(12) United States Patent
Schott et al.

(10) Patent No.: US 12,440,523 B2
(45) Date of Patent: *Oct. 14, 2025

(54) IMMUNOMODULATORY COMPOSITIONS COMPRISING MICROBIAL ENTITIES

(71) Applicant: Solarea Bio, Inc., Cambridge, MA (US)

(72) Inventors: Eric Michael Schott, West Roxbury, MA (US); Gerardo V. Toledo, Hopkinton, MA (US); Maria Juliana Soto-Giron, Cambridge, MA (US); Alicia Eve Ballok, Natick, MA (US); Ryan Green, Somerville, MA (US); Mark Charbonneau, Medford, MA (US)

(73) Assignee: Solarea Bio, Inc., Waltham, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/477,298

(22) Filed: Sep. 28, 2023

(65) Prior Publication Data

US 2024/0131091 A1 Apr. 25, 2024
US 2024/0226201 A9 Jul. 11, 2024

Related U.S. Application Data

(63) Continuation of application No. 18/304,264, filed on Apr. 20, 2023, now Pat. No. 12,016,891, which is a
(Continued)

(51) Int. Cl.
*A61K 35/747* (2015.01)
*A23L 33/105* (2016.01)
(Continued)

(52) U.S. Cl.
CPC .......... *A61K 35/747* (2013.01); *A23L 33/105* (2016.08); *A23L 33/135* (2016.08);
(Continued)

(58) Field of Classification Search
CPC .................................................. A61K 35/747
See application file for complete search history.

(56) References Cited

U.S. PATENT DOCUMENTS 3,048,526 A 8/1962 Bloswell
3,108,046 A 10/1963 Harbit
(Continued)

FOREIGN PATENT DOCUMENTS

AU 2008231930 A1 10/2008
BR PI0905590 A2 8/2011
(Continued)

OTHER PUBLICATIONS

Lu, et al., "Short Chain Fatty Acids Prevent High-fat-diet-induced Obesity in Mice by Regulating G Protein-coupled Receptors and Gut Microbiota", Sci Rep, 2016, vol. 6, No. 37589: pp. 1-13.
(Continued)

*Primary Examiner* — Rosanne Kosson
(74) *Attorney, Agent, or Firm* — Goodwin Procter LLP

(57) ABSTRACT

This disclosure provides for compositions (e.g., pharmaceutical compositions, dietary supplements, medical foods and food stuff), comprising combinations of live microbe populations for the treatment and/or prevention of immune system disorders and conditions related to inflammation, including both pathogen assisted conditions and conditions that are independent of pathogens. Included with the present disclosure are methods for use of the compositions, and methods for selecting microbial entities to formulate the compositions of the disclosure.

18 Claims, 43 Drawing Sheets

Specification includes a Sequence Listing.

Related U.S. Application Data continuation of application No. PCT/US2022/053684, filed on Dec. 21, 2022.

(60) Provisional application No. 63/348,854, filed on Jun. 3, 2022, provisional application No. 63/292,362, filed on Dec. 21, 2021.

(51) Int. Cl.
| | |
|---|---|
| *A23L 33/135* | (2016.01) |
| *A23L 33/15* | (2016.01) |
| *A61K 31/525* | (2006.01) |
| *A61K 35/742* | (2015.01) |
| *A61K 45/06* | (2006.01) |
| *A61P 29/00* | (2006.01) |

(52) U.S. Cl.
CPC ............ *A23L 33/15* (2016.08); *A61K 31/525* (2013.01); *A61K 35/742* (2013.01); *A61K 45/06* (2013.01); *A61P 29/00* (2018.01)

(56) References Cited

U.S. PATENT DOCUMENTS

| | | | |
|---|---|---|---|
| 3,536,809 | A | 10/1970 | Applezweig |
| 3,598,123 | A | 8/1971 | Zaffaroni |
| 3,845,770 | A | 11/1974 | Theeuwes et al. |
| 3,916,899 | A | 11/1975 | Theeuwes et al. |
| 4,008,719 | A | 2/1977 | Theeuwes et al. |
| 4,478,822 | A | 10/1984 | Haslam et al. |
| 4,532,126 | A | 7/1985 | Ebert et al. |
| 4,625,494 | A | 12/1986 | Iwatschenko |
| 4,671,953 | A | 6/1987 | Stanley et al. |
| 4,786,505 | A | 11/1988 | Lovgren et al. |
| 4,800,083 | A | 1/1989 | Hom et al. |
| 4,904,479 | A | 2/1990 | Illum |
| 4,919,939 | A | 4/1990 | Baker |
| 4,935,243 | A | 6/1990 | Borkan et al. |
| 4,950,484 | A | 8/1990 | Olthoff et al. |
| 5,013,726 | A | 5/1991 | Ivy et al. |
| 5,059,595 | A | 10/1991 | Grazie |
| 5,073,543 | A | 12/1991 | Marshall et al. |
| 5,120,548 | A | 6/1992 | McClelland et al. |
| 5,225,202 | A | 7/1993 | Hodges et al. |
| 5,354,556 | A | 10/1994 | Sparks et al. |
| 5,591,767 | A | 1/1997 | Mohr et al. |
| 5,610,184 | A | 3/1997 | Shahinian, Jr. |
| 5,639,476 | A | 6/1997 | Oshlack et al. |
| 5,674,533 | A | 10/1997 | Santus et al. |
| 5,733,556 | A | 3/1998 | Schrier et al. |
| 5,733,575 | A | 3/1998 | Mehra et al. |
| 5,837,284 | A | 11/1998 | Mehta |
| 5,871,776 | A | 2/1999 | Mehta |
| 5,902,632 | A | 5/1999 | Mehta |
| 6,139,875 | A | 10/2000 | Adams et al. |
| 6,258,380 | B1 | 7/2001 | Overholt |
| 6,420,473 | B1 | 7/2002 | Chittamuru et al. |
| 6,455,052 | B1 | 9/2002 | Marcussen et al. |
| 6,482,435 | B1 | 11/2002 | Stratton et al. |
| 6,511,685 | B1 | 1/2003 | Weissmahr |
| 6,544,510 | B2 | 4/2003 | Olshenitsk et al. |
| 6,569,457 | B2 | 5/2003 | Ullah et al. |
| 6,572,871 | B1 | 6/2003 | Church et al. |
| 6,750,331 | B1 | 6/2004 | Takaichi et al. |
| 7,214,370 | B2 | 5/2007 | Naidu et al. |
| 8,318,151 | B2 | 11/2012 | Darimont-Nicolau et al. |
| 8,460,726 | B2 | 6/2013 | Harel et al. |
| 8,802,158 | B2 | 8/2014 | Boileau et al. |
| 8,871,266 | B2 | 10/2014 | Sanguansri et al. |
| 8,877,178 | B2 | 11/2014 | Boileau et al. |
| 9,040,101 | B2 | 5/2015 | Heiman et al. |
| 9,095,604 | B2 | 8/2015 | Ikegami et al. |
| 9,173,910 | B2 | 11/2015 | Kaplan et al. |
| 9,301,983 | B2 | 4/2016 | Huang et al. |
| 9,371,510 | B2 | 6/2016 | Moore |
| 9,386,793 | B2 | 7/2016 | Blaser et al. |
| 9,487,764 | B2 | 11/2016 | Falb et al. |
| 9,549,955 | B2 | 1/2017 | Rittmann et al. |
| 9,636,367 | B2 | 5/2017 | Garcia-Rodenas et al. |
| 9,937,211 | B2 | 4/2018 | Kelly et al. |
| 10,064,895 | B2 | 9/2018 | Vincent |
| 12,016,891 | B2 * | 6/2024 | Schott .................... A61P 29/00 |
| 2004/0213828 | A1 | 10/2004 | Smith |
| 2005/0147710 | A1 | 7/2005 | Teckoe et al. |
| 2010/0172874 | A1 | 7/2010 | Turnbaugh et al. |
| 2011/0111094 | A1 | 5/2011 | Lavermicocca et al. |
| 2011/0177567 | A1 | 7/2011 | Bakker et al. |
| 2011/0177976 | A1 | 7/2011 | Gordon et al. |
| 2012/0015075 | A1 | 1/2012 | Davis et al. |
| 2012/0040387 | A1 | 2/2012 | Matsuoka |
| 2014/0044858 | A1 | 2/2014 | Quevedo |
| 2014/0065209 | A1 | 3/2014 | Putaala et al. |
| 2014/0147425 | A1 | 5/2014 | Henn et al. |
| 2014/0179726 | A1 | 6/2014 | Bajaj et al. |
| 2014/0314719 | A1 | 10/2014 | Smith et al. |
| 2015/0126463 | A1 | 5/2015 | Hsiao et al. |
| 2015/0259728 | A1 | 9/2015 | Cutcliffe et al. |
| 2015/0366941 | A1 | 12/2015 | Menear et al. |
| 2016/0067289 | A1 | 3/2016 | Berggren et al. |
| 2016/0081309 | A1 | 3/2016 | Newton et al. |
| 2016/0143961 | A1 | 5/2016 | Berry et al. |
| 2016/0199424 | A1 | 7/2016 | Berry et al. |
| 2016/0206666 | A1 | 7/2016 | Falb et al. |
| 2016/0235792 | A1 | 8/2016 | Berry et al. |
| 2016/0263166 | A1 | 9/2016 | Elinav et al. |
| 2016/0271189 | A1 | 9/2016 | Cutcliffe et al. |
| 2016/0302464 | A1 | 10/2016 | Egli et al. |
| 2016/0354417 | A1 | 12/2016 | Smittle et al. |
| 2017/0165303 | A1 | 6/2017 | Olmstead |
| 2017/0326190 | A1 | 11/2017 | Ansell et al. |
| 2018/0303934 | A1 * | 10/2018 | Clube .................... A61P 37/00 |
| 2019/0321420 | A1 | 10/2019 | Chen et al. |
| 2020/0164002 | A1 | 5/2020 | Toledo et al. |
| 2022/0354907 | A1 | 11/2022 | Toledo et al. |

FOREIGN PATENT DOCUMENTS

| | | | |
|---|---|---|---|
| CA | 2334877 | A1 | 10/2000 |
| EP | 1495109 | A1 | 1/2005 |
| EP | 1794283 | A1 | 6/2007 |
| WO | WO-2004080200 | A1 | 9/2004 |
| WO | WO-2010099617 | A1 | 9/2010 |
| WO | WO-2012098254 | A1 | 7/2012 |
| WO | WO-2012170047 | A2 | 12/2012 |
| WO | WO-2013067146 | A1 | 5/2013 |
| WO | WO-2013176774 | A1 | 11/2013 |
| WO | WO-2014068338 | A1 | 5/2014 |
| WO | WO-2014145958 | A2 | 9/2014 |
| WO | WO-2015172191 | A1 | 11/2015 |
| WO | WO-2015177246 | A2 | 11/2015 |
| WO | WO-2015200842 | A1 | 12/2015 |
| WO | WO-2016065075 | A1 | 4/2016 |
| WO | WO-2016086205 | A2 | 6/2016 |
| WO | WO-2016086210 | A1 | 6/2016 |
| WO | WO-2016124940 | A1 | 8/2016 |
| WO | WO-2016172658 | A2 | 10/2016 |
| WO | WO-2017160711 | A1 | 9/2017 |
| WO | WO-2019118984 | A2 | 6/2019 |
| WO | WO-2020051379 | A1 | 3/2020 |
| WO | WO-2020257722 | A2 | 12/2020 |
| WO | WO-2021061991 | A1 | 4/2021 |

OTHER PUBLICATIONS

Scortichini, et al., "Development and validation of a GC-FID method for the analysis of short chain fatty acids in rat and human faeces and in fermentation fluids", J Chromatogr B Analyt Technol Biomed Life Sci., Apr. 2020, vol. 1143, Article 121972: pp. 1-9. Epub Jan. 13, 2020.

"Bone Density Study in Post-Menopausal Women", RDC Clinical, New Study Announcement, Dec. 3, 2021 [online], [Retrieved Jun.

(56) References Cited

OTHER PUBLICATIONS 9, 2022]. Retrieved from the internet: https://www.rdcclinical.com.au/trials/bone-density-study/. 8 Pages.
"Solarea Bio Announces Licensing Agreement with ADM", Solarea Bio Press Release, Oct. 19, 2021, 10:17 ET: pp. 1-3.
Vijayakumar, et al., "A Microplate Growth Inhibition Assay for Screening Bacteriocins against Listeria monocytogenes to Differentiate Their Mode-of-Action", Biomolecules, Jun. 2015, vol. 5, No. 2: pp. 1178-1194.
Scott, et al., "Manipulating the gut microbiota to maintain health and treat disease", Micro Ecol Health Dis, 2015, vol. 26, No. 25877: pp. 1-10.
"Solarea peer-review publication reveals green olives and other fruits and vegetables have vast microbial diversity with the potential to deliver probiotic functionality", Solarea Bio Press Release, Solarea Bio Press Release, Dec. 15, 2021, 10:17 ET: pp. 1-3.
Abdulla OA, Neamah W, Sultan M, Alghetaa HK, Singh N, Busbee PB, Nagarkatti M and Nagarkatti P (2021) The Ability of AhR Ligands to Attenuate Delayed Type Hypersensitivity Reaction Is Associated With Alterations in the Gut Microbiota. Front. Immunol. 12:684727. doi: 10.3389/fimmu.2021.684727.
Abubucker, et al., "Metabolic Reconstruction for Metagenomic Data and Its Application to the Human Microbiome", PLoS Computational Biology, Jun. 2012, vol. 8, No. 6: pp. 1-17.
Seeman, et al., "Age- and Menopause-Related Bone Loss Compromise Cortical and Trabecular Microstructure", J Gerontol A Biol Sci Med Sci, Oct. 2013, vol. 10: pp. 1218-1225.
Aghaloo, et al. "Periodontal Diseas and Bisphosphonates Induce Osteonecrosis of the Jaws in the Rat", Journal of Bone and Mineral Research, vol. 26, No. 8, Aug. 2011, pp. 1871-1882 DOI: 10.1002/jbmr.379.
Agus et al. "Gut Microbiota Regulation of Tryptophan Metabolism in Health and Disease," Cell Host & Microbe, vol. 23, Issue 6, 2018, pp. 716-724, ISSN 1931-3128, https://doi.org/10.1016/j.chom.2018.05.003.
Villageliu, et al., "Dopamine production in Enterococcus faecium: A microbial endocrinology-based mechanism for the selection of probiotics based on neurochemical-producing potential", PLoS One, Nov. 2018, vol. 13, No. 11: e0207038 (10 pages).
Segata, et al., "Metagenomic microbial community profiling using unique clade-specific marker genes", Nature Methods, Jun. 2012, vol. 9, No. 8: pp. 811-814.
Alcock, et al., "Is eating behavior manipulated by the gastrointestinal microbiota? Evolutionary pressures and potential mechanisms", Bioessays 2014, vol. 36: pp. 940-949.
Aletaha et. al. "2010 Rheumatoid arthritis classification criteria: An American College of Rheumatology/European League Against Rheumatism collaborative initiative." Arthritis & Rheumatism, 62: 2569-2581. https://doi.org/10.1002/art.27584.
Allen. P. et al. "Immunomodulatory Roles of Polysaccharide Capsules in the Intestine Frontiers in Immunology" vol. 11 (2020) https://www.frontiersin.org/articles/10.3389/fimmu.2020.00690, DOI=10.3389/fimmu.2020.00690.
Serino, et al., "Metabolic adaptation to a high-fat diet is associated with a change in the gut microbiota", Gut, 2012, vol. 61: pp. 543-553.
Allgeier, RJ et al (1929) A colorimetric method for the determination of butyric acid. J Bacteriol 17(2): 79-87.
Almutairi et al., "The global prevalence of rheumatoid arthritis: a meta-analysis based on a systematic review", Rheumatology International, 2020, https://doi.org/10.1007/s00296-020-04731-0: pp. 1-15.
Visser, et al., "Optimal dosage and route of administration of methotrexate in rheumatoid arthritis: a systematic review of the literature", Ann Rheum Dis., Jul. 2009, vol. 68, No. 7: pp. 1094-1099. Epub Nov. 2009.
Sethi, et al., "Design, synthesis and computational studies involving Indole-Coumarin hybrids as galectin-1 inhibitors", Chemical Papers, Month 2021, vol. 75: pp. 2791-2805. Epub Feb. 2, 2021.
Altschul, et al., "Basic Local Alignment Search Tool", J Mol Biol., Oct. 5, 1990, vol. 215, No. 3: pp. 403-410.

Amalraj, et al., "A Novel Highly Bioavailable Curcumin Formulation Improves Symptoms and Diagnostic Indicators in Rheumatoid Arthritis Patients: A Randomized, Double-Blind, Placebo-Controlled, Two-Dose, Three-Arm, and Parallel-Group Study", J Med Food 20 (10) 2017, 1022-1030. DOI: 10.1089/jmf.2017.3930.
An, et al., "GABA-producing Lactobacillus plantarum inhibits metastatic properties and induces apoptosis of 5-FU-resistant colorectal cancer cells via GABAB receptor signaling§", Journal of Microbiology (2021) vol. 59, No. 2, pp. 202-216.
Shahbizi, et al., "Anti-Inflammatory and Immunomodulatory Properties of Fermented Plant Foods", Nutrients, Apr. 2021, vol. 13, No. 5, Article 1516: pp. 1-20.
Ananthakrishnan, et al., "Gut Microbiome Function Predicts Response to Anti-integrin Biologic Therapy in Inflammatory Bowel Diseases", Cell Host & Microbe, May 10, 2017, vol. 21: pp. 603-610.
Anastasilakis, et al., "Head-to-head comparison of risedronate vs. teriparatideon bone turnover markers in women with postmenopausal osteoporosis: a randomised trial", Int J Clin Pract, Jun. 2008, vol. 62, No. 6: pp. 919-924.
Vital, et al., "A gene-targeted approach to investigate the intestinal butyrate-producing bacterial community", Microbiome, 2013, vol. 1, No. 8: pp. 1-14.
Shajib, et al., "Diverse Effects of Gut-Derived Serotonin in Intestinal Inflammation", ACS Chemical Neuroscience, May 2017, vol. 8: pp. 920-931.
Aron-Wisnewsky, J et al (2012) The importance of the gut microbiota after bariatric surgery. Nature 9(10): 590-598.
Artacho, et al., "The Pretreatment Gut Microbiome Is Associated With Lack of Response to Methotrexate in New-Onset Rheumatoid Arthritis", American College of Rheumatology, vol. 73, No. 6, Jun. 2021, pp. 931-942.
Asgari, et al., "Nucleotide-pair encoding of 16S rRNA sequences for host phenotype and biomarker detection", bioRxiv, Jul. 19, 2018, pp. 1-25. https://doi.org/10.1101/334722.
Sheikhi, et al., "Probiotic Yogurt Culture Bifidobacterium Animalis Subsp Lactis BB-12 and Lactobacillus Acidophilus LA-5 Modulate the Cytokine Secretion by Peripheral Blood Mononuclear Cells from Patients with Ulcerative Colitis", Drug Res, 2016, vol. 66: pp. 300-305.
Atarashi, et al., "Induction of Colonic Regulatory T Cells by Indigenous Clostridium Species", Science, Jan. 21, 2011, vol. 331: pp. 337-341.
Atarashi, et al., "Treg induction by a rationally selected mixture of Clostridia strains from the human microbiota", Nature, Aug. 8, 2013, vol. 500: pp. 232-236.
Vivekananda, et al., "Effect of the probiotic Lactobacilli reuteri (Prodentis) in the management of periodontal disease: a preliminary randomized clinical trial", Journal of Oral Microbiology, Nov. 2010, vol. 2, Article 5344: pp. 1-10.
Sheth, et al., "Spatial metagenomic characterization of microbial biogeography in the gut", Nature Biotechnology, Aug. 2019, vol. 37, pp. 877-883.
Backhed, et al., "Mechanisms underlying the resistance to diet-induced obesity in germ-free mice", PNAS, 2007, vol. 104, No. 3: pp. 979-984.
Backhed, et al., "The gut microbiota as an environmental factor that regulates fat storage", PNAS, 2004, vol. 101, No. 44: pp. 15718-15723.
Bagga, et al., "Differential effects of prostaglandin derived from w-6 and w-3 polyunsaturated fatty acids on COX-2 expression and IL-6 secretion", PNAS, Feb. 18, 2003, vol. 100, pp. 1751-1756.
Shin, et al., "An increase in the Akkermansia spp population induced by metformin treatment improves glucose homeostasis in diet-induced obese mice", Gut, 2014, vol. 63: pp. 727-735.
Bahr, et al., "Risperidone-induced weight gain is mediated through shifts in the gut microbiome and suppression of energy expenditure", EBioMedicine, 2015, vol. 2: pp. 1725-1734.
Bai, et al., "Response of gut microbiota and inflammatory status to bitter melon (*Momordica charantia* L.) in high fat diet induced obese rats", J Ethnopharmacol, 2016, vol. 194: pp. 717-726.
Shoaie, et al., "Quantifying Diet-Induced Metabolic Changes of the Human Gut Microbiome", Cell Metab, 2015, vol. 22: pp. 320-331.

(56) References Cited

OTHER PUBLICATIONS

Bansal, et al., "The bacterial signal indole increases epithelial-cell tight-junction resistance and attenuates indicators of inflammation", PNAS, Jan. 5, 2010, vol. 107, pp. 1-6.

Bellamy, et al., "Validation study of WOMAC: a health status instrument for measuring clinically important patient relevant outcomes to antirheumatic drug therapy in patients with osteoarthritis of the hip or knee", J Rheumatol, Dec. 1988, vol. 15, No. 12: pp. 1833-1840.

Simpson, et al., "Review article: dietary fibre-microbiota interactions", Aliment Pharmacol Ther, 2015, vol. 42: pp. 158-179.

Belsky, et al., "Change in the Rate of Biological Aging in Response to Caloric Restriction: CALERIE Biobank Analysis", J Gerontol A Biol Sci Med Sci, 2018, vol. 73, No. 1, 4-10 doi:10.1093/gerona/glx096.

Berg, G et al (2015) The Edible Plant Microbiome: Importance and Health Issues. In: Lugtenberg B. (eds) Principles of Plant-Microbe Interactions, Chapter 44,. Springer, Cham.

Vogt, et al., "L-Rhamnose increases serum propionate in humans1-3", Am J Clin Nutr, 2004, vol. 80: pp. 89-94.

Singer, et al., "The initiation of metabolic inflammation in childhood obesity", J Clin Invest, 2017, vol. 127, No. 1: pp. 65-73.

Biaggini, et al., "The pathogenic potential of Pseudomonas fluorescens MFN1032 on enterocytes can be modulated by serotonin, substance P and epinephrine." Archives of microbiology 197, No. 8 (2015): 983-990.

Bischoff, et al., "Role of serotonin in intestinal inflammation: knockout of serotonin reuptake transporter exacerbates 2,4,6-trinitrobenzene sulfonic acid colitis in mice", Am J Physiol Gastrointest Liver Physiol, Mar. 2009, vol. 296, No. 3: pp. G685-G695.

Bleau, et al., "Crosstalk between intestinal microbiota, adipose tissue and skeletal muscle as an early event in systemic low-grade inflammation and the development of obesity and diabetes", Diabetes Metab Res Rev, 2015, vol. 31, No. 6: pp. 545-561.

Singh, et al., "Dysregulated Microbial Fermentation of Soluble Fiber Induces Cholestatic Liver Cancer", Cell, 2018, vol. 175: pp. 679-694.

Boden, G (2011) Obesity, Insulin Resistance and Free Fatty Acids. Curr Opin Endocrinol Diabetes Obes 18(2): 139-143.

Voreades, et al., "Diet and the development of the human intestinal microbiome", Front Microbiol, 2014, vol. 5, No. 494: 1-9.

Sjogren, et al., "The Gut Microbiota Regulates Bone Mass in Mice", Journal of Bone and Mineral Research, Jun. 2012, vol. 27, No. 6: pp. 1357-1367.

Bouxsein, et al., "Considerations for Development of Surrogate Endpoints for Antifracture Efficacy of New Treatments in Osteoporosis: A Perspective", Journal of Bone and Mineral Research, Mar. 3, 2008, vol. 23, No. 8: pp. 1155-1167.

Bouxsein, et al., "Ovariectomy-Induced Bone Loss Varies Among Inbred Strains of Mice", Journal of Bone and Mineral Research, Mar. 7, 2005, vol. 20, No. 7: pp. 1085-1092.

Brand, et al., "Collagen-induced arthritis", Nature Protocols, 2007, vol. 2 No. 5., 1269-1275. doi:10.1038/nprot.2007.173.

Skelly, et al., "Mining the microbiota for microbial and metabolite-based immunotherapies", Nat Rev Immunol, May 2019, vol. 19, No. 5: pp. 305-323 (19 pages).

Braun, et al., "Ankylosing spondylitis", Lancet 2007; 369: 1379-90.

Britton, et al., "Probiotic L. reuteri Treatment Prevents Bone Loss in a Menopausal Ovariectomized Mouse Model", Journal of Cellular Physiology, 2014, vol. 229: pp. 1822-1830.

Vorholt, et al., "Microbial life in the phyllosphere", Institute of Microbiology, Dec. 2012, vol. 10: pp. 828-840.

Skirbekk, et al., "How to Measure Population Aging? The Answer Is Less than Obvious: A Review", Gerontology, 2019, vol. 65, No. 2: pp. 136-144. Epub Dec. 13, 2018.

Brown, et al., "Gut Microbiota Regulation of T Cells During Inflammation and Autoimmunity", Annual Review of Immunology, 2019, vol. 37: pp. 599-624.

Brunkwall, L et. al., (2017) The gut microbiome as a target for prevention and treatment of hyperglycemia in type 2 diabetes: from current human evidence to future possibilities. Diabetalogia 60: 943-951.

Caffaratti, et al., "What We Know So Far about the Metabolite-Mediated Microbiota-Intestinal Immunity Dialogue and How to Hear the Sound of This Crosstalk", Metabolites 2021, 11, 406. https://doi.org/10.3390/metabo11060406 https://www.mdpi.com/journal/metabolites: pp. 1-37.

Slavin, et al., "Fiber and Prebiotics: Mechanisms and Health Benefits", Nutrients, 2013, vol. 5: pp. 1417-1435.

Calise, et el., "Immune Response-Dependent Assembly of IMP Dehydrogenase Filaments", Frontiers in Immunology, Nov. 29, 2018, vol. 9, Article 2789: pp. 1-15.

Camacho, L. et al (2015) Metformin in breast cancer-an evolving mystery. Breast Cancer Res 17(88): 1-4.

Wagner, et al., "Pyruvate fermentation by Oenococcus oeni and Leuconostoc mesenteroides and role of pyruvate dehydrogenase in anaerobic fermentation." Applied and environmental microbiology 71, No. 9 (2005): 4966-4971.

Smith, et al., "Comparison of Biosequences", Advances in Applied Mathematics 2, 1981: pp. 482-489.

Cani, et al., "Improvement of glucose tolerance and hepatic insulin sensitivity by oligofructose requires a functional glucagon-like peptide 1 receptor", Diabetes, 2006, vol. 55: pp. 1484-1490.

Cani, et al., "Metabolic endotoxemia initiates obesity and insulin resistance", Diabetes, 2007, vol. 56: pp. 1761-1772.

Carbonero, et al., "Microbial pathways in colonic sulfur metabolism and links with health and disease", Frontiers in Immunology, Nov. 28, 2012, vol. 3, Article 448: pp. 1-11.

Smith, et al., "Yeast Modulation of Human Dendritic Cell Cytokine Secretion: An In Vitro Study", PLoS One, 2014, vol. 9, No. 5: pp. 1-14.

Cario, "Barrier-protective function of intestinal epithelial Toll-like receptor 2", nature publishing group, vol. 1 Supplement 1 | Nov. 2008 | www.nature.com/mi, doi:10.1038/mi.2008.47: pp. S62-S66.

Catrina, et al., "RA: from risk factors and pathogenesis to prevention, Gene, environment, microbiome and mucosal immune tolerance in rheumatoid arthritis", Rheumatology Advance Access published Dec. 23, 2014, doi:10.1093/rheumatology/keu469, Downloaded from http://rheumatology.oxfordjournals.org/ at University of California, San Francisco on Mar. 11, 2015: pp. 1-12.

Wagner, et al., "The Pentose Phosphate Pathway in Regenerating Skeletal Muscle", Biochem. 1978, vol. 170: pp. 17-22.

Smolen, et al., "Clinical trials of new drugs for the treatment of rheumatoid arthritis: focus on early disease", Ann Rheum Dis., Jul. 2016, vol. 75, No. 7: pp. 1268-1271. Epub Apr. 2016.

Charbonneau, et al., "Sialylated Milk Oligosaccharides Promote Microbiota-Dependent Growth in Models of Infant Undernutrition", Cell, Feb. 25, 2016, vol. 164, pp. 859-871.

Chassaing, et al., "Intestinal Epithelial cell Toll-like Receptor 5 Regulates the Intestinal Microbiota to Prevent Low-grade Inflammation and Metabolic Syndrome in Mice", Published in final edited form as: Gastroenterology. Dec. 2014 ; 147(6): 1363-1377.e17. doi:10.1053/j.gastro.2014.08.033,; pp. 1-19.

Chelliah, et al., "Evaluation of antimicrobial activity and probiotic properties of wild-strain Pichia kudriavzevii isolated from frozen idli batter", Yeast, 2016, vol. 33, pp. 385-401.

Smollen, et al., "Rheumatoid arthritis", Nature Reviews Disease Primers, Feb. 2018, vol. 4, Article 18001: pp. 1-23.

Chen, et al., "Estrogen and Microbiota Crosstalk: Should We Pay Attention?", Trends in Endocrinology & Metabolism, Nov. 2016, vol. 27, No. 11, pp. 752-755.

Chen, et al., "Metabolism of Fructooligosaccharides in Lactobacillus plantarum ST-III via Differential Gene Transcription and Alteration of Cell Membrane Fluidity", Appl Environ Microbiol, 2015, vol. 81, No. 22: pp. 7697-7707.

Wahlstrom, et al., "Intestinal Crosstalk between Bile Acids and Microbiota and Its Impact on Host Metabolism", Cell Metab, 2016, vol. 24: pp. 41-50.

Solarea Bio, "Managing inflammatory diseases and aging with edible plant microbes", www.nature.com/biopharmdeal, Dec. 2022: pp. B2-B3.

(56) References Cited

OTHER PUBLICATIONS

Choi, et al., "Difference in the Gut Microbiome between Ovariectomy-Induced Obesity and Diet-Induced Obesity", J. Microbiol. Biotechnol, Dec. 28, 2017, vol. 27, No. 12: pp. 2228-2236.
Chriswell, et al., "Microbiota mediated mucosal inflammation in arthritis", Published in final edited form as: Best Pract Res Clin Rheumatol. Dec. 2019 ; 33(6): 101492. doi:10.1016/j.berh.2020.101492; pp. 1-17.
Codella, R et al (2018) Exercise has the guts: how physical activity may positively modulate gut microbiota in chronic and immune-based diseases. Digest Liv Dis 50: 331-341.
Solarea Bio, Inc., "Food Trial Evaluating the Efficacy of SBD111 Versus Placebo for the Clinical Dietary Management of the Metabolic Processes of Osteopenia", Nih U.S. National Library of Medicine, Last updated Jan. 28, 2022: pp. 1-6. <https://beta.clinicaltrials.gov/study/NCT05009875>.
Collins, et al., "Beneficial effects of Lactobacillus reuteri 6475 on bone density in male mice is dependent on lymphocytes", Scientific Reports, 2019, vol. 9: pp. 1-17.
Correa, et al., "Regulation of immune cell function by short-chain fatty acids", Clinical & Translational Immunology, 2016, vol. 5, pp. 1-8.
Wallace, et al., "Use and Abuse of HOMA Modeling", Diabetes Care, 2004, vol. 27, No. 6: pp. 1487-1495.
Sonnenburg, et al., "Diet-microbiota interactions as moderators of human metabolism", Nature, 2016, vol. 535: pp. 56-64.
Cowardin, et al., "Mechanisms by which sialylated milk oligosaccharides impact bone biology in a gnotobiotic mouse model of infant undernutrition", PNAS, Jun. 11, 2019, vol. 116, No. 24: pp. 11988-11996.
Cowardin, et al., "Supplementary Information for: Mechanisms by which sialylated milk oligosaccharides impact bone biology in a gnotobiotic mouse model of infant undernutrition", PNAS, www.pnas.org/cgi/doi/10.1073/pnas.1821770116.
Coyle, et al., "Metformin as an adjuvant treatment for cancer: a systematic review and meta analysis", Ann Onc, 2016, vol. 27, pp. 2184-2195.
Sonowal, et al., "Indoles from commensal bacteria extend healthspan", Proc Natl Acad Sci USA, Sep. 2017, vol. 114, No. 36: pp. E7506-E7515. Epub Aug. 2017.
Crimmins, et al., "Quest for a summary measure of biological age: the health and retirement study", GeroScience (2021) 43:395-408, https://doi.org/10.1007/s11357-021-00325-1: pp. 395-408.
Cristofori, et al., "Anti-Inflammatory and Immunomodulatory Effects of Probiotics in Gut Inflammation: A Door to the Body", Frontiers of Immunology, Feb. 26, 2021, vol. 12, Article 578386: pp. 1-21.
Walsham, et al., "Lactobacillus reuteri Inhibition of Enteropathogenic *Escherichia coli* Adherence to Human Intestinal Epithelium", Frontiers in Microbiology, Mar. 2016, vol. 7, Article 244: pp. 1-10.
Soto-Giron, et al., "The Edible Plant Microbiome represents a diverse genetic reservoir with functional potential in the human host", Scientific Reports, Dec. 2021, vol. 11, No. 1, Article 24017: pp. 1-14.
Dalby, et al., "Dietary Uncoupling of Gut Microbiota and Energy Harvesting from Obesity and Glucose Tolerance in Mice", Cell Reports, 2017, vol. 21 pp. 1521-1533.
Damani, et al., "The Role of Prunes in Modulating Inflammatory Pathways to Improve Bone Health in Postmenopausal Women", Adv Nutr, Oct. 2, 2022, vol. 13, No. 5: pp. 1476-1492.
Dar, et al., "Bacillus clausii inhibits bone loss by skewing Treg-Th17 cell equilibrium in postmenopausal osteoporotic mice model", Nutrition, 2018, vol. 54, pp. 118-128.
Strorelli, et al., "Metformin, Microbes, and Aging", Cell Metab, 2013, vol. 17: pp. 809-811.
Das, et al., "Prevention of Diabetes-A Historical Note", IJHS, 2013, vol. 48, No. 4, pp. 625-642.
Walter, et al., "Screening Concepts for the Isolation of Biosurfactant Producing Microorganisms", Part of the Advances in Experimental Medicine and Biology (AEMB) book series, 2010, vol. 672: pp. 1-13 (20 pages).

Stuible, et al., "Mechanism and Function of Monoclonal Antibodies Targeting Siglec-15 for Therapeutic Inhibition of Osteoclastic Bone Resorption*", The Journal of Biological Chemistry, vol. 289, No. 10: pp. 6498-6512.
De Jesus Raposo, et al., "Emergent Sources of prebiotics: seaweed and microalgae", Mar. Drugs, 2016, vol. 14, No. 2: doi: 10.3390/md14020027.
De La Cuesta-Zuluaga, et al., "Metformin Is Associated With Higher Relative Abundance of Mucin-Degrading Akkermansia muciniphila and Several Short-Chain Fatty Acid-Producig Microbiota in the Gut", Diabetes Care, 2017, vol. 40: pp. 54-62.
Deehan, et al., "Precision Microbiome Modulation with Discrete Dietary Fiber Structures Directs Short-Chain Fatty Acid Production", Cell Host & Microbe, Mar. 11, 2020, vol. 27: pp. 1-16.
Delzenne, NM (2015) Gut microorganisms as promising targets for the management of type 2 diabetes. Diabetalogia 58: 2206-2217.
Derrien, M et al., (2015) Fate, activity, and impact of ingested bacteria within the human gut microbiota. Trends in Microbiol 23(6): 354-366.
Wan, et al., "Serotonin: A Potent Immune Cell Modulator in Autoimmune Diseases", Frontiers in Immunology, Feb. 2020, vol. 11, Article 186: pp. 1-12.
Stull, et al., "Bioactives in Blueberries Improve Insulin Sensitivity in Obese, Insulin-Resistant Men and Women", J Nutr, 2010, vol. 140, No. 10: pp. 1764-1768.
Di Francesco, et al., "A time to fast", Science, 2018, vol. 362: pp. 770-775.
Diebel, et al., "Determination of Biological Age: Geriatric Assessment vs Biological Biomarkers", Current Oncology Reports (2021) 23: 104 | https://doi.org/10.1007/s11912-021-01097-9: pp. 1-8.
Drew, L (2016) Reseeding the gut. Nature 540:s109-s112.
Stull, et al., "Blueberries' Impact on Insulin Resistance and Glucose Intolerance", Antioxidants, 2016, vol. 5, No. 44: pp. 1-11.
Duncan, SH et al (2004) Contribution of acetate to butyrate formation by human faecal bacteria. Br J Nutr 91: 915-923.
Duong-Ly, et al., "T cell activation triggers reversible inosine-5'-monophosphate dehydrogenase assembly", Journal of Cell Science, 2018, vol. 131: pp. 1-8.
Wang, et al., "FXR: a metabolic regulator and cell protector", Cell Research, Nov. 2008, vol. 18, No. 11: pp. 1087-1095.
Suez, et al., "Post-Antibiotic Gut Mucosal Microbiome Reconstitution Is Impaired by Probiotics and Improved by Autologous FMT", Cell, 2018, vol. 174: pp. 1406-1423.
Edgar, "Updating the 97% identity threshold for 16S ribosomal RNA OTUs." Bioinformatics 34, No. 14 (2018): 2371-2375.
Elzinga, et al., "The Use of Defined Microbial Communities To Model Host-Microbe Interactions in the Human Gut", Microbiology and Molecular Biology Reviews, Jun. 2019, vol. 83, No. 2: pp. 1-40.
Engelke, et al., "Clinical Use of Quantitative Computed Tomography and Peripheral Quantitative Computed Tomography in the Management of Osteoporosis in Adults: The 2007 ISCD Official Positions", Journal of Clinical Densitometry, 2008, vol. 11, No. 1: pp. 123-162.
Sun, et al., "Assessments of Probiotic Potentials of Lactiplantibacillus plantarum Strains Isolated From Chinese Traditional Fermented Food: Phenotypic and Genomic Analysis", Frontiers in Microbiology, May 2022, vol. 13, Article 895132: pp. 1-10.
Engelke, et al., "Regional distribution of spine and hip QCT BMD responses after one year of once-monthly ibandronate in postmenopausal osteoporosis", Bone, 2010, vol. 46: pp. 1626-1632.
Ericsson, et al., "Variable Colonization after Reciprocal Fecal Microbiota Transfer between Mice with Low and High Richness Microbiota", Front Microbiol, 2017, vol. 8, No. 196: pp. 1-13.
Wang, et al., "Modulation of gut microbiota during probiotic-mediated attenuation of metabolic syndrome in high fat diet-fed mice", ISME J, 2015, vol. 9: pp. 1-15.
Sun, et al., "Gut mirobiota and intestinal FXR mediate the clinical benefits of metformin", Nat Med, 2018, vol. 24: pp. 1919-1929.
Everard, et al., "Microbiome of prebiotic-treated mice reveals novel targets involved in host response during obesity", ISME, 2014, vol. 8: pp. 2116-2130.

(56) References Cited

OTHER PUBLICATIONS

Fairbanks, et al., "Importance of Ribonucleotide Availability to ProliferatingT-lymphocytes from Healthy Humans", The Journal of Biological Chemistry, 1995, vol. 270, No. 50; pp. 29682-29689.

Fan, et al., "Lactobacillus casei CCFM1074 Alleviates Collagen-Induced Arthritis in Rats via Balancing Treg/Th17 and Modulating the Metabolites and Gut Microbiota", Frontiers in Immunology | www.frontiersin.org | May 17, 2021 | vol. 12 | Article 680073 | doi: 10.3389/fimmu.2021.680073: pp. 1-15.

Sutphin, et al., "Caenorhabditis elegans orthologs of human genes differentially expressed with age are enriched for determinants of longevity", Aging Cell, Aug. 2017, vol. 16, No. 4: pp. 672-682. Epub Apr. 2017.

Fan, et al., "Protective effects of Bifidobacterium adolescentis on collagen-induced arthritis in rats depend on timing of administration", Food Funct., 2020, 11, 4499-4511 | DOI:10.1039/d0fo000-77a | Published on Apr. 29, 2020. Downloaded by Harvard University on Dec. 7, 2021 9:17:48 PM: pp. 4499-4511.

Fang, et al., "Intestinal FXR agonism promotes adipose tissue browning and reduces obesity and insulin resistance", Nature, 2015, vol. 21, No. 2: pp. 159-167.

Wasserman, et al., "An Apple a Day: Which Bacteria Do We Eat With Organic and Conventional Apples", Frontiers in Microbiology, Jul. 24, 2019, vol. 10, Article 1629: pp. 1-13.

Suzek, et al., "UniRef clusters: a comprehensive and scalable alternative for improving sequence similarity searches", Bioinformatics, 2015, vol. 31, No. 6: pp. 926-932.

Fiorucci, et al., "Bile Acids Activated Receptors Regulate innate immunity", Frontiers in Immunology | www.frontiersin.org | Aug. 13, 2018 | vol. 9 | Article 1853 | doi: 10.3389/fimmu.2018.01853: pp. 1-17.

Flanagan, et al., "Annual Review of Nutrition Calorie Restriction and Aging in Humans", Annu. Rev. Nutr. 2020.40:105-133. Downloaded from www.annualreviews.org | Access provided by CASA Institution Identity on Feb. 20, 2023 | https://doi.org/10.1146/annurev-nutr-122319-034601: pp. 105-135.

Flores, et al., "Fecal microbial determinants of fecal and systemic estrogens and estrogen metabolites: a cross-sectional study", Journal of Translational Medicine, Dec. 21, 2012, vol. 10, No. 253: pp. 1-11.

Sweeney, et al., "Metabolic surgery: action via hormonal milieu changes, changes in bile acids or gut microbiota? A summary of the literature", Best Pract Res Clin Gastroenterol, 2014, vol. 28: pp. 727-740.

Forslund, et al., "Corrigendum: Disentangling type 2 diabetes and metformin treatment signatures in the human gut microbiota", Nature, 2015, vol. 528, No. 7581: pp. 262-266.

Wassermann, et al., "Harnessing the microbiomes of Brassica vegetables for health issues", Sci Rep, 2017, vol. 7: p. 17649.

Takimoto, et al., "Effect of Bacillus subtilis C-3102 on bone mineral density in healthy postmenopausal Japanese women: a randomized, placebo-controlled, double-blind clinical trial", Bioscience of Microbiota, Food and Health, 2018, vol. 37, No. 4: pp. 87-96.

Franzosa, et al., "Species-level functional profiling of metagenomes and metatranscriptomes", Nature Methods, Nov. 2018, vol. 15, pp. 962-968.

Frost, G et al (2014) The short-chain fatty acid acetate reduces appetite via a central homeostatic mechanism. Nat Commun. 5(3611): 1-11.

Gagnon, et al., "Bone Health After Bariatric Surgery", JBMR Plus, 2017, vol. 2: pp. 1-13.

Tan, et al., "The Role of Short-Chain Fatty Acids in Health and Disease", Advances in Immunology, 2014, vol. 121: pp. 91-119.

Gao, et al., "Impact of the Gut Microbiota on Intestinal Immunity Mediated by Tryptophan Metabolism", Frontiers in Cellular and Infection Microbiology, Feb. 2018, vol. 8, Article 13: pp. 1-22.

Garidou, et al., "The Gut Microbiota Regulates Intestinal CD4 T Cells Expressing RORgt and Controls Metabolic Disease", Cell Metab, 2015, vol. 22: pp. 100-112.

Watanabe, et al., "Impact of senescence-associated secretory phenotype and its potential as a therapeutic target for senescence-associated diseases", Cancer Science, Apr. 2017, vol. 108, No. 4: pp. 563-569.

Ternes, et al., "The gut microbial metabolite formate exacerbates colorectal cancer progression", Nature Metabolism, Apr. 2022, vol. 4, No. 4: pp. 458-475. Epub Apr. 2022.

Gehrig, et al., "Effects of microbiota-directed foods in gnotobiotic animals and undernourished children", Science, Jul. 12, 2019, vol. 365, No. 139: pp. 1-12.

Gehrig, et al., "Supplementary Material for: Effects of microbiota-directed foods in gnotobiotic animals and undernourished children", Science, Jul. 12, 2019, vol. 365, No. 139: pp. 1-42.

Gentile, et al., "The gut microbiota at the intersection of diet and human health", Science, 2018, vol. 362: pp. 776-780.

Terrapon, et al., "How do gut microbes break down dietary fiber?", Trends Biochem Sci, 2014, vol. 39, No. 4: pp. 156-158.

Geva-Zatorsky, et al., "Mining the Human Gut for Immunomodulatory Organisms", Cell, Feb. 23, 2017, vol. 168: pp. 928-943.

Ghosh, et al., "The gut microbiome as a modulator of healthy ageing", Nature Reviews Gastroenterology & Hepatology, Epub: Apr. 2022, vol. 19, No. 9: pp. 565-584.

Weitkunat, et al., "Short-chain fatty acids and inulin, but not guar gum, prevent diet-induced obesity and insulin resistance through differential mechanisms in mice", Sci Rep, 2017, vol. 7, No. 6109: pp. 1-13.

The Tabula Muris Consortium, et al., "A single-cell transcriptomic atlas characterizes ageing tissues in the mouse", Nature, Jul. 2020, vol. 583, No. 7817: pp. 590-595. Epub Jul. 2020.

Giri, et al., "Role of Bacillus licheniformis VS16-Derived Biosurfactant in Mediating Immune Responses in Carp Rohu and its Application to the Food Industry", Frontiers in Microbiology, Mar. 2017, vol. 8, Article 514: pp. 1-13.

Glowacki, et al., "Prevention of inflammation-mediated bone loss in murine and canine periodontal disease via recruitment of regulatory lymphyocytes", Nov. 2013, Nov. 2013, vol. 110, No. 46: pp. 18525-18530 (7 pages). Epub Oct. 2013.

Gonzalez-Garcia, et al., "Microbial propionic acid production", Fermentation, 2017, vol. 3, No. 21: pp. 1-20.

Thevaranjan, et al., "Age-Associated Microbial Dysbiosis Promotes Intestinal Permeability, Systemic Inflammation, and Macrophage Dysfunction", Cell Host & Microbe, Apr. 2017, vol. 21, No. 4: pp. 455-466 (19 pages).

Gosalbes, et al., "Metabolic adaptation in the human gut microbiota during pregnancy and the first year of life", EBioMedicine, 2019, vol. 39: pp. 497-509.

Weitzmann, et al., "Estrogen deficiency and bone loss: an inflammatory tale", The Journal of Clinical Investigation, May 2006, vol. 116, No. 5: pp. 1186-1194.

Théatre, et al., "The Surfactin-Like Lipopeptides From *Bacillus* spp.: Natural Biodiversity and Synthetic Biology for a Broader Application Range", Frontiers in Bioengineering and Biotechnology, Mar. 2021, vol. 9, Article 623701: pp. 1-20.

Greenblatt, et al., "Bone Turnover Markers in the Diagnosis and Monitoring of Metabolic Bone Disease", Clinical Chemistry, 2017, vol. 63, No. 2: pp. 464-474.

Greenspan, et al., "Early Changes in Biochemical Markers of Bone Turnover Predict the Long-Term Response to Alendronate Therapy in Representative Elderly Women: A Randomized Clinical Trial", Journal of Bone and Mineral Research, 1998, vol. 13, No. 9: pp. 1431-1438.

Griffiths, et al., "Psoriasis and Atopic Dermatitis", Dermatol Ther (Heidelb), Epub: Feb. 2017, vol. 7 (Suppl 1): pp. S31-S41.

Tilg, et al., "The intestinal microbiota fuelling metabolic inflammation", Nature Reviews, Aug. 6, 2019: pp. 1-15.

Grootaert, et al., "Adherence and viability of intestinal bacteria to differentiated Caco-2 cells quantified by flow cytometry", Journal of Microbiological Methods, Epub: Apr. 2011, vol. 86, No. 1: pp. 33-41.

Gu, et al., "Analyses of gut microbiota and plasma bile acids enable stratification of patients for antidiabetic treatment", Nature Commun, 2017, vol. 8: p. 1785.

(56) References Cited

OTHER PUBLICATIONS

Welch, et al., "The Effects of Flavonoids on Bone", Curr Osteoporos Rep., 2014, vol. 12: pp. 205-210.

Tohidi, et al., "Omentin-1, visfatin and adiponectin levels in relation to bone mineral density in Iranian postmenopausal women", Bone, 2012, vol. 51: pp. 876-881.

Guo, et al., "Secretions of Bifidobacterium infantis and Lactobacillus acidophilus Protect Intestinal Epithelial Barrier Function", JPGN, 2017, vol. 64, No. 3: pp. 404-412.

Gusmao-Silva, et al., "Hsp65-Producing Lactococcocus lactis Prevents Antigen-Induced Arthritis in Mice", Frontiers in Immunology, Sep. 2020, vol. 11, Article: 562905: pp. 1-15.

Hacquard, et al., "Microbiota and Host Nutrition across Plant and Animal Kingdoms", Cell Host & Microbe, 2015, vol. 17: pp. 603-616.

Tolhurst, et al., "Short-Chain Fatty Acids Stimulate Glucagon-Like Peptide-1 Secretion via the G-Protein-Coupled Receptor FFAR2", Diabetes, 2012, vol. 61: pp. 364-371.

Han, et al., "Probiotic Gastrointestinal Transit and Colonization After Oral Administration: A Long Journey", Frontiers in Cellular and Infection Microbiology, Mar. 2021, vol. 11, Article 609722: pp. 1-12.

Hang, et al., "Bile acid metabolites control Th17 and Treg cell differentiation", Nature, Dec. 2019, vol. 576 (7785): pp. 143-148 (34 pages). Epub Nov. 2019. Author Manuscript.

Wells, et al., "Associations between gut microbiota and genetic risk for rheumatoid arthritis in the absence of disease: a cross-sectional study", Lancet Rheumatology, Jul. 2020, vol. 2, No. 7: pp. e418-e427.

Truong, DT et al (2015) MetaPhlAn2 for enhanced metagenomic taxonomic profiling. Nature Methods 12(10): 902-904.

Hehemann, et al., "Transfer of carbohydrate-active enzymes from marine bacteria to Japanese gut microbiota", Nature, 2010, vol. 464: pp. 908-914.

Heineken, et al., "Systems-level characterization of a host-microbe metabolic symbiosis in the mammalian gut", Gut microbes, 2013, vol. 4, No. 1: pp. 28-40.

Heinken, et al., "Systematic assessment of secondary bile acid metabolism in gut microbes reveals distinct metabolic capabilities in inflammatory bowel disease", Microbiome, May 2019, vol. 7, No. 1: pp. 1-18.

Henao-Mejia, et al., "Inflammasome-mediated dysbiosis regulates progression of NAFLD and obesity", Nature, 2012, vol. 482, No. 7384: p. 179-185.

Herr, et al., "The Effects of Serotonin in Immune Cells", Frontiers in Cardiovascular Medicine, Jul. 2017, vol. 4, Article 48: pp. 1-11.

Weyand, et al., "The immunology of rheumatoid arthritis", Nature Immunology, Jan. 2021, vol. 22, No. 1: pp. 10-18.

Tsai, et al., "Gerobiotics: probiotics targeting fundamental aging processes", Bioscience of Microbiota, Food and Health, 2021, vol. 40, No. 1: pp. 1-11. Epub Oct. 2020.

Hildebrandt, et al., "High Fat Diet Determines the Composition of the Murine Gut Microbiome Independently of Obesity", Gastroenterology, 2009, vol. 137, No. 5: p. 1716.

Hofer, et al., "Caloric Restriction Mimetics in Nutrition and Clinical Trials", Frontiers in Nutrition, Sep. 2021, vol. 8, Article 717343: pp. 1-20.

Holers, et al., "Rheumatoid arthritis and the mucosal origins hypothesis: protection turns to destruction", Nature Reviews Rheumatology, Sep. 2018, vol. 14, No. 9: pp. 542-557 (16 pages).

Tuohy, et al., "Up-regulating the Human Intestinal Microbiome Using Whole Plant Foods, Polyphenols, and/or Fiber", J Agric Food Chem, 2012, vol. 60: pp. 8776-8782.

Holmdahl, et al., "The molecular pathogenesis of collagen-induced arthritis in mice-a model for rheumatoid arthritis", Ageing Research Reviews, Feb. 2002, vol. 1, No. 1: pp. 135-147.

Holmes, et al., "Diet-Microbiome Interactions in Health Are Controlled by Intestinal Nitrogen Source Constraints", Cell Metab, 2017, vol. 25: pp. 140-151.

Whisner, et al., "Prebiotics, Bone and Mineral Metabolism", Calcif Tissue Int, 2018, vol. 102: pp. 443-479.

Turnbaugh, et al., "A core gut microbiome in obese and lean twins", Nature, 2009, vol. 457, No. 7228: pp. 480-484.

Hug, et al., "Toll-Like Receptors: Regulators of the Immune Response in the Human Gut ", Nutrients, Feb. 2018, vol. 10(2):203: pp. 1-16.

Hugenholtz, et al., "Mouse models for human intestinal microbiota research: a critical evaluation", Cellular and Molecular Life Sciences, 2018, vol. 75: pp. 149-160.

Ibanez, et al., "Gut microbiome and bone", Joint Bone Spine, 2019, vol. 86: pp. 43-47.

Turnbaugh, et al., "An obesity-associated gut microbiome with increased capacity for energy harvest", Nature, 2006, vol. 444: pp. 1027-1031.

Ilhan, et al., (2017) "Distinctive microbiomes and metabolites linked with weight loss after gastric bypass, but not gastric banding", ISME J 11(9): 2047-2058.

Imaoka, et al., "Anti-inflammatory activity of probiotic Bifidobacterium: enhancement of IL-10 production in peripheral blood mononuclear cells from ulcerative colitis patients and inhibition of IL-8 secretion in HT-29 cells", World J Gastroenterol, 2008, vol. 14, No. 16: pp. 2511-2516.

Turnbaugh, et al., "Diet-Induced Obesity is Linked to Marked but Reversible Alterations in the Mouse Distal Gut Microbiome", Cell Host Microbe, 2008, vol. 3: pp. 213-223.

Jackson, et al., "Culture dependent and independent analysis of bacterial communities associated with commercial salad leaf vegetables", BMC Microbiol, 2013, vol. 13, No. 274: pp. 1-12.

Jackson, et al., "Emerging Perspectives on the Natural Microbiome of Fresh Produce Vegetables", Agriculture, 2015, vol. 5: pp. 170-187.

Jahangir, et al., "Type 2 Diabetes Current and Future Medications: A Short Review", Int J Pharm Pharmacol, 2017, vol. 1, No. 1: p. 101.

Turnbaugh, et al., "Supplementary Materials for : The Effect of Diet on the Human Gut Microbiome: A Metagenomic Analysis in Humanized Gnotobiotic Mice", Sci Transl Med, 2009: pp. 1-23.

Jain, et al., "High throughput ANI analysis of 90K prokaryotic genomes reveals clear species boundaries", Nature Communications, 2018, vol. 9, No. 5114: pp. 1-8.

Jain, et al., "Nanopore sequencing and assembly of a human genome with ultra-long reads", Nature Biotechnology, 2018, vol. 36, No. 4: p. 338.

White, J (2014) A Brief History of the Development of Diabetes Medications. Diabetes Spectr 27(2): 82-86.

Turnbaugh, et al., "The Effect of Diet on the Human Gut Microbiome: A Metagenomic Analysis in Humanized Gnotobiotic Mice", Sci Transl Med, 2009: pp. 1-23.

Jarvis, et al., "Microbiomes Associated With Foods From Plant and Animal Sources", Front Microbiol, 2018, vol. 9: p. 2540.

Jenab, et al., "Bacterial Natural Compounds with Anti-Inflammatory and Immunomodulatory Properties (Mini Review)", Drug Design, Development and Therapy, Sep. 2020, vol. 14: pp. 3787-3801.

Jhun, et al., "Lactobacillus sakei suppresses collagen-induced arthritis and modulates the differentiation of T helper 17 cells and regulatory B cells", Journal of Translational Medicine, Month 2020, vol. 18(1):317: pp. 1-11.

Tyagi, et al., "The Microbial Metabolite Butyrate Stimulates Bone Formation via T Regulatory Cell-Mediated Regulation of WNT10B Expression", Immunity, 2018, vol. 49: pp. 1116-1131.

Jia, et al., "CARD 2017: expansion and model-centric curation of the comprehensive antibiotic resistance database", Nucleic Acids Res, 2017, No. 45: pp. D566-D573.

Jia, et al., "Common methods of biological age estimation", Clinical Interventions in Aging, May 2017, vol. 12: pp. 759-772 (15 pages). Wikipedia, https://en.wikipedia.org/wiki/Pyruvate_dehydrogenase_complex, accessed Dec. 3, 2021.

United Nations, et al., "World Population Prospects 2019: Highlights", Department of Economic and Social Affairs, Statistical Papers—United Nations (Ser. A), Population and Vital Statistics Report, Jun. 2019: pp. 1-2.

(56) References Cited

OTHER PUBLICATIONS

Jubair, et al., "Modulation of inflammatory arthritis by gut microbiota through mucosal inflammation and autoantibody generation ", Arthritis Rheumatol, Aug. 2018, vol. 70, No. 8: pp. 1220-1233 (21 pages). Author manuscript. Epub Jul. 2018.
Justice, et al., "A framework for selection of blood-based biomarkers for geroscience-guided clinical trials: report from the TAME Biomarkers Workgroup", GeroScience, Dec. 2018, vol. 40, No. 5-6: pp. 419-436 (18 pages). Epub Aug. 2018.
Kaluzna-Czaplinska, et al., "Is there a relationship between intestinal microbiota, dietary compounds, and obesity?", Trends Food Sci Technol, 2017, vol. 70: p. 105-113.
U.S. Appl. No. 16/235,858—Notice of Allowance, Jan. 23, 2020.
Kang, et al., "Modulation of Inflammatory Cytokines by Omega-3 Fatty Acids", Subcell Biochem., 2008, vol. 49: pp. 133-143.
Kapitza, et al., "Effects of semaglutide on beta cell function and glycaemic control in participants with type 2 diabetes: a randomized, double-blind, placebo-controlled trial", Diabetalogia, 2017, vol. 60: pp. 1390-1399.
Williams, et al., "Ethanol and volatile fatty acid production from lignocellulose by Clostridium cellulolyticum." International Scholarly Research Notices 2013, pp. 1-7.
Kau, et al., "Human nutrition, the gut microbiome and the immune system", Nature, 2011, vol. 474: pp. 327-336.
Kellgren, et al., "Radiological Assessment of Osteo-Arthrosis", Ann. Rheum. Dis., Dec. 1957, vol. 16, No. 4: pp. 494-502.
Kim, et al., "Impact of L-Arginine Metabolism on Immune Response and Anticancer Immunotherapy", Frontiers in Oncology, Mar. 2018, vol. 8, No. 67: pp. 1-5.
U.S. Appl. No. 16/694,876—Office Action, Dec. 8, 2021, 41 pages.
Kimura, et al., "The gut microbiota suppresses insulin-mediated fat accumulation via the short-chain fatty acid receptor GPR43", Nat Commun, 2013, vol. 4, No. 1829: pp. 1-12.
Kinane, et al., "Periodontal diseases", Nature Reviews Disease Primers, Jun. 2017, vol. 3, Article 17038: pp. 1-14.
Wilson, et al., " Microbial Influences of Mucosal Immunity in Rheumatoid Arthritis ", Current Rheumatology Reports, Oct. 2020, vol. 22, No. 11: pp. 1-8.
U.S. Appl. No. 16/694,876—Office Action, Nov. 5, 2020, 34 pages.
Kishida, et al., "Effect of miglitol on the suppression of nonalcoholic steatohepatitis development and improvement of thegut environment in a rodent model", J Gastroenterol, 2017, vol. 52, No. 11: pp. 1180-1191.
Klemera, et al., "A new approach to the concept and computation of biological age", Mechanisms of Ageing and Development, Mar. 2006, vol. 127, No. 3: pp. 240-248. Epub Nov. 2005.
Koh, et al., "From Dietary Fiber to Host Physiology: Short Chain Fatty Acids as Key Bacterial Metabolites", Cell, 2016, vol. 165: pp. 1332-1345.
U.S. Appl. No. 16/694,876—Office Action,m Jul. 20, 2022, 26 pages.
Kolmogorov, et al., "Assembly of long, error-prone reads using repeat graphs", Nature Biotechnology, May 2019, vol. 37, No. 5: pp. 540-546. Epub Apr. 2019.
Komura, et al., "Caenorhabditis elegans as an alternative model host for legionella pneumophila, and protective effects of Bifidobacterium infantis", Applied and Environmental Microbiology, Jun. 2010, vol. 76, No. 12: pp. 4105-4108. Epub Apr. 2010.
U.S. Appl. No. 16/826,078—Office Action, Oct. 5, 2022, 54 pages.
Ku, et al., "Anti-inflammatory effects of 27 selected terpenoid compounds tested through modulating Th1/Th2 cytokine secretion profiles using murine primary splenocytes", Food Chemistry, Nov. 2013, vol. 141, No. 2: pp. 1104-1113. Epub Apr. 2013.
Kumari, et al., "Mechanisms of Cellular Senescence: Cell Cycle Arrest and Senescence Associated Secretory Phenotype", Frontiers in Cell and Developmental Biology, Mar. 2021, vol. 9, Article 645593: pp. 1-24.
Van Der Beek, et al., "Streptococcal dTDP-L-rhamnose biosynthesis enzymes: functional characterization and lead compound identification", Molecular Microbiology, Jan. 1, 2019, vol. 111, No. 4: pp. 1-32.
Kuo, et al., "Bone biomarker for the clinical assessment of osteoporosis: recent developments and future perspectives", Biomarker Research, 2017, vol. 5, No. 18: pp. 1-9.
Kushkevych, et al., "Sulfate-Reducing Bacteria of the Oral Cavity and Their Relation with Periodontitis-Recent Advances", Journal of Clinical Medicine, Jul. 2020, vol. 9, No. 8, Article 2347: pp. 1-20.
Winer, et al., "The Intestinal Immune System in Obesity and Insulin Resistance", Cell Metab, 2016, vol. 23: pp. 413-426.
Van Hul, et al., "Reduced obesity, diabetes and steatosis upon cinnamon and grape pomace are associated with changes in gut microbiota and markers of gut barrier", Am J Physiol Endocrinol Metab, 2017, vol. 314, No. 4: E3340E352.G.
Lambert, et al., "Combined Red Clover isoflavones and probiotics potently reduce menopausal vasomotor symptoms", PLOS One, Jun. 7, 2017, vol. 12, No. 6: pp. 1-16.
Lang, et al., "The microbes we eat: abundance and taxonomy of microbes consumed in a day's worth of meals for three diet types", PeerJ, 2014, 2:e659; doi 10.7717/peerj.659.
Langmead, at al., "Fast gapped-read alignment with Bowtie 2", Nat Methods, 2012, vol. 9, No. 4: pp. 357-359.
Van Wyk, et al., "Current perspectives on the families of glycoside hydrolases of Mycobacterium tuberculosis: their importance and prospects for assigning function to unknowns", Glycobiology, 2017, vol. 27, No. 2: pp. 112-122.
Lavasani, et all., "A Novel Probiotic Mixture Exerts a Therapeutic Effect on Experimental Autoimmune Encephalomyelitis Mediated by IL-10 Producing Regulatory T Cells," PLoS One, 2010 5(2):1-11.
Lawenius, et al., "A probiotic mix partially protects against castration-induced bone loss in male mice", Journal of Endocrinology, Jun. 2022, vol. 254, No. 2: pp. 91-101.
Winer, et al., "Immunologic impact of the intestine in metabolic disease", J Clin Invest, 2017, vol. 127, No. 1: pp. 33-42.
Vanzanten, et al., "Gastric transitional zones, areas where Helicobacter treatment fails: results of a treatment trial using the Sydney strain mouse model", Antimicrobial Agents and Chemotherapy, Jul. 2003, vol. 47, No. 7: pp. 2249-2255.
Lebeer, et al., "Functional Analysis of Lactobacillus rhamnosus GG Pili in Relation to Adhesion and Immunomodulatory Interactions with Intestinal Epithelial Cells," Applied and Environmental Microbiology, 2011, pp. 185-193.
Lee, et al., "Blueberry Supplementation Influences the Gut Microbiota, Inflammation, and Insulin Resistance in High-Fat-Diet-Fed Rats", J Nutr, 2018, vol. 148, No. 2: pp. 209-219.
Lee, et al., "Effect of Metformin on Metabolic Improvement and Gut Microbiota", Appl Environ Microbiol, 2014, vol. 80, No. 19: p. 59355943.
Vatanen, et al., "Variation in Microbiome LPS Immunogenicity Contributes to Autoimmunity in Humans", Cell, 2016, vol. 165: pp. 842-853.
Lee, et al., "Elucidating the Mechanism of Weissella-dependent Lifespan Extension in Caenorhabditis elegans," Scientific Reports, 2015, 5:17128, pp. 1-13.
Lee, et al., "Gut microbiota-generated metabolites in animal health and disease", Nat Chem Biol, 2014, vol. 10: pp. 416-424.
Wolfert, et al., "Adaptive immune activation: glycosylation does matter", Nat Chem Biol, Dec. 2013, vol. 9, No. 12: pp. 776-784.
Vavassori, et al., "The bile acid receptor FXR is a modulator of intestinal innate immunity", The Journal of Immunology, Nov. 2009, vol. 183, No. 10: pp. 6251-6261 (12 pages). Epub Oct. 2009.
Ley et al (2005) Obesity alters gut microbial ecology. PNAS 102(31): 11070-11075.
Li, et al., "Intermittent Fasting Promotes White Adipose Browning and Decreases Obesity by Shaping the Gut Microbiota", Cell Metab, 2017, vol. 26: pp. 672-685.
Veghef-Mehrabany, et al., "Effects of Probiotic Supplementation on Oxidative Stress Indices in Women with Rheumatoid Arthritis: A

(56) References Cited

OTHER PUBLICATIONS

Randomized Double-Blind Clinical Trial", Journal of the American College of Nutrition, May-Jun. 2016, vol. 35, No. 4: pp. 291-299 (10 pages). Epub Apr. 2015.

Li, et al., "Metabolic Surgery Profoundly Influences Gut Microbial-Host Metabolic Crosstalk", Gut, 2011, vol. 60, No. 9: pp. 1214-1223.

Li, et al., "Microbial osteoporosis: The interplay between the gut microbiota and bones via host metabolism and immunity", MicrobiologyOpen, 2019: pp. 1-15.

Woo, et al., "Metformin Ameliorates Hepatic Steatosis and Inflammation without Altering Adipose Phenotype in Diet-Induced Obesity", PLoS One, 2014, vol. 9, No. 3: e91111.

Vaghef-Mehrabany, et al., "Probiotic supplementation improves inflammatory status in patients with rheumatoid arthritis", Nutrition, Apr. 2014, vol. 30, No. 4: pp. 430-435. Epub Dec. 2013.

Liao, et al., "Mouse Models and Aging:Longevity and Progeria," Current Topics in Developmental Biology (2014), 109:249-285.

Lim, et al., "The Effect of Lactobacillus acidophilus YT1(MENOLACTO) on Improving Menopausal Symptoms: A Randomized, Double-Blinded, Placebo-Controlled Clinical Trial", Journal of Clinical Medicine, Jul. 9, 2020, vol. 9, No. 7, Article 2173: pp. 1-16.

Lin, H et al (2016) Correlations of Fecal Metabonomic and Microbiomic Changes Induced by High-fat Diet in the Pre-Obesity State. Sci Rep 6(21618):1-14.

Verginer, et al., "Production of Volatile Metabolites by Grape-Associated Microorganisms", Journal Agricultural and Food Chemistry, Jul. 2010, vol. 58, No. 14: pp. 8344-8350.

Liu, et al., "Deep Sequencing of the Oral Microbiome Reveals Signatures of Periodontal Disease," PLoS One 2012, 6:e7919, pp. 1-16.

Liu, et al., "Role of the Gut Microbiome in Modulating Arthritis Progression in Mice," Scientific Reports, 2016, vol. 6:30594 pp. 1-11.

Woo, Jae-Yeon, et al., "Lactobacillus pentosus var. plantarum C29 ameliorates memory impairment and inflammaging in a D-galactose-induced accelerated aging mouse model", Anaerobe, 27, 2014, pp. 22-26.

Verma, et al. "Cell surface polysaccharides of Bifidobacterium bifidum induce the generation of Foxp3+ regulatory T cells", Sci Immunol. 3, Oct. 19, 2018: pp. 1-14.

Liu, et al., "The relationship between menopausal syndrome and gut microbes", BMC Women's Health, Nov. 2022, vol. 22, Article 437: pp. 1-11.

Liu, et al., "VFDB 2019: a comparative pathogenomic platform with an interactive web interface", Nucleic Acids Res, 2019, vol. 47: D687-D692.

Lopez-Otin, et al., "Hallmarks of Health," Cell 2021, 184:33-63.

Vijay-Kumar et al (2010) Metabolic syndrome and altered gut microbiota in mice lacking toll-like receptor 5. Science 328(5975): 228-231.

Louis, et al., "Formation of propionate and butyrate by the human colonic microbiota", Environ Microbiol, 2017, vol. 19, No. 1: pp. 29-41.

Lucas, et al., "Short-chain fatty acids regulate systemic bone mass and protect from pathological bone loss", Nature Communications, 2018, vol. 9, No. 55: pp. 1-10.

Wu, et al., "Arginine metabolism and nutrition in growth, health and disease", Amino Acids, May 2009, vol. 31, No. 1: pp. 153-168.

Macfarlane et al., "Synbiotic Consumption Changes the Metabolism and Composition of the Gut Microbiota in Older People and Modifies Inflammatory Processes: a Randomized, Double-blind, Placebo-Controlled Crossover Study," Aliment Pharmacol. Ther. 2013, 38:804-816.

Abuajah, et al., "Functional components and medicinal properties of food: a review", J Food Sci Technol, 2015, vol. 52, No. 5: pp. 2522-2529.

Madiraju, et al., "Metformin suppresses gluconeogenesis by inhibiting mitochondrial glycerophosphate dehydrogenase", Nature, 2014, vol. 510: pp. 542-546.

Akamatsu, et al., "Conversion of antigen-specific effector/memory T cells Into Foxp3-expressing Treg cells by inhibition of CDK8/19", Science Immunology, Oct. 25, 2019, vol. 4: pp. 1-16.

Maeda, et al., "Dysbiosis Contributes to Arthritis Development via Activation of Autoreactive TCells in the Intestine," Arthritis & Rheumatology 2016, 10.1002: 1-35.

Alipour, B. et.al. Effects of Lactobacillus casei supplementation on disease activity and inflammatory cytokines in rheumatoid arthritis patients: a randomized double-blind clinical trial. (2014) Int J Rheum Dis, 17: 519-527. https://doi.org/10.1111/1756-185X. 12333.

Wu, et al., "Metformin alters the gut microbiome of individuals with treatment-naïve type 2 diabetes, contributing to the therapeutic effects of the drug", Nat Med, 2017, vol. 23, No. 7: pp. 850-858.

Mandel, et al., "Bacillus Coagulans: a Viable Adjunct Therapy for Relieving Symptoms of Rheumatoid Arthritis According to a Randomized, Controlled Trial," BMC Complementary and Alternative Medicine 2010, 10:1-7.

Amdekar, et al., "Lactobacillus casei reduces the Inflammatory Joint Damage Associated with Collagen-Induced Arthritis (CIA) by Reducing the Pro-Inflammatory Cytokines", J Clin Immunol (2011) 31:147-154.

Marinelli, et al., "Identification of the Novel Role of Butyrate as AhR Ligand in Human Intestinal Epithelial Cells," Scientific Reports 2019, 10.1038 pp. 1-14.

Arjmandi, et al., "Bone-Protective Effects of Dried Plum in Postmenopausal Women: Efficacy and Possible Mechanisms", Nutrients, 2019, vol. 9, No. 496: pp. 1-19.

Mccabe, et al., "Exercise prevents high fat diet induced bone loss, marrow adiposity and dysbiosis in male mice", Bone, 2018: https://doi.org/10.1016/j.bone.2018.03.024.

Arumugam, et al., "Enterotypes of the human gut microbiome", Nature, 2011, vol. 473, No. 7346: pp. 174-180.

Mcintyre, et al., "Inhibition of the Neuromuscular Acetylcholine Receptor with Atracurium Activates FOXO/DAF-16-induced longevity," Aging Cell 2021 13381 pp. 1-16.

Wu, et al., "Supplement: Metformin alters the gut microbiome of individuals with treatment-naïve type 2 diabetes, contributing to the therapeutic effects of the drug", Nat Med, 2017, vol. 23, No. 7.

Milajerdi, et al., "The effect of probiotics on inflammatory biomarkers: a meta-analysis of randomized clinical trials", European Journal of Nutrition, Mar. 11, 2020, vol. 59, No. 2: pp. 633-649.

Bae, et al., "Akkermansia muciniphila phospholipid induces homeostatic immune responses", Nature, Jul. 27, 2022, pp. 1-21.

Millar, et al., "A Proinflammatory Diet is Associated with Increased Odds of Frailty after 12-year Follow-up in a Cohort of Adults," Am. J. Clin. Nutr. 2022, 115:334-343.

Bakker-Zierikzee, et al., "Effects of infant formula containing a mixture of galacto- and fructo-oligosaccharides or viable Bifidobacterium animalis on the intestinal microflora during the first 4 months of life", Br J Nutr, 2005, vol. 94: pp. 783-790.

Montandon, et al., "Effects of Antidiabetic Drugs on Gut Microbiota Composition", Genes, 2017, vol. 8, No. 250: pp. 1-12.

Basu, et al., "Blueberries decrease cardiovascular risk factors in obese men and women with metabolic syndrome", J Nutr, 2010, vol. 140, No. 9: pp. 1582-1587.

Morikawa, et al., "A Study on the Structure-function Relationship of Lipopeptide Biosurfactants," Biochimica et Biophysica Acta 2000, pp. 211-218.

Xu, et al., "Intestinal microbiota: a potential target for the treatment of postmenopausal osteoporosis", Bone Research, 2017, vol. 5: pp. 1-18.

Moriwake, et al., "Delphinidin, One of the Major Anthocyanidins, Prevents Bone Loss through the Inhibition of Excessive Osteoclastogenesis in Osteoporosis Model Mice", PLoS One, May 2014, vol. 9, No. 5: pp. 1-11.

Black, et al., "Postmenopausal Osteoporosis", The New England Journal of Medicine, Jan. 21, 2016, vol. 374, No. 3: pp. 254-262.

(56) References Cited

OTHER PUBLICATIONS

Moslehi-Jenabian, et al., "Beneficial Effects of Probiotic and Food Borne Yeasts on Human Health", Nutrients, 2010, vol. 2: pp. 449-473.
Body, et al., "A Randomized Double-Blind Trial to Compare the Efficacy of Teriparatide [Recombinant Human Parathyroid Hormone (1-34)] with Alendronate in Postmenopausal Women with Osteoporosis", The Journal of Clinical Endocrinology & Metabolism, Oct. 2002, vol. 87, No. 10: pp. 4528-4535.
Mulligan, et al., "Selection of Microbes Producing Biosurfactants in Media without Hydrocarbons", J. Ferment. Technol., vol. 62, No. 4, pp. 311-314, 1984.
Brahe, LK et al (2013) Is butyrate the link between diet, intestinal microbiota and obesity-related metabolic diseases? Obes Rev 14: 950-959.
Myneni, et al., "Regulation of bone remodeling by vitamin K2", Oral Diseases, 2017, vol. 23' pp. 1021-1028.
Xu, et al., "Paenibacillus panacisoli enhances growth of *Lactobacillus* spp. by producing xylooligosaccharides in corn stover ensilages." Carbohydrate polymers 184 (2018): 435-444.
Nakagawa, et al., "Effects and mechanisms of prolongevity induced by Lactobacillus gasseri SBT2055 in Caenorhabditis elegans", Aging Cell (2016) 15, pp. 227-236.
Bürkle, et al., "MARK-AGE Biomarkers of Ageing", Mechanisms of Ageing and Development 151 (2015), pp. 2-12.
Nayak, et al., "Methotrexate impacts conserved pathways in diverse human gut bacteria leading to decreased host immune activation", Cell Host & Microbe, Mar. 10, 2021, pp. 362-377.
Cani, et al., "Changes in gut microbiota control metabolic endotoxemia-induced inflammation in high-fat diet-induced obesity and diabetes in mice", Diabetes, 2008, vol. 57: pp. 1470-1481.
Needleman, et al., "A General Method Applicable to the Search for Similarities in the Amino Acid Sequence of Two Proteins", J. Mol. Biol., Mar. 1970, vol. 48: pp. 443-453.
Cani, et al., "Selective increases of bifidobacteria in gut microflora improve high-fat-diet-induced diabetes in mice through a mechanism associated with endotoxaemia", Diabetologica, 2007, vol. 50: pp. 2374-2383.
Negatu, et al., "Indole Propionic Acid, an Unusual Antibiotic Produced by the Gut Microbiota, With Anti-inflammatory and Antioxidant Properties", Frontiers in Microbiology, Oct. 2020, vol. 11, Article 575586, pp. 1-8.
Xu, Huihui, et al., "Interactions between Gut Microbiota and Immunomodulatory Cells in Rheumatoid Arthritis", Hindawi, Mediators of Inflammation, vol. 2020, Article ID 1430605, 14 Pages, https://doi.org/10.1155/2020/1430605.
Nguyen, et al., "A perspective on 16S rRNA operational taxonomic unit clustering using sequence similarity." NPJ biofilms and microbiomes 2, No. 1 (2016): 1-8.
Chaudhury, et al., "Clinical Review of Antidiabetic Drugs: Implications for Type 2 Diabetes Mellitus Management", Front Endocrinol, 2017, vol. 8, No. 6: pp. 1-12.
Ni, et al., "A Molecular-Level Landscape of Diet-Gut Microbiome Interactions: Toward Dietary Interventions Targeting Bacterial Genes", mBio, 2015, vol. 6, No. 6: e01263-15.
Choi, et al., "Diet mimicking fasting promotes regeneration and reduces autoimmunity and multiple sclerosis symptoms", Published in final edited form as: Cell Rep. Jun. 7, 2016; 15(10):2136-2146. doi:10.1016/j.celrep.2016.05.009: pp. 1-18.
Nilsson, et al., "Lactobacillus reuteri reduces bone loss in older women with low bone mineral density: a randomized, placebo-controlled, double-blind, clinical trial", The Journal of Internal Medicine, 2018, vol. 284: pp. 307-317.
Cockburn, Ow et al., (2016) Polysaccharide Degradation by the Intestinal Microbiota and Its Influence on Human Health and Disease. J Mol Biol 428: 3230-3252.
Ohlsson, et al., "Probiotics Protect Mice from Ovariectomy-Induced Cortical Bone Loss", PLOS One, Mar. 2014, vol. 9, No. 3: pp. 1-8.
Yamashita, Maya, et al., "Lactobacillus helveticus SBT2171 Attenuates Experimental Autoimmune Encephalomyelitis in Mice", Frontiers in Microbiology, Jan. 2018, vol. 8, Article 2596.
Olar, et al., "Prospects for new antimicrobials based on N,N-dimethylbiguanide complexes as effective agents on both planktonic and adhered strains", Eur J Med Chem, 2010, vol. 45: pp. 2868-2875.
Cox, et al., "SolexaQA: At-a-glance quality assessment of Illumina second-generation sequencing data", BMC Bioinformatics, 2010, vol. 11, No. 485: pp. 1-6.
Olson, et al (2017) Obesity and the tumor microenvironment, Science 358(6367): 1130-1131.
Cuollo, et al., "The Senescence-Associated Secretory Phenotype (SASP) in the Challenging Future of Cancer Therapy and Age-Related Diseases", Biology 2020, 9, 485; doi:10.3390/biology9120485 www.mdpi.com/journal/biology: pp. 1-16.
Ozaki, et al., "The L-type amino acid transporter LAT1 inhibits osteoclastogenesis and maintains bone homeostasis through the mTORC1 pathway", Science Signaling, Jul. 9, 2019, vol. 12: pp. 1-14.
Dane, et al., "Effect of risedronate on biochemical marker of bone resorption in postmenopausal women with osteoporosis or osteopenia", Gynecological Endocrinology, 2008, vol. 24, No. 4: pp. 207-213.
Ozogul, et al., "The Function of Lactic Acid Bacteria on Biogenic Amines Production by Food-Borne Pathogens in Arginine Decarboxylase Broth", Food Sci. Technol. Res., 18 (6), 795-804, 2012.
Yamashita, Maya, et al., "Preventive Effect of Lactobacillus helveticus SBT2171 on Collagen-Induced Arthritis in Mice", Frontiers in Microbiology, Jun. 2017, vol. 8, Article 1159.
Pacifici, et al., "T cells: Critical bone regulators in health and disease", Bone, 2010, vol. 47, pp. 461-471.
De Vadder, F et al (2016) Microbiota-Produced Succinate Improves Glucose Homeostasis via Intestinal Gluconeogenesis. Cell Metab 24: 151-157.
Paine, et al., "Dysregulation of bile acids, lipids, and nucleotides in psoriatic arthritis revealed by unbiased profiling of serum metabolites", American College of Rheumatology , Jul. 11, 2022. https://doi: 10.1002/art.42288.
Devaraj, S et al (2013) The Human Gut Microbiome and Body Metabolism: Implications for Obesity and Diabetes. Clin Chem 59(4): 617-628.
Pan, et al., "A single bacterium restores the microbiome dysbiosis to protect bones from destruction in a rat model of rheumatoid arthritis", Microbiome, 2019, vol. 7, No. 107: pp. 1-11.
Ding, et al., "The regulation of immune cells by Lactobacilli: a potential therapeutic target for anti-atherosclerosis therapy", Oncotarget, 2017, vol. 8, No. 35: pp. 59915-59928.
Pan, et al., "Predominant gut Lactobacillus murinus strain mediates anti-inflammaging effects in calorie-restricted mice", Microbiome, vol. 6, Iss 1, pp. 1-17 (2018).
Yamazaki, Munchiro, et al., "Dopamine inhibition of superoxide anion production by polymorphonuclear leukocytes", J. Allergy Clin. Immunol., May 1989, pp. 967-972.
Parekh, et al., "The role and influence of gut microbiota in pathogenesis and management of obesity and metabolic syndrome", Front Endocrinol, 2014, vol. 5, No. 47: pp. 1-7.
Engelke, et al., "Clinical Use of Quantitative Computed Tomography (QCT) of the Hip in the Management of Osteoporosis in Adults: the 2015 ISCD Official Positions—Part I", Journal of Clinical Densitometry: Assessment & Management of Musculoskeletal Health, 2015, vol. 18, No. 3: pp. 338-358.
Park, et al., "Short communication: Development of a direct in vivo screening model to identify potential probiotic bacteria using Caenorhabditis elegans", Journal of Dairy Science, 2014, vol. 97, No. 11, pp. 6828-6834.
Everard, et al., "Diabetes, obesity and gut microbiota", Best Pract Res Clin Gastroenterol, 2013, vol. 27: pp. 73-83.
Patnode, et al., "Interspecies Competition Impacts Targeted Manipulation of Human Gut Bacteria by Fiber-Derived Glycans", Cell, Sep. 19, 2019, vol. 159: pp. 59-73.

(56) References Cited

OTHER PUBLICATIONS

Famouri, et al., "Effects of Probiotics on Nonalcoholic Fatty Liver Disease in Obese Children and Adolescents", JPGN, 2017, vol. 64, No. 3: pp. 413-417.

Paynich, et al., "Exopolysaccharide from Bacillus subtilis Induces Anti-Inflammatory M2 Macrophages That Prevent T Cell-Mediated Disease", The Journal of Immunology, 2017, pp. 1-10.

Yan, et al., "Gut microbiota induce IGF-1 and promote bone formation and growth", PNAS, Nov. 7, 2016: pp. 1-10.

PCT/US2019/049823—Invitation to Pay Additional Fees, Dec. 10, 2019, 2 pages.

Fletcher, et al., "Shifts in the Gut Metabolome and Clostridium difficile Transcriptome throughout Colonization and Infection in a Mouse Model", mSphere, Mar. 2018, vol. 3, No. 2: pp. 1-18.

PCT/US2020/038830—Invitation to Pay Additional Fees, Oct. 29, 2020, 24 pages.

Fransen, et al., "Aged Gut Microbiota Contributes to Systemical Inflammaging after Transfer to Germ-Free Mice", Frontiers in Immunology, Nov. 2017, vol. 8, Article 1385: pp. 1-12.

Peng, et al., "IDBA-UD: a de novo assembler for single-cell and metagenomic sequencing data with highly uneven depth", Bioinformatics, 2012, vol. 28, No. 11, 1420-1428.

Gad, et al., "Anti-aging effects of L-arginine", Journal of Advanced Research, 2010, vol. 1: pp. 169-177.

Peters, et al., "The transcriptional landscape of age in human peripheral blood", Nature Communications, 2015, pp. 1-14.

Yan, Yiqing, et al., "Dopamine Controls Systemic Inflammation through Inhibition of NLRP3 Inflammasome", Cell, 160, Jan. 15, 2015, pp. 62-73.

Pineda, et al., "A randomized, double-blinded, placebo-controlled pilot study of probiotics in active rheumatoid arthritis", Med Sci Monit, 2011; 17(6): CR347-354, Published: Jun. 1, 2011, http://www.medscimonit.com/fulltxt.php?ICID-881808: pp. 348-354.

GenBank KC111446.1. Hanseniaspora opuntiae strain JEY269 18S ribosomal RNA gene, partial sequence; internal transcribed spacer 1, 5.8S ribosomal RNA gene, and internal transcribed spacer 2, complete sequence; and 28S ribosomal RNA gene, partial sequence. Jul. 24, 2013 [online]. [Retrieved Dec. 10, 2019]. Retrieved from the internet: <URL: https:/twww.ncbi.nlm.nih.gov/nuccore/KC111446.1/ >. Especially p. 1.

Plovier, et al., "A purified membrane protein from Akkermansia muciniphila or the pasteurized bacterium improves metabolism in obese and diabetic mice", Nat. Med., 2017, vol. 23, No. 1: pp. 107-113.

Gilbert, et al., "Current understanding of the human microbiome", Nature Medicine, Apr. 2018, vol. 24, No. 4: pp. 392-400.

Poupet, et al., "Caenorhabditis elegans, a Host to Investigate the Probiotic Properties of Beneficial Microorganisms", Frontiers in Nutrition | www.frontiersin.org, Aug. 2020 | vol. 7 | Article 135, published: Aug. 21, 2020, doi: 10.3389/fnut.2020.00135: pp. 1-22.

Gold, et al., "Longitudinal Analysis of the Association Between Vasomotor Symptoms and Race/Ethnicity Across the Menopausal Transition: Study of Women's Health Across the Nation", American Journal of Public Health, Jul. 2006, vol. 96, No. 7: pp. 1226-1235.

Psichas, et al., "The short chain fatty acid propionate stimulates GLP-1 and PYY secretion via free fatty acid receptor 2 in rodents", Int J Obes, 2015, vol. 39: pp. 424-429.

Yang et al., "The prospects of Jerusalem artichoke in functional food ingredients and bioenergy production," Biotechnology Reports 5: 77-88 (2015).

Pyra, et al., "Prebiotic Fiber Increases Hepatic Acetyl CoA Carboxylase Phosphorylation and Suppresses Glucose-Dependent Insulinotropic Polypeptide Secretion More Effectively When Used with Metformin in Obese Rats", J Nutr, 2012, vol. 142, No. 2: pp. 213-220.

Grey, et al., "Duration of Antiresorptive Effects of Low-Dose Zoledronate in Osteopenic Postmenopausal Women: A Randomized, Placebo-Controlled Trial", Journal of Bone and Mineral Research, Jan. 2014, vol. 29, No. 1: pp. 166-172.

Qin, et al., "A human gut microbial gene catalogue established by metagenomic sequencing", Nature, 2010, vol. 464: pp. 59-65.

Guo, et al., "Clostridium species as probiotics: potentials and challenges", Journal of Animal Science and Biotechnology, Feb. 2020, vol. 11, No. 24: pp. 1-10.

Quinn, et al., "Global chemical effects of the microbiome include new bile-acid conjugations", https://doi.org/10.1038/s41586-020-2047-9, Published online: Feb. 26, 2020, Nature | vol. 579 | Mar. 5, 2020: pp. 123-129—Total pp. 22.

Guttman-Yassky, et al., "Contrasting pathogenesis of atopic dermatitis and psoriasis—Part I: Clinical and pathologic concepts", J Allergy Clin Immunol., Epub Mar. 2011, vol. 127, No. 5: pp. 1110-1118.

Rahman, et al., "NemaLife chip: a micropillar-based microfluid culture device optimized for aging studies in crawling C. elegans", www.nature.com/scientificreports, (2020) 10:16190 | https://doi.org/10.1038/s41598-020-73002-6: pp. 1-19.

Yang, et al., "Potent Anti-Inflammatory and Antiadipogenic Properties of Bamboo (*Sasa coreana Nakai*) Leaves Extract and Its Major Constituent Flavonoids", J Agric Food Chem, 2017, vol. 65: pp. 6665-6673.

Ramirez-Puebla, et al., "Gut and Root Microbiota Commonalities", App Environ Microbiol, 2013, vol. 79, No. 1: pp. 2-9.

Heinemann, et al., "The Menopause Rating Scale (MRS) scale: A methodological review", Health and Quality of Life Outcomes, Sep. 2004, vol. 2, No. 45: pp. 1-8.

Rastall, et al., "Recent developments in prebiotics to selectively impact beneficial microbes and promote intestinal health", Curr Opin Biotechnol, 2015, vol. 32, pp. 42-46.

Higgins, et al., "Toll-Like Receptor 4-Mediated Innate IL-10 Activates Antigen-Specific Regulatory T Cells and Confers Resistance to Bordetella pertussis by Inhibiting Inflammatory Pathology", The Journal of Immunology, Sep. 2003, vol. 171, No. 6: pp. 3119-3127.

Ravussin, et al., "Responses of Gut Microbiota to Diet Composition and Weight Loss in Lean and Obese Mice", Obesity, 2012, vol. 20, No. 4: pp. 738-747.

Holden, et al., "Enteropathic arthritis", Rheumatic Disease Clinics of North America, Aug. 2003, vol. 29, No. 3: pp. 513-530.

Reichold, et al., "Bifidobacterium adolescentis protects from the development of nonalcoholic steatohepatitis in a mouse model", J Nutr Biochem, 2014, vol. 25: pp. 118-125.

Yassour, et al., "Natural history of the infant gut microbiome and impact of antibiotic treatment on bacterial strain diversity and stability", Sci Transl Med, 2016, vol. 8, No. 343: pp. 1-12.

Rendina, et al., "Dried Plum's Unique Capacity to Reverse Bone Loss and Alter Bone Metabolism in Postmenopausal Osteoporosis Model", PLoS One, Mar. 2013, vol. 8, No. 3: pp. 1-10.

Hunter, et al., "Prevalence of rheumatoid arthritis in the United States adult population in healthcare claims databases, 2004-2014", Rheumatology International, Sep. 2017, vol. 37, No. 9: pp. 1551-1557. Epub Apr. 2017.

Riskedal, et al., "Development and Performance of a Diagnostic Precision Biomarker for Seronegative Rheumatoid Arthritis Based on DNA Methylation in Blood", Meeting: ACR Convergence 2022, Date: Saturday, Nov. 12, 2022: pp. 1-4.

Iwami, et al., "Effects of Short Chain Fatty Acid, Sodium Butyrate, on Osteoblastic Cells and Osteoclastic Cells", Int. J. Biochem., 1993, vol. 25, No. 11: pp. 1631-1635.

Rodriquez-R, et al, "The enveomics collection: a toolbox for specialized analyses of microbial genomes and metagenomes", PeerJ Preprints, 2016, vol. 4: e1900v1.

Jafarnejad, et al., "Effects of a Multispecies Probiotic Supplement on Bone Health in Osteopenic Postmenopausal Women: A Randomized, Double-blind, Controlled Trial", Journal of the American College of Nutrition, 2017, vol. 36, No. 7: pp. 497-506.

Romanin, et al., "Probiotic yeast *Kluyveromyces marxianus* CIDCA 8154 shows anti-inflammatory and anti-oxidative stress properties in in vivo models", Beneficial Microbes, 2016; 7(1): 83-93, ISSN 1876-2833 print, ISSN 1876-2891 online, DOI 10.3920/BM2015.0066, http://www.wageningenacademic.com/doi/pdf/10.3920/BM2015.0066—Friday, Sep. 22, 2017 8:40:22 AM—Göteborgs Universitet IP Address: 130.241.16.16: pp. 83-93.

(56) References Cited

OTHER PUBLICATIONS

Yoneno, Kazuaki et al, "TGR5 signalling inhibits the production of pro-inflammatory cytokines by in vitro differentiated inflammatory and intestinal macrophages in Crohn's disease", Immunology, 2013, 139, pp. 19-29.
Rosales-Bravo, et al, "Novel consortium of *Klebsiella variicola* and *Lactobacillus* species enhances the functional potential of fermented dairy products by increasing the availability of branched-chain amino acids and the amount of distinctive volatiles." Journal of applied microbiology 123, No. 5 (2017): 1237-1250.
Jennings, et al., "Amino Acid Intakes Are Associated With Bone Mineral Density and Prevalence of Low Bone Mass in Women: Evidence From Discordant Monozygotic Twins", Journal of Bone and Mineral Research, Feb. 2016, vol. 31, No. 2: pp. 326-335.
Roselli, et al., "Caenorhabditis Elegans and Probiotics Interactions from a Prolongevity Perspective", International Journal of Molecular Sciences, Int. J. Mol. Sci. 2019, 20, 5020; doi:10.3390/ijms20205020, www.mdpi.com/journal/ijms: pp. 1-14.
Jin, et al., "Localization and Function of GABA Transporters GAT-1 and GAT-3 in the Basal Ganglia", Frontiers in Systems Neuroscience, Jul. 2011, vol. 5, Article 63: pp. 1-10.
Rosenbaum, et al., "The gut microbiota in human energy homeostasis and obesity", Trends Endocrinol Metab, 2015, vol. 26, No. 9: pp. 493-501.
Justice, et al., "Frameworks for Proof-of-Concept Clinical Trials of Interventions That Target Fundamental Aging Processes", J Gerontol A Biol Sci Med Sci, Nov. 2016, vol. 71, No. 11: pp. 1415-1423. Epub Aug. 2016.
Rosenberg, et al., "Interaction between the Microbiome and Diet: The Hologenome Concept", J Nutr Food Sci, 2016, vol. 6, No. 5: p. 1000545.
You, Xin-yu, et al., "Intestinal Mucosal Barrier Is Regulated by Intestinal Tract Neuro-Immune Interplay", Frontiers in Pharmacology, May 2021, vol. 12, Article 659716.
Roshchina, "Chapter 2 Evolutionary Considerations of Neurotransmitters in Microbial, Plant, and Animal Cells", M. Lyte and p. P.E. Freestone (eds.), Microbial Endocrinology, Interkingdom Signaling in Infectious Disease and Health, DOI 10.1007/978-1-4419-5576-0_2: pp. 17-52.
Kim, et al., "Immune regulation by microbiome metabolites", Immunology, 2018, vol. 154, pp. 220-229.
Round, et al., "The gut microbiota shapes intestinal immune responses during health and disease", Nat Rev Immunol, 2009, vol. 9: pp. 313-324.
King, et al., "Regulation of de novo purine synthesis in human bone marrow mononuclear cells by hypoxanthine.", The Journal of Clinical Investigation, 1983;72(3):965-970.
Rühmann, et al., "Methods to identify the unexplored diversity of microbial exopolysaccharides", Frontiers in Microbiology | www.frontiersin.org, Jun. 2015 | vol. 6 | Article 565, published: Jun. 9, 2015, doi: 10.3389/fmicb.2015.00565: pp. 1-8.
Kobayashi, et al., "Oral administration of Lactobacillus gasseri SBT2055 is effective in preventing Porphyromonas gingivalis-accelerated periodontal disease", Scientific Reports, Apr. 2017, vol. 7, No. 1, Article 545: pp. 1-10.
Salminen, et al., "Activation of innate immunity system during aging: NF-kB signaling is the molecular culprit of inflamm-aging", Ageing Research Reviews 7 (2008), doi:10.1016/j.arr.2007.09.002: pp. 83-105.
Yousef, et al., "Metformin: A Unique Herbal Origin Medication", GJMR-B: Pharma, Drug Discovery, Toxicology, and Medicine, 2017, vol. 17, No. 3: pp. 31-37.
Saltiel, et al., "New therapeutic approaches for the treatment of obesity", Sci Transl Med, 2016, vol. 8, No. 323: p. 1-12.
Kumar, et al., " A Potential Probiotic Lactobacillus plantarum JBC5 Improves Longevity and Healthy Aging by Modulating Antioxidative, Innate Immunity and Serotonin-Signaling Pathways in Caenorhabditis elegans", Antioxidants (Basel), Jan. 2022, vol. 11, No. 2, Article 268: pp. 1-25.

Samah, et al., "Probiotics for the management of type 2 diabetes mellitus: A systematic review and meta- analysis", Diabetes Res Clin Pract, 2016, vol. 118: pp. 172-182.
Lambert, et al., "Combined bioavailable isoflavones and probiotics improve bone status and estrogen metabolism in postmenopausal osteopenic women: a randomized controlled trial", Am J Clin Nutr, 2017, vol. 106: pp. 909-920.
Samuel, et al., "Effects of the gut microbiota on host adiposity are modulated by the short-chain fatty-acid binding G protein-coupled receptor, Gpr41", PNAS, 2008, vol. 105, No. 43: pp. 16767-16772.
Langan, et al., "Microbiota-Derived Metabolites, Indole-3 aldehyde and Indole-3-acetic Acid, Differentially Modulate Innate Cytokines and Stromal Remodeling Processes Associated with Autoimmune Arthritis," Int. J. of Molecular Sciences 2021, 22:1-17.
Sandrini, et al., "Microbial endocrinology: host-bacteria communication within the gut microbiome", Journal of Endocrinology, (2015) 225, R21-R34, http://joe.endocrinology-journals.org, DOI: 10.1530/JOE-14-0615: pp. R21-R34.
Yu, Haitao, et al., "Protective Ability of Biogenic Antimicrobial Peptide Microcin J25 Against Enterotoxigenic *Escherichia coli*-Induced Intestinal Epithelial Dysfunction and Inflammatory Reponses IPEC-J2 Cells", Frontiers in Cellular and Infection Microbiology, Jul. 2018, vol. 8, Article 242.
Santos-Marcos, et al., "Influence of gender and menopausal status on gut microbiota", Maturitas, Oct. 2018, vol. 116: pp. 43-53.
Lee, et al., "Effect of Enterotoxigenic *Escherichia coli* on Microbial Communities during Kimchi Fermentation", J. Microbiol. Biotechnol., Nov. 2021, vol. 31, No. 11: pp. 1552-1558.
Sarioglu, et al., "Comparison of the effects of alendronate and risedronate on bone mineral density and bone turnover markers in postmenopausal osteoporosis", Rheumatol Int, 2006, vol. 26: pp. 195-200.
Lewiecki, et al., "Once-Monthly Oral Ibandronate Improves Biomechanical Determinants of Bone Strength in Women with Postmenopausal Osteoporosis", J Clin Endocrinol Metab, Jan. 2009, vol. 94, No. 1: pp. 171-180.
Sawin, et al., "Glycomacropeptide is a prebiotic that reduces Desulfovibrio bacteria, increases cecal short-chain fatty acids, and is anti-inflammatory in mice", Am J Physiol Gastrointest Liver Physiol, 2015, vol. 309: G590-G601.
Li, et al., "Butyrate reduces appetite and activates brown adipose tissue via the gut-brain neural circuit", Gut, 2017: pp. 1-11.
Scher, et al., "Expansion of intestinal Prevotella copri correlates with enhanced susceptibility to arthritis", Elife, Nov. 2013, vol. 2:e01202 (20 pages).
Yusufu, Ibrahim, et al., "A Tryptophan-Deficient Diet Induces Gut Microbiota Dysbiosis and Increases Systemic Inflammation in Aged Mice", Int. J. Mol. Sci., 2021, 22, 5005, <https://doi.org/10.3390/ijms22095005>.
Schirmer, et al., "Linking the Human Gut Microbiome to Inflammatory Cytokine Production Capacity", Cell, 2016, vol. 167, No. 4: pp. 1125-1136.
Lin, et al., "Butyrate and propionate protect against diet-induced obesity and regulate gut hormones via free fatty acid receptor 3-independent mechanisms", PLoS One, 2012, vol. 7, No. 4: pp. 1-9.
Schorpion, et al., "Can Probiotic Supplements Improve Outcomes in Rheumatoid Arthritis?", Curr Rheumatol Rep, Nov. 2017, vol. 19, No. 11, Article 73: pp. 7.
Liu, et al., "The Anti-Periodontitis Effects of Ethanol Extract Prepared Using *Lactobacillus paracasei* subsp. *paracasei* NTU 101," Nutrients 2018, 10:472 pp. 1-13.
Schroeder, et al., "Bifidobacteria or Fiber Protects against Diet-Induced Microbiota-Mediated Colonic Mucus Deterioration", Cell Host & Microbe, 2018, vol. 23: pp. 27-40.
Liu, et al.. , "Lactobacillus salivarius Isolated from Patients with Rheumatoid Arthritis Suppresses Collagen-Induced Arthritis and Increases Treg Frequency in Mice," J. of Interferon & Cytokine Research, 2016 36(12):1-7.
Schwarzer, et al., "Lactobacillus plantarum strain maintains growth of infant mice during chronic undernutrition", Science, Feb. 19, 2016, vol. 351, No. 6275: pp. 854-857.

(56) References Cited

OTHER PUBLICATIONS

Zaiss, et al., "Increased Bone Density and Resistance to Ovariectomy-Induced Bone Loss in FoxP3-Transgenic Mice Based on Impaired Osteoclast Differentiation", Arthritis & Rheumatism, Aug. 2010, vol. 62, No. 8: pp. 2328-2338.
Macfarlane, et al., "Session: Short-chain Fatty Acids: Regulation of Short-chain Fatty Acid Production," Proceedings of the Nutrition Society 2003, 62:67-72.
Ahlborg, et al., "Bone Loss and Bone Size after Menopause", The New England Journal of Medicine, Jul. 24, 2003, vol. 349, No. 4: pp. 327-334.
Magnusdottir, et al., "Generation of genome-scale metabolic reconstructions for 773 members of the human gut microbiota", Nature Biotechnology, Jan. 2017, vol. 35, No. 1: pp. 81-89.
Altman, et al., "Development of Criteria for the Classification and Reporting of Osteoarthritis," Arthritis and Rheumatism, Aug. 1986, vol. 29, No. 8: pp. 1039-1049.
Marietta, et al., "Human Gut-derived Prevotella histicola Suppresses Inflammatory Arthritis in Humanized Mice," Arthritis Rheumatol 2016, 68(12):2878-2888.
Apweiler, et al., "Protein sequence databases", Current Opinion in Chemical Biology (2004) 8:76-80.
Mccabe, et al., "Prebiotic and Probiotic Regulation of Bone Health: Role of the Intestine and its Microbiome", Curr Osteoporosis Rep., Dec. 2015, vol. 13, No. 6: pp. 636-371.
Zaiss, et al., "Treg Cells Suppress Osteoclast Formation", Arthritis & Rheumatism, Dec. 2017, vol. 56, No. 12: pp. 4104-4112.
Milani, et al., "Bifidobacteria exhibit social behavior through carbohydrate resource sharing in the gut", Sci Rep, 2015, vol. 5, No. 15782: pp. 1-14.
Baker, et al., "Estrogen-gut microbiome axis: Physiological and clinical implications", Maturitas, 2017, vol. 103: pp. 45-53.
Monteagudo-Mera, et al., "Adhesion Mechanisms Mediated by Probiotics and Prebiotics and their Potential Impact on Human Health," Applied Microbiology and Biotechnology 2019, 10.1007 pp. 1-10.
Bharath, et al., "Metformin Enhances Autophagy and Normalizes Mitochondrial Function to Alleviate Aging-Associated Inflammation", Cell Metabolism, 2020, 32, 44-55. https://doi.org/10.1016/j.cmet.2020.04.015.
Morrison, et al., "Formation of short chain fatty acids by the gut microbiota and their impact on human metabolism", Gut Microbes, 2016, vol. 7, No. 3: pp. 189-200.
Bodkhe, et al., "The role of microbiome in rheumatoid arthritis treatment", Therapeutic Advances in Musculoskeletal Disease, Feb. 2019, vol. 11: pp. 1-16.
Munder, et al., "Arginase: an emerging key player in the mammalian immune system", British Journal of Pharmacology, 2009, vol. 158: pp. 638-651.
Zaiss, Mario M., et al., "The gut-joint axis in rheumatoid arthritis", Nature Reviews | Rheumatology, vol. 17, Apr. 2021, pp. 224-237.
Napolitano, et al., "Novel Gut-Based Pharmacology of Metformin in Patients with Type 2 Diabetes Mellitus", PLoS One, 2014, vol. 9, No. 7: e100778.
Campbell, T.C. et al., "The China Study: The most comprehensive study of nutrition ever conducted and startling implications for diet, weight loss, and long term health," Benbella, 2006, 1-425.
Neff, et al., "Rapamycin extends murine lifespan but has limited effects on aging", The Journal of Clinical Investigation, Aug. 2013, vol. 123, No. 8, pp. 3272-3291.
Chanclud, et al., "Plant hormones: key players in gut microbiota and human diseases?", Trends Plant Sci, 2017, vol. 22, No. 9: 754-758.
Nguyen, et al., "TLR2 and endosomal TLR-mediated secretion of IL-10 and immune suppression in response to phagosome-confined Listeria monocytogenes", PLOS Pathogens, Jul. 7, 2020, pp. 1-20.
Chiang, et al., "Antiosteoporotic Effects of Lactobacillus-Fermented Soy Skim Milk on Bone Mineral Density and the Microstructure of Femoral Bone in Ovariectomized Mice", Journal of Agricultural and Food Chemistry, 2011, vol. 59: pp. 7734-7742.

Ohlsson, et al., "Mild stimulatory effect of a probiotic mix on bone mass when treatment is initiated 1.5 weeks after ovariectomy in mice", Am J Physiol Endocrinol Metab., Feb. 1, 2021, vol. 320: pp. 591-E597.
Zamani, Batol, et al., "Synbiotic supplementation and the effects on clinical and metabolic responses in patients with rheumatoid arthritis: a randomised, double-blind, placebo-controlled trial", British Journal of Nutrition, 2017, 117, pp. 1095-1102.
Oliviero, et al., "Benefits of Probiotics in Rheumatic Diseases", Frontiers in Nutrition, Sep. 2020, vol. 7, Article 157, pp. 1-6.
Cunha, et al., "Nisin Influence on the Antimicrobial Resistance Ability of Canine Oral Enterococci", Antibiotics 2020, 9, 890; doi:10.3390/antibiotics9120890 www.mdpi.com/journal/antibiotics: pp. 1-14.
Ozcan, et al., "A Human Gut Commensal Ferments Cranberry Carbohydrates To Produce Formate", Appl Environ Microbiol, 2017, vol. 83, No. 17, pp. 1-16.
Davies, et al., "Effect of Oral Semaglutide Compared With Placebo and Subcutaneous Semaglutide on Glycemic Control in Patients With Type 2 Diabetes", JAMA, 2017, vol. 318, No. 15: pp. 1460-1470.
Pahor, et al., "Effect of Losartan and Fish Oil on Plasma IL-6 and Mobility in Older Persons. The ENRGISE Pilot Randomized Clinical Trial.", J Gerontol A Biol Sci Med Sci, 2019, vol. 74, No. 10, 1612-1619.
Deshpande, et al., "Para-probiotics for Preterm Neonates—The Next Frontier", Nutrients 2018, 10, 871; doi:10.3390/nu10070871 www.mdpi.com/journal/nutrients: pp. 1-9.
Pan, et al., "Key proteins and pathways that regulate lifespan", J. Biol. Chem. (2017) 292(16) 6452-6460.
Zampieri, Raffaella Margherita, et al., "Anti-Inflammatory Activity of Exopolysaccharides from *Phormidium* sp. ETS05, the Most Abundant Cyanobacterium of the Therapeutic Euganean Thermal Muds, Using the Zebrafish Model", Biomolecules, Apr. 10, 2020, 10, 582.
Park, et al., "Probiotic Lactobacillus fermentum strain JDFM216 stimulates the longevity and immune response of Caenorhabditis elegans through a nuclear hormone receptor", Scientific Reports, 2018, pp. 1-10.
Everard, et al., "Cross-talk between Akkermansia muciniphila and intestinal epithelium controls diet-induced obesity", PNAS, 2013, vol. 11, No. 22: pp. 9066-9071.
Paul, et al., "Probiotics and Amelioration of Rheumatoid Arthritis: Significant Roles of Lactobacillus casei and Lactobacillus acidophilus", Microorganisms, 2021, pp. 1-17.
Ferro, et al., "Probiotic Supplementation for Rheumatoid Arthritis: A Promising Adjuvant Therapy in the Gut Microbiome Era", Frontiers in Pharmacology | www.frontiersin.org | Jul. 23, 2021 | vol. 12 | Article 711788 | doi: 10.3389/fphar.2021.711788: pp. 1-17.
PCT/US2020/038830—International Search Report and Written Opinion, Dec. 16, 2020, 23 pages.
Franceschi, et al., "Inflammaging: a new immune-metabolic viewpoint for age-related diseases", Nat Rev Endocrinol., Oct. 2018, vol. 14, No. 10: pp. 576-590.
Perry, et al., "Acetate mediates a microbiome-brain-b-cell axis to promote metabolic syndrome", Nature, 2016, vol. 534: pp. 213-217.
Zhang, et al., "Effect of probiotics on glucose metabolism in patients with type 2 diabetes mellitus: a meta-analysis of randomized controlled trials", Medicina, 2016, vol. 52: pp. 28-34.
Pinoli, et al., "Dopaminergic Regulation of Innate Immunity: a Review", J Neuroimmune Pharmacol, DOI 10.1007/s11481-017-9749-2, Published online: Jun. 3, 2017: pp. 1-22.
Gibson, G et al., (1995) Dietary Modulation of the Human Colonic Microbiota: Introducing the Concept of Prebiotics. J Nutr 125(6):1401-1412.
Pryor, Rand Cabriero, F (2015) Repurposing metformin: an old drug with new tricks in its binding pockets. Biochem J 471: 307-322.
Graessler, et al., "Metagenomic sequencing of the human gut microbiome before and after bariatric surgery in obese patients with type 2 diabetes: correlation with inflammatory and metabolic parameters", Pharmacogenetics J, 2013, vol. 13: pp. 514-522.

(56) References Cited

OTHER PUBLICATIONS

Perez-Chaparro, "Newly Identified Pathogens Associated with Periodontitis: A Systematic Review", Journal of Dental Research, Jul. 29, 2014, pp. 846-858.
Gunnarsson, et al., "Potential of Jerusalem artichoke (*Helianthus tuberosus* L.) as a biorefinery crop." Industrial Crops and Products 56 (2014): 231-240.
Raftis, et al., "An immunomodulatory member of the gut microbiota reduces clinical signs and inflammatory joint damage in an animal model of rheumatoid arthritis": 4D Pharma PLC, pp. 1.
Zhang, et al., "Effects of Acarbose on the Gut Microbiota of Prediabetic Patients: A Randomized, Double-blind, Controlled Crossover Trial", 2017, vol. 8: pp. 293-307.
Rao, et al., "Human Peripheral Blood Mononuclear Cells Exhibit Heterogeneous CD52 Expression Levels and Show Differential Sensitivity to Alemtuzumab Mediated Cytolysis", PLoA One | Heterogeneous CD52 Expression on Human PBMCs, www.plosone.org, Jun. 2012 | vol. 7 | Issue 6 | e39416: pp. 1-12.
Hess, et al., "Dairy Foods: Current Evidence of their Effects on Bone, Cardiometabolic, Cognitive, and Digestive Health", Comprehensive Reviews in Food Science and Food Safety, 2016, vol. 15: pp. 251-268.
Reichardt, et al., "Phylogenetic distribution of three pathways for propionate production within the human gut microbiota", ISME J, 2014, vol. 8: pp. 1323-1335.
Huang, et al., "Bacteriocins: Potential for Human Health", Oxidative Medicine and Cellular Longevity, Apr. 2021, vol. 2021, Article 5518825: pp. 1-17.
Rios-Covain, et al., "Enhanced butyrate formation by cross-feeding between Faecalibacterium prausnitzii and Bifidobacterium adolescentis", FEMS Microbiol Lett, 2015, vol. 362, No. 21: pp. 1-7.
Imlay, et al., "Diagnosing oxidative stress in bacteria: not as easy as you might think", Current Opinion in Microbiology, 2015, vol. 24: pp. 124-131.
Rogier, et al., "Alteration of the intestinal microbiome characterizes preclinical inflammatory arthritis in mice and its modulation attenuates established arthritis", Published online: Nov. 15, 2017, www.nature.com/scientificreports | Scientific Reports 7:15613 | DOI:10.1038/s41598-017-15802-x: pp. 1-12.
Zhang, et al., "Human gut microbiota in obesity and after gastric bypass", PNAS, 2009, vol. 106, No. 7: pp. 2365-2370.
Rosario, et al., "Understanding the Representative Gut Microbiota Dysbiosis in Metformin-Treated Type 2 Diabetes Patients Using Genome-Scale Metabolic Modeling", Front Physiol, 2018, vol. 9: p. 775.
Jin, et al., "Isolation and characterization of high exopolysaccharide-producing Weissella confuse VP30 from young children's feces", Microbial Cell Factories, Jun. 2019, vol. 18(1):110: pp. 1-13.
Kasubuchi, et al., "Dietary Gut Microbial Metabolites, Short-chain Fatty Acids, and Host Metabolic Regulation", Nutrients, 2015, vol. 7: pp. 2839-2849.
Rothschild, et al., "Environment dominates over host genetics in shaping human gut microbiota", Nature, 2018: pp. 1-6.
Kindt, et al., "The G Protein-Coupled Bile Acid Receptor TGR5 (Gpbar1) Modulates Endothelin-1 Signaling in Liver", Cells, Nov. 2019, vol. 8(11):1467: pp. 1-21.
Saccon, et al., "Senolytic Combination of Dasatinib and Quercetin Alleviates Intestinal Senescence and Inflammation and Modulates the Gut Microbiome in Aged Mice", Journals of Gerontology: Biological Sciences, cite as: J Gerontol A Biol Sci Med Sci, 2021, vol. 76, No. 11, 1895-1905, doi:10.1093/gerona/glab002, Advance Access publication Jan. 6, 2021: pp. 1895-1905.
Zhang, et al., "Modulation of gut microbiota by berberine and metformin during the treatment of high-fat diet-induced obesity in rats", Sci Rep, 2015, vol. 5, No. 14405: pp. 1-10.
Sam, et al., "The Fungal Mycobiome and Its Interaction with Gut Bacteria in the Host", Int J Mol Sci, 2017, vol. 18, No. 330: pp. 1-11.
König, et al., "Specific Collagen Peptides Improve Bone Mineral Density and Bone Markers in Postmenopausal Women—A Randomized Controlled Study", Nutrients, 2018, vol. 10. No, 97: pp. 1-11.
Sanchez, et al., "Efficacy of Probiotics in Rheumatoid Arthritis and Spondyloarthritis: A Systematic Review and Meta-Analysis of Randomized Controlled Trials", Published: Jan. 14, 2022, Nutrients 2022, 14, 354. https://doi.org/10.3390/nu14020354, https://www.mdpi.com/journal/nutrients: pp. 1-19.
Le, et al., "Host Hepatic Metabolism is Modulated by Gut Microbiota-Derived Sphingolipids," Cell Host & Microbe, 2022 30:798-808.
Saraiva, et al., "The regulation of IL-10 production by immune cells", doi: 10.1038/nri2711, Published online Feb. 15, 2010, Mar. 2010 | vol. 10, www.nature.com/reviews/immunol: pp. 170-181.
Lee, et al., "Heliobacter pylori Eradication Prevents Progression of Gastric Cancer in Hypergastrinemic INS-GAS Mice," Cancer Research 2008, 68:(9):3540-3548.
Sayed, et a;.,"An inflammatory aging clock (iAge) based on deep learning tracks multimorbidity, immunosenescence, frailty and cardiovascular aging", https://doi.org/10.1038/s43587-021-00082-y, Nature Aging | vol. 1 | Jul. 2021 | 598-615 | www.nature.com/nataging: pp. 598-615, Total pp. 31.
Zhang, et al., "Structural Changes of Gut Microbiota during Berberine-Mediated Prevention of Obesity and Insulin Resistance in High-Fat Diet-Fed Rats", PLoS One, 2012, vol. 7, No. 8: e42529.
Schoch, C.L. et al., "Nuclear ribosomal internal transcribed spacer (ITS) region as a universal DNA barcode marker for Fungi," Proceedings of the National Academy of Sciences, 2012, vol. 109, No. 16, pp. 6241-6246.
Liu, et al., "Targeted Small Molecule-Mediated Immunomodulation of GP130 Receptor Attenuates Rheumatoid Arthritis in Rats," Ostreoarthritis and Cartilage, 2019 27:S381-S382.
Schroeder, et al., "Signals from the gut microbiota to distant organs in physiology and disease", Nat Med, 2016, vol. 22, No. 10: pp. 1079-1089.
"Solarea Bio Teams up with Hebrew SeniorLife Investigators on a Newly Awarded U.S. National Academy of Medicine Catalyst Grant", Solarea Bio Press Release, Nov. 4, 2021, 10:17 ET: pp. 1-4.
Maeda et al., "Host-microbiota Interactions in Rheumatoid Arthritis," Experimental & Molecular Medicine 51:150 pp. 1-6.
Alpert, et al., "A clinically meaningful metric of immune age derived from high-dimensional longitudinal monitoring", Nature Medcine, Mar. 2019, vol. 25, pp. 487-495.
Martinez-Lopez, et al., "System-wide Benefits of Intermeal Fasting by Autophagy", Cell Metab, 2017, vol. 26: pp. 856-871.
Zhang, Xuan, et al., "The oral and gut microbiomes are perturbed in rheumatoid arthritis and partly normalized after treatment", Nature Medicine, vol. 21, No. 8, Aug. 2015, pp. 895-907.
Mohammed, et al., "The Therapeutic Effect of Probiotics on Rheumatoid Arthritis: a Systemic Review and Meta-analysis of Randomized Control Trials," Clin. Rheumatol. 36:2697-2707 (2017).
Bernini, et al., "Beneficial effects of Bifidobacterium lactis on lipid profile and cytokines in patients with metabolic syndrome", Nutrition, 2016, vol. 32: pp. 716-719.
Muller, et al., "The Plant Microbiota: Systems-Level Insights and Perspectives", The Annual Review of Genetics, 2016, vol. 50: pp. 211-234.
Brown, et al., "Comparison of the Effect of Denosumab and Alendronate on BMD and Biochemical Markers of Bone Turnover in Postmenopausal Women With Low Bone Mass: A Randomized, Blinded, Phase 3 Trial*", Journal of Bone and Mineral Research, 2009, vol. 24: pp. 153-161.
Naylor, et al., "Response of bone turnover markers to three oral bisphosphonatetherapies in postmenopausal osteoporosis: the TRIO study", Osteoporos Int, 2016, vol. 27: pp. 21-31.
Chambers, et al., "Effects of targeted delivery of propionate to the human colon on appetite regulation, body weight maintenance and adiposity in overweight adults", Gut, 2015, vol. 64: pp. 1744-1754.
Ni, et al., "TGR5-HNF4a axis contributes to bile acid-induced gastric intestinal metaplasia markers expression", Cell Death Discovery, pp. 1-20 (2020).

(56) References Cited

OTHER PUBLICATIONS

Zhang, Yiqiang, et al., "Rapamycin Extends Life and Health in C57BL/6 Mice", J Gerontol A Biol Sci Med Sci, Feb. 2014, 69(2), pp. 119-130.
David, La et al (2014) Diet rapidly and reproducibly alters the human gut microbiome. Nature 505: 559-563.
Palacios, et al., "The effect of a novel probiotic on metabolic biomarkers in adults with prediabetes and recently diagnosed type 2 diabetes mellitus: study protocol for a randomized controlled trial", Trials, 2017, vol. 18, No. 7: pp. 1-8.
Eastell, et al., "Use of bone turnover markers in postmenopausal osteoporosis", Lancet Diabetes Endocrinol 2017, vol. 5: pp. 908-923.
Parks, et al., "CheckM: assessing the quality of microbial genomes recovered from isolates, single cells, and metagenomes", Genome Research, 2015, pp. 1043-1055.
Feres, et al., "The subgingival periodontal microbiota of the aging mouth", Periodontology 2000, vol. 72, 2016, 30-53 | Printed in Singapore. All rights reserved | © 2016 John Wiley & Sons A/S. Published by John Wiley & Sons Ltd.: pp. 30-53.
Pearson, et al., "Improved tools for biological sequence comparison", Proc. Natl. Acad. Sci. USA, Apr. 1988, vol. 85: pp. 2444-2448.
Zhang, Yuanyuan, et al., "Anti-inflammatory Activity and Mechanism of Surfactin in Lipopolysaccharide-Activated Macrophages", Inflammation, vol. 38, No. 2, Apr. 2015, pp. 756-764.
Postler, et al., "Understanding the Holobiont: How Microbial Metabolites Affect Human Health and Shape the Immune System", Cell, 2017, vol. 26: pp. 110-130.
Gouda et al.., Endophytes: A Treasure House of Bioactive Compounds of Medicinal Importance, Frontiers in Microbiology, Mini Review, Sep. 29, 2016, vol. 7, article 1538, total pp. 1-8. (Front. Microbiol. 7:1538. doi: 10. 3389/fmich.2016.01538). (Year: 2016).
Quach, et al., "Characterizing how probiotic Lactobacillus reuteri 6475 and lactobacillic acid mediate suppression of osteoclast differentiation", Bone Reports, 2019, vol. 11, pp. 1-14.
Heaney, et al., "Dairy and Bone Health", Journal of the American College of Nutrition, 2009, vol. 28, No. 1: pp. 82S-90S.
Rastogi, et al., "Leaf microbiota in an agroecosystem: spatiotemporal variation in bacterial community composition on field-grown lettuce", ISME J, 2012, vol. 6: pp. 1812-1822.
Hooper, et al., "Interactions Between the Microbiota and the Immune System", Science, 2012, vol. 336, No. 6086: pp. 1268-1273.
Robida-Stubbs, et al., "TOR Signaling and Rapamycin Influence Longevity by Regulating SKN-1/Nrf and DAF-16/FoxO", Cell Metabolism 15, 713-724, May 2, 2012 ª2012 Elsevier Inc.: pp. 713-724.
Zhao, et al., "Gut bacteria selectively promoted by dietary fibers alleviate type 2 diabetes", Science, 2018, vol. 359: pp. 1151-1156.
Rosen, et al., "Treatment With Once-Weekly Alendronate 70 mg Compared With Once-Weekly Risedronate 35 mg in Women With Postmenopausal Osteoporosis: A Randomized Double-Blind Study", Journal of Bone and Mineral Research, 2005, vol. 20, No. 1: pp. 141-151.
Kaplan, et al., "Fermentation of Fructooligosaccharides by Lactic Acid Bacteria and Bifidobacterial", Appl Environ Microbiol, 2000, vol. 66, No. 6: pp. 2682-2684.
Rutledge, et a;., "Measuring biological age using omics data", Nature Reviews | Genetics vol. 23 | Dec. 2022: pp. 715-727.
Kreznar, et al., "Host Genotype and Gut Microbiome Modulate Insulin Secretion and Diet-Induced Metabolic Phenotypes", Cell Rep, 2017, vol. 18: pp. 1739-1750.
Samuel, et al., "A humanized gnotobiotic mouse model of host-archaeal-bacteria mutualism", PNAS, 2006, vol. 103, No. 26: pp. 10011-10016.
Lawenius, et al., "Development of a synbiotic that protects against ovariectomy-induced trabecular bone loss", Am J Physiol Endocrinol Metab., Apr. 1, 2022, vol. 322, No. 4: pp. E344-E354.
Saul, et al., "A new gene set identifies senescent cells and predicts senescence-associated pathways across tissues", Published online: Aug. 16, 2022, Nature Communications | (2022)13:4827, https://doi.org/10.1038/s41467-022-32552-1: pp. 1-15.
Zhao, Ruixiang, et al., "Purification and characterization of bacteriocin produced by Lactobacillus rhamnosus zrx01", Food Bioscience, 38, 2020, 100754.
Schott, et al., "Targeting the gut microbiome to treat the osteoarthritis of obesity", JCI Insight, Apr. 2018, vol. 3, No. 8: e95997 (18 pages).
"Solarea Bio Investigators Receive National Academy of Medicine Healthy Longevity 2022 Quickfire Challenge Award", Solarea Bio Press Release, Sep. 29, 2022, 09:17 ET: pp. 1-3.
Maier, et al., Extensive impact of non-antibiotic drugs on human gut bacteria, Nature, 2018: pp. 1-6.
Atkinson, et al., "Pharmacological Value of Murine Delayed-type Hypersensitivity Arthritis: A Robust Mouse Model of Rheumatoid Arthritis in C57BL/6 Mice", Basic & Clinical Pharmacology & Toxicology, 2017, 120, 108-114.
Morishita, et al., "Production of menaquinones by lactic acid bacteria." Journal of dairy science 82, No. 9 (1999): 1897-1903.
Bron, et al., "Emerging molecular insights into the interaction between probiotics and the host intestinal mucosa", Nat Rev Microbiol, 2012, vol. 10: pp. 66-78.
Newman, et al., "Strategies and Challenges in Clinical Trials Targeting Human Aging", Gerontol A Biol Sci Med Sci, 2016, vol. 71, No. 11, pp. 1424-1434.
Zheng, et al., "Prebiotic mannan-oligosaccharides augment the hypoglycemic effects of metformin in correlation with modulating gut microbiota", J Agric Food Chem, 2018, vol. 66, No. 23: pp. 5821-5831.
Pacifici, et al., "Bone Remodeling and the Microbiome", Cold Spring Harb Perspect Med, 2018, vol. 8, pp. 1-20.
Easson, et al., "Food safety assessment and toxicity study of the synbiotic consortium SBD111", Food and Chemical Toxicology, Oct. 2022, vol. 168, Article 113329: pp. 1-14.
PCT/US2019/049823—International Search Report and Written Opinion, Feb. 20, 2020, 12 pages.
Ge, et al., "Helicobacter pylori-infected C57BL/6 mice with different gastrointestinal microbiota have contrasting gastric pathology, microbial and host immune responses", Science Reports, May 2018, vol. 8, No. 1, Article: 8014: pp. 1-15.
Puertollano, et al., "Biological significance of short-chain fatty acid metabolism by the intestinal microbiome", Curr Opin Clin Nutr Metab Care, 2014, vol. 17, No. 2: pp. 139-144.
Harley, et al., "Obesity and the gut microbiome: Striving for causality", Mol Metab, 2012, vol. 1: pp. 21-31.
Reinhoud, et al., "Analysis of Glutamate, GABA, Noradrenaline, Dopamine, Serotonin, and Metabolites Using Microbore UHPLC with Electrochemical Detection", ACS Chemical Neuroscience, pubs.acs.org/chemneuro, 2013 American Chemical Society, dx.doi.org/10.1021/cn400044s | ACS Chem. Neurosci. 2013, 4: pp. 888?894.
Zhou, Bin and Zhang, Defeng, "Antibacterial effects of bacteriocins isolated from Lactobacillus rhamnosus (ATCC 53103) in a rabbit model of knee implant infection", Experimental and Therapeutic Medicine, 15, 2018, pp. 2985-2989.
Rosenblatt, et al., "Is It Ethical to Conduct Placebo-Controlled Clinical Trials in the Development of New Agents for Osteoporosis? An Industry Perspective", Journal of Bone and Mineral Research, 2003, vol. 18, No. 6: pp. 1142-1145.
Komura, et al., "Mechanism underlying prolongevity induced by bifidobacteria in Caenorhabditis elegans", Biogerontology, Feb. 2013, vol. 14, No. 1: pp. 73-87. Epub Jan. 2013.
Santano, et al., "Comparative Evaluation of the Antimicrobial and Mucus Induction Properties of Selected Bacillus Strains against Enterotoxigenic *Escherichia coli*", Antibiotics 2020, 9, 849; doi:10.3390/antibiotics9120849 www.mdpi.com/journal/antibiotics: pp. 1-10.
Li, et al., "Sex steroid deficiency-associated bone loss is microbiota dependent and prevented by probiotics", The Journal of Clinical Investigation, Jun. 2016, vol. 126, No. 6: pp. 2049-2063.
Lyu, et al., "Balancing Herbal Medicine and Functional Food for Prevention and Treatment of Cardiometabolic Diseases through Modulating Gut Microbiota", Front Microbiol, 2017, vol. 8, No. 2146: pp. 1-21.

(56) References Cited

OTHER PUBLICATIONS

Atkinson, et al., "Establishment and characterization of a sustained delayed-type hypersensitivity model with arthritic manifestations in C57BL/6J mice", Arthritis Research & Therapy (2012) 14:R134, pp. 1-16.
Nair, et al., "A simple practice guide for dose conversion between animals and human", Journal of Basic and Clinical Pharmacy, Mar.-May 2016, vol. 7, Issue. 2: pp. 27-31.
Zhou, et al., "Age-dependent variations of cancellous bone in response to ovariectomy in C57BL/6J mice", Experimental and Therapeutic Medicine, 2018, vol. 15: pp. 3623-3632.
Pandiyan, et al., "Microbiome Dependent Regulation of Treg and Th17 Cells in Mucosa", Frontiers in Immunology, Mar. 8, 2019, vol. 10, Article 426: pp. 1-17.
Gatej, et al., "Probiotic Lactobacillus rhamnosus GG prevents alveolar bone loss in a mouse model of experimental periodontitis", J Clin Periodontol., Nov. 2017, vol. 45, No. 2: pp. 1-21. doi: 10.1111/jcpe.12838.
Raisz, et al., "Short-Term Risedronate Treatment in Postmenopausal Women: Effects on Biochemical Markers of Bone Turnover", Osteoporosis International, 2000, vol. 11: pp. 615-620.
Jansson, et al., "Probiotic treatment using a mix of three Lactobacillus strains for lumbar spine bone loss in postmenopausal women: a randomised, double-blind, placebo-controlled, multicentre trial", Lancet Rheumatol, Nov. 2019, vol. 1: e154-62.
Saltiel, et al., "Inflammatory mechanisms linking obesity and metabolic disease", J Clin Invest, 2017, vol. 127, No. 1: pp. 1-4.
Li, et al., "Pro-and anti-inflammatory effects of short chain fatty acids on immune and endothelial cells." European journal of pharmacology 831 (2018): 52-59.
Meng, et al., "Anti-inflammatory effects of Bifidobacterium longum subsp infantis secretions on fetal human enterocytes are mediated by TLR-4 receptors", Am J Physiol Gastrointest Liver Physiol, 2016, vol. 311:G744-G753.
Zmora, et al., "Personalized Gut Mucosal Colonization Resistance to Empiric Probiotics Is Associated with Unique Host and Microbiome Features", Cell, 2018, vol. 174: pp. 1388-1405.
Piatek, et al., "In-Vitro Growth Inhibition of Bacterial Pathogens by Probiotics and a Synbiotic: Product Composition Matters", Int. J. Environ. Res. Public Health, 2020, pp. 1-10.
Jang, et al., "IL-6 and IL-10 Induction from Dendritic Cells in Response to Mycobacterium tuberculosis Is Predominantly Dependent on TLR2-Mediated Recognition", The Journal of Immunology, Sep. 2004, vol. 173, No. 5: pp. 3392-3397.
Schiavi, et al., "The Surface-Associated Exopolysaccharide of Bifidobacterium longum 35624 Plays an Essential Role in Dampening Host Proinflammatory Responses and Repressing Local TH17 Responses", Appl Environ Microbiol, Nov. 2016, vol. 82, No. 24: pp. 7185-7196.
Costa, et al., "Microbial Extracellular Polymeric Substances: Ecological Function and Impact on Soil Aggregation", Frontiers in Microbiology | www.frontiersin.org | Jul. 23, 2018 | vol. 9 | Article 1636 | doi: 10.3389/fmicb.2018.01636: pp. 1-14.
Cosman, et al., "Clinician's Guide to Prevention and Treatment of Osteoporosis", 2014, vol. 25, pp. 2359-2381.
Okeke, et al., "The Role of the Gut Microbiome in the Pathogenesis and Treatment of Obesity", GAHMJ, 2014, vol. 3, No. 3: pp. 44-57.
PCT/US2022/053684—Invitation to Pay Additional Fees, Jul. 7, 2023, 6 pages.
Kulkarni, et al., "Benefits of Metformin in Attenuating the Hallmarks of Aging", Cell Metabolism, Jul. 2020, vol. 32, No. 1: pp. 15-30. Epub Apr. 2020.
Forster, et al., "Identification of gut microbial species linked with disease variability in a widely used mouse model of colitis", https://doi.org/10.1038/s41564-022-01094-z | Nat ure Microbiology | vol. 7 | Apr. 2022 | www.nature.com/naturemicrobiology: pp. 590-599.
PCT/US2018/066088—International Search Report and Written Opinion, Jun. 11, 2019, 20 pages.
Musso, et al., "Obesity, diabetes, and gut microbiota: the hygiene hypothesis expanded?", Diabetes Care, Oct. 2010, vol. 33, No. 10: pp. 2277-2284. doi: 10.2337/dc10-0556.
Anuj, et al., "Pseudomonas fluorescens strain VZW14 16S ribosomal RNA gene, partial sequence", GenBank: KX066864.1, Submitted Apr. 14, 2016; downloaded from the internet <https://www.ncbi.nlm.nih.gov/nuccore/KX066864> on Sep. 19, 2023, pp. 1-2.
Tu, et al., "Strain/species identification in metagenomes using genome-specific markers", Nucleic Acids Res, Apr. 2014, vol. 42, No. 8: pp. e67 (12 pages). doi: 10.1093/nar/gku138. Epub Feb. 12, 2014.
Dufour, et al., "Molecular typing of industrial strains of Pseudomonas spp. isolated from milk and genetical and biochemical characterization of an extracellular protease produced by one of them", Int J Food Microbiol., Jul. 2008, vol. 125, No. 2: pp. 188-196. doi: 10.1016/j.ijfoodmicro.2008.04.004. Epub Apr. 16, 2008.
Chiang, et al., "Effect of bioactive compounds in lactobacilli-fermented soy skim milk on femoral bone microstructure of aging mice", J Sci Food Agric, Jan. 2012, vol. 92, No. 2: pp. 328-335. Epub Aug. 4, 2011. doi: 10.1002/jsfa.4579.
PCT/US2022/080362—International Search Report and Written Opinion, Mar. 21, 2023, 16 pages.
Gu, et al., "Analysis of bacterial diversity and biogenic amines content during the fermentation processing of stinky tofu", Food Res Int., Sep. 2018, vol. 111: pp. 689-698. Epub May 29, 2018. doi: 10.1016/j.foodres.2018.05.065.
Szydlowska, et al., "Effects of probiotics supplementation on the hormone and body mass index in perimenopausal and postmenopausal women using the standardized diet. A 5-week double-blind, placebo-controlled, and randomized clinical study", Randomnized Controlled Trial, Eur Rev Med Pharmacol Sci., May 2021, vol. 25, No. 10: pp. 3859-3867. doi: 10.26355/eurrev_202105_25953.
Anonymous, "Ther-Biotic Women's Formula—Probiotic Support for a Woman's special needs", Klaire Labs, Jan. 1, 2017: pp. 1-2, XP093030232, Retreived from the Internet: https://us.sfihealth.com/klairelabs/cache/file/837992BD-4CAF-4EA6-A3BA47C3C99BEAE8.pdf.
Vyhlidalova, et al., "Gut Microbial Catabolites of Tryptophan Are Ligands and Agonists of the Aryl Hydrocarbon Receptor: A Detailed Characterization", International Journal of Molecular Sciences, Apr. 2020, vol. 21, No. 7, Article 2614: pp. 1-17.
Ai Bander, et al., "The Gut Microbiota and Inflammation: An Overview", Int. J. Environ. Res. Public Health 2020, 17, 7618; doi:10.3390/ijerph17207618.
Van Roon, et al., "Methotrexate bioavailability", Clinical and Experimental Rheumatology 2010, Clin Exp Rheumatol 2010; 28 (suppl. 61): pp. s27-s32.
Adeniji, et al., "Bacillus velezensis: phylogeny, useful applications, and avenues for exploitation." Appl Microbial Biotechnol, Mar. 2019, vol. 103: pp. 3669-3682. https://doi.org/10.1007/s00253-019-09710-5 (Year: 2019).
Farag, et al., "The Many Faces of Kefir Fermented Dairy Products: Quality Characteristics, Flavour Chemistry, Nutritional Value, Health Benefits, and Safety", Nutrients, Jan. 2020, vol. 12, No. 2: p. 346 (23 Pages total). doi:10.3390/nu12020346 (Year: 2020).
Medeot, et al., "Bacillus velezensis strain MEP218 chromosome, complete genome", Gen Bank, Accession No. CP042864.2, Aug. 12, 2019 (Year: 2019).
Peluzlo et al., "Kefir and Intestinal Microbiota Modulation: Implications in Human Health", Frontiers in Nutrition, Feb. 2021, vol. 8: pp. 1-15 (Year: 2021).
PCT/US2020/038830—International Preliminary Report on Patentability, Dec. 30, 2020, 16 pages.
Carbohydrate Active Enzymes Database, "Glycoside Hydrolase Family 63," http://www.cazy.org/GH63.html.
Gregori, et al., "Limosilactobacillus reuteri 6475 and Prevention of Early Postmenopausal Bone Loss: A Randomized Clinical Trial", Randomized Controlled Trial, JAMA Netw Open., Jun. 2024, vol. 7, No. 6: pp. e2415455. doi: 10.1001/jamanetworkopen.2024.15455.
U.S. Appl. No. 16/235,858—Office Action, Aug. 6, 2019.

(56) References Cited

OTHER PUBLICATIONS

Forslund, et al., "Disentangling type 2 diabetes and metformin treatment signatures in the human gut microbiota", Nature, 2015, vol. 528, No. 7581: pp. 262-266.
Douglas, et al., "PICRUSt2 for prediction of metagenome functions", Nat Biotechnol. Jun. 2020, vol. 38, No. 6: pp. 685-688. doi: 10.1038/s41587-020-0548-6.
PCT/US2022/053684—International Search Report and Written Opinion, Sep. 6, 2023, 23 pages.
Cheng, F.-S., et al., Probiotic mixture VSL#3: An overview of basic and clinical studies in chronic diseases, WJCC 8: 1361-1384 (2020).
Jung, J.-I., et al., Effects of Probiotic Culture Supernatant on Cariogenic Biofilm Formation and RANKL-Induced Osteoclastogenesis in RAW 264.7 Macrophages, Molecules, 26: 733 (2021).
Li, P., et al., One-year supplementation with Lactobacillus reuteri ATCC PTA 6475 counteracts a degradation of gut microbiota in older women with low bone mineral density, npj Biofilms Microbiomes, 8: 84 (2022).
Lin, X., et al., Gut microbiota impacts bone via Bacteroides vulgatus-valeric acid-related pathways, Nat Commun, 14: 6853 (2023).
Liu, J.-H., et al., Akkermansia muciniphila promotes type H vessel formation and bone fracture healing by reducing gut permeability and inflammation, Disease Models & Mechanisms, 13: dmm043620 (2020).
Resciniti, S. M., et al., The Effectiveness of a Lactobacilli-Based Probiotic Food Supplement on Bone Mineral Density and Bone Metabolism in Australian Early Postmenopausal Women: Protocol for a Double-Blind Randomized Placebo-Controlled Trial, Nutrients, 16: 1150 (2024).
Roberts, J. L., et al., Bifidobacterium adolescentis supplementation attenuates fracture-induced systemic sequelae, Biomedicine & Pharmacotherapy, 132: 110831 (2020).
Yan, F., et al., Colon-specific delivery of a probiotic-derived soluble protein ameliorates intestinal inflammation in mice through an EGFR-dependent mechanism, Journal of Clinical Investigation, 121 (6):2242-2253 (2011).
Zhu, F., et al., The combination of Butyricicoccus pullicaecorum and 3-hydroxyanthranilic acid prevents postmenopausal osteoporosis by modulating gut microbiota and Th17/Treg, Eur J Nutr, 63: 1945-1959 (2024).
Fong, F. L.Y., et al., Immunomodulation of Lactobacillus rhamnosus GG (LGG)-derived soluble factors on antigen-presenting cells of healthy blood donors, Sci Rep, 6: 22845 (2016).
Haller, D., Non-pathogenic bacteria elicit a differential cytokine response by intestinal epithelial cell/leucocyte co-cultures, Gut, 47: 79-87 (2000).
Shen, X., et al., Supplementation of p40, a Lactobacillus rhamnosus GG-derived protein, in early life promotes epidermal growth factor receptor-dependent intestinal development and long-term health outcomes, Mucosal Immunology, 11: 1316-1328 (2018).
Yan, F., et al., A Lactobacillus rhamnosus GG-derived Soluble Protein, p40, Stimulates Ligand Release from Intestinal Epithelial Cells to Transactivate Epidermal Growth Factor Receptor, Journal of Biological Chemistry, 288: 30742-30751 (2013).
Published as US 2020/0164002 A1, U.S. Appl. No. 16/694,876, filed Nov. 25, 2019, U.S. Pat. No. 11,819,524, Nov. 21, 2023, Granted.
Published as US 2023/0210917 A1, U.S. Appl. No. 17/816,371, filed Jul. 29, 2022, U.S. Pat. No. 12,048,722, Jul. 30, 2024, Granted.
Published as US 2023/0233625 A1, U.S. Appl. No. 18/053,262, filed Nov. 7, 2022, U.S. Pat. No. 11,980,647, May 14, 2024, Granted.
U.S. Appl. No. 18/744,111, filed Jun. 14, 2024, Pending.
Published as US 2019/0269743 A1, U.S. Appl. No. 16/235,858, filed Dec. 28, 2018, U.S. Pat. No. 10,596,209, Mar. 24, 2020, Granted.
Published as US 2020/0376049 A1, U.S. Appl. No. 16/826,078, filed Mar. 20, 2020, U.S. Pat. No. 11,793,841, Oct. 24, 2023, Granted.
Published as US 2022/0354907 A1, U.S. Appl. No. 17/555,261, filed Dec. 17, 2021, Published.
Published as US 2023/0190834 A1, U.S. Appl. No. 17/816,932, filed Aug. 2, 2022, Abandoned.
Published as US 2023/0256035 A1, U.S. Appl. No. 18/304,264, filed Apr. 20, 2023, U.S. Pat. No. 12,016,891, Jun. 25, 2024, Granted.
Published as US 2023/0346859 A1, U.S. Appl. No. 18/181,495, filed Mar. 9, 2023, U.S. Pat. No. 11,938,158, Mar. 26, 2024, Granted.
Published as US 2024/0123001 A1, U.S. Appl. No. 18/395,925, filed Dec. 26, 2023, Published.

\* cited by examiner

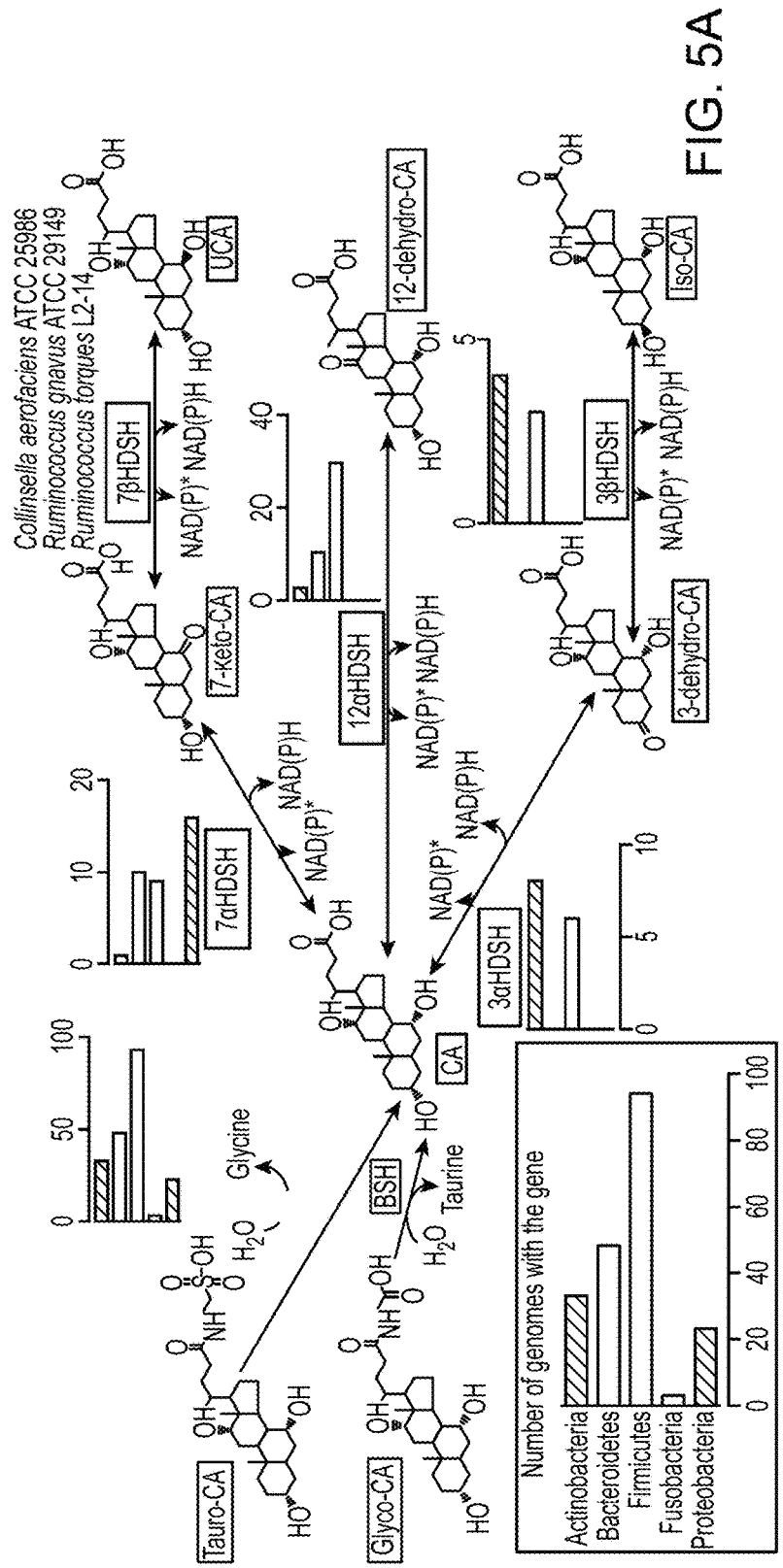
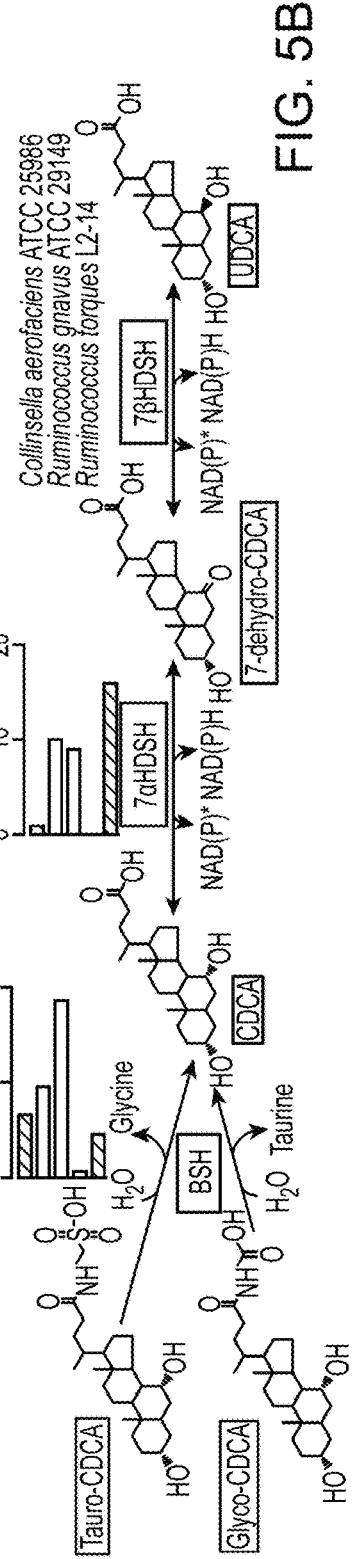
FIG. 5A
FIG. 5B

Enzymes involved in biosynthetic pathway of EPS.

| S.no. | Group | Enzyme | Mode of action | References |
|---|---|---|---|---|
| 1. | Group-1 | Hexokinase | Intracellular enzymes converts glucose to glucose-6-phosphate | [43] |
| 2. | Group-2 | Uridine-5' diphosphate (UDP)-glucose pyrophosphorylase | Catalyzes conversion of glucose-1-phosphate to UDP-glucose (key molecule of EPS synthesis) | [147] |
| 3. | Group-3 | Glycosyl transferases (GTFs) | Transfers sugar nucleotides to a glycosyl carrier lipid | [55] |
| 4. | Group-4 | Wzx protein (flippase), permease and ABC-transporters | Involved in the polymerization of the macromolecules and situated outside the cell membrane and cell wall. Translocate individual repeating units attached to UDP-C55 lipid carrier across cytoplasmic membrane | [61] |

FIG. 6

Table 1. Details of the essential genes in the *Lactobacillus* EPS gene clusters and families of the encoded putative proteins.

| | Genes | Abbreviation | Total Number of Genes | Number of PLFams | Number of Clusters not Having the Gene | Number of Proteins: PGFams | PLFams | PGFams | % of Singleton Families # | Number of Clusters Having Multicopy Genes | For Clusters Having >2 Copies of Gene, Average Number of Those Genes | Families # |
|---|---|---|---|---|---|---|---|---|---|---|---|---|
| 1 | LytR-transcriptional regulator | epsA | 78 | 8 | 74 | 2 | 9.8 | 4 | 12.5 | 5 | 2.2 | 1 |
| 2 | Tyrosine kinase modulator | epsB | 130 | 29 | 25 | 15 | 4.4 | 1.9 | 37.9 | 9 | 2 | 2 |
| 3 | Tyrosine kinase | epsC | 125 | 25 | 30 | 10 | 5 | 2.5 | 28 | 8 | 2 | 2 |
| 4 | Phosphotyrosine phosphatase | epsD | 97 | 11 | 49 | 1 | 8.8 | 11 | 9.1 | 0 | - | - |
| 5 | Priming glycosyltransferase | epsE | 140 | 24 | 10 | 8 | 5.8 | 3 | 33.3 | 4 | 2 | 1.8 |
| 6 | Glycosyltransferase | gt | 670 | 343 | 0 | 246 | 1.9 | 1.4 | 66.6 | 140 | 4.6 | 4.3 |
| 7 | Flippase | wzx | 147 | 39 | 18 | 16 | 3.8 | 2.4 | 46.2 | 17 | 2.17 | 2 |
| 8 | Polysaccharide polymerase | wzy | 103 | 50 | 42 | 42 | 2 | 1.2 | 73.8 | 2 | 2 | 2 |

PGFams were considered for GT and Wzy, while PLFams were considered for all other proteins.

FIG. 7

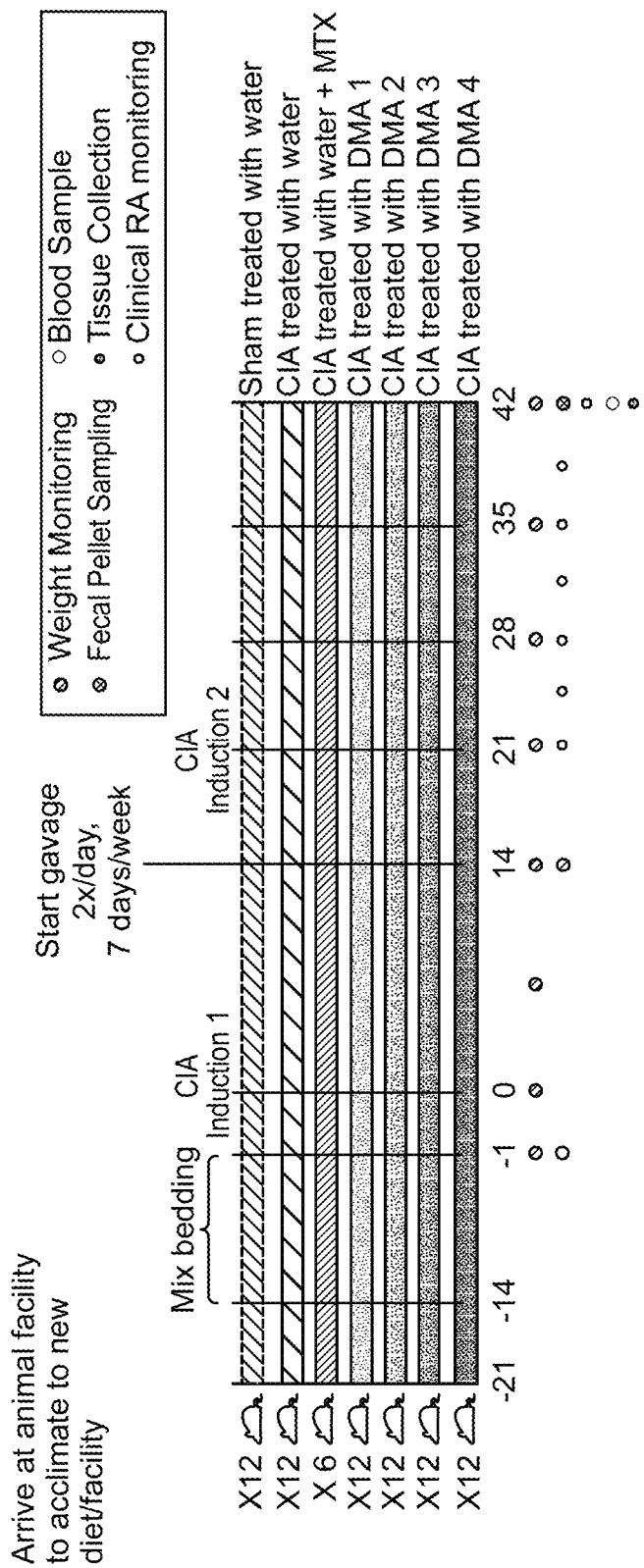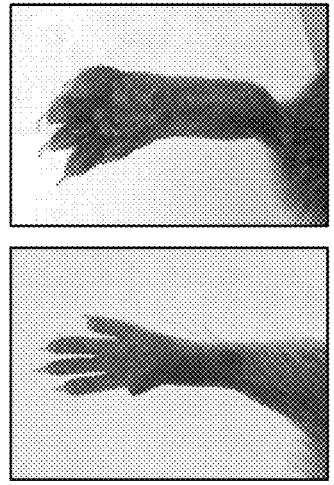
FIG. 29

*p<0.05, **p<0.01. ns: Not Significant, compared to CIA Control. One-way ANOVA with multiple hypothesis testing correction.

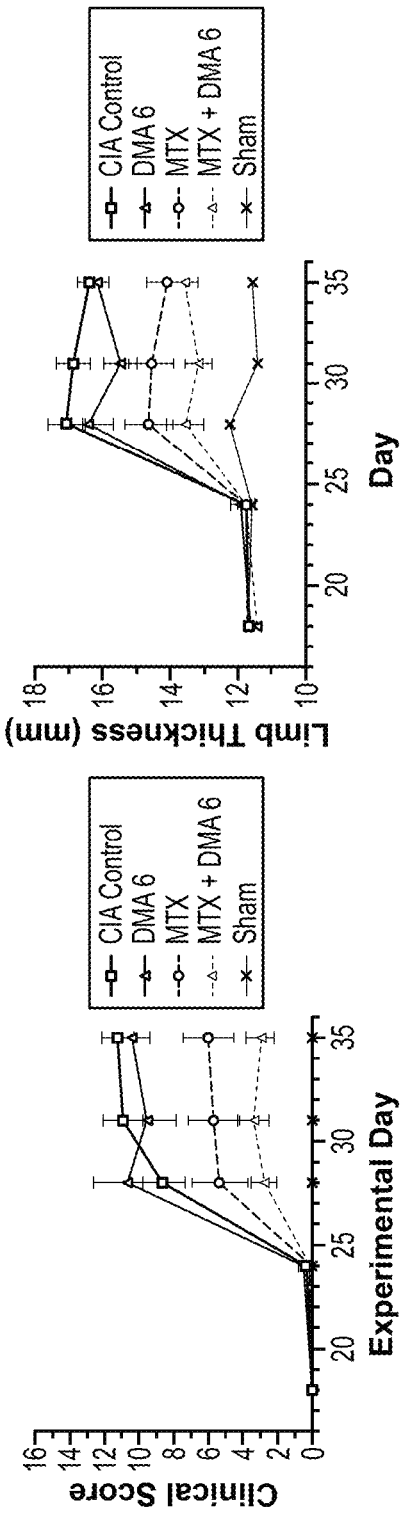
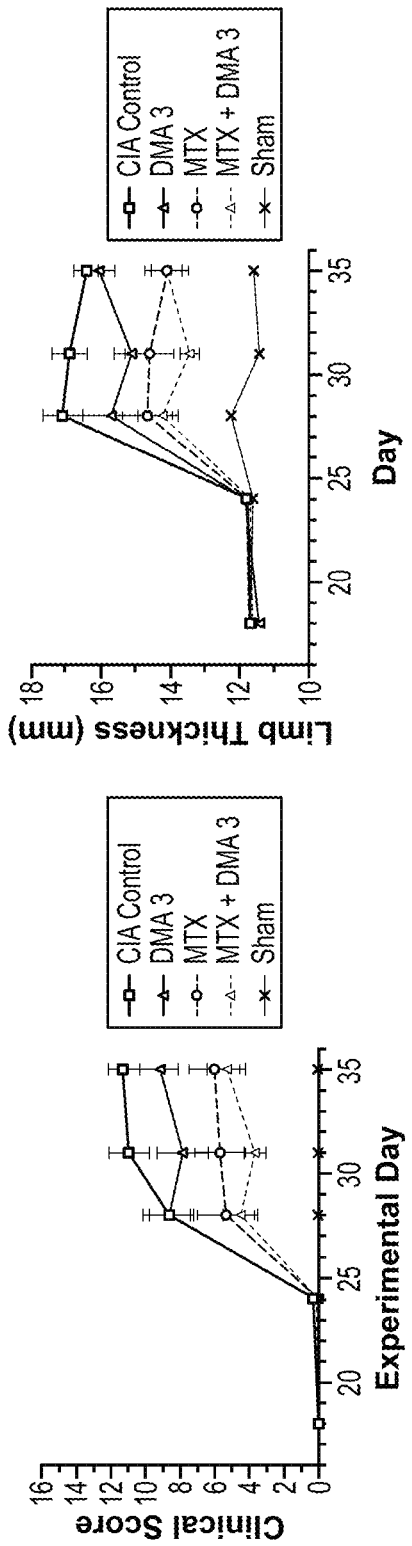
FIG. 32A
FIG. 32B
FIG. 32C
FIG. 32D

IMMUNOMODULATORY COMPOSITIONS COMPRISING MICROBIAL ENTITIES

CROSS REFERENCE TO RELATED APPLICATIONS

This application is a continuation application of U.S. patent application Ser. No. 18/304,264, filed on Apr. 20, 2023, which is a continuation application of International Application No. PCT/US2022/053684, filed on Dec. 21, 2022, which claims the benefit of and priority to U.S. Provisional Application Nos: 63/292,362 filed Dec. 21, 2021, and 63/348,854 filed Jun. 3, 2022, each of which is hereby incorporated in its entirety by reference for all purposes.

SEQUENCE LISTING

The instant application contains a Sequence Listing which has been submitted via Patent Center and is hereby incorporated by reference in its entirety. Said XML, created on Mar. 30, 2023, is named SBI-011WO_SL.xml, and is 1,354,275 bytes in size.

BACKGROUND

Plant-based and fermented foods are rich sources of diverse microbes. Daily consumption of fresh fruits, vegetables, seeds and other plant-derived ingredients of salads and juices is recognized as part of a healthy diet and associated with weight loss, weight management and overall healthy lifestyles. This is demonstrated clinically and epidemiologically in the "China Study" (Campbell, T. C. and Campbell T. M. 2006. The China Study: startling implications for diet, weight loss and long-term health. Benbella books pp 419) where a lower incidence of inflammatory-related indications were observed in rural areas where diets are whole food plant-based. The benefit from these is thought to be derived from the vitamins, fiber, antioxidants, and other molecules that are thought to benefit the microbial flora through the production of prebiotics. These can be in the form of fermentation products from the breakdown of complex carbohydrates and other plant-based polymers. There has been no clear mechanistic association between microbes in whole food plant-based diets and the benefits conferred by such a diet. The role of these microbes as probiotics, capable of contributing to gut colonization and thereby influencing a subject's microbiota composition in response to a plant-based diet, has been underappreciated.

In particular, although it is appreciated that the gut microbiome has important effects on the development and functioning of the immune system, how probiotics modulate the immune system, and which populations are most effective at doing so, is not well understood. Thus, there is a significant need to identify microbes found in plants and fermented foods and produce compositions comprising live microbial populations that can be used to treat and/or prevent immune system disorders, and conditions related to inflammation.

The global human population is aging, with the number of individuals over age fifty estimated to have exceeded 1.8 billion in 2020 (United Nations World Population Prospects 2019). One consequence of this is the increased incidence of aging-related diseases, including metabolic syndrome, cardiovascular disease, and obesity; each leading to increased healthcare costs and compromising the length and quality of life for older adults (Franceschi, C., et al. Nat Rev Endocrinol 14, 576-590 (2018)). A central feature of aging is low-grade, chronic inflammation that occurs in the absence of infection, a phenomenon termed "inflammaging" or "aging-associated inflammation". In the context of an aging global population and increasing incidence of aging-related diseases, there is a pressing need to identify strategies to prevent and/or manage inflammaging. However, aside from recommendations regarding diet and exercise, effective options for aging-associated inflammation are lacking.

Aging-associated inflammation is thought to be mediated by a shared set of mechanisms, including cellular senescence, activation of both the inflammasome and DNA damage response, as well as intestinal dysbiosis; changes in the structure of the microorganisms that reside within the human intestinal tract (the gut microbiota) (Franceschi, C., et al. Nat Rev Endocrinol 14, 576-590 (2018)). The gut microbiota plays an integral role in regulating host immunity and inflammation through a variety of mechanisms (Brown, E. M., et al. Ann Rev Immunol 37, 599-624 (2019)). A recent meta-analysis of randomized clinical trials utilizing probiotic supplementation found that orally administered microbes can significantly reduce systemic inflammatory biomarkers in human subjects (Milajerdi, A. et al. Eur J Nutr 59, 633-649 (2020)), and there is evidence that probiotic organisms can also promote longevity in model organisms, including *Caenorhabitis elegans* (Roselli, M. et al. Int J Mol Sci 20, E5020 (2019)). However, commercial probiotics are limited to a small number of bacterial and fungal species, and novel sources of beneficial microbes present new possible solutions to address systemic inflammation in the aging population. Thus, there is a significant need to identify microbes and produce compositions comprising live microbial populations that can be used to treat and/or prevent symptoms of aging-associated inflammation.

SUMMARY

In certain aspects, disclosed herein are pharmaceutical compositions comprising a population of viable microbes, comprising:
(i) a first microbial entity comprising a first bacterial species comprising:
   (a) an 16S rDNA sequence that is at least 97% identical to a 16S rDNA sequence set forth in SEQ ID NO: 1-233 from Table 4;
   (b) a first genome; wherein the first genome comprises at least one functional expression sequence at least about 30% identical to a functional expression sequence selected from Table 5 or Table 6; or
   (c) a bacterial species capable of producing an enzyme having an amino acid sequence at least 60% identical to an enzyme selected from Table 5 or an enzyme capable of acting on the same substrate as an enzyme having an amino acid sequence at least 60% identical to an enzyme selected from Table 5 or Table 6;
(ii) a second microbial entity comprising a first fungal species comprising:
   (a) an 18S or ITS rDNA sequence that is at least 97% identical to a 18S or ITS rDNA sequence set forth in SEQ ID NO: 1-233 from Table 4;
   (b) a genome comprising a functional expression sequence selected from at least about 30% identical to a functional expression sequence selected from Table 5 or Table 6; or (c) a metabolic signature or functionality selected from Table 5 or Table 7; and
(iii) a pharmaceutically acceptable delivery vehicle.

In certain aspects, disclosed herein are pharmaceutical compositions comprising a population of viable microbes, comprising:
(i) first microbial entity comprising a first bacterial species comprising a 16S rDNA sequence that is at least 97% identical to a 16S rDNA sequence set forth in SEQ ID NO 1-233 from Table 4;
(ii) a second microbial entity comprising a first fungal species comprising:
(a) an 18S or ITS rDNA sequence that is at least 97% identical to a 18S or ITS rDNA sequence set forth in SEQ ID NO: 1-233 from Table 4;
(b) a genome comprising a functional expression sequence selected from at least about 30% identical to a functional expression sequence selected from Table 5 or Table 6; or
(c) a metabolic signature or functionality or functionality selected from Table 5 or Table 7; and
(iii) a pharmaceutically acceptable delivery vehicle.

In certain aspects, disclosed herein are pharmaceutical compositions comprising a functional population of viable microbes, comprising:
(i) a first microbial entity comprising a first bacterial species comprising a first genome; wherein the first genome comprises at least one functional expression sequence at least about 30% identical to a functional expression sequence selected from Table 5 or Table 6;
(ii) a second microbial entity comprising a first fungal species comprising:
(a) an 18S or ITS rDNA sequence that is at least 97% identical to a 18S or ITS rDNA sequence set forth in SEQ ID NO:233 from Table 4;
(b) a genome comprising a functional expression sequence selected from at least about 30% identical to a functional expression sequence selected from Table 5 or Table 6; or
(c) a metabolic signature or functionality or functionality selected from Table 5 or Table 7; and
(iii) a pharmaceutically acceptable delivery vehicle.

In certain aspects, disclosed herein are pharmaceutical compositions comprising a functional population of viable microbes, comprising:
(i) a first microbial entity comprising a bacterial species capable of producing an enzyme having an amino acid sequence at least 60% identical to an enzyme selected from Table 5 or Table 6 or an enzyme capable of acting on the same substrate as an enzyme having an amino acid sequence at least 60% identical to an enzyme selected from Table 5 or Table 6;
(ii) a second microbial entity comprising a first fungal species comprising:
(a) an 18S or ITS rDNA sequence that is at least 97% identical to a 18S or ITS rDNA sequence set forth in SEQ ID NO: 1-233 from Table 4;
(b) a genome comprising a functional expression sequence selected from at least about 30% identical to a functional expression sequence selected from Table 5 or Table 6; or
(c) a metabolic signature or functionality selected from Table 5 or Table 7; and
(iii) a pharmaceutically acceptable delivery vehicle.

In certain aspects, disclosed herein are pharmaceutical compositions comprising a population of viable microbes, comprising:
(i) a first microbial entity comprising a first bacterial species comprising:
(a) an 16S rDNA sequence that is at least 97% identical to a 16S rDNA sequence set forth in SEQ ID NO: 1-233 from Table 4;
(b) a first genome; wherein the first genome comprises at least one functional expression sequence at least about 30% identical to a functional expression sequence selected from Table 5 or Table 6; or
(c) a bacterial species capable of producing an enzyme having an amino acid sequence at least 60% identical to an enzyme selected from Table 5 or Table 6 or an enzyme capable of acting on the same substrate as an enzyme having an amino acid sequence at least 60% identical to an enzyme selected from Table 5 or Table 6;
(ii) a second microbial entity comprising a first fungal species comprising an 18S or ITS rDNA sequence that is at least 97% identical to a 18S or ITS rDNA sequence set forth in SEQ ID NO: 1-233 from Table 4; and
(iii) a pharmaceutically acceptable delivery vehicle.

In certain aspects, disclosed herein are pharmaceutical compositions comprising a population of viable microbes, comprising:
(i) a first microbial entity comprising a first bacterial species comprising:
(a) an 16S rDNA sequence that is at least 97% identical to a 16S rDNA sequence set forth in SEQ ID NO: 1-233 from Table 4;
(b) a first genome; wherein the first genome comprises at least one functional expression sequence at least about 30% identical to a functional expression sequence selected from Table 5 or Table 6; or
(c) a bacterial species capable of producing an enzyme having an amino acid sequence at least 60% identical to an enzyme selected from Table 5 or Table 6 or an enzyme capable of acting on the same substrate as an enzyme having an amino acid sequence at least 60% identical to an enzyme selected from Table 5 or Table 6;
(ii) a second microbial entity comprising a first fungal species comprising a genome comprising a functional expression sequence selected from at least about 30% identical to a functional expression sequence selected from Table 5 or Table 6; and
(iii) a pharmaceutically acceptable delivery vehicle.

In certain aspects, disclosed herein are pharmaceutical compositions comprising a population of viable microbes, comprising:
(i) a first microbial entity comprising a first bacterial species comprising:
(a) an 16S rDNA sequence that is at least 97% identical to a 16S rDNA sequence set forth in SEQ ID NO: 1-233 from Table 4;
(b) a first genome; wherein the first genome comprises at least one functional expression sequence at least about 30% identical to a functional expression sequence selected from Table 5 or Table 6; or
(c) a bacterial species capable of producing an enzyme having an amino acid sequence at least 60% identical to an enzyme selected from Table 5 or Table 6 or an enzyme capable of acting on the same substrate as an enzyme having an amino acid sequence at least 60% identical to an enzyme selected from Table 5 or Table 6;

(ii) a second microbial entity comprising a first fungal species comprising a metabolic signature or functionality selected from Table 5 or Table 7; and
(iii) a pharmaceutically acceptable delivery vehicle.

In certain aspects, disclosed herein are pharmaceutical compositions comprising a population of viable microbes, comprising:
(i) first microbial entity comprising a first bacterial species comprising a 16S rDNA sequence that is at least 97% identical to a 16S rDNA sequence set forth in SEQ ID NO: 1-233 from Table 4;
(ii) a second microbial entity comprising a first fungal species comprising an 18S or ITS rDNA sequence that is at least 97% identical to a 18S or ITS rDNA sequence set forth in SEQ ID NO: 1-233 from Table 4; and
(iii) a pharmaceutically acceptable delivery vehicle.

In certain aspects, disclosed herein are pharmaceutical compositions comprising a functional population of viable microbes, comprising:
(i) a first microbial entity comprising a first bacterial species comprising a first genome; wherein the first genome comprises at least one functional expression sequence at least about 30% identical to a functional expression sequence selected from Table 5 or Table 6.
(ii) a second microbial entity comprising a first fungal species comprising a genome comprising a functional expression sequence selected from at least about 30% identical to a functional expression sequence selected from Table 5 or Table 6; and
(iii) a pharmaceutically acceptable delivery vehicle.

In certain aspects, disclosed herein are pharmaceutical compositions comprising a functional population of viable microbes, comprising:
(i) a first microbial entity comprising a first bacterial species capable of producing an enzyme having an amino acid sequence at least 60% identical to an enzyme selected from Table 5 or Table 6 or an enzyme capable of acting on the same substrate as an enzyme having an amino acid sequence at least 60% identical to an enzyme selected from Table 5 or Table 6;
(ii) a second microbial entity comprising a first fungal species comprising a metabolic signature or functionality selected from Table 5 or Table 7; and
(iii) a pharmaceutically acceptable delivery vehicle.

In certain aspects, disclosed herein are pharmaceutical compositions comprising a population of viable microbes, comprising:
(i) a first and second microbial entity, wherein each microbial entity comprises a bacterial species, each species comprising:
(a) an 16S rDNA sequence that is at least 97% identical to a 16S rDNA sequence set forth in SEQ ID NO: 1-233 from Table 4;
(b) a first genome; wherein the first genome comprises at least one functional expression sequence at least about 30% identical to a functional expression sequence selected from Table 5 or Table 6; or
(c) a bacterial species capable of producing an enzyme having an amino acid sequence at least 60% identical to an enzyme selected from Table 5 or an enzyme capable of acting on the same substrate as an enzyme having an amino acid sequence at least 60% identical to an enzyme selected from Table 5 or Table 6; and
(ii) a pharmaceutically acceptable delivery vehicle.

In certain aspects, disclosed herein are pharmaceutical compositions comprising a population of viable microbes, comprising:
(i) a first and second microbial entity, wherein each microbial entity comprises a fungal species, each species comprising:
(a) an 18S or ITS rDNA sequence that is at least 97% identical to a 18S or ITS rDNA sequence set forth in SEQ ID NO: 1-233 from Table 4;
(b) a genome comprising a functional expression sequence selected from at least about 30% identical to a functional expression sequence selected from Table 5 or Table 6; or
(c) a metabolic signature or functionality selected from Table 5 or Table 7; and
(ii) a pharmaceutically acceptable delivery vehicle.

In certain embodiments, the first bacterial species comprises a 16S rDNA sequence that is at least 97.5%, at least 98%, at least 98.5%, at least 99%, at least 99.5%, or 100% identical to the 16S rDNA sequence set forth in SEQ ID NO: 1-233 from Table 4. In certain embodiments, the first fungal species comprises an 18S or ITS rDNA sequence that is at least 97.5%, at least 98%, at least 98.5%, at least 99%, at least 99.5%, or 100% identical to the 18S or ITS rDNA sequence set forth in SEQ ID NO: 1-233 from Table 4. In certain embodiments, the functional expression sequence comprises an amino acid sequence selected from Table 5 or Table 6. In certain embodiments, the functional expression sequence comprises an mRNA sequence which encodes an amino acid sequence selected from Table 5 or Table 6. In certain embodiments, the first genome comprises at least one functional expression sequence at least 60% identical to a functional expression sequence selected from Table 5 or Table 6. In certain embodiments, the second genome comprises at least one functional expression sequence at least 60% identical to a functional expression sequence selected from Table 5 or Table 6. In certain embodiments, the first bacterial species comprises one or more features selected from the group consisting of:
(i) capable of engrafting when administered to a subject,
(ii) capable of having anti-inflammatory activity,
(iii) not capable of inducing pro-inflammatory activity,
(iv) capable of producing a secondary bile acid,
(v) capable of producing a tryptophan metabolite,
(vi) capable of restoring epithelial integrity as determined by a primary epithelial cell monolayer barrier integrity assay,
(vii) capable of being associated with remission of an inflammatory bowel disease,
(viii) capable of producing a short-chain fatty acid,
(ix) capable of inhibiting a Histone Deacetylase (HDAC) activity,
(x) capable of producing a medium-chain fatty acid,
(xi) capable of expressing catalase activity,
(xii) capable of having alpha-fucosidase activity,
(xiii) capable of inducing Wingless-Type MMTV Integration Site Family (Wnt) activation,
(xiv) capable of producing a B vitamin,
(xv) capable of modulating host metabolism of endocannabinoid,
(xvi) capable of producing a polyamine and/or modulating a host metabolism of a polyamine,
(xvii) capable of reducing fecal levels of a sphingolipid,
(xviii) capable of modulating host production of kynurenine,
(xix) capable of reducing fecal calprotectin level,
(xx) not capable of activating a toll-like receptor pathway,
(xxi) capable of activating a toll-like receptor pathway,
(xxii) not capable of producing ursodeoxycholic acid, (xxiii) capable of not being associated with clinical non-remission of an inflammatory bowel disease,
(xxiv) capable of inhibiting apoptosis of intestinal epithelial cells,
(xxv) capable of inducing an increased anti-inflammatory interleukin (IL)-10/IL-6 cytokine ratio in macrophages,
(xxvi) capable of not inducing pro-inflammatory IL-6, Tumor Necrosis Factor alpha (TNFα), IL-1b, IL-23 or IL-12 production or gene expression in macrophages,
(xxvii) capable of downmodulating one or more genes induced in Interferon Gamma (IFN-γ) treated colonic organoids,
(xxix) capable of producing IL-18,
(xxx) capable of inducing the activation of antigen presenting cells,
(xxxi) capable of reducing the expression of one or more inhibitory receptors on T cells,
(xxxii) capable of increasing expression of one or more genes/proteins associated with T cell activation and/or function,
(xxxiii) capable of enhancing the ability of CD8+ T cells to kill tumor cells,
(xxxiv) capable of enhancing the efficacy of an immune checkpoint inhibitor therapy, (xxxv) capable of reducing colonic inflammation,
(xxxvi) capable of promoting the recruitment of CD8+ T cells to tumors
(xxxvii) capable of promoting the production of T-regulatory cells, and.
(xxxviii) combinations thereof.

In certain embodiments, the not activating a toll-like receptor (TLR) pathway comprises no activation of TLR4 or TLR5. In certain embodiments, the activating a toll-like receptor pathway comprises activation of TLR2. In certain embodiments, the one or more genes induced in IFN-γ treated colonic organoids, is selected from genes associated with inflammatory chemokine signaling, Nuclear Factor Kappa B (NF-κB) signaling, Tumor Necrosis Factor (TNF) family signaling, type I interferon signaling, type II interferon signaling, TLR signaling, lymphocyte trafficking, Th17 cell differentiation, Th1 differentiation, Th2 differentiation, apoptosis, inflammasomes, autophagy, oxidative stress, Major Histocompatibility Complex (MHC) class I and II antigen presentation, complement, Mechanistic Target of Rapamycin Kinase (mTor), nod-like receptor signaling, Phosphatidylinositol-4,5-Bisphosphate 3-Kinase (PI3K) signaling, and combinations thereof. In certain embodiments, the one or more inhibitory receptors on T cells is selected from T Cell Immunoreceptor With Ig And ITIM Domains (TIGIT), T-Cell Immunoglobulin Mucin Receptor 3 (TIM-3), Lymphocyte Activating 3 (LAG-3), and combinations thereof. In certain embodiments, the one or more genes or proteins associated with T cell activation and/or function is selected from Protein Tyrosine Phosphatase Receptor Type C (PTPRC/CD45RO), Early T-Cell Activation Antigen P60 (CD69), IL-24, TNF-α, perforin, IFN-γ, and combinations thereof.

In certain embodiments, the first bacterial species is capable of producing indole-containing compounds. In certain embodiments, the indole containing compound is selected from indole, indole acetic acid (IAA), and indole propionic acid (IPA). In certain embodiments, the first bacterial species is capable of producing bacteriocins and antibacterial peptides. In certain embodiments, the first bacterial species is capable of producing neurotransmitters selected from serotonin, gamma-aminobutyric acid (GABA), dopamine, melatonin, and combinations thereof.

In certain embodiments, the first bacterial species is capable of inducing the production of IFNγ, IL-12, TNF-α, IL-17, IL-6, or combinations thereof. In certain embodiments, the first bacterial species is capable of producing a biosurfactant that reduces pro-inflammatory cytokines. In certain embodiments, the first bacterial species metabolizes human produced primary bile acids into secondary bile acids. In certain embodiments, the primary bile acid is cholic acid, chenodeoxycholic acid, or combinations thereof. In certain embodiments, the secondary bile acid inhibits Farnesoid X-Activated Receptor (NR1H4/FXR) and/or activates G Protein-Coupled Bile Acid Receptor 1 (GPBAR1/TGR5). In certain embodiments, the first bacterial species produces more omega-3 fatty acids compared to omega-6 fatty acids.

In certain embodiments, the first bacterial species comprises one or more bacteria that are capable of producing a metabolite selected from Table 5 or Table 7. In certain embodiments, the first fungal species comprises one or more fungi that are capable of producing a metabolite selected from Table 5 or Table 7. In certain embodiments, the first fungal species utilizes a metabolite produced by the first bacterial species. In certain embodiments, the first fungal species utilizes a metabolite selected from Table 5 or Table 7. In certain embodiments, the pharmaceutical composition further comprises a metabolite selected from Table 5 or Table 7. In certain embodiments, the pharmaceutical composition further comprises a metabolite produced by the first bacterial entity, produced by the first fungal entity, or combinations thereof.

In certain embodiments, the composition includes a prebiotic fiber. In certain embodiments, the pharmaceutically acceptable delivery vehicle comprises an excipient or carbon source. In certain embodiments, the pharmaceutically acceptable delivery vehicle is present at an amount of 50% or less by weight.

In certain embodiments, the pharmaceutical composition is formulated in an oral administration form comprising between $1\times10^6$ and $1\times10^{12}$ cfu/dose of each of the first microbial entity and the second microbial entity.

In certain embodiments, the first microbial entity and the second microbial entity synergize to produce an anti-inflammatory effect in a mammalian host. In certain embodiments, the anti-inflammatory effect in a mammalian host is caused by the production at least one anti-inflammatory metabolite by either the first microbial entity, the second microbial entity or both the first and the second microbial entities. In certain embodiments, administering an effective dose of the pharmaceutical composition to a human subject reduces the level and/or activity of at least one inflammatory cytokine from Table 8 relative to a level and/or activity of the inflammatory cytokine in the serum of the human subject; or a tissue of the subject, prior to administering the pharmaceutical composition to the subject.

In certain embodiments, administering an effective dose of the pharmaceutical composition to a human subject treats, prevents, or reduces the severity of at least one symptom in the subject of an immune system disorder. In certain embodiments, the immune system disorder is selected from allergic rhinitis, allergic conjunctivitis, allergic bronchial asthma, atopic eczema, anaphylaxis, insect sting, drug allergy, food allergy, asthma, eczema, a disorder or condition associated with a pathological Th17 activity, or combinations thereof. In certain embodiments, the human subject has an altered Th17 activity, In certain embodiments, administering an effective dose of the pharmaceutical composition to a human subject treats, prevents, or reduces the severity of at least one symptom in the subject of a rheumatic disease selected from rheumatoid arthritis, spondyloarthritis, and psoriasis.

In certain embodiments, administering an effective dose of the pharmaceutical composition to a human subject treats, prevents, or reduces the severity of at least one symptom in the subject of periodontal disease.

In certain embodiments, administering an effective dose of the pharmaceutical composition to a human subject treats, prevents, or reduces the severity of at least one symptom in the subject of gastritis. In certain embodiments, the gastritis is *H. pylori*-associated gastritis.

In certain embodiments, the pharmaceutical compositions described herein, comprise at least one additional microbial entity.

In certain aspects, described herein are medical foods comprising:
(i) a first microbial entity of the pharmaceutical compositions described herein;
(ii) a second microbial entity of the pharmaceutical compositions described herein; and
(iii) an excipient.

In certain embodiments, the medical food further comprises a metabolite selected from Table 5 or Table 7. In certain embodiments, the first microbial entity comprises one or more bacteria that are capable of producing a metabolite selected from Table 5 or Table 7. In certain embodiments, the first microbial entity comprises one or more fungi that are capable of producing a metabolite selected from Table 5 or Table 7. In certain embodiments, the first microbial entity utilizes a metabolite produced by the second microbial entity. In certain embodiments, the first microbial entity utilizes a metabolite selected from Table 5 or Table 7. In certain embodiments, the medical food further comprises a metabolite produced by the first microbial entity, produced by the second microbial entity, or combinations thereof.

In certain embodiments, the medical food further comprises a prebiotic fiber. In certain embodiments, the medical food further comprises at least one additional microbial entity.

In certain embodiments, the medical food is formulated in an oral administration form comprising between $1 \times 10^6$ and $1 \times 10^{12}$ cfu/administration of each of the first microbial entity and the second microbial entity.

In certain embodiments, the first microbial entity and the second microbial entity synergize to produce an anti-inflammatory effect in a mammalian host. In certain embodiments, the anti-inflammatory effect in a mammalian host is caused by the production of at least one anti-inflammatory metabolite by either the first microbial entity, the second microbial entity or both the first and the second microbial entities. In certain embodiments, administering an effective amount of the medical food to a human subject reduces the level and/or activity of at least one inflammatory cytokine from Table 8 relative to a level and/or activity of the inflammatory cytokine in the serum of the human subject; or a tissue of the subject, prior to administering the medical food to the subject.

In certain embodiments, administering an effective amount of the medical food to a human subject enables the dietary management of at least one symptom in the subject of an immune system disorder. In certain embodiments, the immune system disorder is selected from allergic rhinitis, allergic conjunctivitis, allergic bronchial asthma, atopic eczema, anaphylaxis, insect sting, drug allergy, food allergy, asthma, eczema, a disorder or condition associated with a pathological Th17 activity, or combinations thereof. In certain embodiments, the human subject has an altered Th17 activity.

In certain embodiments, administering an effective amount of the medical food to a human subject enables the dietary management of at least one symptom in the subject of a rheumatic disease selected from rheumatoid arthritis, spondyloarthritis, and psoriasis.

In certain embodiments, administering an effective amount of the medical food to a human subject enables the dietary management of at least one symptom in the subject of periodontal disease.

In certain embodiments, administering an effective amount of the medical food to a human subject enables the dietary management of at least one symptom in the subject of gastritis. In certain embodiments, the gastritis is *H. pylori*-associated gastritis.

In certain aspects, described herein is a solid food stuff comprising:
(i) a first microbial entity of the pharmaceutical compositions described herein;
(ii) a second microbial entity of the pharmaceutical compositions described herein; and
(iii) an excipient.

In certain embodiments, the solid food stuff further comprises a metabolite selected from Table 5 or Table 7. In certain embodiments, the solid stuff further comprises a metabolite produced by the first bacterial entity, produced by the first fungal entity, or combinations thereof. In certain embodiments, the solid food stuff further comprises a prebiotic fiber. In certain embodiments, the solid food stuff further comprises at least one additional microbial entity. In certain embodiments, the solid food stuff is formulated in an oral administration form comprising between $1 \times 10^6$ and $1 \times 10^{12}$ cfu/administration of each of the first microbial entity and the second microbial entity.

In certain embodiments, the first microbial entity and the second microbial entity synergize to produce an anti-inflammatory effect in a mammalian host. In certain embodiments, the anti-inflammatory effect in a mammalian host is caused by the production at least one anti-inflammatory metabolite by either the first microbial entity, the second microbial entity, or both the first and the second microbial entities.

In certain embodiments, administering an effective amount of the solid food stuff to a human subject reduces the level and/or activity of at least one inflammatory cytokine from Table 8 relative to a level and/or activity of the inflammatory cytokine in the serum of the human subject; or a tissue of the subject, prior to administering the solid food stuff to the subject.

In certain embodiments, administering an effective amount of the solid food stuff to a human subject enables the dietary management of at least one symptom in the subject of an immune system disorder. In certain embodiments, the immune system disorder is selected from allergic rhinitis, allergic conjunctivitis, allergic bronchial asthma, atopic eczema, anaphylaxis, insect sting, drug allergy, food allergy, asthma, eczema, a disorder or condition associated with a pathological Th17 activity, and combinations thereof. In certain embodiments, the human subject has an altered Th17 activity.

In certain embodiments, administering an effective amount of the solid food stuff to a human subject enables the dietary management of at least one symptom in the subject of a rheumatic disease selected from rheumatoid arthritis, spondyloarthritis, and psoriasis.

In certain embodiments, administering an effective amount of the solid food stuff to a human subject enables the dietary management of at least one symptom in the subject of periodontal disease.

In certain embodiments, administering an effective amount of the solid food stuff to a human enables the dietary management of at least one symptom in the subject of gastritis. In certain embodiments, the gastritis is *H. pylori*-associated gastritis.

In certain aspects, described herein are dietary supplements comprising:
(i) a first microbial entity of the pharmaceutical compositions described herein;
(ii) a second microbial entity of the pharmaceutical compositions described herein; and
(iii) an excipient.

In certain embodiments, the dietary supplement further comprises a metabolite selected from Table 5 or Table 7. In certain embodiments, the first microbial entity comprises one or more bacteria that are capable of producing a metabolite selected from Table 5 or Table 7. In certain embodiments, the first microbial entity comprises one or more fungi that are capable of producing a metabolite selected from Table 5 or Table 7. In certain embodiments, the first microbial entity utilizes a metabolite produced by the second microbial entity. In certain embodiments, the first microbial entity utilizes a metabolite selected from Table 5 or Table 7. In certain embodiments, the dietary supplement further comprises a metabolite produced by the first microbial entity, produced by the second microbial entity, or combinations thereof. In certain embodiments, the dietary supplement further comprises a prebiotic fiber. In certain embodiments, the dietary supplement further comprises at least one additional microbial entity. In certain embodiments, the dietary supplement is formulated in an oral administration form comprising between $1 \times 10^6$ and $1 \times 10^{12}$ cfu/dose of each of the first microbial entity and the second microbial entity.

In certain embodiments, the first microbial entity and the second microbial entity synergize to produce an anti-inflammatory effect in a mammalian host. In certain embodiments, the anti-inflammatory effect in a mammalian host is caused by the production of at least one anti-inflammatory metabolite by either the first microbial entity, the second microbial entity or both the first and the second microbial entities. In certain embodiments, administering an effective amount of the dietary supplement to a human subject reduces the level and/or activity of at least one inflammatory cytokine from Table 8 relative to a level and/or activity of the inflammatory cytokine in the serum of the human subject; or a tissue of the subject, prior to administering the dietary supplement to the subject.

In certain embodiments, administering an effective amount of the dietary supplement to a human subject reduces and/or prevents at least one symptom in the subject of an immune system disorder. In certain embodiments, the immune system disorder is selected from allergic rhinitis, allergic conjunctivitis, allergic bronchial asthma, atopic eczema, anaphylaxis, insect sting, drug allergy, food allergy, asthma, eczema, a disorder or condition associated with a pathological Th17 activity, or combinations thereof. In certain embodiments, the human subject has an altered Th17 activity.

In certain embodiments, administering an effective amount of the dietary supplement to a human subject reduces and/or prevents at least one symptom in the subject of a rheumatic disease selected from rheumatoid arthritis, spondyloarthritis, and psoriasis.

In certain embodiments, administering an effective amount of the dietary supplement to a human subject reduces and/or prevents at least one symptom in the subject of periodontal disease.

In certain embodiments, administering an effective amount of the dietary supplement to a human subject reduces and/or prevents at least one symptom in the subject of gastritis. In certain embodiments, the gastritis is *H. pylori*-associated gastritis.

In certain embodiments of the pharmaceutical composition, medical food, dietary supplement, or nutritional food stuff described herein, the pharmaceutically acceptable delivery vehicle or excipient comprises a non-naturally occurring compound. In certain embodiments of the pharmaceutical composition, medical food, dietary supplement, or nutritional food stuff described herein, the first or second microbial entity exhibits at least one of mucoadherence or mammalian epithelial cell adherence. In certain embodiments, the pharmaceutical composition, medical food, dietary supplement, or nutritional food stuff described herein further comprises a tastant, a flavorant, a vitamin or mineral, an agriculturally-derived carbohydrate, an agriculturally-derived lipid, or combinations thereof. In certain embodiments, the pharmaceutical composition, medical food, dietary supplement, or nutritional food stuff described herein is in a solid, semi-solid, liquid, or gel state at room temperature. In certain embodiments, the pharmaceutical composition, medical food, dietary supplement, or nutritional food stuff described herein is formulated for administration as an infant formula, an elderly nutritional formula, a prenatal nutrition formula, an athletic performance formula, a ready-to-use therapeutic food formula, or an athletic recovery formula.

In certain aspects, described herein are methods comprising administering a pharmaceutical composition, medical food, dietary supplement, or solid food stuff described herein to a human subject. In certain aspects, described herein is a method of reducing the level and/or activity of at least one inflammatory cytokine from Table 8, comprising administering an effective amount to a human subject an effective amount of the pharmaceutical composition, medical food, dietary supplement or solid food stuff described herein. In certain embodiments, the level and/or activity of the at least one inflammatory cytokine from Table 8 is reduced in the serum or select tissue of the human subject after administration of the pharmaceutical composition, medical food, or solid food stuff compared to a level and/or activity of the at least one inflammatory cytokine from Table 8 prior to administration of the pharmaceutical composition, medical food, or solid food stuff.

In certain aspects, described herein are methods of treating, preventing or reducing the severity of at least one symptom of an immune system disorder, and/or enabling dietary management of at least one symptom of an immune system disorder, comprising administering to a human subject an effective amount of the pharmaceutical composition, medical food, dietary supplement or solid food stuff described herein. In certain embodiments, the immune system disorder is selected from the group consisting of allergic rhinitis, allergic conjunctivitis, allergic bronchial asthma, atopic eczema, anaphylaxis, insect sting, drug allergy, food allergy, asthma, eczema, a disorder or condition associated with a pathological Th17 activity, and combinations thereof.

In certain aspects, described herein are methods of treating, preventing or reducing the severity of at least one symptom of a rheumatic disease, and/or enabling dietary management of at least one symptom of a rheumatic disease, selected from rheumatoid arthritis, spondyloarthritis, and psoriasis, comprising administering to a human subject an effective amount of the pharmaceutical composition, medical food, dietary supplement or solid food stuff described herein. In certain embodiments, the rheumatic disease is rheumatoid arthritis. In certain embodiments, the symptom of rheumatic disease is selected from synovial hyperplasia, articular cartilage damage, damage to the metaphyseal bone, or combinations thereof.

In certain aspects, described herein are methods of treating, preventing or reducing the severity of at least one symptom of periodontal disease, and/or enabling dietary management of at least one symptom of periodontal disease, comprising administering to a human subject an effective amount of the pharmaceutical composition, medical food, dietary supplement or solid food stuff described herein.

In certain aspects, described herein are methods of treating, preventing or reducing the severity of at least one symptom of gastritis, and/or enabling dietary management of at least one symptom of gastritis, comprising administering to a human subject an effective amount of the pharmaceutical composition, medical food, dietary supplement or solid food stuff described herein. In certain embodiments, the gastritis is *H. pylori*-associated gastritis.

In certain aspects, described herein are methods of treating, preventing or reducing the severity of at least one symptom of osteoarthritis, and/or enabling dietary management of at least one symptom of osteoarthritis comprising administering to a human subject an effective amount of the pharmaceutical composition, medical food, dietary supplement or solid food stuff described herein.

In certain aspects, described herein are methods of selecting a microbial entity for a pharmaceutical composition, medical food, dietary supplement, or solid foodstuff for treating, preventing, reducing the severity, and/or enabling dietary management of at least one symptom of an immune system disorder comprising a viable microbial population, the method comprising:
(i) providing a library of whole-genome or cDNA transcriptome sequences of microbial candidates of different species; and
(ii) generating a gene-of-interest database for orthologous genes-of-interest from the different species, wherein the gene-of-interest is selected from genes involved in the metabolism or biogenesis of short chain fatty acid (propionate and butyrate), indole (indole-3-acetic acid and indole propionic acid), Gamma-aminobutyric acid (GABA), surfactants (surfactin, nisin, fengycin, and iturin), dopamine, secondary bile acids, exopolysaccharide proteins (EPS), omega 3 fatty acids, and combinations thereof.

In certain aspects, described herein are methods of formulating a pharmaceutical composition, medical food, dietary supplement, or solid food stuff comprising a viable microbial population for treating, preventing, reducing the severity, and/or enabling dietary management of at least one symptom of an immune system disorder, the method comprising:
(i) selecting at least two microbial entity candidates of different species with immunomodulatory function; and
(ii) identifying genes-of-interest that indicate synergistic functions of the at least two microbial entities in silico using predictive modeling of libraries of whole-genome or cDNA transcriptome sequences of the microbial candidates of different species; and/or
(iii) culturing the at least two microbial entities in combination in vitro and detecting formation of an anti-inflammatory product.

In certain aspects, described herein are methods of formulating a pharmaceutical composition, medical food, dietary supplement, or solid food stuff comprising a viable microbial population for treating, preventing, reducing the severity, and/or enabling dietary management of at least one symptom of a rheumatic disease, the method comprising:
(i) selecting at least two microbial entity candidates of different species with immunomodulatory function; and
(ii) identifying genes-of-interest that indicate synergistic functions of the at least two microbial entities in silico using predictive modeling of libraries of whole-genome or cDNA transcriptome sequences of the microbial candidates of different species; and/or
(iii) culturing the at least two microbial entities in combination in vitro and detecting formation of an anti-inflammatory product.

In certain aspects, described herein are methods of formulating a pharmaceutical composition, medical food, dietary supplement or nutritional food stuff comprising a viable microbial population for treating, preventing, reducing the severity, and/or enabling dietary management of at least one symptom of a periodontal disease, the method comprising:
(i) selecting at least two microbial entity candidates of different species with immunomodulatory function; and
(ii) identifying genes-of-interest that indicate synergistic functions of the at least two microbial entities in silico using predictive modeling of libraries of whole-genome or cDNA transcriptome sequences of the microbial candidates of different species; and/or
(iii) culturing the at least two microbial entities in combination in vitro and detecting formation of an antimicrobial product.

In certain aspects, described herein are methods of formulating a pharmaceutical composition, medical food, dietary supplement or nutritional food stuff comprising a viable microbial population for treating, preventing, reducing the severity, and/or enabling dietary management of at least one symptom of gastritis, the method comprising:
(i) selecting at least two microbial entity candidates of different species with immunomodulatory function; and
(ii) identifying genes-of-interest that indicate synergistic functions of the at least two microbial entities in silico using predictive modeling of libraries of whole-genome or cDNA transcriptome sequences of the microbial candidates of different species; and/or
(iii) culturing the at least two microbial entities in combination in vitro and detecting formation of an antimicrobial and/or anti-inflammatory product. In certain embodiments, the gastritis is *H. pylori*-associated gastritis.

In certain aspects, described herein are methods of formulating a pharmaceutical composition, medical food, dietary supplement or nutritional food stuff comprising a viable microbial population for treating, preventing, reducing the severity, and/or enabling dietary management of at least one symptom of osteoarthritis, the method comprising:

(i) selecting at least two microbial entity candidates of different species with immunomodulatory function; and (ii) identifying genes-of-interest that indicate synergistic functions of the at least two microbial entities in silico using predictive modeling of libraries of whole-genome or cDNA transcriptome sequences of the microbial candidates of different species; and/or (iii) culturing the at least two microbial entities in combination in vitro and detecting formation of an anti-microbial and/or anti-inflammatory product.

In certain aspects, described herein are methods of treating, preventing, or reducing the severity of at least one symptom of aging-associated inflammation, and/or enabling dietary management of at least one symptom of aging-associated inflammation in a human subject, the method comprising administering to the human subject an effective amount of the pharmaceutical composition, medical food, dietary supplement or solid food stuff described herein. In certain embodiments, the symptom of aging-associated inflammation is selected from the group consisting of frailty, chronic pain, sarcopenia, impaired mobility, walking speed, cognitive processing speed, and executive functioning.

In certain aspects, described herein are methods of modulating the level and/or activity of an inflammatory cytokine related to human aging in a human subject, comprising administering to the human subject an effective amount of the pharmaceutical composition, medical food, dietary supplement or solid food stuff described herein. In certain embodiments, the modulating the level and or activity of an inflammatory cytokine related to human aging, comprises reducing the level and/or activity of at least one inflammatory cytokine from Table 8. In certain embodiments, the level and/or activity of the at least one inflammatory cytokine from Table 8 is reduced in the serum or select tissue of the human subject after administration of the pharmaceutical composition, medical food, dietary supplement or solid food stuff compared to a level and/or activity of the at least one inflammatory cytokine from Table 8 prior to administration of the pharmaceutical composition, medical food, dietary supplement or solid food stuff. In certain embodiments, the inflammatory cytokine is selected from the group consisting of IFNγ, IL-12, TNF-α, IL-17, IL-6, IL-1β, IL-10, and combinations thereof. In certain embodiments, the level and/or activity of the at least one inflammatory cytokine related to human aging is reduced in the serum or select tissue of the human subject after the administration of the effective amount of the pharmaceutical composition, medical food, dietary supplement or solid food stuff.

In certain aspects, described herein are methods of reducing the level of at least one biomarker associated with aging-associated inflammation in a human subject, comprising administering to the human subject an effective amount of the pharmaceutical composition, medical food, dietary supplement or solid food stuff described herein. In certain embodiments, the at least one biomarker associated with aging-associated inflammation is selected from the group consisting of IL-6, TNF-α, TNF-α Receptor II (TNFRII), Growth Differentiating Factor 15 (GDF15), Cystatin-C, B-type Natriuretic peptides (BNP, NT-proBNP), C-Reactive Protein (CRP), C-X-C Motif Chemokine Ligand 10 (CXCL10), C-X3-C Motif Chemokine Ligand 1 (CX3CL1), Insulin Like Growth Factor (IGF) 1 (IGF-1), IGF binding proteins, Insulin, and Hemoglobin Subunit Alpha 1 (HbA1C). In certain embodiments, the level of the at least one biomarker associated with aging-associated inflammation is reduced in the serum or select tissue of the human subject after administration of the pharmaceutical composition, medical food, dietary supplement or solid food stuff compared to a level and/or activity of the at least one biomarker associated with aging-associated inflammation prior to administration of the pharmaceutical composition, medical food, dietary supplement or solid food stuff. In certain embodiments, the method results in reducing the severity of at least one symptom of aging-associated inflammation in the human subject; wherein the symptom of aging-associated inflammation is selected from the group consisting of frailty, chronic pain, sarcopenia, impaired mobility, walking speed, cognitive processing speed, and executive functioning.

In certain aspects, described herein are methods of improving immune health in a subject, the method comprising administering to the subject an effective amount of the pharmaceutical composition, medical food, dietary supplement or solid food stuff described herein. In certain embodiments, the method modulates the level and/or activity of an inflammatory cytokine in a subject. In certain embodiments, the modulating the level and or activity of an inflammatory cytokine, comprises reducing the level and/or activity of at least one inflammatory cytokine from Table 8. In certain embodiments, the level and/or activity of the at least one inflammatory cytokine from Table 8 is reduced in the serum or select tissue of subject after administration of the pharmaceutical composition, medical food, dietary supplement or solid food stuff compared to a level and/or activity of the at least one inflammatory cytokine from Table 8 prior to administration of the pharmaceutical composition, medical food, dietary supplement or solid food stuff. In certain embodiments, the inflammatory cytokine is selected from the group consisting of IFNγ, IL-12, TNF-α, IL-17, IL-6, IL-1β, IL-10, and combinations thereof. In certain embodiments, the level and/or activity of the at least one inflammatory cytokine in the serum or select tissue of a human subject after the administration of the effective amount of the pharmaceutical composition, medical food, dietary supplement or solid food stuff. In certain embodiments, the method causes an anti-inflammatory effect in the subject. In certain embodiments, the anti-inflammatory effect is caused by the production of at least one anti-inflammatory metabolite by either the first microbial entity, the second microbial entity or both the first and the second microbial entities. In certain embodiments, the method prevents, reduces the severity of, and/or enables the dietary management of an immune system disorder. In certain embodiments, the immune system disorder is selected from the group consisting of allergic rhinitis, allergic conjunctivitis, allergic bronchial asthma, atopic eczema, anaphylaxis, insect sting, drug allergy, food allergy, asthma, eczema, a disorder or condition associated with a pathological Th17 activity, and combinations thereof.

In certain aspects, described herein are methods of selecting a microbial entity for a pharmaceutical composition, medical food, dietary supplement, or solid foodstuff comprising a viable microbial population for treating, preventing, reducing the severity, and/or enabling dietary management of at least one symptom of aging-associated inflammation in a human subject, modulating the level and/or activity of an inflammatory cytokine related to human aging in a human subject, and/or reducing the level of at least one biomarker associated with aging-associated inflammation in a human subject, the method comprising:

(i) providing a library of whole-genome or cDNA transcriptome sequences of microbial candidates of different species; and (ii) generating a gene-of-interest database for orthologous genes-of-interest from the different species, wherein the gene-of-interest is selected from genes involved in the metabolism or biogenesis of short chain fatty acid (propionate and butyrate), indole (indole-3-acetic acid and indole propionic acid), Gamma-aminobutyric acid (GABA), surfactants (surfactin, nisin, fengycin, and iturin), dopamine, secondary bile acids, exopolysaccharide proteins (EPS), omega 3 fatty acids, and combinations thereof.

In certain aspects, described herein are methods of formulating a pharmaceutical composition, medical food, dietary supplement, or solid food stuff comprising a viable microbial population for treating, preventing, reducing the severity, and/or enabling dietary management of at least one symptom of aging-associated inflammation in human subject, modulating the level and/or activity of an inflammatory cytokine related to human aging in a human subject, and/or reducing the level of at least one biomarker associated with aging-associated inflammation in a human subject, the method comprising:
  (i) selecting at least two microbial entity candidates of different species with immunomodulatory function; and
  (ii) identifying genes-of-interest that indicate synergistic functions of the at least two microbial entities in silico using predictive modeling of libraries of whole-genome or cDNA transcriptome sequences of the microbial candidates of different species; and/or
  (iii) culturing the at least two microbial entities in combination in vitro and detecting formation of an anti-inflammatory product.

In certain aspects, disclosed herein are methods of improving immune health, comprising administering to a human subject an effective amount of a composition comprising viable microbes, comprising:
  (i) a first microbial entity comprising a first bacterial population comprising *Lactobacillus brevis*;
  (ii) a second microbial entity comprising a second bacterial population comprising *Lactococcus lactis*;
  (iii) a third microbial entity comprising a third bacterial population comprising *Bacillus velenzensis*; and.
  (iv) a fourth microbial entity comprising a fourth bacterial population comprising *Lactobacillus harbinensis*.

In certain aspects, disclosed herein are methods of improving immune health, comprising administering to a human subject an effective amount of a composition comprising:
  (i) a first microbial entity comprising a first bacterial species comprising a 16S rDNA sequence that is at least 97% identical to a 16S rDNA sequence set forth in SEQ ID NO: 43;
  (ii) a second microbial entity comprising a second bacterial species comprising a 16S rDNA sequence that is at least 97% identical to a 16S rDNA sequence set forth in SEQ ID NO: 224;
  (iii) a third microbial entity comprising a third bacterial species comprising a 16S rDNA sequence that is at least 97% identical to a 16S rDNA sequence set forth in SEQ ID NO: 221; and
  (iv) a fourth microbial entity comprising a fourth bacterial species comprising a 16S rDNA sequence that is at least 97% identical to a 16S rDNA sequence set forth in SEQ ID NO: 198.

In certain embodiments of any of the foregoing methods, the composition comprises a medical food, nutritional supplement or foodstuff. In certain embodiments of any of the foregoing methods, the composition comprises a pharmaceutical composition.

In certain embodiments of any of the foregoing methods, the viable microbes are plant-derived or food-derived. In certain embodiments, improving immune health comprises reducing inflammation in the human subject.

In certain aspects, described herein are methods of inhibiting inflammation in a human subject, the method comprising: administering to a human subject an effective amount of a composition comprising:
  (i) a first microbial entity comprising a first bacterial species comprising a 16S rDNA sequence that is at least 97% identical to a 16S rDNA sequence set forth in SEQ ID NO: 43;
  (ii) a second microbial entity comprising a second bacterial species comprising a 16S rDNA sequence that is at least 97% identical to an 16S rDNA sequence set forth in SEQ ID NO:224;
  (iii) a third microbial entity comprising a third bacterial species comprising a 16S rDNA sequence that is at least 97% identical to an 16S rDNA sequence set forth in SEQ ID NO: 221; and
  (iv) a fourth microbial entity comprising a fourth bacterial species comprising a 16S rDNA sequence that is at least 97% identical to an 16S rDNA sequence set forth in SEQ ID NO:198; wherein the human subject has lower circulating levels of at least one anti-inflammatory marker and/or higher circulating levels of at least one inflammation-associated marker.

In certain embodiments of any of the foregoing methods, the methods result higher circulating levels of at least one anti-inflammatory marker and/or lower circulating levels of at least one inflammation-associated marker in the human subject.

In certain embodiments of any of the foregoing methods, the composition is capable of producing neurotransmitters selected from the group consisting of serotonin, gamma-aminobutyric acid (GABA), dopamine, acetylcholine and combinations thereof. In certain embodiments, the composition is capable of modulating IFNγ, IL-12, TNF-α, IL-17, IL-6, IL-1β, IL-10 or combinations thereof in the human subject. In certain embodiments, at least one microbial entity comprises a first genome; wherein the first genome comprises at least one functional expression sequence at least about 30% identical to a functional expression sequence selected from Table 5 or Table 6. In certain embodiments, at least one microbial entity is capable of producing an enzyme having an amino acid sequence at least 60% identical to an enzyme selected from Table 5 or an enzyme capable of acting on the same substrate as an enzyme having an amino acid sequence at least 60% identical to an enzyme selected from Table 5 or Table 6. In certain embodiments, at least one microbial entity comprises a genus of bacteria with a metabolic signature or functionality selected from Table 5 or Table 7.

In certain embodiments of any of the foregoing methods, at least one microbial entity comprises one or more features selected from the group consisting of:
  (i) capable of engrafting when administered to a subject,
  (ii) capable of having anti-inflammatory activity,
  (iii) not capable of inducing pro-inflammatory activity,
  (iv) capable of producing a secondary bile acid,
  (v) capable of producing a tryptophan metabolite,
  (vi) capable of restoring epithelial integrity as determined by a primary epithelial cell monolayer barrier integrity assay, (vii) capable of being associated with remission of an inflammatory bowel disease,
(viii) capable of producing a short-chain fatty acid,
(ix) capable of inhibiting a histone deacetylase (HDAC) activity,
(x) capable of producing a medium-chain fatty acid,
(xi) capable of expressing catalase activity,
(xii) capable of having alpha-fucosidase activity,
(xiii) capable of inducing Wnt activation,
(xiv) capable of producing a B vitamin,
(xv) capable of modulating host metabolism of endocannabinoid,
(xvi) capable of producing a polyamine and/or modulating a host metabolism of a polyamine,
(xvii) capable of reducing fecal levels of a sphingolipid,
(xviii) capable of modulating host production of kynurenine and/or capable of producing kynurenine,
(xix) capable of reducing fecal calprotectin level,
(xx) not capable of activating a pattern recognition receptor (PRR) pathway, and optionally, a toll-like receptor (TLR) pathway, a NACHT, LRR, and PYD domains-containing protein 3 (NLRP3) inflammasome pathway, or a C-type lectin receptor pathway and combinations thereof;
(xxi) capable of activating a PRR pathway, and optionally a TLR pathway, a NLRP3 pathway a C-type lectin receptor pathway, and combinations thereof;
(xxii) not capable of producing ursodeoxycholic acid,
(xxiii) capable of not being associated with clinical non-remission of an inflammatory bowel disease,
(xxiv) capable of inhibiting apoptosis of intestinal epithelial cells,
(xxv) capable of inducing an increased anti-inflammatory Interleukin (IL)-10/IL-6 cytokine ratio in macrophages,
(xxvi) capable of not inducing pro-inflammatory IL-6, Tumor Necrosis Factor Alpha (TNFα), IL-1β, IL-23 or IL-12 production or gene expression in macrophages,
(xxvii) capable of downmodulating one or more genes induced in Interferon gamma (IFN-γ) treated colonic organoids,
(xxix) capable of producing IL-18,
(xxx) capable of inducing the activation of antigen presenting cells,
(xxxi) capable of reducing the expression of one or more inhibitory receptors on T cells,
(xxxii) capable of increasing expression of one or more genes/proteins associated with T cell activation and/or function,
(xxxiii) capable of enhancing the ability of CD8+ T cells to kill tumor cells,
(xxxiv) capable of enhancing the efficacy of an immune checkpoint inhibitor therapy,
(xxxv) capable of reducing colonic inflammation,
(xxxvi) capable of promoting the recruitment of CD8+ T cells to tumors, and combinations thereof
(xxxvii) capable of producing antioxidants, and optionally, flavonoids, terpenoids, ascorbate and combinations thereof.

In certain embodiments, the not activating a toll-like receptor pathway comprises no activation of TLR4 or TLR5, and/or wherein the activating a toll-like receptor pathway comprises activation of TLR2. In certain embodiments, the one or more genes induced in IFN-γ treated colonic organoids, is selected from the group consisting of genes associated with inflammatory chemokine signaling, Nuclear Factor Kappa B (NF-κB) signaling, TNF family signaling, type I interferon signaling, type II interferon signaling, TLR signaling, lymphocyte trafficking, Th17 cell differentiation, Th1 differentiation, Th2 differentiation, apoptosis, inflammasomes, autophagy, oxidative stress, major histocompatibility (MHC) class I and II antigen presentation, complement, mTor, nod-like receptor signaling, Phosphatidylinositol-4,5-Bisphosphate 3-Kinase (PI3K) signaling, and combinations thereof. In certain embodiments, the one or more inhibitory receptors on T cells is selected from the group consisting of T Cell Immunoreceptor With Ig And ITIM Domains (TIGIT), T-Cell Immunoglobulin Mucin Family Member 3 (TIM-3), Lymphocyte Activating 3 (LAG-3), and combinations thereof. In certain embodiments, the one or more genes or proteins associated with T cell activation and/or function is selected from the group consisting of CD45RO, CD69, IL-24, TNF-α, perforin, IFN-γ, and combinations thereof. In certain embodiments, at least one microbial entity is capable of producing (a) one or more indole-containing compounds, optionally wherein the indole-containing compound is selected from the group consisting of indole, indole acetic acid (IAA), and indole propionic acid (IPA) and/or (b) bacteriocins and/or antibacterial peptides and/or (c) a biosurfactant that reduces pro-inflammatory cytokines. In certain embodiments, at least one microbial entity metabolizes human produced primary bile acids into secondary bile acids, optionally wherein the primary bile acid is cholic acid, chenodeoxycholic acid, or combinations thereof, and optionally wherein the secondary bile acid inhibits FXR and/or activates TGR5. In certain embodiments, at least one microbial entity produces more omega-3 fatty acids compared to omega-6 fatty acids. In certain embodiments, at least one microbial entity comprises one or more bacteria that are capable of producing a metabolite selected from Table 5 or Table 7. In certain embodiments, the composition further comprises a metabolite selected from Table 5 or Table 7. In certain embodiments, the composition further comprises a prebiotic fiber. In certain embodiments, the inhibition of inflammation in the subject is caused by the production at least one anti-inflammatory metabolite by at least one microbial entity. In certain embodiments, the method reduces the level and/or activity of at least one inflammatory cytokine from Table 8 relative to a level and/or activity of the inflammatory cytokine in the serum of the human subject; or a tissue of the subject, prior to administering the pharmaceutical composition, medical food, or food stuff. In certain embodiments, method comprises treating, preventing, reducing the severity, and/or enabling dietary management of at least one symptom of an immune system disorder. In certain embodiments, the immune system disorder is selected from the group consisting of allergic rhinitis, allergic conjunctivitis, allergic bronchial asthma, atopic eczema, anaphylaxis, insect sting, drug allergy, food allergy, asthma, eczema, a disorder or condition associated with a pathological Th17 activity, and a rheumatic disease selected from spondyloarthritis, psoriasis and rheumatoid arthritis.

In certain embodiments, the methods described herein further comprise administering an effective amount of at least one immunosuppressive agent to the subject. In certain embodiments, at least one immunosuppressive agent is administered before, simultaneously with, or after the administration of the effective amount of the pharmaceutical composition, medical food, dietary supplement or solid food stuff described herein.

In certain embodiments, the methods described herein further comprise administering one or more additional agents for the treatment, prevention or management of one or more symptoms of rheumatic disease. In certain embodiments, the one or more additional agents for the treatment, prevention or management of one or more symptoms of rheumatic disease comprises methotrexate.

In certain embodiments, the methods described herein further comprise administering one or more additional agents for the treatment, prevention or management of one or more symptoms of periodontal disease.

In certain embodiments, the methods described herein further comprise administering one or more additional agents for the treatment, prevention or management of one or more symptoms of gastritis.

In certain embodiments, the methods described herein further comprise administering one or more additional agents for the treatment, prevention or management of one or more symptoms of osteoarthritis.

In certain embodiments, the methods described herein further comprise administering one or more additional agents for the treatment, prevention or management of one or more symptoms of aging-associated inflammation.

BRIEF DESCRIPTION OF THE SEVERAL VIEWS OF THE DRAWINGS

These and other features, aspects, and advantages of the present invention will become better understood with regard to the following description, and accompanying drawings, where:

FIG. 5A is a diagram of the metabolic pathways of secondary acids, specifically the deconjugation of Tauro-Cholic Acid (CA)/Glyco-CA and subsequent conversion to 12-dehydro-CA, UCA, and Iso-CA.

FIG. 5B is a diagram of the metabolic pathways of secondary acids, specifically the deconjugation of Tauro-Chenodeoxycholic acid (CDCA)/Glyco-CDCA and subsequent conversion to Ursodeoxycholic acid (UDCA).

FIG. 6 is a table listing the enzymes involved in the biosynthesis of EPS.

FIG. 7 is a table listing the essential genes in the *Lactobacillus* EPS gene clusters and families.

FIG. 29 is a diagram depicting the experimental design for a mouse collagen-induced arthritis (CIA) model of rheumatoid arthritis for testing DMAs effects on disease progression and immune system activity. Exemplary images of healthy and arthritic paws are shown (bottom).

FIG. 32A-D are graphs depicting results of effects of DMA administration in combination with methotrexate on paw swelling and clinical scores in a collagen induced arthritis mouse model, using the experimental design described in FIG. 31. FIG. 32A and FIG. 32C depict arthritis clinical score in mice administered the indicated DMA with or without methotrexate (MTX). FIG. 32B and FIG. 32D depict limb thickness in mice administered the indicated DMA with or without methotrexate (MTX).

FIG. 33A depicts acetate production (µM) of individual strains and DMA swaps. Error bars indicate SD (n=3). FIG. 33B depicts serotonin production by DMAs. FIG. 33C depicts IL-8 secretion of HT-29 epithelial cells stimulated with individual isolates or DMA swaps. Note the high levels of IL-8 elicited from the *B. velezensis* isolates, which is not recapitulated in the DMAs, despite containing this species. Data are represented as percent IL-8 secretion relative to an LPS agonist control. Error bars represent SEM (n=3-13). Significance was determined via One-way ANOVA. Outliers determined through ROUT method using Q=1%.

DETAILED DESCRIPTION

Definitions

Figure 1:
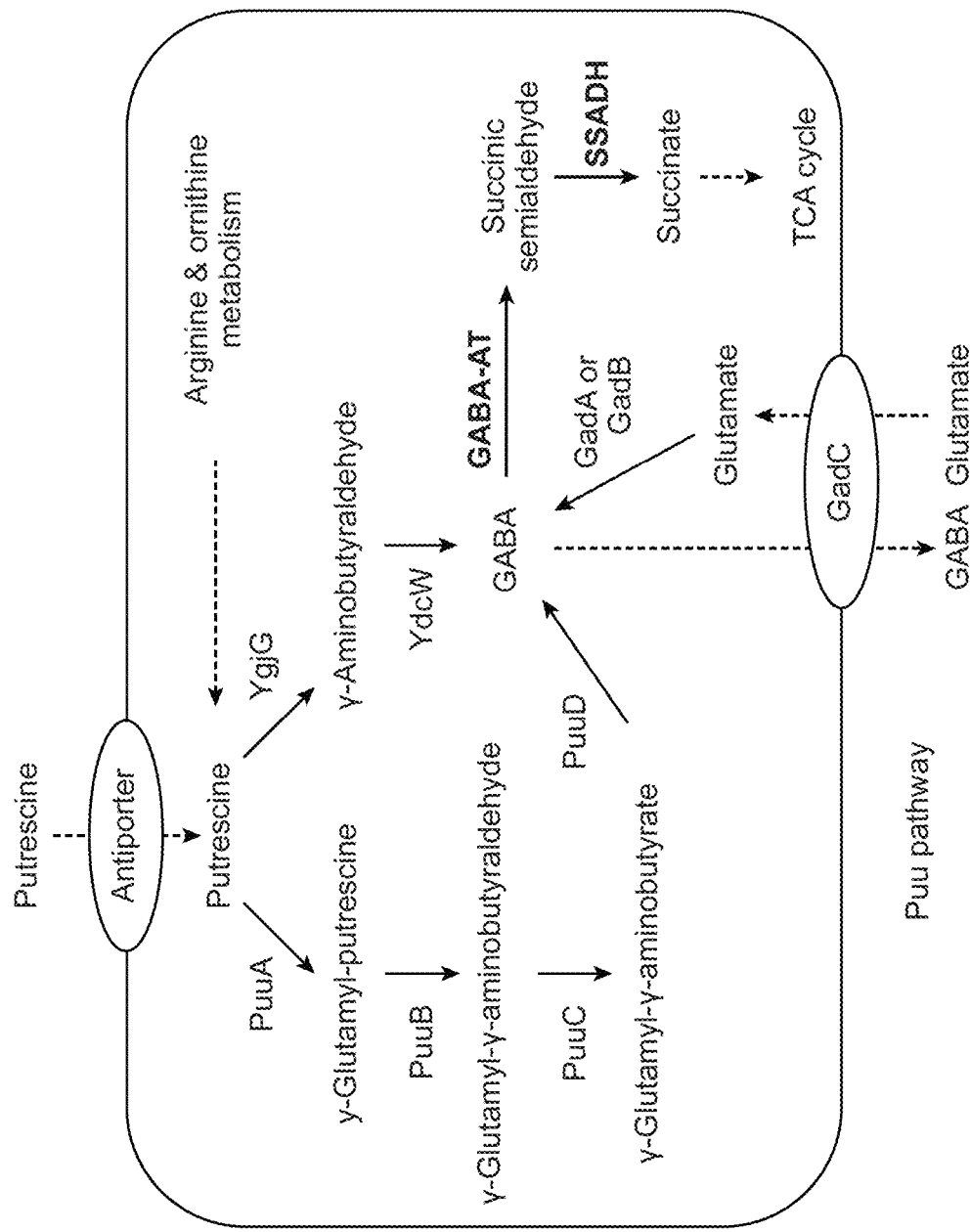
FIG. 1 is a diagram of the metabolic pathways involving Gamma aminobutyric acid (GABA).
Figure 2:
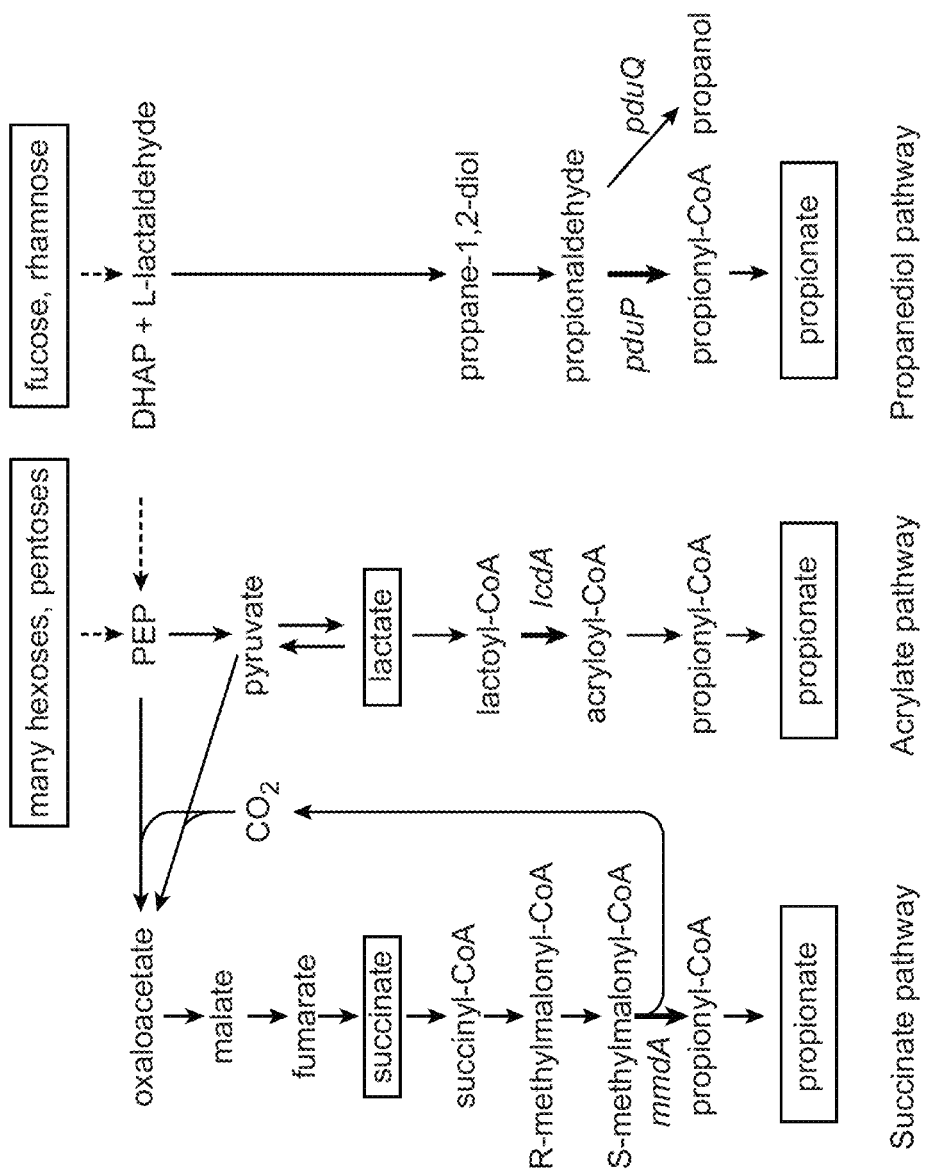
FIG. 2 is a diagram of the metabolic pathways of succinate, acrylate and propanediol.
Figure 3:
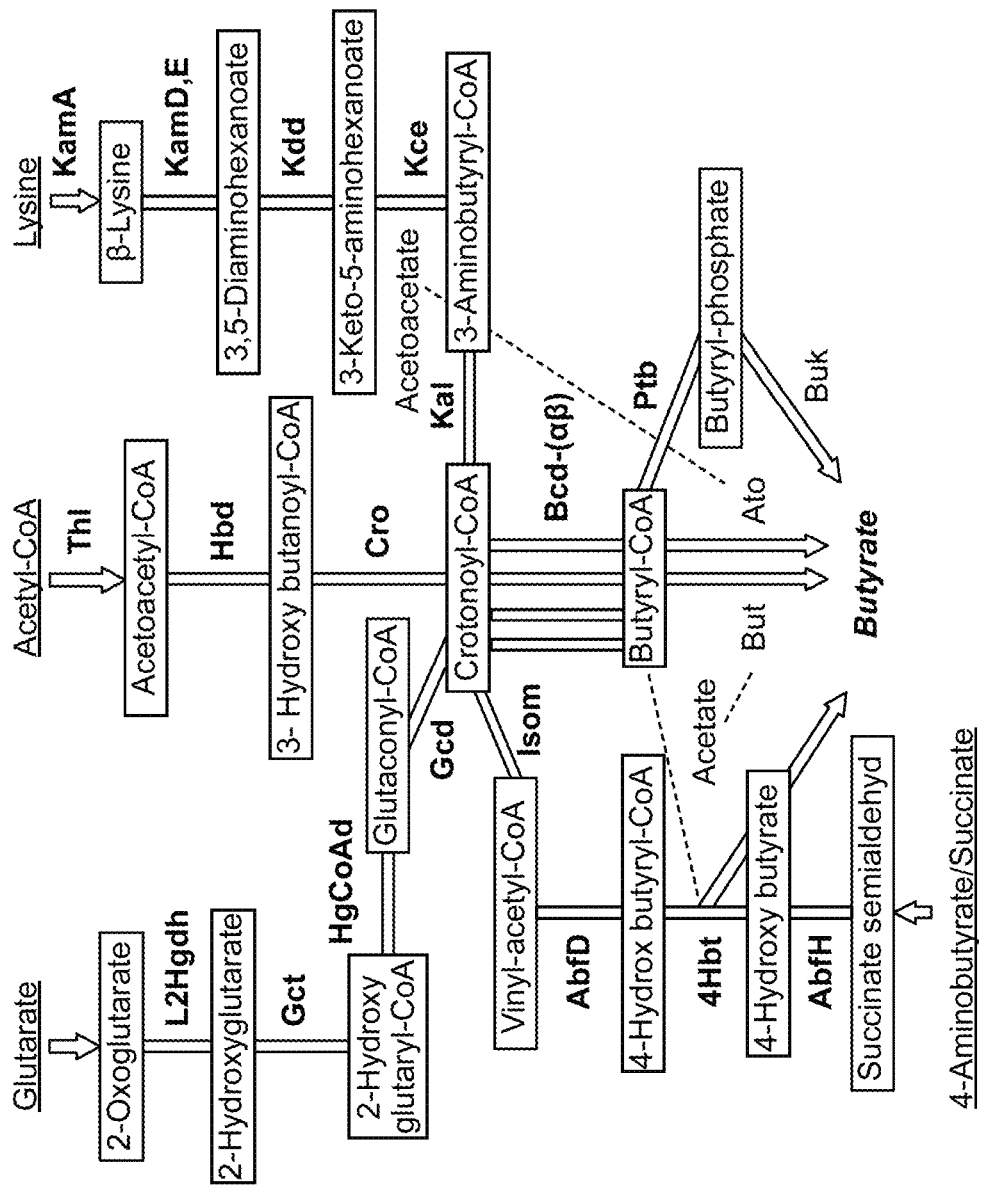
FIG. 3 is a diagram of the metabolic pathways of Butyrate.
Figure 4:
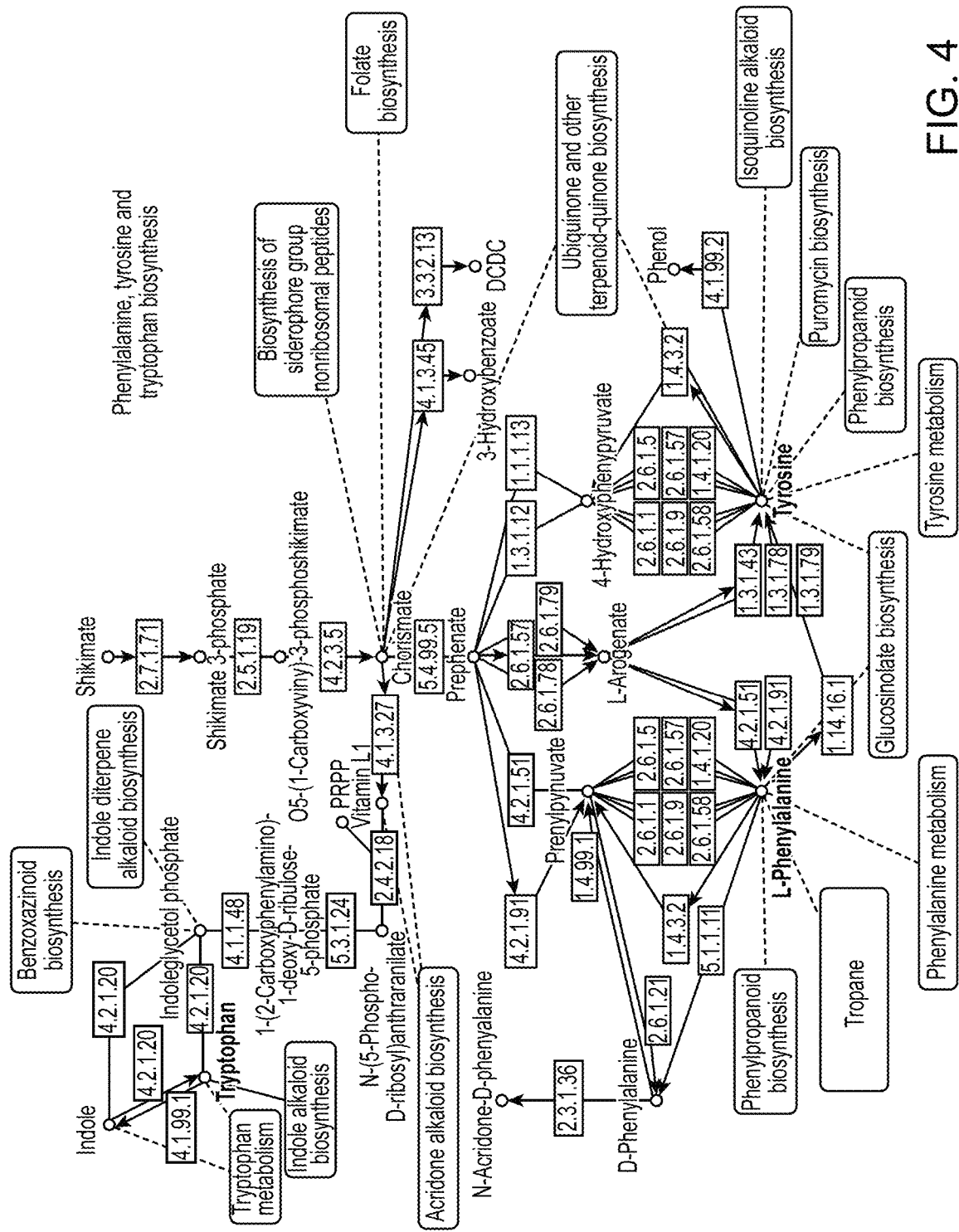
FIG. 4 is a diagram of the metabolic pathways of phenylalanine, tyrosine and tryptophan biosynthesis.
Figure 5C:
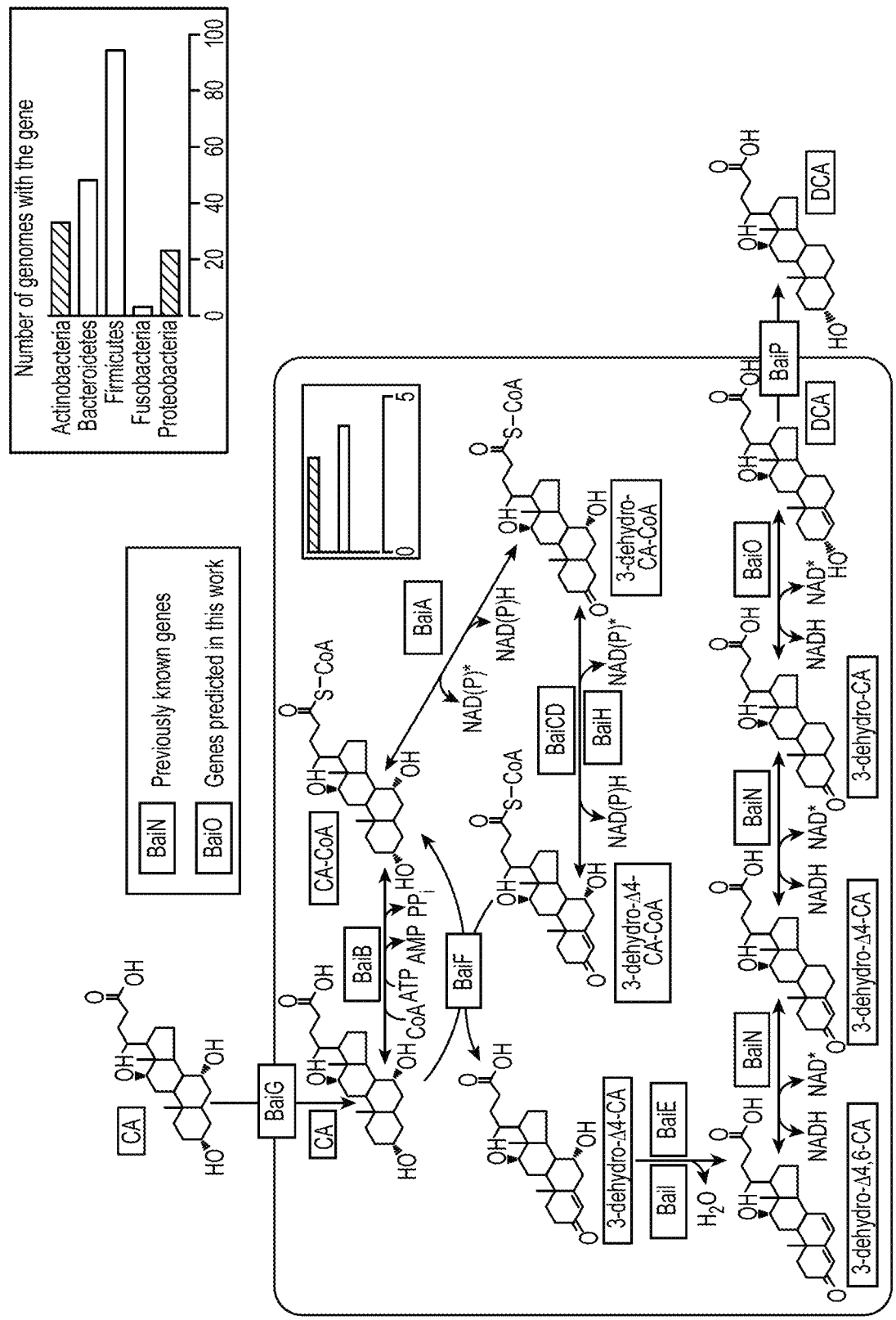
FIG. 5C is a diagram of the metabolic pathways of secondary acids, specifically the conversion of CA to Deoxycholic acid (DCA) via the bai pathway.
Figure 5D:
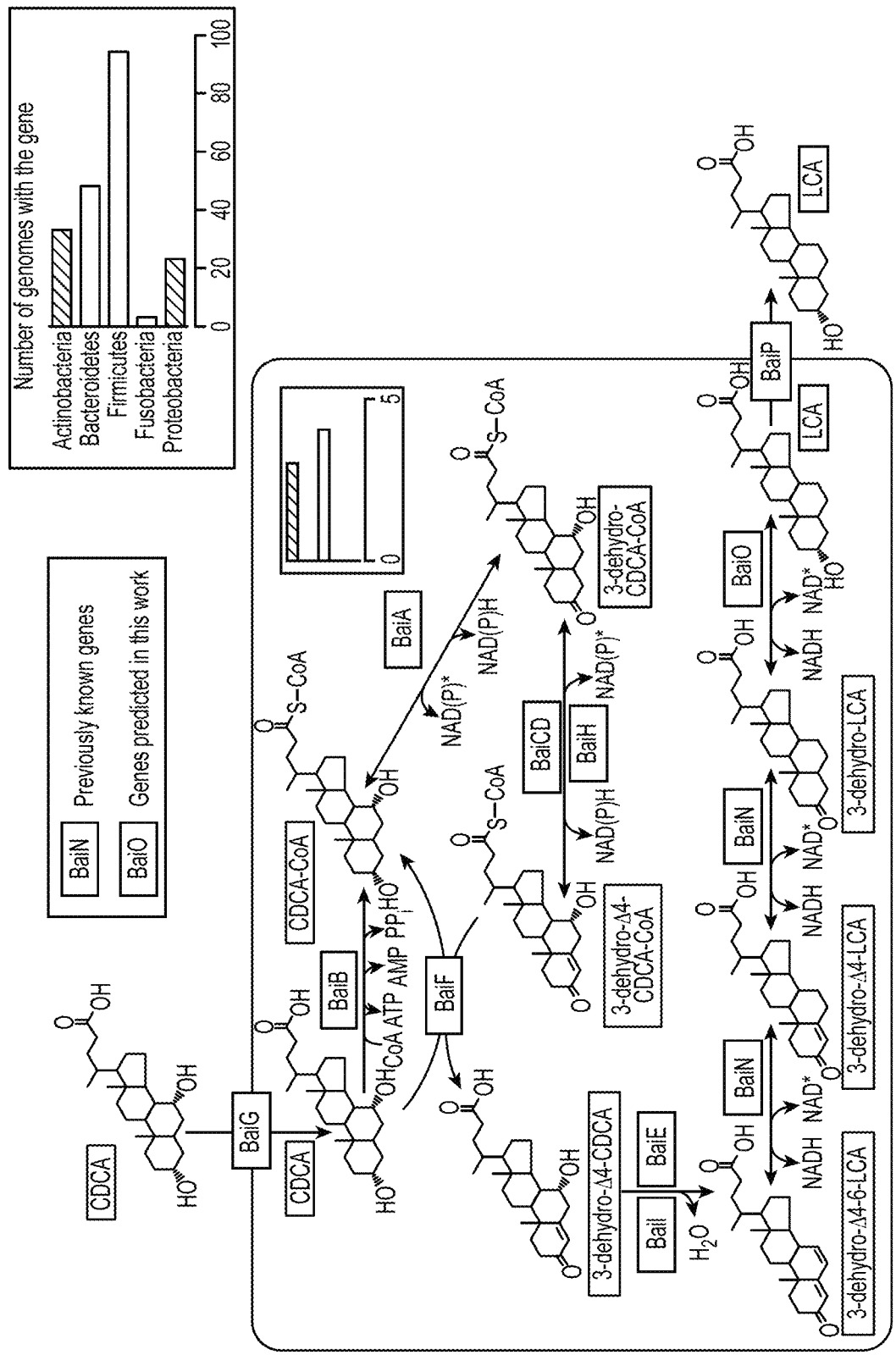
FIG. 5D is a diagram of the metabolic pathways of secondary acids, specifically the conversion of CDCA to Lithocholic acid (LCA) via the bai pathway.
Figure 5E:
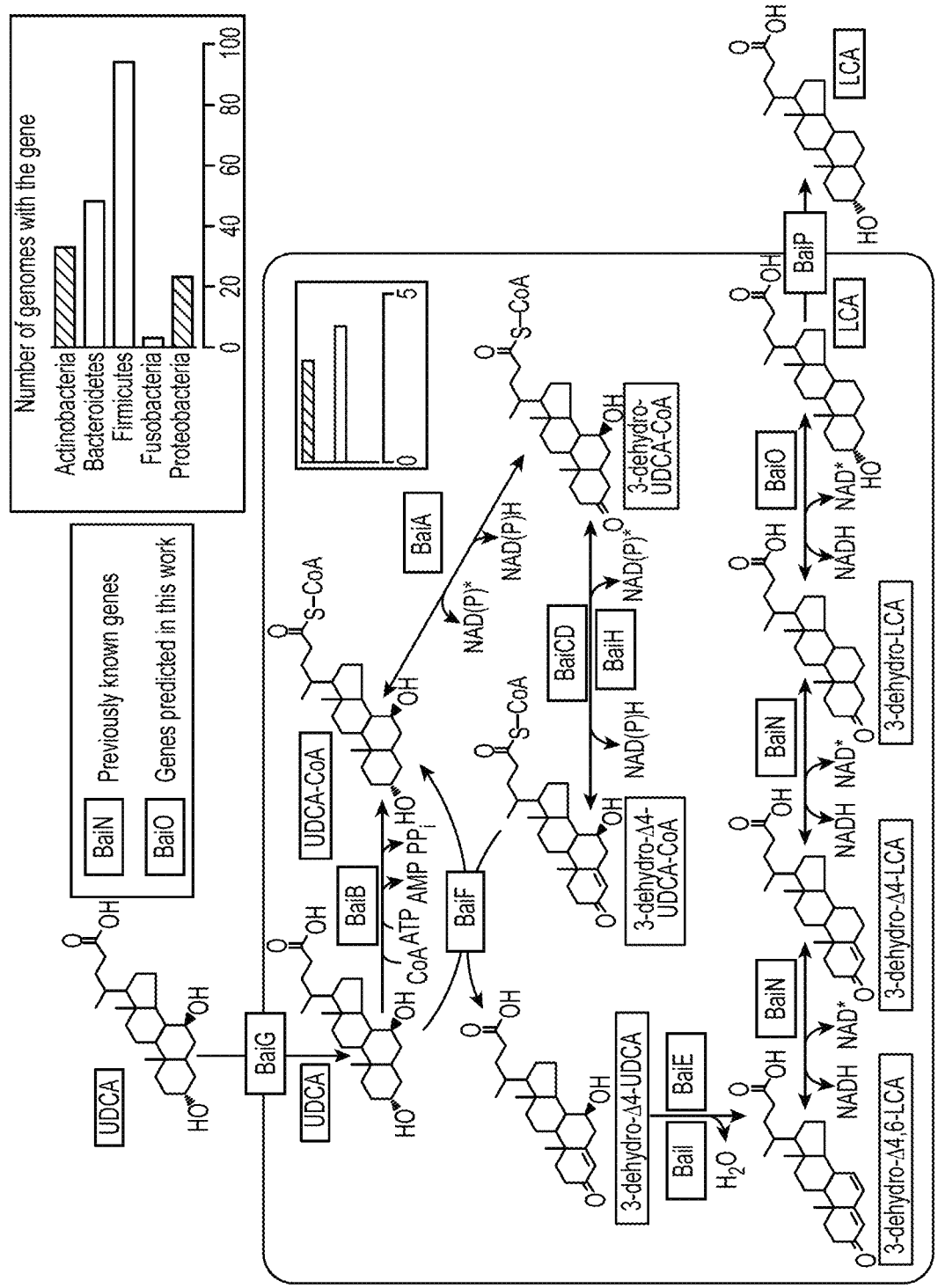
FIG. 5E is a diagram of the metabolic pathways of secondary acids, specifically the conversion of UDCA to Lithocholic acid (LCA) via the bai pathway.
Figure 8:
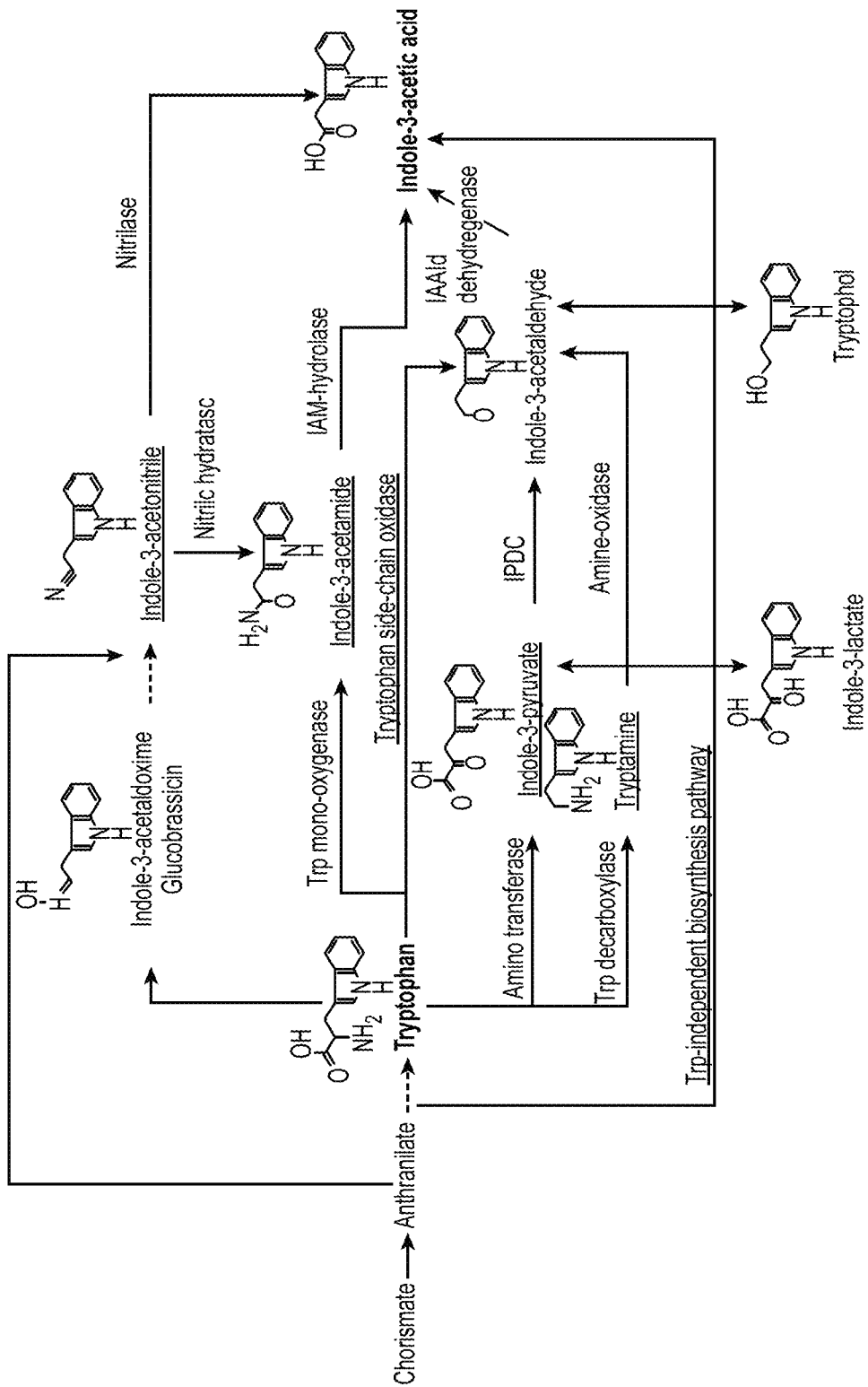
FIG. 8 is a diagram of the metabolic pathways of tryptophan and indole 3 acetic acid.
Figure 9:
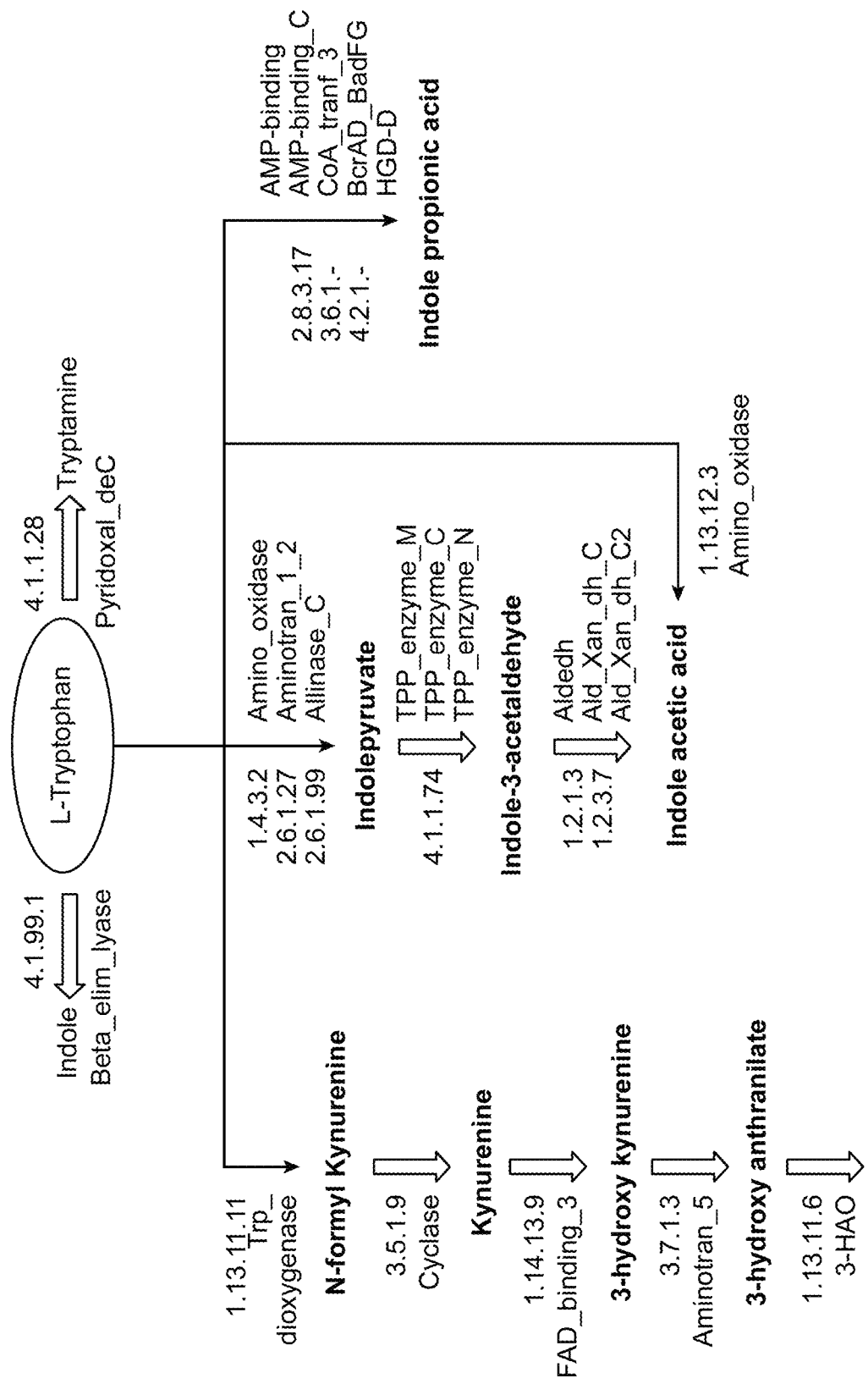
FIG. 9 is a diagram of the metabolic pathways of tryptophan and indole 3 acetic acid.
Figure 10:
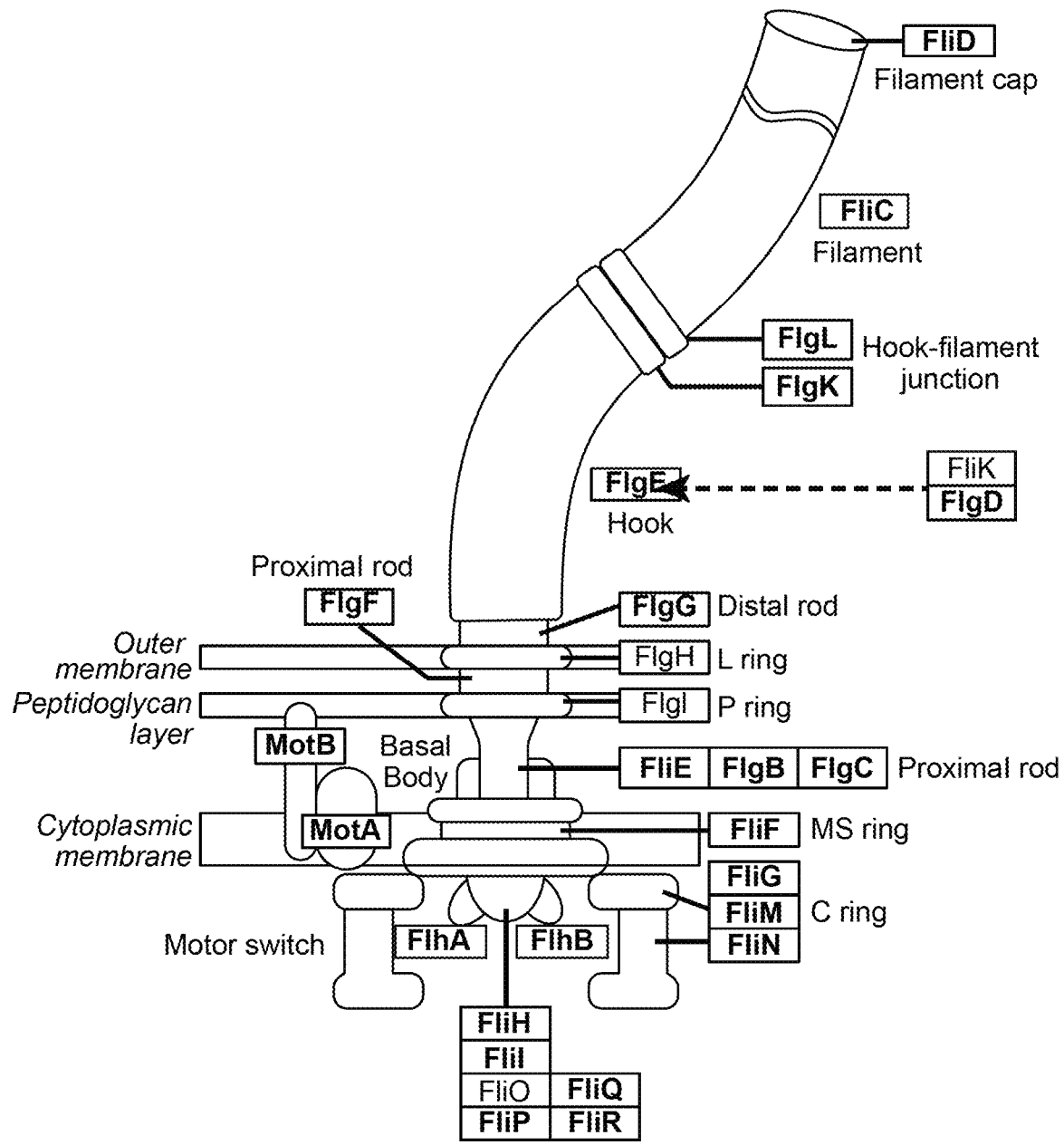
FIG. 10 is a diagram of the genes and proteins that comprise the flagellum.
Figure 11:
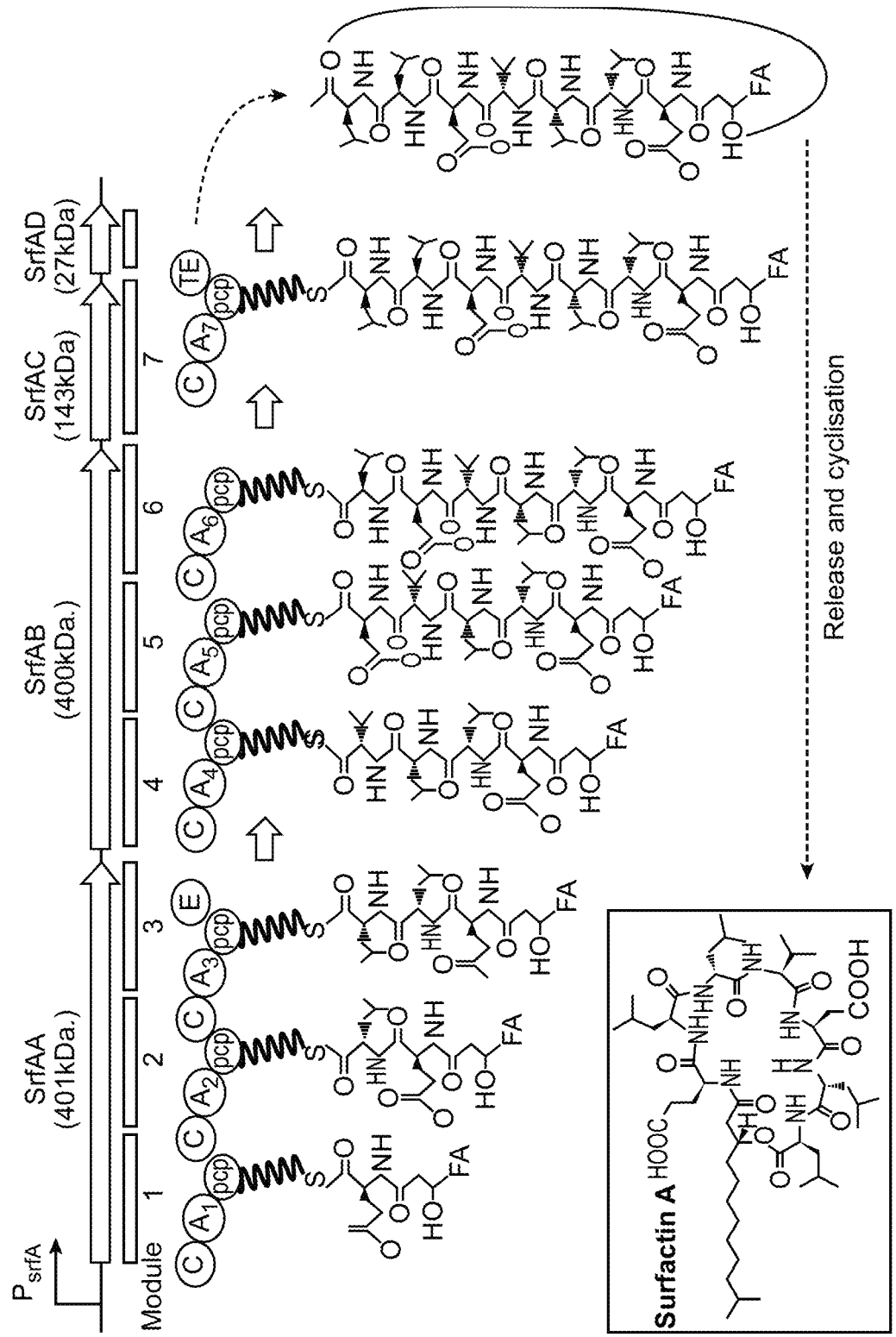
FIG. 11 is a diagram of the genes and chemical structure of Surfactin A (SEQ ID NOS 904-907 and 910, respectively, in order of appearance).
Figure 12:
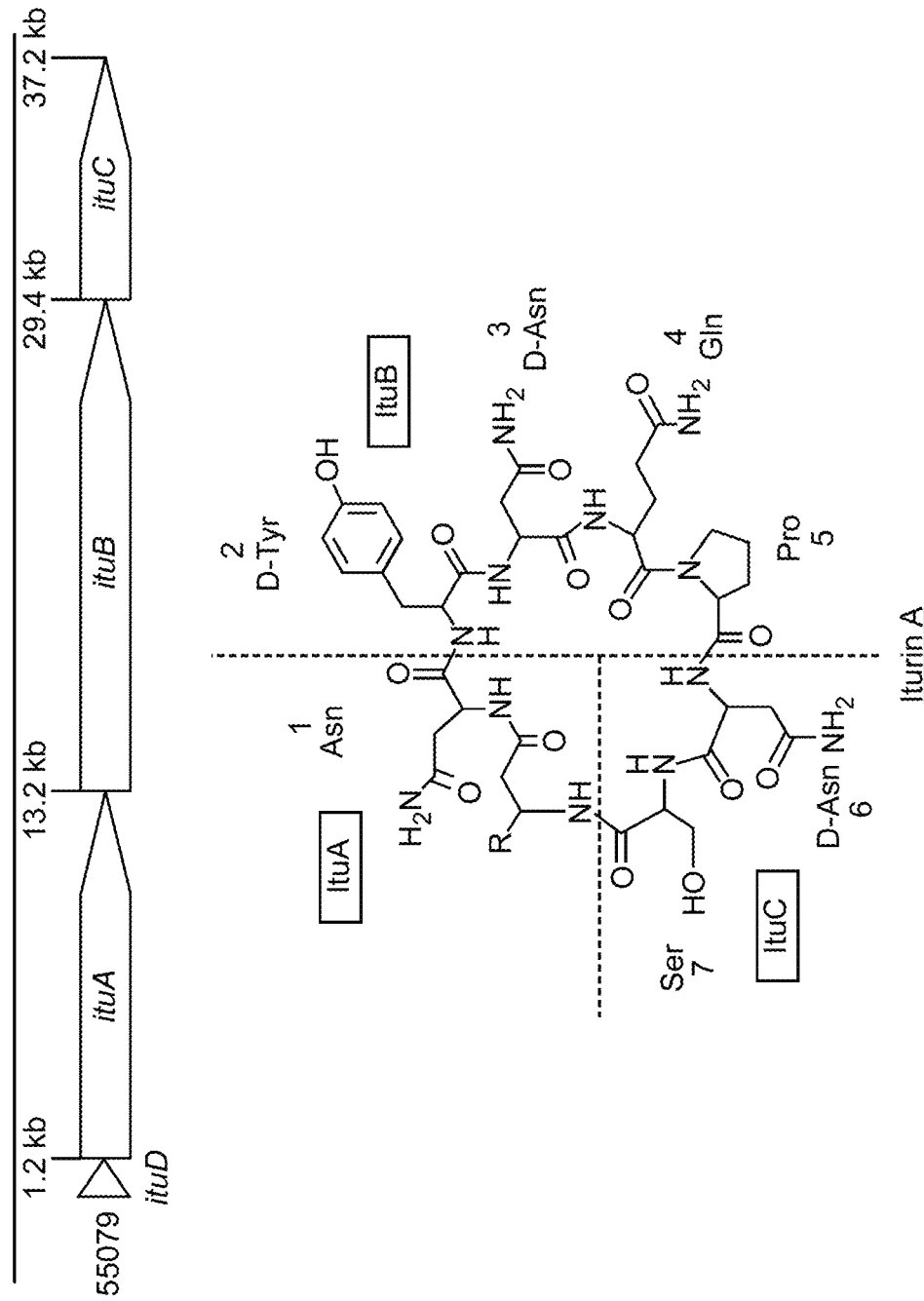
FIG. 12 (top) is a diagram of the organization and positions of the homologous gene clusters in *B. subtilis* RB14. The iturin operon was reported to be more than 38 kb long and composed of four open reading frames, ituD, ituA, ituB, and ituC. A diagram of the chemical structure of Iturin surfactant is also shown (bottom) (SEQ ID NO: 908).
Figure 13:
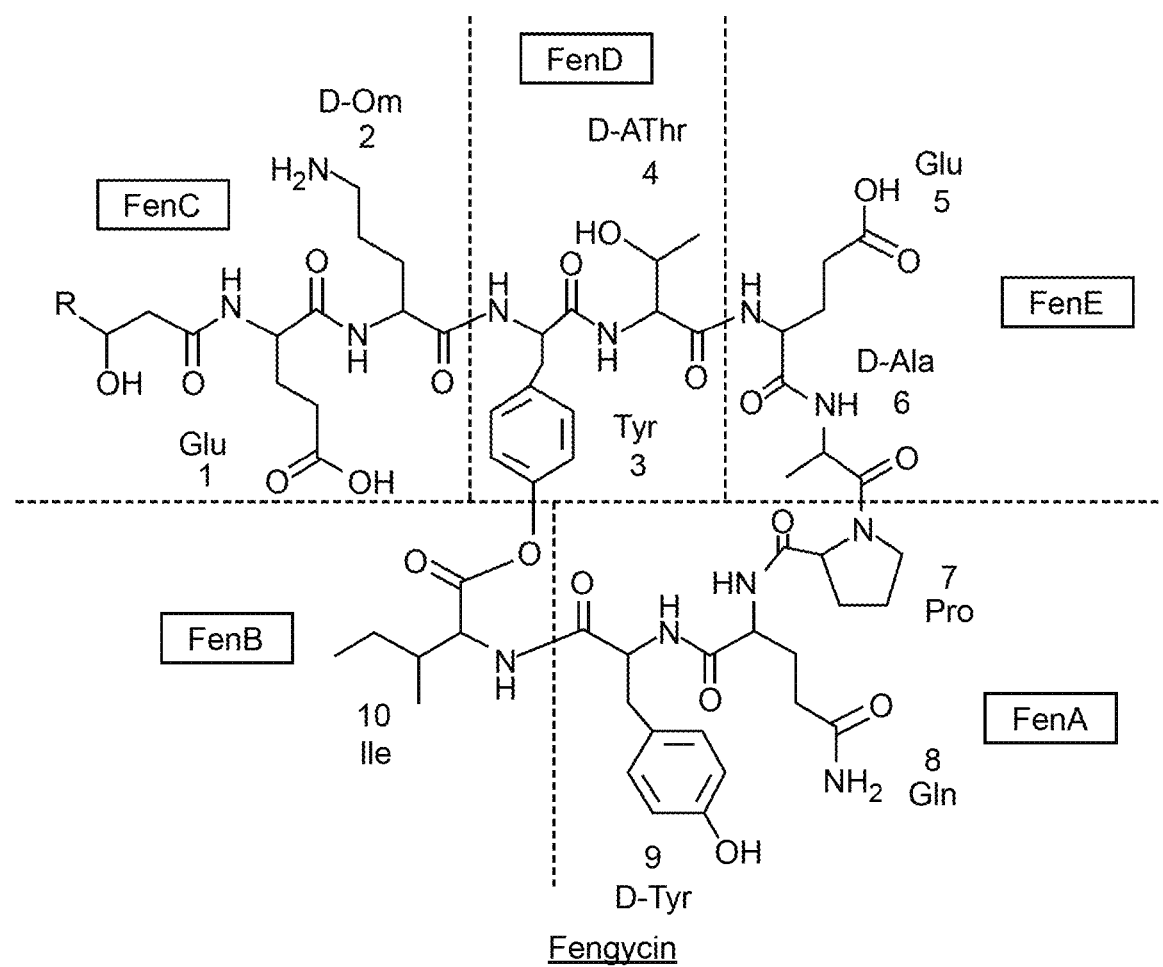
FIG. 13 is a diagram of the chemical structure of fengycin surfactant (SEQ ID NO: 909). This peptide is synthesized nonribosomally by five fengycin synthetases, which interlock in the order of FenC-FenD-FenE-FenA-FenB to form a complex.
Figure 14:
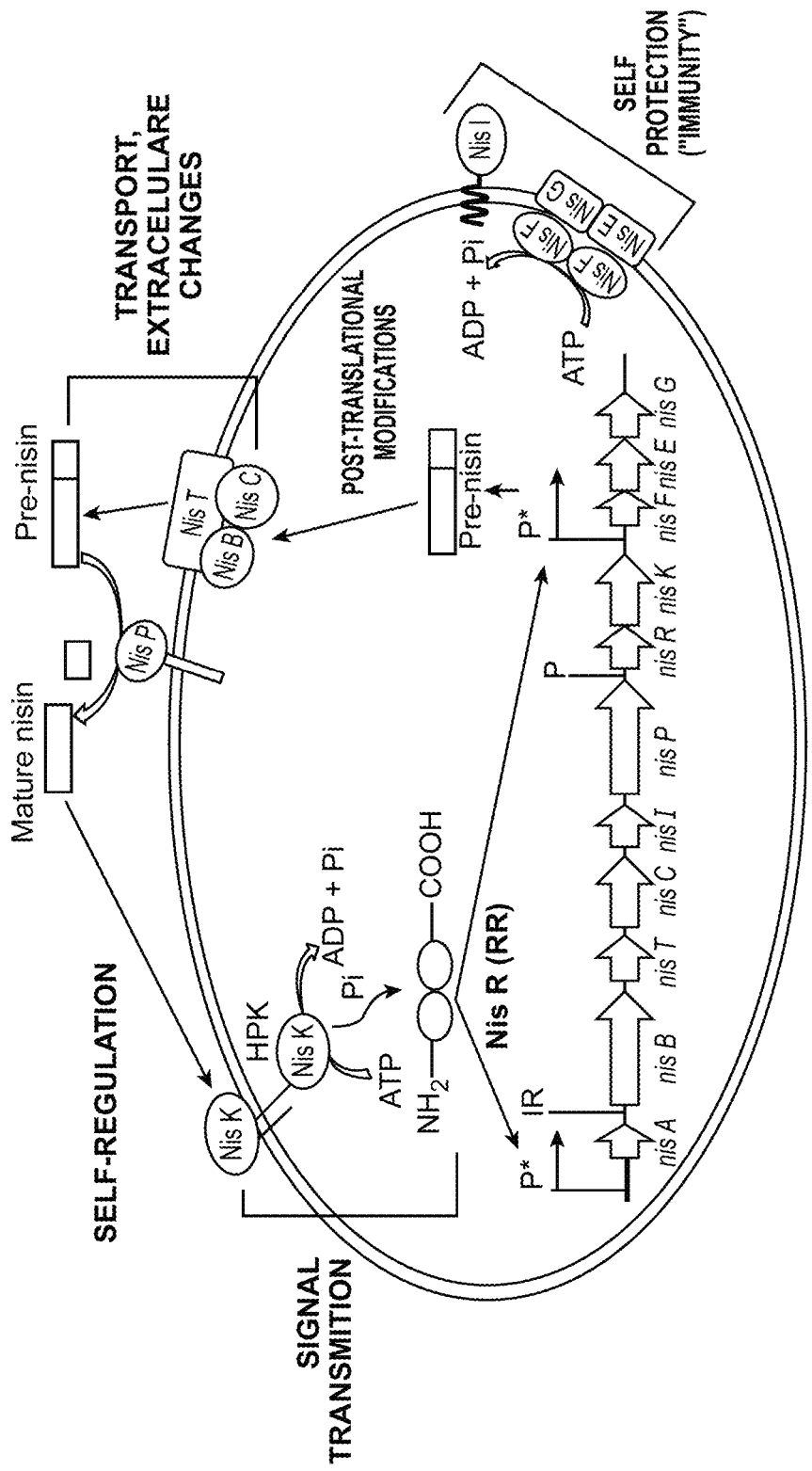
FIG. 14 is a diagram of the cellular regulation of Nisin surfactant.
Figure 15:
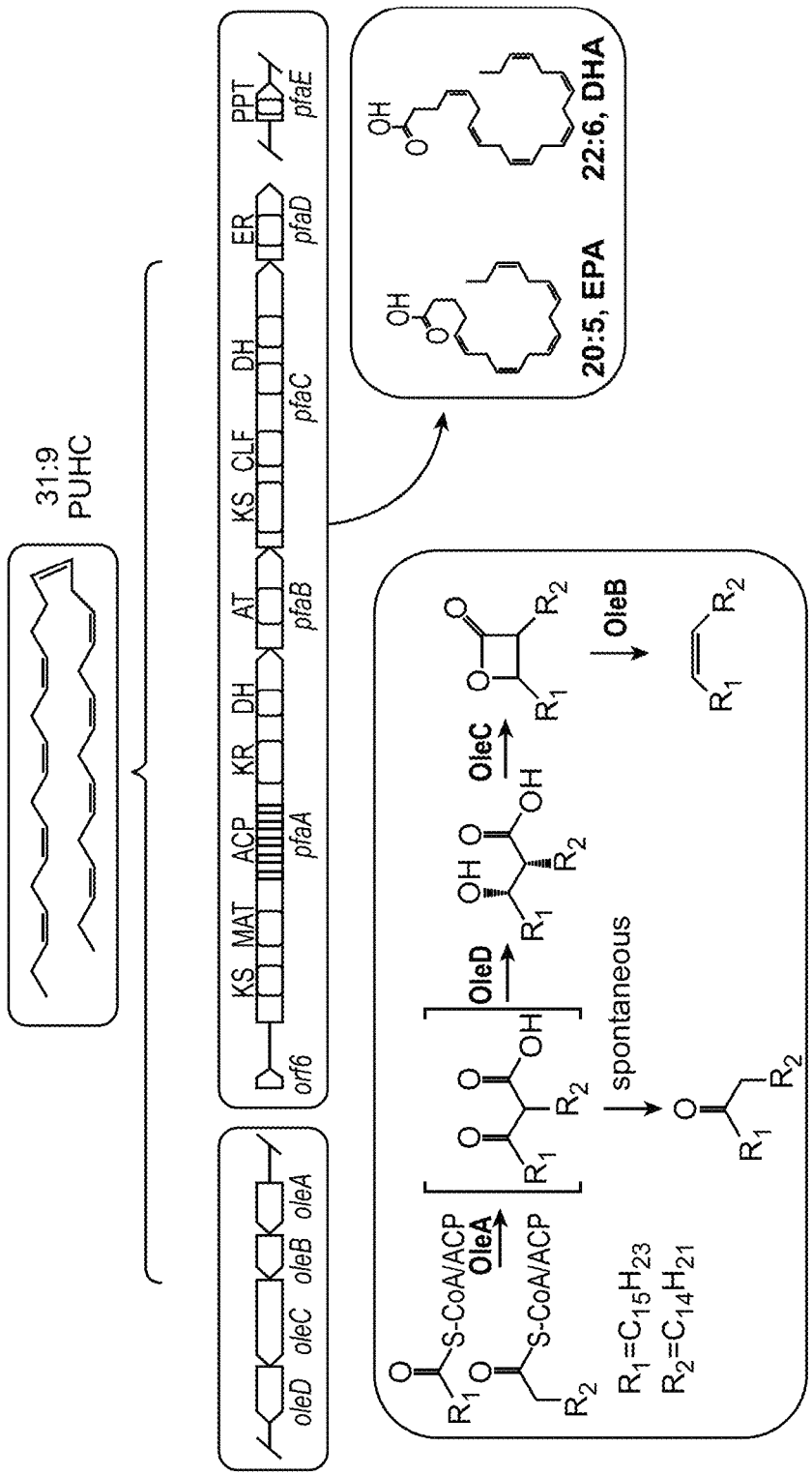
FIG. 15 is a diagram of the biosynthetic pathways of omega-3 polyunsaturated fatty acids, PUFA and PUHC. Domain designations within the Pfa synthase are; phosphopantetheinyl transferase (PPT), β-ketoacyl synthase (KS), malonyl-CoA:ACP transacylase (MAT), acyl-carrier protein (ACP), ketoacyl reductase (KR), dehydratase/isomerase (DH), acyltransferase (AT), chain-length factor (CLF), and enoyl reductase (ER). The Pfa synthase multienzyme complex.
Figure 16:
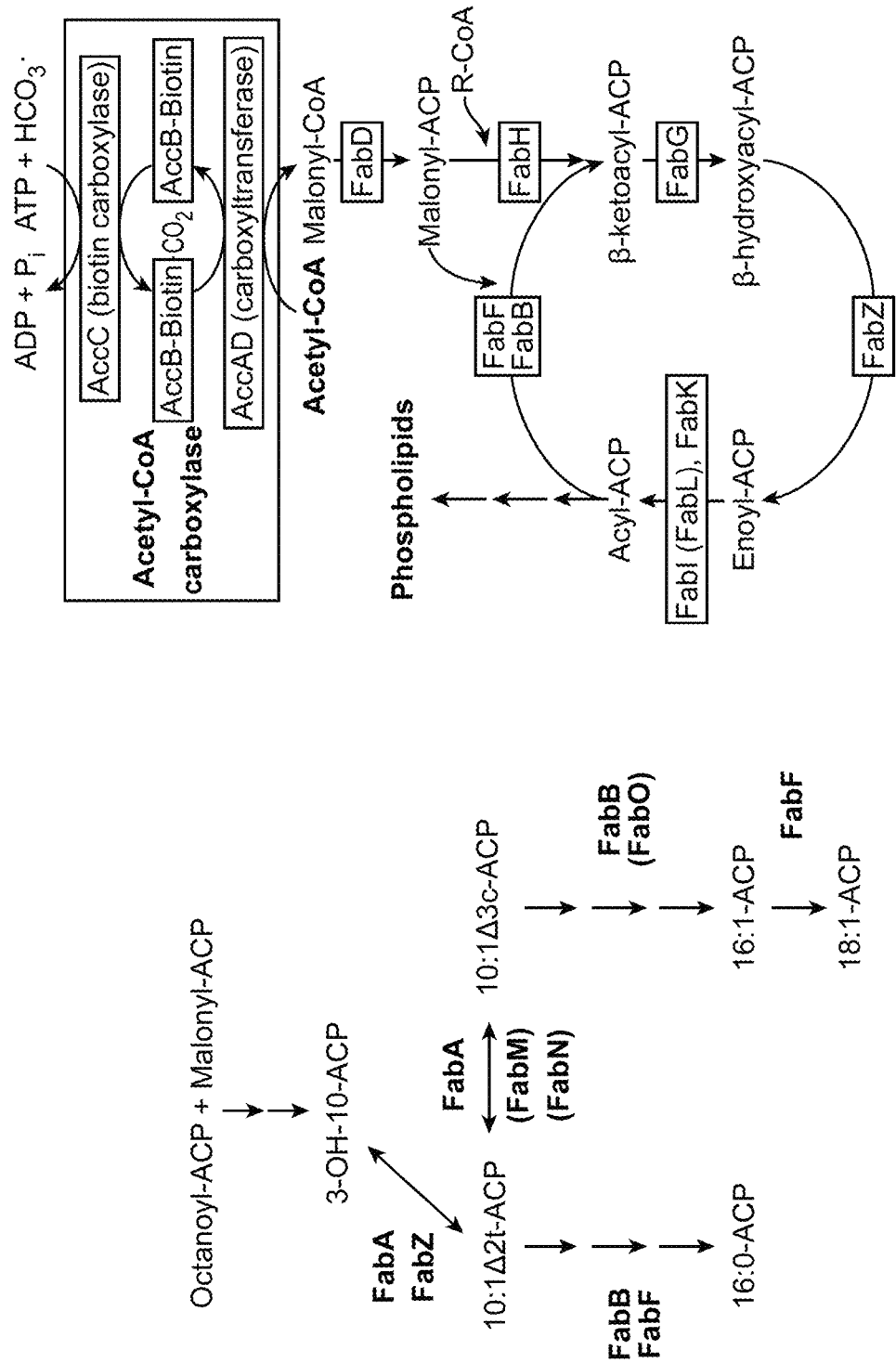
FIG. 16 are diagrams of biosynthetic pathways of type II fatty acids.

Terms used in the claims and specification are defined as set forth below unless otherwise specified.

As used herein, the term "derived from" includes microbes immediately taken from an environmental sample as well as microbes isolated from an environmental source and subsequently grown in pure culture. The term "derived from" also includes material isolated from the recited source, and materials obtained using the isolated materials (e.g., cultures of microorganisms made from microorganisms isolated from the recited source).

As used herein, the term "preventing" includes completely or substantially reducing the likelihood or occurrence or the severity of initial clinical or aesthetical symptoms of a condition.

As used herein, the term "about" includes variation of up to approximately +/−10% and that allows for functional equivalence in the product.

As used herein, the term "colony-forming unit" or "cfu" is an individual cell that is able to clone itself into an entire colony of identical cells.

As used herein all percentages are weight percent unless otherwise indicated.

As used herein, "viable organisms" are organisms that are capable of growth and multiplication. In some embodiments, viability can be assessed by numbers of colony-forming units that can be cultured. In some embodiments viability can be assessed by other means, such as quantitative polymerase chain reaction.

"Microbiome" refers to the genetic content of the communities of microbes that live inside and on the human body, or inside or outside a plant, both sustainably and transiently, including eukaryotes, archaea, bacteria, and viruses (including bacterial viruses (i.e., phage)), wherein "genetic content" includes genomic DNA, RNA such as ribosomal RNA, the epigenome, plasmids, and all other types of genetic information.

The term "microbial entity" as used herein, refers to the community of microorganisms that occur (sustainably or transiently) in and on a plant or an animal subject, typically a mammal such as a human, including eukaryotes, archaea, bacteria, and viruses (including bacterial viruses i.e., phage).

The term "metabolic signature" as used herein, refers to the ability of an organism to produce or utilize one or more metabolites.

The term "functional expression sequence" as used herein, refers to any polynucleotide (RNA or DNA) or amino acid sequence resulting in a functional polynucleotide (e.g., mRNA, tRNA rRNA) or protein, including fragments of protein that form functional binding domains or domains with a discrete activity (e.g., enzymatic activity) within the cell.

A "combination" of two or more bacteria includes the physical co-existence of the two bacteria, either in the same material or product or in physically connected products, as well as the temporal co-administration or co-localization of the two bacteria.

As used herein "heterologous" designates organisms to be administered that are not naturally present in the same proportions as in the therapeutic composition as in subjects to be treated with the therapeutic composition. These can be organisms that are not normally present in individuals in need of the composition described herein, or organisms that are not present in sufficient proportion in said individuals. These organisms can comprise a synthetic composition of organisms derived from separate plant sources or can comprise a composition of organisms derived from the same plant source, or a combination thereof.

The term "pharmaceutically acceptable delivery vehicle" as used herein, refers to any compound or device that is formulated with the microbial entities into a pharmaceutical composition described herein to improve delivery of the pharmaceutical composition to the subject to which the composition has been administered. Pharmaceutically acceptable delivery vehicles include excipients, liposomes, nanoparticles, and nanovectors.

The term "medical food" as used herein, refers to a food which is formulated to be consumed or administered enterally with or without the supervision of a physician and which is intended for the dietary management of a disease, state, disorder, or condition, or one or more symptoms thereof. Medical foods can be in solid, liquid or gel form.

The term "dietary supplement", as used herein refers to a substance that is not a conventional food and that is manufactured to be administered to a subject over a period of time, wherein the substance is an addition to the subject's diet and is effective to produce a desired effect when administered to the subject over a period of time. In certain embodiments, the desired effect is treating, ameliorating, preventing, or managing one or more symptoms of a disease, disorder, state, or condition in the subject.

The term "foodstuff" as used herein, refers to a nutritional composition for oral administration that is in solid, liquid or gel form. A medical food can also be a foodstuff.

The term "utilizes a metabolite" as used herein, refers to capability of a microbial entity described herein to metabolize a metabolite into a different form, either by catabolism or anabolism.

The term "anti-inflammatory product" as used herein, refers to any substance that has an effect (either direct or indirect) on a subject in contact with the product that results in reduction of inflammation, or any detectable markers of inflammation known in the art.

The term "pro-inflammatory cytokines" as used herein, refers to small proteins that regulate the activity of blood cells such as immune system cells and are involved in the up-regulation of inflammatory reactions. Pro-inflammatory cytokines can be produced by activated macrophages or other immune cells, endothelial cells and epithelial cells.

The term "immune health" as used herein, refers to the functions and activity of the immune system and cells associated with the immune system of a healthy subject. As used herein, the term "improving immune health" refers to modulating the activity and/or function of the immune system so as to increase the immune system's ability to detect foreign antigens, pathogens, and/or abnormal cells (such as but not limited to cancer cells and infected cells), and/or refers to modulating the immune system's activity and/or function in a subject exhibiting abnormally increased immune system activity/immune response relative to healthy subjects, such as conditions or diseases related to increased inflammation (such as, but not limited to, Alzheimer's disease, cancer, asthma, heart disease, type II diabetes, rheumatoid arthritis) and/or conditions or diseases related to increased immune response (e.g., autoimmune disease).

The term "ameliorating" refers to any therapeutically beneficial result in the treatment of a disease state, e.g., an immune system disorder disease state, including prophylaxis, lessening in the severity or progression, remission, or cure thereof.

The term "in situ" refers to processes that occur in a living cell growing separate from a living organism, e.g., growing in tissue culture.

The term "in vivo" refers to processes that occur in a living organism.

The term "mammal" as used herein includes both humans and non-humans and include but is not limited to humans, non-human primates, canines, felines, murines, bovines, equines, and porcines.

The term "sufficient amount" means an amount sufficient to produce a desired effect, e.g., an amount sufficient to modulate inflammation.

The term "therapeutically effective amount" is an amount that is effective to ameliorate a symptom of a disease.

Abbreviations used in this application include the following: rDNA refers to ribosomal DNA, HDAC refers to histone deacetylase, IL-10 refers to Interleukin 10, IL-6 refers to Interleukin 6, TNFα, refers to Tumor Necrosis Factor Alpha, IFN-γ, refers to Interferon Gamma, and TLR refers to Toll Like Receptor.

It must be noted that, as used in the specification and the appended claims, the singular forms "a," "an" and "the" include plural referents unless the context clearly dictates otherwise.

This disclosure has several advantages, such as providing for new pharmaceutical compositions, dietary supplements, medical foods and solid food stuff, comprising new combinations of live microbe populations for the treatment, prevention, and/or enabling dietary management of immune system disorders and conditions related to inflammation, including both pathogen assisted conditions and conditions that are independent of pathogens. Included with the present disclosure are methods for use of the pharmaceutical composition, dietary supplements, medical foods and solid food stuff products, and methods for selecting microbial entities to formulate same.

Compounds

Nucleic Acids

The term percent of "identity," in the context of two or more nucleic acid or polypeptide sequences, refer to two or more sequences or subsequences that have a specified percentage of nucleotides or amino acid residues that are the same, when compared and aligned for maximum correspondence, as measured using one of the sequence comparison algorithms described below (e.g., BLASTP and BLASTN or other algorithms available to persons of skill) or by visual inspection. Depending on the application, the percent of "identity" can exist over a region of the sequence being compared, e.g., over a functional domain, or, alternatively, exist over the full length of the two sequences to be compared.

For sequence comparison, typically one sequence acts as a reference sequence to which test sequences are compared. When using a sequence comparison algorithm, test and reference sequences are input into a computer, subsequence coordinates are designated, if necessary, and sequence algorithm program parameters are designated. The sequence comparison algorithm then calculates the percent sequence identity for the test sequence(s) relative to the reference sequence, based on the designated program parameters.

Optimal alignment of sequences for comparison can be conducted, e.g., by the local homology algorithm of Smith & Waterman, Adv. Appl. Math. 2:482 (1981), by the homology alignment algorithm of Needleman & Wunsch, J. Mol.

Biol. 48:443 (1970), by the search for similarity method of Pearson & Lipman, Proc. Nat'l. Acad. Sci. USA 85:2444 (1988), by computerized implementations of these algorithms (GAP, BESTFIT, FASTA, and TFASTA in the Wisconsin Genetics Software Package, Genetics Computer Group, 575 Science Dr., Madison, Wis.), or by visual inspection (see generally Ausubel et al., infra).

One example of an algorithm that is suitable for determining percent sequence identity and sequence similarity is the BLAST algorithm, which is described in Altschul et al., J. Mol. Biol. 215:403-410 (1990). Software for performing BLAST analyses is publicly available through the National Center for Biotechnology Information (www.ncbi.nlm.nih.gov/).

Compositions

Microbial Entities

Described herein are compositions such as pharmaceutical compositions, medical foods and solid food stuff comprising a combination of two or more microbial entities.

Bacterial Entities

Described herein are compositions comprising bacterial entities comprising bacterial species. In certain embodiments, the bacterial entity comprises bacterial species comprising: a 16S rDNA gene sequence that is at least 97% identical to a 16S rDNA sequence set forth in SEQ ID NO: 1-233 selected from Table 4. In certain embodiments, the bacterial entity comprises a bacterial species comprising: an 16S rDNA sequence that is at least 80%, 85%, 90%, 91%, 92%, 93%, 94%, 95%, 96%, 97%, 98% or at least 99% identical to a 16S rDNA sequence set forth in SEQ ID NO: 1-233 selected from Table 4.

In certain embodiments, the bacterial entity comprises bacterial species comprising: a first genome; wherein the first genome comprises at least one functional expression sequence at least about 30% identical to a functional expression sequence selected from Table 5 or Table 6. In certain embodiments, the first genome comprises at least one functional expression sequence at least 35%, at least 40%, at least 45%, at least 50%, at least 55%, at least 60%, at least 65%, at least 70%, at least 75%, at least 80%, at least 85%, at least 90%, at least 91%, at least 92%, at least 93%, at least 94%, at least 95%, at least 96%, at least 97%, at least 98%, at least 99%, identical to a functional expression sequence selected from Table 5 or Table 6. The functional expression sequence can be a gene coding for a protein, an RNA (e.g., an rRNA, an mRNA), or a fragment of a protein (e.g., a binding domain, or an activation domain, or catalytic domain), or a fragment of a nucleic acid (e.g., a fragment of an mRNA coding for a protein domain).

In certain embodiments, disclosed herein are compositions for proving immune health comprising viable microbes, comprising:
(v) a first microbial entity comprising a first bacterial population comprising *Lactobacillus brevis*;
(vi) a second microbial entity comprising a second bacterial population comprising *Lactococcus lactis*;
(vii) a third microbial entity comprising a third bacterial population comprising *Bacillus velezensis*; and.
(viii) a fourth microbial entity comprising a fourth bacterial population comprising *Lactobacillus harbinensis*.

In certain aspects, disclosed herein are compositions for improving immune health, comprising:
(i) a first microbial entity comprising a first bacterial species comprising a 16S rDNA sequence that is at least 97% identical to a 16S rDNA sequence set forth in SEQ ID NO: 43;
(ii) a second microbial entity comprising a second bacterial species comprising a 16S rDNA sequence that is at least 97% identical to a 16S rDNA sequence set forth in SEQ ID NO: 285;
(iii) a third microbial entity comprising a third bacterial species comprising a 16S rDNA sequence that is at least 97% identical to a 16S rDNA sequence set forth in SEQ ID NO: 284; and
(iv) a fourth microbial entity comprising a fourth bacterial species comprising a 16S rDNA sequence that is at least 97% identical to a 16S rDNA sequence set forth in SEQ ID NO: 286.

In certain embodiments, the bacterial entity comprises bacterial species comprising: a bacterial species capable of producing an enzyme having an amino acid sequence at least 60% identical to an enzyme selected from Table 5 or Table 6 or an enzyme capable of acting on the same substrate as an enzyme having an amino acid sequence at least 60% identical to an enzyme selected from Table 5 or Table 6. In certain embodiments, the bacterial species is capable of producing an enzyme having an amino acid sequence at least 65%, at least 70%, at least 80%, at least 85%, at least 90%, at least 91%, at least 92%, at least 93%, at least 94%, at least 95%, at least 96%, at least 97%, at least 98%, or at least 99%, identical to an enzyme selected from Table 5 or Table 6. In certain embodiments, the bacterial species is capable of producing an enzyme capable of acting on the same substrate as an enzyme having an amino acid sequence at least 85%, at least 90%, at least 91%, at least 92%, at least 93%, at least 94%, at least 95%, at least 96%, at least 97%, at least 98%, or at least 99%, identical to an enzyme selected from Table 5 or Table 6.

In certain embodiments, the bacterial species comprises one or more features selected from the group consisting of: (i) capable of engrafting when administered to a subject, (ii) capable of having anti-inflammatory activity, (iii) not capable of inducing pro-inflammatory activity, (iv) capable of producing a secondary bile acid, (v) capable of producing a tryptophan metabolite, (vi) capable of restoring epithelial integrity as determined by a primary epithelial cell monolayer barrier integrity assay, (vii) capable of being associated with remission of an inflammatory bowel disease, (viii) capable of producing a short-chain fatty acid, (ix) capable of inhibiting a HDAC activity, (x) capable of producing a medium-chain fatty acid, (xi) capable of expressing catalase activity, (xii) capable of having alpha-fucosidase activity, (xiii) capable of inducing Wnt activation, (xiv) capable of producing a B vitamin, (xv) capable of modulating host metabolism of endocannabinoid, (xvi) capable of producing a polyamine and/or modulating a host metabolism of a polyamine, (xvii) capable of reducing fecal levels of a sphingolipid, (xviii) capable of modulating host production of kynurenine, (xix) capable of reducing fecal calprotectin level, (xx) not capable of activating a toll-like receptor pathway, (xxi) capable of activating a toll-like receptor pathway, (xxii) not capable of producing ursodeoxycholic acid, (xxiii) capable of not being associated with clinical non-remission of an inflammatory bowel disease, (xxiv) capable of inhibiting apoptosis of intestinal epithelial cells, (xxv) capable of inducing an increased anti-inflammatory IL-10/IL-6 cytokine ratio in macrophages, (xxvi) capable of not inducing pro-inflammatory IL-6, TNFα, IL-lb, IL-23 or IL-12 production or gene expression in macrophages, (xxvii) capable of downmodulating one or more genes induced in IFN-γ treated colonic organoids, (xxix) capable of producing IL-18, (xxx) capable of inducing the activation of antigen presenting cells, (xxxi) capable of reducing the expression of one or more inhibitory receptors on T cells, (xxxii) capable of increasing expression of one or more genes/proteins associated with T cell activation and/or function, (xxxiii) capable of enhancing the ability of CD8+ T cells to kill tumor cells, (xxxiv) capable of enhancing the efficacy of an immune checkpoint inhibitor therapy, (xxxv) capable of reducing colonic inflammation, (xxxvi) capable of promoting the recruitment of CD8+ T cells to tumors, and (xxxvii) combinations thereof. In certain embodiments, the not activating a toll-like receptor pathway comprises no activation of TLR4 or TLR5. In certain embodiments, the activating a toll-like receptor pathway comprises activation of TLR2.

In certain embodiments, the one or more genes induced in IFN-γ treated colonic organoids, is selected from genes associated with inflammatory chemokine signaling, NF-κB signaling, TNF family signaling, type I interferon signaling, type II interferon signaling, TLR signaling, lymphocyte trafficking, Th17 cell differentiation, Th1 differentiation, Th2 differentiation, apoptosis, inflammasomes, autophagy, oxidative stress, MHC class I and II antigen presentation, complement, mTor, nod-like receptor signaling, PI3K signaling, and combinations thereof. In certain embodiments, the one or more inhibitory receptors on T cells is selected from TIGIT, TIM-3, LAG-3, and combinations thereof. In certain embodiments, the one or more genes or proteins associated with T cell activation and/or function is selected from CD45RO, CD69, IL-24, TNF-α, perforin, IFN-γ, and combinations thereof.

In certain embodiments, the first bacterial species is capable of producing indole-containing compounds. In certain embodiments, the indole containing compound is selected from indole, indole acetic acid (IAA), and indole propionic acid (IPA). In certain embodiments, the bacterial species is capable of producing bacteriocins and antibacterial peptides. In certain embodiments, the bacterial species is capable of producing neurotransmitters selected from serotonin, gamma-aminobutyric acid (GABA), dopamine, and combinations thereof. In certain embodiments, the bacterial species is capable of producing IFNγ, IL-12, TNF-α, IL-17, IL-6, or combinations thereof. In certain embodiments, first bacterial species is capable of producing a biosurfactant that reduces pro-inflammatory cytokines such as IL-1β, iNOS, and/or TNF-α. In certain embodiments, bacterial species metabolizes human produced primary bile acids into secondary bile acids. In certain embodiments, the primary bile acid is cholic acid, chenodeoxycholic acid, or combinations thereof. In certain embodiments, the secondary bile acid inhibits FXR and/or activates TGR5. In certain embodiments, the bacterial species produce more omega-3 fatty acids compared to omega-6 fatty acids. In certain embodiments, bacterial species comprises one or more bacteria that are capable of producing a metabolite selected from Tables 5 or 7.

Fungal Entities

Described herein are compositions comprising fungal entities comprising fungal species. In certain embodiments, the composition described herein comprises at least one fungal species comprising an 18S rDNA or ITS (Internal Transcribed Spacer) sequence that is at least 97% identical to a 18S rDNA or ITS sequence set forth in SEQ ID NO 1-233 selected from Table 4. In certain embodiments, the composition described herein comprise at least one fungal species comprising an 18S rDNA or ITS sequence that is at least 80%, 85%, 90%, 91%, 92%, 93%, 94%, 95%, 96%, 97%, 98% or at least 99% identical to a 18S rDNA or ITS sequence set forth in SEQ ID NO: 1-233 selected from Table 4.

In certain embodiments, the composition described herein comprise at least one fungal species comprising a genome comprising a functional expression sequence selected from at least about 30% identical to a functional expression sequence selected from Table 5 or Table 6. In certain embodiments, at least one fungal species comprising a genome comprising a functional expression sequence selected from at least 35%, at least 40%, at least 45%, at least 50%, at least 55%, at least 60%, at least 65%, at least 70%, at least 75%, at least 80%, at least 85%, at least 90%, at least 91%, at least 92%, at least 93%, at least 94%, at least 95%, at least 96%, at least 97%, at least 98%, or at least 99% identical to a functional expression sequence selected from Table 5 or Table 6.

In certain embodiments, the composition described herein comprise at least one fungal species capable of producing a metabolite, or has a functionality selected from Table 5 or Table 7.

Compositions Comprising Bacterial and Fungal Entities

Disclosed herein are compositions (e.g., pharmaceutical compositions, medical foods or solid food stuff) comprising at least one bacterial entity and at least one fungal entity. In certain embodiments, the composition comprises: composition comprising a population of viable microbes, comprising: (i) a first microbial entity comprising a first bacterial species comprising: (a) an 16S rDNA sequence that is at least 97% identical to a 16S rDNA sequence set forth in SEQ ID NO: 1-233 selected from Table 4; (b) a first genome; wherein the first genome comprises at least one functional expression sequence at least about 30% identical to a functional expression sequence selected from Table 5 or Table 6; or (c) a bacterial species capable of producing an enzyme having an amino acid sequence at least 80% identical to an enzyme selected from Table 5 or Table 6 or an enzyme capable of acting on the same substrate as an enzyme having an amino acid sequence at least 80% identical to an enzyme selected from Table 5 or Table 6; (ii) a second microbial entity comprising a first fungal species comprising: (a) an 18S rDNA or ITS sequence that is at least 97% identical to a 18S rDNA or ITS sequence set forth in SEQ ID NO: 1-233 selected from Table 4; (b) a genome comprising a functional expression sequence selected from at least about 30% identical to a functional expression sequence selected from Table 5 or Table 6; or (c) a metabolic signature or functionality selected from Table 5 or Table 7.

In certain embodiments, the compositions described herein comprise at least one additional microbial entity. In certain embodiments, the compositions described herein comprise 3, 4, 5, 6, 7, 8, 9, 10, 11, 12, 13, 14, 15, 16, 17, 18, 19, 20 or more microbial entities.

In certain embodiments, the composition is formulated in an oral administration form comprising between $1\times10^6$ and $1\times10^{12}$ cfu/administration of each of the bacterial entity and the fungal entity. In certain embodiments, the composition comprises at least $1\times10^6$, at least $1\times10^7$, at least $1\times10^8$, at least $1\times10^9$, at least $1\times10^{10}$, at least $1\times10^{11}$ cfu/administration of the bacterial entity. In certain embodiments, the composition comprises at least $1\times10^6$, at least $1\times10^7$, at least $1\times10^8$, at least $1\times10^9$, at least $1\times10^{10}$, at least $1\times10^{11}$ cfu/administration of the fungal entity.

In certain embodiments the bacterial entity and the fungal entity synergize to produce an anti-inflammatory effect in a mammalian host. In certain embodiments, the anti-inflammatory effect in a mammalian host is caused by the production at least one anti-inflammatory metabolite by either the bacterial entity, the fungal entity or both the bacterial and fungal entities.

In certain embodiments, administering an effective amount of the composition to a human subject reduces the level and/or activity of at least one inflammatory cytokine from Table 8 relative to a level and/or activity of the inflammatory cytokine in the serum of the human subject; or a tissue of the subject, prior to administering the pharmaceutical composition to the subject.

In certain embodiments, administering an effective amount of the pharmaceutical composition to a human subject treats, prevents, reduces the severity, and/or enables the dietary management of at least one symptom in the subject of an immune system disorder. In certain embodiments, the immune system disorder is selected from allergic rhinitis, allergic conjunctivitis, allergic bronchial asthma, atopic eczema, anaphylaxis, insect sting, drug allergy, food allergy, asthma, eczema, a disorder or condition associated with a pathological Th17 activity, or combinations thereof. In certain embodiments, the human subject has an altered Th17 activity, In certain embodiments, administering an effective dose of the pharmaceutical composition to a human subject treats, prevents, or reduces the severity of at least one symptom in the subject of a rheumatic disease selected from rheumatoid arthritis, spondyloarthritis, and psoriasis. In certain embodiments, administering an effective dose of the pharmaceutical composition to a human subject treats, prevents, or reduces the severity of at least one symptom in the subject of periodontal disease. In certain embodiments administering an effective dose of the pharmaceutical composition to a human subject treats, prevents, or reduces the severity of at least one symptom in the subject of gastritis. In certain embodiments the gastritis is *H. pylori*-associated gastritis.

Pharmaceutically Acceptable Delivery Vehicles

The microbial entities of the invention can be formulated in pharmaceutical compositions. These compositions can comprise, in addition to one or more of the microbial entities described herein and a pharmaceutically acceptable delivery vehicle. In certain embodiments the pharmaceutically acceptable delivery vehicle is an excipient.

In some embodiments the composition comprises at least one carbohydrate. A "carbohydrate" refers to a sugar or polymer of sugars. The terms "saccharide," "polysaccharide," "carbohydrate," and "oligosaccharide" can be used interchangeably. Most carbohydrates are aldehydes or ketones with many hydroxyl groups, usually one on each carbon atom of the molecule. Carbohydrates generally have the molecular formula $C_nH_{2n}O_n$. A carbohydrate can be a monosaccharide, a disaccharide, trisaccharide, oligosaccharide, or polysaccharide. The most basic carbohydrate is a monosaccharide, such as glucose, sucrose, galactose, mannose, ribose, arabinose, xylose, and fructose. Disaccharides are two joined monosaccharides. Exemplary disaccharides include sucrose, maltose, cellobiose, and lactose. Typically, an oligosaccharide includes between three and six monosaccharide units (e.g., raffinose, stachyose), and polysaccharides include six or more monosaccharide units. Exemplary polysaccharides include starch, glycogen, and cellulose. Carbohydrates may contain modified saccharide units such as 2'-deoxyribose wherein a hydroxyl group is removed, 2'-fluororibose wherein a hydroxyl group is replace with a fluorine, or N-acetylglucosamine, a nitrogen-containing form of glucose (e.g., 2'-fluororibose, deoxyribose, and hexose). Carbohydrates may exist in many different forms, for example, conformers, cyclic forms, acyclic forms, stereoisomers, tautomers, anomers, and isomers.

In some embodiments, the composition comprises at least one lipid. As used herein a "lipid" includes fats, oils, triglycerides, cholesterol, phospholipids, fatty acids in any form including free fatty acids. Fats, oils and fatty acids can be saturated, unsaturated (cis or trans) or partially unsaturated (cis or trans). In some embodiments the lipid comprises at least one fatty acid selected from lauric acid (12:0), myristic acid (14:0), palmitic acid (16:0), palmitoleic acid (16:1), margaric acid (17:0), heptadecenoic acid (17:1), stearic acid (18:0), oleic acid (18:1), linoleic acid (18:2), linolenic acid (18:3), octadecatetraenoic acid (18:4), arachidic acid (20:0), eicosenoic acid (20:1), eicosadienoic acid (20:2), eicosatetraenoic acid (20:4), eicosapentaenoic acid (20:5) (EPA), docosanoic acid (22:0), docosenoic acid (22:1), docosapentaenoic acid (22:5), docosahexaenoic acid (22:6) (DHA), and tetracosanoic acid (24:0). In some embodiments the composition comprises at least one modified lipid, for example a lipid that has been modified by cooking.

In some embodiments, the composition comprises at least one supplemental mineral or mineral source. Examples of minerals include, without limitation: chloride, sodium, calcium, iron, chromium, copper, iodine, zinc, magnesium, manganese, molybdenum, phosphorus, potassium, and selenium. Suitable forms of any of the foregoing minerals include soluble mineral salts, slightly soluble mineral salts, insoluble mineral salts, chelated minerals, mineral complexes, non-reactive minerals such as carbonyl minerals, and reduced minerals, and combinations thereof.

In some embodiments, the composition comprises at least one supplemental vitamin. The at least one vitamin can be fat-soluble or water soluble vitamins. Suitable vitamins include but are not limited to vitamin C, vitamin A, vitamin E, vitamin B12, vitamin K, riboflavin, niacin, vitamin D, vitamin B6, folic acid, pyridoxine, thiamine, pantothenic acid, and biotin. Suitable forms of any of the foregoing are salts of the vitamin, derivatives of the vitamin, compounds having the same or similar activity of the vitamin, and metabolites of the vitamin.

In some embodiments, the composition comprises at least one dietary supplement. Suitable examples are well known in the art and include herbs, botanicals, and certain hormones. Non limiting examples of dietary supplements include ginko, gensing, and melatonin.

In some embodiments the composition comprises an excipient. Non-limiting examples of suitable excipients include a tastant, a flavorant, a buffering agent, a preservative, a stabilizer, a binder, a compaction agent, a lubricant, a dispersion enhancer, a disintegration agent, a flavoring agent, a sweetener, a coloring agent.

In some embodiments the excipient is a buffering agent. Non-limiting examples of suitable buffering agents include sodium citrate, magnesium carbonate, magnesium bicarbonate, calcium carbonate, and calcium bicarbonate.

In some embodiments the excipient comprises a preservative. Non-limiting examples of suitable preservatives include antioxidants, such as alpha-tocopherol and ascorbate, and antimicrobials, such as parabens, chlorobutanol, and phenol.

In some embodiments the composition comprises a binder as an excipient. Non-limiting examples of suitable binders include starches, pregelatinized starches, gelatin, polyvinylpyrolidone, cellulose, methylcellulose, sodium carboxymethylcellulose, ethylcellulose, polyacrylamides, polyvinyloxoazolidone, polyvinylalcohols, C12-C18 fatty acid alcohol, polyethylene glycol, polyols, saccharides, oligosaccharides, and combinations thereof.

In some embodiments, the composition comprises a lubricant as an excipient. Non-limiting examples of suitable lubricants include magnesium stearate, calcium stearate, zinc stearate, hydrogenated vegetable oils, sterotex, polyoxyethylene monostearate, talc, polyethyleneglycol, sodium benzoate, sodium lauryl sulfate, magnesium lauryl sulfate, and light mineral oil.

In some embodiments, the composition comprises a dispersion enhancer as an excipient. Non-limiting examples of suitable dispersants include starch, alginic acid, polyvinylpyrrolidones, guar gum, kaolin, bentonite, purified wood cellulose, sodium starch glycolate, isoamorphous silicate, and microcrystalline cellulose as high HLB emulsifier surfactants.

In some embodiments, the composition comprises a disintegrant as an excipient. In some embodiments the disintegrant is a non-effervescent disintegrant. Non-limiting examples of suitable non-effervescent disintegrants include starches such as corn starch, potato starch, pregelatinized and modified starches thereof, sweeteners, clays, such as bentonite, micro-crystalline cellulose, alginates, sodium starch glycolate, gums such as agar, guar, locust bean, karaya, pecitin, and tragacanth. In some embodiments the disintegrant is an effervescent disintegrant. Non-limiting examples of suitable effervescent disintegrants include sodium bicarbonate in combination with citric acid, and sodium bicarbonate in combination with tartaric acid.

In some embodiments, the excipient comprises a flavoring agent. Flavoring agents incorporated into the outer layer can be chosen from synthetic flavor oils and flavoring aromatics; natural oils; extracts from plants, leaves, flowers, and fruits; and combinations thereof. In some embodiments the flavoring agent is selected from cinnamon oils; oil of wintergreen; peppermint oils; clover oil; hay oil; anise oil; *eucalyptus*; vanilla; citrus oil such as lemon oil, orange oil, grape and grapefruit oil; and fruit essences including apple, peach, pear, strawberry, raspberry, cherry, plum, pineapple, and apricot.

In some embodiments, the excipient comprises a sweetener. Non-limiting examples of suitable sweeteners include glucose (corn syrup), dextrose, invert sugar, fructose, and mixtures thereof (when not used as a carrier); saccharin and its various salts such as the sodium salt; dipeptide sweeteners such as aspartame; dihydrochalcone compounds, glycyrrhizin; *Stevia rebaudiana* (Stevioside); chloro derivatives of sucrose such as sucralose; and sugar alcohols such as sorbitol, mannitol, sylitol, and the like. Also contemplated are hydrogenated starch hydrolysates and the synthetic sweetener 3,6-dihydro-6-methyl-1,2,3-oxathiazin-4-one-2,2-dioxide, particularly the potassium salt (acesulfame-K), and sodium and calcium salts thereof.

In some embodiments, the composition comprises a coloring agent. Non-limiting examples of suitable color agents include food, drug and cosmetic colors (FD&C), drug and cosmetic colors (D&C), and external drug and cosmetic colors (Ext. D&C). The coloring agents can be used as dyes or their corresponding lakes.

In certain embodiments, the pharmaceutically acceptable delivery vehicle comprises a liposome.

In certain embodiments, the pharmaceutically acceptable delivery vehicle comprises a nanoparticle. In certain embodiments, the nanoparticle is a nanovector. In certain embodiments, the nanovector comprises an amphiphilic polymer. In certain embodiments, the delivery vehicle comprises fruit and/or vegetable powder or extract(s).

The weight fraction of the excipient or combination of excipients in the formulation of the pharmaceutical composition is usually about 50% or less, about 45% or less, about 40% or less, about 35% or less, about 30% or less, about 25% or less, about 20% or less, about 15% or less, about 10% or less, about 5% or less, about 2% or less, or about 1% or less of the total weight of the amino acids in the composition.

The precise nature of one or more pharmaceutically acceptable delivery vehicles, excipients, carriers, fillers or other material can depend on whether the composition is a pharmaceutical composition, a medical food, or a solid food stuff and the oral administration form.

Oral Administration Forms

In one aspect provided herein are methods and compositions formulated for oral delivery to a subject in need thereof. In an embodiment, a composition is formulated to deliver a composition comprising combinations of microbial entities disclosed herein to a subject in need thereof. In another embodiment, a pharmaceutical composition is formulated to deliver a composition comprising a combinations of microbial entities to a subject in need thereof. In another embodiment a composition is formulated to deliver a composition comprising prebiotic and a probiotic to a subject in need thereof. Compositions for oral administration can be in tablet, capsule, powder or liquid form.

In an embodiment, a composition is administered in solid, semi-solid, micro-emulsion, gel, or liquid form. Examples of such administration forms include tablet forms disclosed in U.S. Pat. Nos. 3,048,526, 3,108,046, 4,786,505, 4,919,939, and 4,950,484; gel forms disclosed in U.S. Pat. Nos. 4,904,479, 6,482,435, 6,572,871, and 5,013,726; capsule forms disclosed in U.S. Pat. Nos. 4,800,083, 4,532,126, 4,935,243, and 6,258,380; or liquid forms disclosed in U.S. Pat. Nos. 4,625,494, 4,478,822, and 5,610,184; each of which is incorporated herein by reference in its entirety.

Forms of the compositions that can be used orally include tablets, push-fit capsules made of gelatin, as well as soft, sealed capsules made of gelatin and a plasticizer, such as glycerol or sorbitol. Tablets can be made by compression or molding, optionally with one or more accessory ingredients including freeze-dried plant material serving both as prebiotic and as a filler. Compressed tablets can be prepared by compressing in a suitable machine the active ingredient in a free-flowing form such as a powder or granules, optionally mixed with binders (e.g., povidone, gelatin, hydroxypropylmethyl cellulose), inert diluents, preservative, antioxidant, disintegrant (e.g., sodium starch glycolate, cross-linked povidone, cross-linked sodium carboxymethyl cellulose) or lubricating, surface active or dispersing agents. Molded tablets can be made by molding in a suitable machine a mixture of the powdered compound moistened with an inert liquid diluent. The tablets can optionally be coated or scored and can be formulated so as to provide slow or controlled release of the active ingredient therein. Tablets can optionally be provided with an enteric coating, to provide release in parts of the gut (e.g., colon, lower intestine) other than the stomach. All formulations for oral administration can be in forms suitable for such administration. The push-fit capsules can contain the active ingredients in admixture with filler such as lactose, binders such as starches, and/or lubricants such as talc or magnesium stearate and, optionally, stabilizers. In soft capsules, the active compounds (prebiotics or probiotics) can be dissolved or suspended in suitable liquids, such as fatty oils, liquid paraffin, or liquid polyethylene glycols. In addition, stabilizers can be added. Dragee cores are provided with suitable coatings. For this purpose, concentrated sugar solutions can be used, which can optionally contain gum arabic, talc, polyvinyl pyrrolidone, carbopol gel, polyethylene glycol, or titanium dioxide, lacquer solutions, and suitable organic solvents or solvent mixtures. Dyestuffs or pigments can be added to the tablets or Dragee coatings for identification or to characterize different combinations of active compound administrations.

Formulations for oral use can also be presented as hard gelatin capsules wherein the active ingredient is mixed with an inert solid diluent, for example, calcium carbonate, calcium phosphate or kaolin, or as soft gelatin capsules wherein the active ingredient is mixed with water soluble carrier such as polyethylene glycol or an oil medium, for example peanut oil, liquid paraffin, or olive oil.

Oral liquid preparations can be in the form of, for example, aqueous or oily suspensions, solutions, emulsions syrups or elixirs, or can be presented as a dry product for reconstitution with water or other suitable vehicle before use. Such liquid preparations can contain conventional additives, such as suspending agents, for example sorbitol, methyl cellulose, glucose syrup, gelatin, hydroxyethyl cellulose, carboxymethyl cellulose, aluminum stearate gel or hydrogenated edible fats, emulsifying agents, for example lecithin, sorbitan monooleate, acacia; nonaqueous vehicles (which can include edible oils), for example almond oil, oily esters such as glycerine, propylene glycol, or ethyl alcohol; preservatives, for example methyl or propyl p-hydoxybenzoate or sorbic acid, and, if desired, conventional flavoring or coloring agents.

In an embodiment, a provided composition includes a softgel formulation. A softgel can contain a gelatin-based shell that surrounds a liquid fill. The shell can be made of gelatin, plasticiser (e.g., glycerin and/or sorbitol), modifier, water, color, antioxidant, or flavor. The shell can be made with starch or carrageenan. The outer layer can be enteric coated. In an embodiment, a softgel formulation can include a water or oil soluble fill solution, or suspension of a composition, for example, a prebiotic composition, covered by a layer of gelatin.

An enteric coating can control the location of a microbial entity described herein and how it is absorbed in the digestive system. For example, an enteric coating can be designed such that a composition comprising the microbial entity does not dissolve in the stomach but rather travels to the small intestine, where it dissolves. An enteric coating can be stable at low pH (such as in the stomach) and can dissolve at higher pH (for example, in the small intestine). Material that can be used in enteric coatings includes, for example, alginic acid, cellulose acetate phthalate, plastics, waxes, shellac, and fatty acids (e.g., stearic acid, palmitic acid). Enteric coatings are described, for example, in U.S. Pat. Nos. 5,225,202, 5,733, 575, 6,139,875, 6,420,473, 6,455,052, and 6,569,457, all of which are herein incorporated by reference in their entirety. The enteric coating can be an aqueous enteric coating. Examples of polymers that can be used in enteric coatings include, for example, shellac (trade name EmCoat 120 N, Marcoat 125); cellulose acetate phthalate (trade name aquacoat CPD®, Sepifilm™ LP, Klucel, Aquacoat® ECD, and Metolose®); polyvinylacetate phthalate (trade name Sureteric®); and methacrylic acid (trade name Eudragit®).

In an embodiment, an enteric coated composition comprising a microbial entity is administered to a subject. In another embodiment, an enteric coated composition is administered to a subject. The stomach has an acidic environment that can kill microbial entities. An enteric coating can protect microbial entities as they pass through the stomach and small intestine.

Enteric coatings can be used to (1) prevent the gastric juice from reacting with or destroying the active substance, (2) prevent dilution of the active substance before it reaches the intestine, (3) ensure that the active substance is not released until after the preparation has passed the stomach, and (4) prevent live bacteria contained in the preparation from being killed because of the low pH-value in the stomach.

Enteric coatings can also be used for avoiding irritation of or damage to the mucous membrane of the stomach caused by substances contained in the oral preparation, and for counteracting or preventing formation or release of substances having an unpleasant odor or taste in the stomach. Finally, such coatings can be used for preventing nausea or vomiting on intake of oral preparations.

In an embodiment a composition comprising the microbial entities described herein is provided as a tablet, capsule, or caplet with an enteric coating. In an embodiment the enteric coating is designed to hold the tablet, capsule, or caplet together when in the stomach. The enteric coating is designed to hold together in acid conditions of the stomach and break down in non-acid conditions and therefore release the drug in the intestines.

Softgel delivery systems can also incorporate phospholipids or polymers or natural gums to entrap a composition, for example, a prebiotic composition, in the gelatin layer with an outer coating to give desired delayed/control release effects, such as an enteric coating. Formulations of softgel fills can be at pH 2.5-7.5. A softgel formulation can be sealed tightly in an automatic manner. A softgel formulation can easily be swallowed, allow for product identification using colors and several shapes, allow uniformity, precision and accuracy between administrations, be safe against adulteration, provide good availability and rapid absorption, and offer protection against contamination, light and oxidation. Furthermore, softgel formulations can avoid unpleasant flavors due to content encapsulation.

A composition comprising a softgel formulation can be in any of number of different sizes, including, for example, round, oblong, oval, tube, droplet, or suppositories.

In an embodiment a composition is provided in an administration form which comprises an effective amount of microbial entities and one or more release controlling excipients as described herein. Suitable modified release administration vehicles include, but are not limited to, hydrophilic or hydrophobic matrix devices, water-soluble separating layer coatings, enteric coatings, osmotic devices, multi-particulate devices, and combinations thereof. In an embodiment the administration form is a tablet, caplet, capsule or lollipop. In another embodiment, the administration form is a liquid, oral suspension, oral solution, or oral syrup. In yet another embodiment, the administration form is a gel capsule, soft gelatin capsule, or hard gelatin capsule.

In an embodiment, the administration form is a gelatin capsule having a size indicated in Table 1.

TABLE 1

Gel Cap Sizes Allowable For Human Consumption
Empty Gelatin Capsule
Physical Specifications

| Size | Outer Diameter (mm) | Height or Locked Length (mm) | Actual Volume (ml) |
|---|---|---|---|
| 000 | 9.97 | 26.14 | 1.37 |
| 00 | 8.53 | 23.30 | 0.95 |
| 0 | 7.65 | 21.7 | 0.68 |
| 1 | 6.91 | 19.4 | 0.50 |
| 2 | 6.35 | 18.0 | 0.37 |
| 3 | 5.82 | 15.9 | 0.3 |
| 4 | 5.31 | 14.3 | 0.21 |
| 5 | 4.91 | 11.1 | 0.13 |

Note:
sizes and volumes are approximate.

In certain embodiments, a composition comprising microbial entities is provided in effervescent administration forms. The compositions can also comprise non-release controlling excipients.

In certain embodiments, a composition comprising a microbial entities is provided in a administration form that has at least one component that can facilitate release of the prebiotic. In a further embodiment the administration form can be capable of giving a discontinuous release of the compound in the form of at least two consecutive pulses separated in time from 0.1 up to 24 hours. The compositions can comprise one or more release controlling and non-release controlling excipients, such as those excipients suitable for a disruptable semi-permeable membrane and as swellable substances.

In certain embodiments, the compositions described herein comprise a plant or plant extract, either in solid or liquid form.

In certain embodiments, a composition comprising microbial entities is provided in an enteric coated administration form. The composition can also comprise non-release controlling excipients.

In certain embodiments, a composition comprising microbial entities is provided in a administration form for oral administration to a subject in need thereof, which comprises one or more pharmaceutically acceptable excipients or carriers, enclosed in an intermediate reactive layer comprising a gastric juice-resistant polymeric layered material partially neutralized with alkali and having cation exchange capacity and a gastric juice-resistant outer layer.

In an embodiment, a composition comprising the microbial entities is provided in the form of enteric-coated granules, for oral administration. The compositions can further comprise cellulose, disodium hydrogen phosphate, hydroxypropyl cellulose, hypromellose, lactose, mannitol, and sodium lauryl sulfate.

In certain embodiments, a composition comprising microbial entities is provided in the form of enteric-coated pellets, for oral administration. The compositions can further comprise glyceryl monostearate 40-50, hydroxypropyl cellulose, hypromellose, magnesium stearate, methacrylic acid copolymer type C, polysorbate 80, sugar spheres, talc, and triethyl citrate.

In certain embodiments, a composition comprising microbial entities is provided in the form of enteric-coated granules, for oral administration. The compositions can further comprise carnauba wax, crospovidone, diacetylated monoglycerides, ethylcellulose, hydroxypropyl cellulose, hypromellose phthalate, magnesium stearate, mannitol, sodium hydroxide, sodium stearyl fumarate, talc, titanium dioxide, and yellow ferric oxide.

In certain embodiments, a composition comprising microbial entities can further comprise calcium stearate, crospovidone, hydroxypropyl methylcellulose, iron oxide, mannitol, methacrylic acid copolymer, polysorbate 80, povidone, propylene glycol, sodium carbonate, sodium lauryl sulfate, titanium dioxide, and triethyl citrate.

The compositions provided herein can be in unit-administration forms or multiple-administration forms. Unit-administration forms, as used herein, refer to physically discrete units suitable for administration to human or non-human animal subject in need thereof and packaged individually. Each unit-administration can contain a predetermined quantity of an active ingredient(s) sufficient to produce the desired therapeutic effect, in association with other pharmaceutical carriers or excipients. Examples of unit-administration forms include, but are not limited to, ampoules, syringes, and individually packaged tablets and capsules. Unit-administration forms can be administered in fractions or multiples thereof. A multiple-administration form is a plurality of identical unit-administration forms packaged in a single container, which can be administered in segregated unit-administration form. Examples of multiple-administration forms include, but are not limited to, vials, bottles of tablets or capsules, or bottles of pints or gallons. In certain embodiments, the multiple administration forms comprise different pharmaceutically active agents. For example a multiple administration form can be provided which comprises a first administration element comprising a composition comprising a prebiotic and a second administration element comprising lactose or a probiotic, which can be in a modified release form.

In this example a pair of administration elements can make a single unit administration. In an embodiment, a kit is provided comprising multiple unit administrations, wherein each unit comprises a first administration element comprising a composition comprising a prebiotic and a second administration element comprising probiotic, lactose or both, which can be in a modified release form. In another embodiment the kit further comprises a set of instructions.

In an embodiment, compositions can be formulated in various administration forms for oral administration. The compositions can also be formulated as a modified release administration form, including immediate-, delayed-, extended-, prolonged-, sustained-, pulsatile-, controlled-, extended, accelerated-, fast-, targeted-, programmed-release, and gastric retention administration forms. These administration forms can be prepared according to known methods and techniques (see, Remington: The Science and Practice of Pharmacy, supra; Modified-Release Drug Delivery Technology, Rathbone et al., Eds., Drugs and the Pharmaceutical Science, Marcel Dekker, Inc.: New York, N.Y., 2002; Vol. 126, which is herein incorporated by reference in its entirety).

In an embodiment, the compositions are in one or more administration forms. For example, a composition can be administered in a solid or liquid form. Examples of solid administration forms include but are not limited to discrete units in capsules or tablets, as a powder or granule, or present in a tablet conventionally formed by compression molding. Such compressed tablets can be prepared by compressing in a suitable machine the three or more agents and a pharmaceutically acceptable carrier. The molded tablets can be optionally coated or scored, having indicia inscribed thereon and can be so formulated as to cause immediate, substantially immediate, slow, controlled or extended release of a composition comprising a prebiotic. Furthermore, administration forms of the invention can comprise acceptable carriers or salts known in the art, such as those described in the Handbook of Pharmaceutical Excipients, American Pharmaceutical Association (1986), incorporated by reference herein in its entirety.

In an embodiment, an effective amount of a composition comprising microbial entities is mixed with a pharmaceutical excipient to form a solid preformulation composition comprising a homogeneous mixture of compounds described herein. When referring to these compositions as "homogeneous," it is meant that the agents are dispersed evenly throughout the composition so that the composition can be subdivided into unit administration forms such as tablets, caplets, or capsules. This solid preformulation composition can then be subdivided into unit administration forms of the type described above comprising from, for example, 1 g to 20 mg of a prebiotic composition. A composition comprising microbial entities can be formulated, in the case of caplets, capsules or tablets, to be swallowed whole, for example with water.

The compositions described herein can be in liquid form. The liquid formulations can comprise, for example, an agent in water-in-solution and/or suspension form; and a vehicle comprising polyethoxylated castor oil, alcohol, and/or a polyoxyethylated sorbitan mono-oleate with or without flavoring. Each administration form comprises an effective amount of an active agent and can optionally comprise pharmaceutically inert agents, such as conventional excipients, vehicles, fillers, binders, disintegrants, pH adjusting substances, buffer, solvents, solubilizing agents, sweeteners, coloring agents, and any other inactive agents that can be included in pharmaceutical administration forms for oral administration. Examples of such vehicles and additives can be found in Remington's Pharmaceutical Sciences, 17th edition (1985).

The compositions (e.g., pharmaceutical composition, medical food or solid food stuff) described herein can be in a solid, semi-solid, liquid, or gel state at room temperature. The compositions described herein can be formulated for administration as an infant formula, an elderly nutritional formula, a prenatal nutrition formula, an athletic performance formula, a ready-to-use therapeutic food formula, or an athletic recovery formula.

Manufacturing

The administration forms described herein can be manufactured using processes that are well known to those of skill in the art. For example, for the manufacture of tablets, an effective amount of a microbial entity described herein can be dispersed uniformly in one or more excipients, for example, using high shear granulation, low shear granulation, fluid bed granulation, or by blending for direct compression. Excipients include diluents, binders, disintegrants, dispersants, lubricants, glidants, stabilizers, surfactants and colorants. Diluents, also termed "fillers," can be used to increase the bulk of a tablet so that a practical size is provided for compression. Non-limiting examples of diluents include lactose, cellulose, microcrystalline cellulose, mannitol, dry starch, hydrolyzed starches, powdered sugar, talc, sodium chloride, silicon dioxide, titanium oxide, dicalcium phosphate dihydrate, calcium sulfate, calcium carbonate, alumina and kaolin. Binders can impart cohesive qualities to a tablet formulation and can be used to help a tablet remain intact after compression. Non-limiting examples of suitable binders include starch (including corn starch and pregelatinized starch), gelatin, sugars (e.g., glucose, dextrose, sucrose, lactose and sorbitol), celluloses, polyethylene glycol, waxes, natural and synthetic gums, e.g., acacia, tragacanth, sodium alginate, and synthetic polymers such as polymethacrylates and polyvinylpyrrolidone. Lubricants can also facilitate tablet manufacture; non-limiting examples thereof include magnesium stearate, calcium stearate, stearic acid, glyceryl behenate, and polyethylene glycol. Disintegrants can facilitate tablet disintegration after administration, and non-limiting examples thereof include starches, alginic acid, crosslinked polymers such as, e.g., crosslinked polyvinylpyrrolidone, croscarmellose sodium, potassium or sodium starch glycolate, clays, celluloses, starches, gums and the like. Non-limiting examples of suitable glidants include silicon dioxide, talc, and the like. Stabilizers can inhibit or retard drug decomposition reactions, including oxidative reactions. Surfactants can also include and can be anionic, cationic, amphoteric or nonionic. If desired, the tablets can also comprise nontoxic auxiliary substances such as pH buffering agents, preservatives, e.g., antioxidants, wetting or emulsifying agents, solubilizing agents, coating agents, flavoring agents, and the like.

In an embodiment, a softgel formulation is made with a gelatin mass for the outer shell, and a composition including one or more substances, for example microbial entities, for the capsule fill can be prepared. To make the gelatin mass, gelatin powder can be mixed with water and glycerin, heated, and stirred under vacuum. Additives, for example, flavors or colors, can be added to molten gelatin using a turbine mixer and transferred to mobile vessels. The gelatin mass can be kept in a steam-jacketed storage vessel at a constant temperature.

The encapsulation process can begin when the molten gel is pumped to a machine and two thin ribbons of gel are formed on either side of machine. These ribbons can then pass over a series of rollers and over a set of die that determine the size and shapes of capsules. A fill composition, for example a prebiotic and/or probiotic fill composition, can be fed to a positive displacement pump, which can dose the fill and inject it between two gelatin ribbons prior to sealing them together through the application of heat and pressure. To remove excess water, the capsules can pass through a conveyer into tumble dryers where a portion of the water can be removed. The capsules can then be placed on, for example, trays, which can be stacked and transferred into drying rooms. In the drying rooms, dry air can be forced over capsules to remove any excess moisture.

Release Formulations

Immediate-release formulations of an effective amount of a composition comprising microbial entities can comprise one or more combinations of excipients that allow for a rapid release of a pharmaceutically active agent (such as from 1 minute to 1 hour after administration). In an embodiment an excipient can be microcrystalline cellulose, sodium carboxymethyl cellulose, sodium starch glycolate, corn starch, colloidal silica, Sodium Laurel Sulphate, Magnesium Stearate, Prosolve SMCC (HD90), croscarmellose Sodium, Crospovidone NF, Avicel PH200, and combinations of such excipients.

"Controlled-release" formulations (also referred to as sustained release (SR), extended-release (ER, XR, or XL), time-release or timed-release, controlled-release (CR), or continuous-release) refer to the release of a prebiotic composition from a administration form at a particular desired point in time after the administration form is administered to a subject. Controlled-release formulations can include one or more excipients, including but not limited to microcrystalline cellulose, sodium carboxymethyl cellulose, sodium starch glycolate, corn starch, colloidal silica, Sodium Laurel Sulphate, Magnesium Stearate, Prosolve SMCC (HD90), croscarmellose Sodium, Crospovidone NF, or Avicel PH200. Generally, controlled-release includes sustained but otherwise complete release. A sudden and total release in the large intestine at a desired and appointed time or a release in the intestines such as through the use of an enteric coating are both considered controlled-release. Controlled-release can occur at a predetermined time or in a predetermined place within the digestive tract. It is not meant to include a passive, uncontrolled process as in swallowing a normal tablet. Examples include, but are not limited to, those described in U.S. Pat. Nos. 3,845,770; 3,916,899; 3,536,809; 3,598,123; 4,008,719; 5,674,533; 5,059,595; 5,591,767; 5,120,548; 5,073,543; 5,639,476; 5,354,556; 5,733,556; 5,871,776; 5,902,632; and 5,837,284 each of which is incorporated herein by reference in its entirety.

In an embodiment, a controlled release administration form begins its release and continues that release over an extended period of time. Release can occur beginning almost immediately or can be sustained. Release can be constant, can increase or decrease over time, can be pulsed, can be continuous or intermittent, and the like. Generally, however, the release of at least one pharmaceutically active agent from a controlled-release administration form will exceed the amount of time of release of the drug taken as a normal, passive release tablet. Thus, for example, while all of at least one pharmaceutically active agent of an uncoated aspirin tablet should be released within, for example, four hours, a controlled-release administration form could release a smaller amount of aspirin over a period of six hours, 12 hours, or even longer. Controlled-release in accordance with the compositions and methods described herein generally means that the release occurs for a period of six hours or more, such as 12 hours or more.

In certain embodiments, a controlled release administration refers to the release of an agent, from a composition or administration form in which the agent is released according to a desired profile over an extended period of time. In an embodiment, controlled-release results in dissolution of an agent within 20-720 minutes after entering the stomach. In certain embodiments, controlled-release occurs when there is dissolution of an agent within 20-720 minutes after being swallowed. In certain embodiments, controlled-release occurs when there is dissolution of an agent within 20-720 minutes after entering the intestine. In certain embodiments, controlled-release results in substantially complete dissolution after at least 1 hour following administration. In certain embodiments, controlled-release results in substantially complete dissolution after at least 1 hour following oral administration. For example, controlled-release compositions allow delivery of an agent to a subject in need thereof over an extended period of time according to a predetermined profile. Such release rates can provide therapeutically effective levels of agent for an extended period of time and thereby provide a longer period of pharmacologic or diagnostic response as compared with conventional rapid release administration forms. Such longer periods of response provide for many inherent benefits that are not achieved with immediate-release administrations. When used in connection with the dissolution profiles discussed herein, the term "controlled-release" refers to wherein all or less than all of the total amount of a administration form, made according to methods and compositions described herein, delivers an active agent over a period of time greater than 1 hour.

In an aspect, controlled-release refers to delayed release of an agent, from a composition or administration form in which the agent is released according to a desired profile in which the release occurs after a period of time.

When present in a controlled-release oral administration form, the compositions described herein can be administered at a substantially lower daily administration level than immediate-release forms.

In an embodiment, the controlled-release layer is capable of releasing 30 to 40% of the one or more active agents (e.g., e.g., a microbial entity) contained therein in the stomach of a subject in need thereof in 5 to 10 minutes following oral administration. In another embodiment, the controlled-release layer is capable of releasing 90% of the one or more active agents (e.g., a microbial entity) is released in 40 minutes after oral administration.

In some embodiments, the controlled-release layer comprises one or more excipients, including but not limited to silicified microcrystalline cellulose (e.g., HD90), croscarmellose sodium (AC-Di-Sol), hydroxyl methyl propyl cellulose, magnesium stearate, or stearic acid. In an embodiment, a controlled release formulation weighs between 100 mg to 3 g.

Pharmaceutical carriers or vehicles suitable for administration of the compounds provided herein include all such carriers known to those skilled in the art to be suitable for the particular mode of administration. In addition, the compositions can one or more components that do not impair the desired action, or with components that supplement the desired action, or have another action.

In certain embodiments, an effective amount of the microbial entity is formulated in an immediate release form. In this embodiment, the immediate-release form can be included in an amount that is effective to shorten the time to its maximum concentration in the blood. By way of example, certain immediate-release pharmaceutical preparations are taught in United States Patent Publication US 2005/0147710A1 entitled, "Powder Compaction and Enrobing," which is incorporated herein in its entirety by reference.

The administration forms described herein can also take the form of pharmaceutical particles manufactured by a variety of methods, including but not limited to high-pressure homogenization, wet or dry ball milling, or small particle precipitation (nano spray). Other methods to make a suitable powder formulation are the preparation of a solution of active ingredients and excipients, followed by precipitation, filtration, and pulverization, or followed by removal of the solvent by freeze-drying, followed by pulverization of the powder to the desired particle size.

In a further aspect the administration form can be an effervescent administration form. Effervescent means that the administration form, when mixed with liquid, including water and saliva, evolves a gas. Some effervescent agents (or effervescent couple) evolve gas by means of a chemical reaction which takes place upon exposure of the effervescent disintegration agent to water or to saliva in the mouth. This reaction can be the result of the reaction of a soluble acid source and an alkali monocarbonate or carbonate source. The reaction of these two general compounds produces carbon dioxide gas upon contact with water or saliva. An effervescent couple (or the individual acid and base separately) can be coated with a solvent protective or enteric coating to prevent premature reaction. Such a couple can also be mixed with previously lyophilized particles (such as a prebiotic). The acid sources can be any which are safe for human consumption and can generally include food acids, acid and hydrite antacids such as, for example: citric, tartaric, amalic, fumeric, adipic, and succinics. Carbonate sources include dry solid carbonate and bicarbonate salt such as, preferably, sodium bicarbonate, sodium carbonate, potassium bicarbonate and potassium carbonate, magnesium carbonate and the like. Reactants which evolve oxygen or other gasses and which are safe for human consumption are also included. In an embodiment citric acid and sodium bicarbonate are used.

In certain aspects, the administration form can be in a candy form (e.g., matrix), such as a lollipop or lozenge. In an embodiment, an effective amount of a prebiotic is dispersed within a candy matrix. In an embodiment, the candy matrix comprises one or more sugars (such as dextrose or sucrose). In certain embodiments, the candy matrix is a sugar-free matrix. The choice of a particular candy matrix is subject to wide variation. Conventional sweeteners such as sucrose can be utilized, or sugar alcohols suitable for use with diabetic patients, such as sorbitol or mannitol can be employed. Other sweeteners, such as the aspartame, can also be easily incorporated into a composition in accordance with compositions described herein. The candy base can be very soft and fast dissolving, or can be hard and slower dissolving. Various forms will have advantages in different situations.

A candy mass composition comprising an effective amount of the microbial entities can be orally administered to a subject in need thereof so that an effective amount of the microbial entities will be released into the subject's mouth as the candy mass dissolves and is swallowed. A subject in need thereof includes a human adult or child.

In an embodiment, a candy mass is prepared that comprises one or more layers which can comprise different amounts or rates of dissolution of the microbial entity. In an embodiment a multilayer candy mass (such as a lollipop) comprises an outer layer with a concentration of the microbial entity differing from that of one or more inner layers. Such a drug delivery system has a variety of applications.

The choices of matrix and the concentration of the drug in the matrix can be important factors with respect to the rate of drug uptake. A matrix that dissolves quickly can deliver drug into the subject's mouth for absorption more quickly than a matrix that is slow to dissolve. Similarly, a candy matrix that contains the prebiotic in a high concentration can release more of the prebiotic in a given period of time than a candy having a low concentration. In an embodiment a candy matrix such as one disclosed in U.S. Pat. No. 4,671,953 or US Application Publication No. 2004/0213828 (which are herein incorporated by reference in their entirety) is used to deliver the prebiotic.

The administration forms described herein can also take the form of pharmaceutical particles manufactured by a variety of methods, including but not limited to high-pressure homogenization, wet or dry ball milling, or small particle precipitation (e.g., nGimat's NanoSpray). Other methods useful to make a suitable powder formulation are the preparation of a solution of active ingredients and excipients, followed by precipitation, filtration, and pulverization, or followed by removal of the solvent by freeze-drying, followed by pulverization of the powder to the desired particle size. In an embodiment the pharmaceutical particles have a final size of 3-1000 µM, such as at most 3, 4, 5, 6, 7, 8, 9, 10, 20, 30, 40, 50, 60, 70, 80, 90, 100, 150, 200, 250, 300, 350, 400, 450, 500, 550, 600, 650, 700, 750, 800, 850, 900, 950, 1000 µM. In certain embodiments, the pharmaceutical particles have a final size of 10-500 µM. In another embodiment the pharmaceutical particles have a final size of 50-600 µM. In another embodiment, the pharmaceutical particles have a final size of 100800 µM.

In an embodiment, an oral administration form (such as a powder, tablet, or capsule) is provided comprising a prebiotic composition comprising 0.7 g of FOS, GOS, or other FOS, GOS, or other appropriate polysaccharide, 0.2 g of lactose, 0.01 g of glucose, 0.01 g of galactose, 0.1-0.2 g of a binder, 0.1-0.2 g of a dispersant, 0.1-0.2 g of a solubilizer, wherein the FOS, GOS, or other FOS, GOS, or other appropriate polysaccharide are composed of 1-25% disaccharides, 1-25% trisaccharides, 1-25% tetrasaccharides, and 1-25% pentasaccharides. The oral administration form can be in the form of a powder, capsule, or tablet. Suitable amounts of binders, dispersants, and solubilizers are known in the art for preparation of oral tablets or capsules.

In certain embodiments, an oral administration form (such as a powder, tablet or capsule) is provided comprising microbial entities comprising 1-99.9% by weight of FOS, GOS, or other FOS, GOS, or other appropriate polysaccharide 0.5-20% by weight of lactose, 0.1-2% by weight of glucose, 0.1-2% by weight of galactose, 0.05-2% by weight of a binder, 0.05-2% by weight of a dispersant, 0.05-2% by weight of a solubilizer, wherein the FOS, GOS, or other FOS, GOS, or other appropriate polysaccharide are composed of 1-25% by weight disaccharides, 1-25% by weight trisaccharides, 1-25% by weight tetrasaccharides, and 1-25% by weight pentasaccharides.

In certain embodiments, an oral administration form (such as a powder, tablet, or capsule) is provided comprising microbial entities comprising 1, 10, 20, 30, 40, 50, 60, 70, 80, 90, 95, 99.5, 100% by weight of FOS, GOS, or other FOS, GOS, or other appropriate polysaccharide 0, 5, 10, 15, or 20% by weight of lactose, 0.1, 0.5, 1, or 2% by weight of glucose, 0.1, 0.5, 1, or 2% by weight of galactose, 0.05, 0.1, 0.5, 1, or 2% by weight of a binder, 0.05, 0.1, 0.5, 1, or 2% by weight of a dispersant, 0.05, 0.1, 0.5, 1, or 2% by weight of a solubilizer, wherein the FOS, GOS, or other FOS, GOS, or other appropriate polysaccharide are composed of 1, 5, 10, 15, 20, or 25% by weight disaccharides, 1, 5, 10, 15, 20, or 25% by weight trisaccharides, 1, 5, 10, 15, 20, or 25% by weight tetrasaccharides, and 1, 5, 10, 15, 20, or 25% by weight pentasaccharides.

In certain embodiments, an oral administration form is provided comprising a composition comprising microbial entities, wherein the oral administration form is a syrup. The syrup can comprise 1%, 5%, 10%, 15%, 20%, 25%, 30%, 35%, 40%, 45%, 50%, 55%, 60%, 65%, 70%, 75%, 80%, or 85% solid. The syrup can comprise 15%, 20%, 25%, 30%, 35%, 40%, 45%, or 50% liquid, for example, water. The syrup can comprise a composition comprising microbial entities. The syrup can be, for example, 1-96%, 10-96%, 20-96%, 30-96%, 40-96%, 50-96%, 60-96%, 70-96%, 80-96%, or 90-96% microbial entities. The syrup can be, for example, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, or 96% microbial entities. In an embodiment, a composition comprises FOS, GOS, or other FOS, GOS, or other appropriate polysaccharide.

In an embodiment, the softgel capsule is 0.25 mL, 0.5 mL, 1.0 mL, 1.25 mL, 1.5 mL, 1.75 mL, or 2.0 mL. In another embodiment, a softgel capsule comprises 0.1 g to 2.0 g of prebiotic composition. In another embodiment, a softgel capsule comprises 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2.0 g of a prebiotic composition. In certain embodiments, a softgel capsule comprises FOS, GOS, or other FOS, GOS, or other appropriate polysaccharide and inulin or FOS.

In certain embodiments, the composition is delivered in a gelatin capsule containing an amount of FOS, GOS, or other FOS, GOS, or other appropriate polysaccharide within the ranges listed in Table 2. In certain embodiments, the number of pills taken per day is within the ranges listed in Table 2.

TABLE 2

Exemplary GOS administration Units
Exemplary GOS Composition
Administrations in Gel Caps

| Size | GOS/Pill (g) | # pills per day |
|---|---|---|
| 000 | 1-2 | 1-15 |
| 00 | 0.6-1.5 | 1-25 |
| 0 | 0.4-1.1 | 1-38 |
| 1 | 0.3-0.8 | 1-50 |
| 2 | 0.25-0.6 | 1-60 |
| 3 | 0.2-0.5 | 1-75 |
| 4 | 0.14-0.3 | 1-837 |

In certain embodiments, a composition is provided that does not contain a preservative. In another embodiment, a composition is provided that does not contain an antioxidant. In another embodiment, a composition is provided that does not contain a preservative or an antioxidant. In an embodiment, a composition comprising FOS, GOS, or other FOS, GOS, or other appropriate polysaccharide does not contain a preservative or an antioxidant.

In certain embodiments, a composition is formulated as a viscous fluid. In another embodiment, a composition is formulated such that its water content is low enough that it does not support microbial growth. In an embodiment, this composition is an intermediate-moisture food, with a water activity between 0.6 and 0.85; in another embodiment this composition is a low-moisture food, with a water activity less than 0.6. Low-moisture foods limit microbial growth significantly and can be produced by one of ordinary skill in the art. For example, these products could be produced similarly to a liquid-centered cough drop. In another embodiment, a prebiotic composition is formulated as a viscous fluid without a preservative in a gel capsule. In an embodiment, a composition comprising FOS, GOS, or other FOS, GOS, or other appropriate polysaccharide is a viscous fluid. In an embodiment, a composition comprises a high percentage of FOS, GOS, or other FOS, GOS, or other appropriate polysaccharide that does not support microbial growth. In certain embodiments, the composition comprises FOS, GOS, or other FOS, GOS, or other appropriate polysaccharide and inulin or FOS.

In certain embodiments, an oral administration form is provided comprising a composition comprising microbial entities, wherein the oral administration form is a softgel. In an embodiment the softgel comprises a syrup. In an embodiment the syrup comprises a composition comprising microbial entities. In an embodiment the composition comprises FOS, GOS, or other FOS, GOS, or other appropriate polysaccharide. In another embodiment the composition comprises more than 80% FOS, GOS, or other FOS, GOS, or other appropriate polysaccharide. In an embodiment, the composition comprises between 80-99.9% FOS, GOS, or other. In an embodiment, the composition comprises more than 80% FOS, GOS, or other FOS, GOS, or other appropriate polysaccharide. In an embodiment, the composition comprises 80, 81, 82, 83, 84, 85, 86, 87, 88, 89, 90, 91, 92, 93, 94, 95, 96, 97, 98, 99, or 99.9% FOS, GOS, or other FOS, GOS, or other appropriate polysaccharide.

In an embodiment a FOS, GOS, or other FOS, GOS, or other appropriate polysaccharide composition is formulated for delivery in a soft gel capsule. In an embodiment a FOS, GOS, or other FOS, GOS, or other appropriate polysaccharide composition formulated for delivery in a soft gel capsule is a high percentage FOS, GOS, or other FOS, GOS, or other appropriate polysaccharide composition, such as a 90-100% FOS, GOS, or other FOS, GOS, or other appropriate polysaccharide composition (e.g., 90, 91, 92, 93, 94, 95, 96, 97, 98, 99 or 100% FOS, GOS, or other FOS, GOS, or other appropriate polysaccharide composition by weight). In another embodiment a FOS, GOS, or other FOS, GOS, or other appropriate polysaccharide composition formulated for delivery in a soft gel capsule comprises 95% FOS, GOS, or other FOS, GOS, or other appropriate polysaccharide. In another embodiment a FOS, GOS, or other FOS, GOS, or other appropriate polysaccharide composition formulated for delivery in a soft gel capsule comprises 96% FOS, GOS, or other FOS, GOS, or other appropriate polysaccharide. In another embodiment, the FOS, GOS, or other FOS, GOS, or other appropriate polysaccharide composition is formulated such that its water content is low enough that it does not support microbial growth. In another embodiment, the FOS, GOS, or other FOS, GOS, or other appropriate polysaccharide composition is formulated as a viscous fluid without a preservative in a gel capsule. In another embodiment, the FOS, GOS, or other FOS, GOS, or other appropriate polysaccharide composition is formulated as a viscous fluid without an antioxidant in a gel capsule. In another embodiment the soft gel capsule comprises 0.1-2 g of a FOS, GOS, or other FOS, GOS, or other appropriate polysaccharide composition.

In certain embodiments, a composition described can be formulated as described, in U.S. Pat. No. 6,750,331, which is herein incorporated by reference in its entirety. A composition can be formulated to comprise an oligosaccharide, a foaming component, a water-insoluble dietary fiber (e.g., cellulose or lignin), or a neutralizing component. In an embodiment, a composition comprises a prebiotic fiber. In an embodiment, a composition can be in the form of a chewable tablet.

In an embodiment, a foaming component can be at least one member selected from the group consisting of sodium hydrogen carbonate, sodium carbonate, and calcium carbonate. In an embodiment, a neutralizing component can be at least one member selected from the group consisting of citric acid, L-tartaric acid, fumaric acid, L-ascorbic acid, DL-malic acid, acetic acid, lactic acid, and anhydrous citric acid. In an embodiment, a water-insoluble dietary fiber can be at least one member selected from the group consisting of crystalline cellulose, wheat bran, oat bran, cone fiber, soy fiber, and beet fiber. The formulation can contain a sucrose fatty acid ester, powder sugar, fruit juice powder, and/or flavoring material.

Formulations of the provided invention can include additive components selected from various known additives. Such additives include, for example, saccharides (excluding oligosaccharides), sugar alcohols, sweeteners and like excipients, binders, disintegrators, lubricants, thickeners, surfactants, electrolytes, flavorings, coloring agents, pH modifiers, fluidity improvers, and the like. Specific examples of the additives include wheat starch, potato starch, corn starch, dextrin and like starches; sucrose, glucose, fructose, maltose, xylose, lactose and like saccharides (excluding oligosaccharides); sorbitol, mannitol, maltitol, xylitol and like sugar alcohols; calcium phosphate, calcium sulfate and like excipients; starch, saccharides, gelatin, gum arabic, dextrin, methyl cellulose, polyvinylpyrrolidone, polyvinyl alcohol, hydroxypropylcellulose, xanthan gum, pectin, gum tragacanth, casein, alginic acid and like binders and thickeners; leucine, isoleucine, L-valine, sugar esters, hardened oils, stearic acid, magnesium stearate, talc, macrogols and like lubricants; CMC, CMC-Na, CMC-Ca and like disintegrators; polysorbate, lecithin and like surfactants; aspartame, alitame and like dipeptides; silicon dioxide and like fluidity improvers; and Stevia, saccharin, and like sweeteners. The amounts of these additives can be properly selected based on their relation to other components and properties of the preparation, production method, etc.

In an embodiment, a FOS, GOS, or other FOS, GOS, or other appropriate polysaccharide composition is a chewable oral administration formulation. In an embodiment the chewable formulation can comprises between 1-99.9% FOS, GOS, or other FOS, GOS, or other appropriate polysaccharide. In an embodiment, a FOS, GOS, or other FOS, GOS, or other appropriate polysaccharide composition comprises 80% FOS, GOS, or other FOS, GOS, or other appropriate polysaccharide 5% L-ascorbic acid, 2% anhydrous citric acid, 3% sodium hydrogencarbonate, 3% calcium carbonate, 2% sucrose fatty acid, 3% fruit juice powder, and 2% potassium carbonate.

In an embodiment, a FOS, GOS, or other FOS, GOS, or other appropriate polysaccharide composition comprises 85% FOS, GOS, or other FOS, GOS, or other appropriate polysaccharide, 5% L-ascorbic acid, 3% sodium hydrogencarbonate, 2% sodium carbonate, 2% sucrose fatty acid ester, 2% fruit juice powder, and 1% potassium carbonate.

In an embodiment, a FOS, GOS, or other FOS, GOS, or other appropriate polysaccharide composition comprises 90% FOS, GOS, or other FOS, GOS, or other appropriate polysaccharide, 2% L-ascorbic acid, 1% anhydrous citric acid, 2% sodium hydrogencarbonate, 2% sodium carbonate, 2% sucrose fatty acid ester, and 1% potassium carbonate.

In an embodiment, a FOS, GOS, or other FOS, GOS, or other appropriate polysaccharide composition comprises 95% FOS, GOS, or other FOS, GOS, or other appropriate polysaccharide, 2% L-ascorbic acid, 1% sodium hydrogencarbonate, and 2% fruit juice powder. In another embodiment, a FOS, GOS, or other FOS, GOS, or other appropriate polysaccharide composition comprises 95% FOS, GOS, or other FOS, GOS, or other appropriate polysaccharide and 5% of L-ascorbic acid, anhydrous citric acid, sodium hydrogencarbonate, calcium carbonate, sucrose fatty acid, fruit juice powder, or potassium carbonate.

In an embodiment, a FOS, GOS, or other FOS, GOS, or other appropriate polysaccharide composition comprises 95% FOS, GOS, or other FOS, GOS, or other appropriate polysaccharide and 5% of L-ascorbic acid, anhydrous citric acid, sodium hydrogencarbonate, calcium carbonate, sucrose fatty acid, fruit juice powder, and potassium carbonate.

The microbial entities according to the present invention that is to be given to an individual, administration is preferably in a "therapeutically effective amount" that is sufficient to show benefit to the individual. A "prophylactically effective amount" can also be administered, when sufficient to show benefit to the individual. The actual amount administered, and rate and time-course of administration, will depend on the nature and severity of protein aggregation disease being treated. Prescription of treatment, e.g. decisions on administration etc, is within the responsibility of general practitioners and other medical doctors, and typically takes account of the disorder to be treated, the condition of the individual patient, the site of delivery, the method of administration and other factors known to practitioners. Examples of the techniques and protocols mentioned above can be found in Remington's Pharmaceutical Sciences, 16th edition, Osol, A. (ed), 1980.

Medical Foods

An alternate embodiment of the present disclosure is a formulation as a medical food. The consuming public has come to understand that foods possess more than basic nutrition (protein, carbohydrate, fat, etc). For example, 95% of consumers agree that "certain foods have health benefits that go beyond basic nutrition and may reduce the risk of disease or other health concerns." More than 50% of consumers believe that foods can replace the use of drugs. Replacing the use of drugs may have the benefit of reducing the incidence of adverse side effects suffered by patients following a pharmaceutical drug treatment regimen. In fact, medical foods are assumed to be generally safe, as people have historically consumed these foods safely in non-medical contexts.

The compositions of the invention may be administered under the supervision of a medical specialist, or may be self-administered. Medical foods could take the form of nutritional shakes or other liquids or meal replacements. Medical foods of the present invention could also take the form of a powder capable of being consumed upon addition to suitable food or liquid. Medical foods could also take the form of a pill, tablet or capsule.

A medical food formulation of the present disclosure could confer benefits of a synthetic composition of microbes isolated from nutritionally beneficial plants, as well as the benefits of prebiotics, or other nutritionally beneficial inclusions, but not consumed to obtain nutrition from them but rather to provide a metabolic function different than a foodstuff. For example, medical foods of the disclosure may also include at least one vitamin, or vitamin precursor. Preferred vitamins possess antioxidant properties and include vitamins A, C and E, and/or their biochemical precursors. Another embodiment of the medical foods of the invention also includes at least one trace element, preferably selected from the group consisting of zinc, manganese and selenium. Medical foods of the disclosure also may include at least one additional antioxidant selected from the group consisting of carotenoids, N-acetylcysteine and L-glutamine. It is known to those of skill in the art how to construct medical foods containing these elements.

Medical foods of the present disclosure would include effective concentration of microbial entities deemed useful for the indication and effective concentrations of any vitamin, prebiotic, or other beneficial additive not consumed to obtain nutrition but to add a therapeutic benefit mediated by the production of SCFA or other immuno-stimulant molecules when passing through the GI tract.

In some embodiments, the composition comprising the microbial entities is a solid foodstuff. Suitable examples of a solid foodstuff include without limitation a food bar, a snack bar, a cookie, a brownie, a muffin, a cracker, a biscuit, a cream or paste, an ice cream bar, a frozen yogurt bar, and the like. In some embodiments, the compositions disclosed herein are incorporated into a therapeutic food. In some embodiments, the medical food is a ready-to-use food that optionally contains some or all essential macronutrients and micronutrients. In some embodiments, the compositions disclosed herein are incorporated into a supplementary food that is designed to be blended into an existing meal. In some embodiments, the supplemental food contains some or all essential macronutrients and micronutrients. In some embodiments, compositions disclosed herein are blended with or added to an existing food to fortify the food's protein nutrition. Examples include food staples (grain, salt, sugar, cooking oil, margarine), beverages (coffee, tea, soda, beer, liquor, sports drinks), snacks, sweets and other foods.

Typically, the dietary supplements and medical foods of the present disclosure are consumed at least once daily, and preferably administered two times per day, preferably once in the morning and once in the afternoon. A typical administration regime for the dietary supplements or medical foods will continue for four to eight weeks. Depending on such factors as the medical condition being managed and the response of the patient, the administration regime may be extended. A medical food of the present invention will typically be consumed in two servings per day as either a meal replacement or as a snack between meals.

Anyone perceived to be at risk of a immune system disorder or other indication described herein can potentially benefit from ingesting the compositions of the disclosure. It is believed to be possible to effectively ameliorate symptoms and conditions associated with immune system disorders and other indications described herein with natural compounds, which do not show any severe side effects. Furthermore, the present methods are expected to be well-tolerated, for example without causing any discomfort or nausea, and simple to apply.

In certain aspects, described herein are medical foods comprising:
  (i) a first microbial entity of the pharmaceutical compositions described herein;
  (ii) a second microbial entity of the pharmaceutical compositions described herein; and
  (iii) an excipient.

In certain embodiments, the medical food further comprises a metabolite selected from Table 5 or Table 7. In certain embodiments, the first microbial entity comprises one or more bacteria that are capable of producing a metabolite selected from Table 5 or Table 7. In certain embodiments, the first microbial entity comprises one or more fungi that are capable of producing a metabolite selected from Table 5 or Table 7. In certain embodiments, the first microbial entity utilizes a metabolite produced by the second microbial entity. In certain embodiments, the first microbial entity utilizes a metabolite selected from Table 5 or Table 7. In certain embodiments, the medical food further comprises a metabolite produced by the first microbial entity, produced by the second microbial entity, or combinations thereof.

In certain embodiments, the medical food further comprises a prebiotic fiber. In certain embodiments, the medical food further comprises at least one additional microbial entity.

In certain embodiments, the medical food is formulated in an oral administration form comprising between $1 \times 10^6$ and $1 \times 10^{12}$ cfu/administration of each of the first microbial entity and the second microbial entity.

In certain embodiments, the first microbial entity and the second microbial entity synergize to produce an anti-inflammatory effect in a mammalian host. In certain embodiments, the anti-inflammatory effect in a mammalian host is caused by the production at least one anti-inflammatory metabolite by either the first microbial entity, the second microbial entity or both the first and the second microbial entities. In certain embodiments, administering an effective amount of the medical food to a human subject reduces the level and/or activity of at least one inflammatory cytokine from Table 8 relative to a level and/or activity of the inflammatory cytokine in the serum of the human subject; or a tissue of the subject, prior to administering the medical food to the subject.

In certain embodiments, administering an effective amount of the medical food to a human subject enables the dietary management of at least one symptom in the subject of an immune system disorder. In certain embodiments, the immune system disorder is selected from allergic rhinitis, allergic conjunctivitis, allergic bronchial asthma, atopic eczema, anaphylaxis, insect sting, drug allergy, food allergy, asthma, eczema, a disorder or condition associated with a pathological Th17 activity, or combinations thereof. In certain embodiments, the human subject has an altered Th17 activity.

In certain embodiments, administering an effective amount of the medical food to a human subject enables the dietary management of at least one symptom in the subject of a rheumatic disease selected from rheumatoid arthritis, spondyloarthritis, and psoriasis.

In certain embodiments, administering an effective amount of the medical food to a human subject enables the dietary management of at least one symptom in the subject of periodontal disease.

In certain embodiments, administering an effective amount of the medical food to a human subject enables the dietary management of at least one symptom in the subject of gastritis. In certain embodiments, the gastritis is *H. pylori*-associated gastritis.

In certain aspects, described herein is a solid food stuff comprising:
  (i) a first microbial entity of the pharmaceutical compositions described herein;
  (ii) a second microbial entity of the pharmaceutical compositions described herein; and
  (iii) an excipient.

In certain embodiments, the solid food stuff further comprises a metabolite selected from Table 5 or Table 7. In certain embodiments, the solid stuff further comprises a metabolite produced by the first bacterial entity, produced by the first fungal entity, or combinations thereof. In certain embodiments, the solid food stuff further comprises a prebiotic fiber. In certain embodiments, the solid food stuff further comprises at least one additional microbial entity. In certain embodiments, the solid food stuff is formulated in an oral administration form comprising between $1 \times 10^6$ and $1 \times 10^{12}$ cfu/administration of each of the first microbial entity and the second microbial entity.

In certain embodiments, the first microbial entity and the second microbial entity synergize to produce an anti-inflammatory effect in a mammalian host. In certain embodiments, the anti-inflammatory effect in a mammalian host is caused by the production at least one anti-inflammatory metabolite by either the first microbial entity, the second microbial entity, or both the first and the second microbial entities.

In certain embodiments, administering an effective amount of the solid food stuff to a human subject reduces the level and/or activity of at least one inflammatory cytokine from Table 8 relative to a level and/or activity of the inflammatory cytokine in the serum of the human subject; or a tissue of the subject, prior to administering the solid food stuff to the subject.

In certain embodiments, administering an effective amount of the solid food stuff to a human subject enables the dietary management of at least one symptom in the subject of an immune system disorder. In certain embodiments, the immune system disorder is selected from allergic rhinitis, allergic conjunctivitis, allergic bronchial asthma, atopic eczema, anaphylaxis, insect sting, drug allergy, food allergy, asthma, eczema, a disorder or condition associated with a pathological Th17 activity, and combinations thereof. In certain embodiments, the human subject has an altered Th17 activity.

In certain embodiments, administering an effective amount of the solid food stuff to a human subject enables the dietary management of at least one symptom in the subject of a rheumatic disease selected from rheumatoid arthritis, spondyloarthritis, and psoriasis.

In certain embodiments, administering an effective amount of the solid food stuff to a human subject enables the dietary management of at least one symptom in the subject of periodontal disease.

In certain embodiments, administering an effective amount of the solid food stuff to a human enables the dietary management of at least one symptom in the subject of gastritis. In certain embodiments, the gastritis is *H. pylori*-associated gastritis.

Dietary Supplements

In certain aspects, described herein are dietary supplements comprising:
(i) a first microbial entity of the pharmaceutical compositions described herein;
(ii) a second microbial entity of the pharmaceutical compositions described herein; and
(iii) an excipient.

In certain embodiments, the dietary supplement further comprises a metabolite selected from Table 5 or Table 7. In certain embodiments, the first microbial entity comprises one or more bacteria that are capable of producing a metabolite selected from Table 5 or Table 7. In certain embodiments, the first microbial entity comprises one or more fungi that are capable of producing a metabolite selected from Table 5 or Table 7. In certain embodiments, the first microbial entity utilizes a metabolite produced by the second microbial entity. In certain embodiments, the first microbial entity utilizes a metabolite selected from Table 5 or Table 7. In certain embodiments, the dietary supplement further comprises a metabolite produced by the first microbial entity, produced by the second microbial entity, or combinations thereof. In certain embodiments, the dietary supplement further comprises a prebiotic fiber. In certain embodiments, the dietary supplement further comprises at least one additional microbial entity. In certain embodiments, the dietary supplement is formulated in an oral administration form comprising between $1\times10^6$ and $1\times10^{12}$ cfu/administration of each of the first microbial entity and the second microbial entity.

In certain embodiments, the first microbial entity and the second microbial entity synergize to produce an anti-inflammatory effect in a mammalian host. In certain embodiments, the anti-inflammatory effect in a mammalian host is caused by the production of at least one anti-inflammatory metabolite by either the first microbial entity, the second microbial entity or both the first and the second microbial entities. In certain embodiments, administering an effective amount of the dietary supplement to a human subject reduces the level and/or activity of at least one inflammatory cytokine from Table 8 relative to a level and/or activity of the inflammatory cytokine in the serum of the human subject; or a tissue of the subject, prior to administering the dietary supplement to the subject.

In certain embodiments, administering an effective amount of the dietary supplement to a human subject reduces and/or prevents at least one symptom in the subject of an immune system disorder. In certain embodiments, the immune system disorder is selected from allergic rhinitis, allergic conjunctivitis, allergic bronchial asthma, atopic eczema, anaphylaxis, insect sting, drug allergy, food allergy, asthma, eczema, a disorder or condition associated with a pathological Th17 activity, or combinations thereof. In certain embodiments, the human subject has an altered Th17 activity.

In certain embodiments, administering an effective amount of the dietary supplement to a human subject reduces and/or prevents at least one symptom in the subject of a rheumatic disease selected from rheumatoid arthritis, spondyloarthritis, and psoriasis.

In certain embodiments, administering an effective amount of the dietary supplement to a human subject reduces and/or prevents at least one symptom in the subject of periodontal disease.

In certain embodiments, administering an effective amount of the dietary supplement to a human subject reduces and/or prevents at least one symptom in the subject of gastritis. In certain embodiments, the gastritis is *H. pylori*-associated gastritis.

Methods of Use
Methods for Improving Immune Health

In certain aspects, described herein are methods of improving immune health in a subject, the method comprising administering to the subject an effective amount of the pharmaceutical composition, medical food, dietary supplement or solid food stuff described herein. In certain embodiments, the method modulates the level and/or activity of an inflammatory cytokine in a subject. In certain embodiments, the modulating the level and or activity of an inflammatory cytokine, comprises reducing the level and/or activity of at least one inflammatory cytokine from Table 8. In certain embodiments, the level and/or activity of the at least one inflammatory cytokine from Table 8 is reduced in the serum or select tissue of subject after administration of the pharmaceutical composition, medical food, dietary supplement or solid food stuff compared to a level and/or activity of the at least one inflammatory cytokine from Table 8 prior to administration of the pharmaceutical composition, medical food, dietary supplement or solid food stuff. In certain embodiments, the inflammatory cytokine is selected from the group consisting of IFNγ, IL-12, TNF-α, IL-17, IL-6, IL-1β, IL-10, and combinations thereof. In certain embodiments, the level and/or activity of the at least one inflammatory cytokine in the serum or select tissue of a human subject after the administration of the effective amount of the pharmaceutical composition, medical food, dietary supplement or solid food stuff. In certain embodiments, the method causes an anti-inflammatory effect in the subject. In certain embodiments, the anti-inflammatory effect is caused by the production of at least one anti-inflammatory metabolite by either the first microbial entity, the second microbial entity or both the first and the second microbial entities. In certain embodiments, the method prevents, reduces the severity of, and/or enables the dietary management of an immune system disorder. In certain embodiments, the immune system disorder is selected from the group consisting of allergic rhinitis, allergic conjunctivitis, allergic bronchial asthma, atopic eczema, anaphylaxis, insect sting, drug allergy, food allergy, asthma, eczema, a disorder or condition associated with a pathological Th17 activity, and combinations thereof.

In certain embodiments, the first microbial entity and the second microbial entity synergize to produce an anti-inflammatory effect in a mammalian host. In certain embodiments, the anti-inflammatory effect in a mammalian host is caused by the production at least one anti-inflammatory metabolite by either the first microbial entity, the second microbial entity or both the first and the second microbial entities. In certain embodiments, administering an effective dose of the pharmaceutical composition to a human subject reduces the level and/or activity of at least one inflammatory cytokine from Table 8 relative to a level and/or activity of the inflammatory cytokine in the serum of the human subject; or a tissue of the subject, prior to administering the pharmaceutical composition to the subject.

In certain aspects, disclosed herein are methods of improving immune health, comprising administering to a subject an effective amount of a composition comprising viable microbes disclosed herein. In certain embodiments, the method of improving immune health comprises administering to a human subject an effective amount of a composition comprising viable microbes, comprising:
  (ix) a first microbial entity comprising a first bacterial population comprising *Lactobacillus brevis;*
  (x) a second microbial entity comprising a second bacterial population comprising *Lactococcus lactis;*
  (xi) a third microbial entity comprising a third bacterial population comprising *Bacillus velezensis;* and.
  (xii) a fourth microbial entity comprising a fourth bacterial population comprising *Lactobacillus harbinensis.*

In certain aspects, disclosed herein are methods of improving immune health, comprising administering to a human subject an effective amount of a composition comprising viable microbes, comprising:
  (xiii) a first microbial entity comprising a first bacterial population comprising *Lactobacillus brevis;*
  (xiv) a second microbial entity comprising a second bacterial population comprising *Lactococcus lactis;*
  (xv) a third microbial entity comprising a third bacterial population comprising *Bacillus velezensis;* and.
  (xvi) a fourth microbial entity comprising a fourth bacterial population comprising *Lactobacillus harbinensis.*

In certain aspects, disclosed herein are methods of improving immune health, comprising administering to a human subject an effective amount of a composition comprising:
  (i) a first microbial entity comprising a first bacterial species comprising a 16S rDNA sequence that is at least 97% identical to a 16S rDNA sequence set forth in SEQ ID NO: 43;
  (ii) a second microbial entity comprising a second bacterial species comprising a 16S rDNA sequence that is at least 97% identical to a 16S rDNA sequence set forth in SEQ ID NO: 224;
  (iii) a third microbial entity comprising a third bacterial species comprising a 16S rDNA sequence that is at least 97% identical to a 16S rDNA sequence set forth in SEQ ID NO: 221; and
  (iv) a fourth microbial entity comprising a fourth bacterial species comprising a 16S rDNA sequence that is at least 97% identical to a 16S rDNA sequence set forth in SEQ ID NO: 198.

Methods of Reducing Inflammation

In certain aspects, described herein are methods of reducing inflammation in a subject in need thereof, comprising administering to the subject and effective amount of a composition comprising viable microbes described herein. In certain embodiments, the method modulates the level and/or activity of an inflammatory cytokine in a subject. In certain embodiments, the modulating the level and or activity of an inflammatory cytokine, comprises reducing the level and/or activity of at least one inflammatory cytokine from Table 8. In certain embodiments, the level and/or activity of the at least one inflammatory cytokine from Table 8 is reduced in the serum or select tissue of subject after administration of the pharmaceutical composition, medical food, dietary supplement or solid food stuff compared to a level and/or activity of the at least one inflammatory cytokine from Table 8 prior to administration of the pharmaceutical composition, medical food, dietary supplement or solid food stuff. In certain embodiments, the inflammatory cytokine is selected from the group consisting of IFNγ, IL-12, TNF-α, IL-17, IL-6, IL-1β, IL-10, and combinations thereof. In certain embodiments, the level and/or activity of the at least one inflammatory cytokine in the serum or select tissue of a human subject after the administration of the effective amount of the pharmaceutical composition, medical food, dietary supplement or solid food stuff. In certain embodiments, the method causes an anti-inflammatory effect in the subject. In certain embodiments, the anti-inflammatory effect is caused by the production of at least one anti-inflammatory metabolite by either the first microbial entity, the second microbial entity or both the first and the second microbial entities. In certain embodiments, the method prevents, reduces the severity of, and/or enables the dietary management of an immune system disorder. In certain embodiments, the immune system disorder is selected from the group consisting of allergic rhinitis, allergic conjunctivitis, allergic bronchial asthma, atopic eczema, anaphylaxis, insect sting, drug allergy, food allergy, asthma, eczema, a disorder or condition associated with a pathological Th17 activity, and combinations thereof.

In certain embodiments, the first microbial entity and the second microbial entity synergize to produce an anti-inflammatory effect in a mammalian host. In certain embodiments, the anti-inflammatory effect in a mammalian host is caused by the production at least one anti-inflammatory metabolite by either the first microbial entity, the second microbial entity or both the first and the second microbial entities. In certain embodiments, administering an effective dose of the pharmaceutical composition to a human subject reduces the level and/or activity of at least one inflammatory cytokine from Table 8 relative to a level and/or activity of the inflammatory cytokine in the serum of the human subject; or a tissue of the subject, prior to administering the pharmaceutical composition to the subject.

In certain embodiments, the method of inhibiting inflammation comprises: administering to a human subject an effective amount of a composition comprising:
  (i) a first microbial entity comprising a first bacterial species comprising a 16S rDNA sequence that is at least 97% identical to a 16S rDNA sequence set forth in SEQ ID NO: 43
  (ii) a second microbial entity comprising a second bacterial species comprising a 16S rDNA sequence that is at least 97% identical to a 16S rDNA sequence set forth in SEQ ID NO: 224;
  (iii) a third microbial entity comprising a third bacterial species comprising a 16S rDNA sequence that is at least 97% identical to a 16S rDNA sequence set forth in SEQ ID NO: 221; and
  (iv) a fourth microbial entity comprising a fourth bacterial species comprising a 16S rDNA sequence that is at least 97% identical to a 16S rDNA sequence set forth in SEQ ID NO: 198.

In certain embodiments, the method results in higher circulating levels of at least one anti-inflammatory marker and/or lower circulating levels of at least one inflammation-associated marker in the human subject. In certain embodiments, the human subject has lower circulating levels of at least one anti-inflammatory marker and/or higher circulating levels of at least one inflammation-associated marker prior to administration of the composition.

Immune System Disorders

In certain embodiments, described herein are methods of treating, preventing or reducing the severity and/or enabling the dietary management of at least one symptom of an immune system disorder, comprising administering to a human subject an effective amount of a composition (e.g., pharmaceutical composition, medical food, dietary supplement, or solid foodstuff) described herein.

In certain embodiments, the immune system disorder is the immune system disorder is selected from the group consisting of allergic rhinitis, allergic conjunctivitis, allergic bronchial asthma, atopic eczema, anaphylaxis, insect sting, drug allergy, food allergy, asthma, eczema, a disorder or condition associated with a pathological Th17 activity, aging-associated inflammation, and combinations thereof.

In certain embodiments, the first microbial entity and the second microbial entity synergize to produce an anti-inflammatory effect in a mammalian host. In certain embodiments, the anti-inflammatory effect in a mammalian host is caused by the production at least one anti-inflammatory metabolite by either the first microbial entity, the second microbial entity or both the first and the second microbial entities. In certain embodiments, administering an effective dose of the pharmaceutical composition to a human subject reduces the level and/or activity of at least one inflammatory cytokine from Table 8 relative to a level and/or activity of the inflammatory cytokine in the serum of the human subject; or a tissue of the subject, prior to administering the pharmaceutical composition to the subject. In certain embodiments, the methods described herein further comprise administering an effective amount of one or more immunosuppressive agents and/or anti-inflammatory agents known in the art in combination with a pharmaceutical composition, medical food, dietary supplement, or food stuff described herein.

Reduction of Inflammatory Cytokines

In certain embodiments, described herein are methods of reducing the level and/or activity of at least one inflammatory cytokine comprising administering an effective amount to a human subject an effective amount of a composition (e.g., pharmaceutical composition, medical food, dietary supplement, or solid foodstuff) described herein. In certain embodiments, described herein are methods of reducing the level and/or activity of at least one inflammatory cytokine associated with aging comprising administering an effective amount to a human subject an effective amount of a composition (e.g., a pharmaceutical composition, medical food, dietary supplement, or food stuff) described herein. In certain embodiments, described herein are methods of treating or preventing inflammation or a condition associated with inflammation comprising administering an effective amount to a human subject an effective amount of a composition (e.g., a pharmaceutical composition, medical food or food stuff) described herein. In certain embodiments, the inflammatory cytokine is one from Table 8 In certain embodiments, the inflammatory cytokine is reduced in the serum or select tissue of the human subject after administration of a composition (e.g., a pharmaceutical composition, medical food, dietary supplement, or food stuff) compared to a level and/or activity of the at least one inflammatory cytokine from Table 8 prior to administration of the composition (e.g., pharmaceutical composition, medical food, or food stuff). In certain embodiments, the methods described herein further comprise administering an effective amount of one or more immunosuppressive agents and/or anti-inflammatory agents known in the art in combination with a pharmaceutical composition, medical food, dietary supplement, or food stuff described herein.

Rheumatic Disease

In certain embodiments, described herein are methods of treating or preventing and/or enabling the dietary management of at least one symptom of a rheumatic disease comprising administering an effective amount to a human subject an effective amount of a composition (e.g., pharmaceutical composition, medical food, dietary supplement, or solid foodstuff) described herein. In certain embodiments, the rheumatic disease is rheumatoid arthritis, spondyloarthritis, or psoriasis. In certain embodiments, the rheumatic disease is rheumatoid arthritis. In certain embodiments, the symptom of rheumatic disease is selected from synovial hyperplasia, articular cartilage damage, damage to the metaphyseal bone, or combinations thereof. In certain embodiments, the methods described herein further comprise administering an effective amount of one or more additional agents known in the art for treating, preventing, reducing the severity of one or more symptoms of, and/or enabling the dietary management of at least one symptom of a rheumatic disease. In certain embodiments, the methods described herein further comprise administering an effective amount of methotrexate in combination with an effective amount of a pharmaceutical composition, medical food, dietary supplement, or solid foodstuff described herein. In certain embodiments, the methotrexate is administered, before, simultaneously, or after the administration of the pharmaceutical composition, medical food, dietary supplement, or solid foodstuff described herein.

Periodontal Disease

In certain embodiments, described herein are methods of treating, preventing, and/or enabling the dietary management of periodontal disease comprising administering to a human subject an effective amount of a composition (e.g., pharmaceutical composition, medical food, dietary supplement, or solid foodstuff) described herein. In certain embodiments, the compositions described herein can be administered by local administration in the form of a gel, mouthwash, lozenge, paste, medical food or food stuff for the treatment or prevention of periodontal disease. In certain embodiments, the methods described herein further comprise administering an effective amount of one or more additional agents known in the art for treating, preventing, reducing the severity of one or more symptoms of, and/or enabling the dietary management of at least one symptom of a periodontal disease. In certain embodiments, the one or more additional agents known in the art for treating, preventing, reducing the severity of one or more symptoms of, and/or enabling the dietary management of at least one symptom of a periodontal disease is administered, before, simultaneously, or after the administration of the pharmaceutical composition, medical food, dietary supplement, or solid foodstuff described herein.

Gastritis

In certain embodiments, described herein are methods of treating or preventing and/or enabling the dietary management of gastritis comprising administering to a human subject an effective amount of a composition (e.g., pharmaceutical composition, medical food, dietary supplement, or solid foodstuff) described herein. In certain embodiments, the gastritis is *H. pylori*-associated gastritis. In certain embodiments, the methods described herein further comprise administering an effective amount of one or more additional agents known in the art for treating, preventing, reducing the severity of one or more symptoms of, and/or enabling the dietary management of at least one symptom of gastritis. In certain embodiments, the one or more additional agents known in the art for treating, preventing, managing one or more symptoms of, and/or enabling the dietary management of at least one symptom of a gastritis is administered, before, simultaneously, or after the administration of the pharmaceutical composition, medical food, dietary supplement, or solid foodstuff described herein.

Osteoarthritis

In some embodiments, compositions and methods disclosed herein can be used to treat or prevent, and/or enable the dietary management of osteoarthritis. In certain embodiments, described herein are methods of treating or preventing osteoarthritis comprising administering to a human subject an effective amount of a composition (e.g., pharmaceutical composition, medical food, dietary supplement, or solid foodstuff) described herein.

As used herein, the term "osteoarthritis" (abbreviated as "OA"), refers to the disease also known as osteoarthrosis and degenerative joint disease, characterized by inflammation and damage to, or loss of cartilage in any joint or joints, and joint pain. Clinical standards for diagnosing osteoarthritis in subjects including mammalian subjects such as canines and humans are well known and include for example swelling or enlargement of joints, joint tenderness or pain, decreased range of motion in joints, visible joint deformities such as bony growths, and crepitus. Symptoms can be identified by clinical observation and history, or imaging including MRI and X-ray. Criteria for diagnosing the presence or absence of OA and severity or degree of OA include but are not limited to the ACR Criteria for knee OA (R. Altman et al., Development of criteria for the classification and reporting of osteoarthritis: Classification of osteoarthritis of the knee: Diagnostic and Therapeutic Criteria Committee of the American Rheumatism Association. Arthritis Rheum. August 29(8):1039-1049(1986)), functional status criteria according to WOMAC (N. Bellamy et al., 1988, Validation study of WOMAC: a health status instrument for measuring clinically important patient relevant outcomes to antirheumatic drug therapy in patients with osteoarthritis of the hip or knee. J Rheumatol 15:1833-1840), and radiological standards for evaluating OA disease severity according to the Kellgren and Lawrence method for knee OA (Kellgren, J. H. and J. S. Lawrence, Radiological assessment of osteo-arthrosis. Ann Rheum Dis 16:494-502).

In some embodiments, the condition to be treated is osteoarthritis. In some embodiments, the condition to be treated is osteoarthritis, and treating the condition further involves administration of any one or combination of known anti-osteoarthritis medications or treatments. These include, but are not limited to, surgery, analgesics, non-steroidal anti-inflammatory drugs (aspirin, celecoxib, diclofenac, diflunisal, etodolac, ibuprofen, indomethacin, ketoprofen, ketorolac, nabumetone, naproxen, oxaprozin, piroxicam), menthol, weight loss regimens, physical exercise, acupuncture, narcotics (Codeine, Fentanyl, Hydrocodone, hydroporphone, meperidine, methadone, oxycodone), and physical therapy.

In certain embodiments, the methods described herein further comprise administering an effective amount of one or more additional agents known in the art for treating, preventing, reduction of the severity one or more symptoms of and/or enabling the dietary management of at least one symptom of osteoarthritis.

In certain embodiments, the anti-osteoarthritis medications or treatments or additional agent known in the art for treating, preventing, reduction of the severity one or more symptoms of and/or enabling the dietary management of at least one symptom of osteoarthritis are administered or performed, before, simultaneously, or after the administration of the pharmaceutical composition, medical food, dietary supplement, or solid foodstuff described herein.

Aging-Associated Inflammation

In certain embodiments, described herein is a method for treating, preventing, reducing the severity, or enabling the dietary management of at least one symptom associated with aging-associated inflammation, comprising administering to a human subject an effective amount of the pharmaceutical composition, medical food, or solid food stuff described herein. In certain embodiments, the symptom of aging-associated inflammation is selected from frailty, chronic pain, sarcopenia, impaired mobility, walking speed, cognitive processing speed, or executive functioning.

In certain aspects, described herein is a method of modulating the level and/or activity of an inflammatory cytokine related to human aging in a human subject, comprising administering to the human subject an effective amount of the pharmaceutical composition, medical food or solid food stuff described herein. In certain embodiments, the modulating the level and or activity of an inflammatory cytokine related to human aging, comprises reducing the level and/or activity of at least one inflammatory cytokine from Table 8. In certain embodiments, the level and/or activity of the at least one inflammatory cytokine from Table 8 is reduced in the serum or select tissue of the human subject after administration of the pharmaceutical composition, medical food, or solid food stuff compared to a level and/or activity of the at least one inflammatory cytokine from Table 8 prior to administration of the pharmaceutical composition, medical food, or solid food stuff. In certain embodiments, the inflammatory cytokine is selected from the group consisting of IFNγ, IL-12, TNF-α, IL-17, IL-6, IL-1β, IL-10, and combinations thereof. In certain embodiments, the level and/or activity of the at least one inflammatory cytokine related to human aging is reduced in the serum or select tissue of the human subject after the administration of the effective amount of the pharmaceutical composition, medical food, or solid food stuff.

In certain aspects, described herein is a method of reducing the level of at least one biomarker associated with aging-associated inflammation in a human subject, comprising administering to the human subject an effective amount of the pharmaceutical composition, medical food, or solid food stuff described herein. In certain embodiments, the at least one biomarker associated with aging-associated inflammation is selected from the group consisting of IL-6, TNF-α, C-Reactive Protein (CRP), C-X-C Motif Chemokine Ligand 10 (CXCL10), C-X3-C Motif Chemokine Ligand 1 (CX3CL1), Insulin Like Growth Factor (IGF) 1 (IGF-1), IGF binding proteins, Insulin, and Hemoglobin Subunit Alpha 1 (HbA1C). In certain embodiments, the biomarker associated with aging-associated inflammation is a biomarker disclosed in Tsai, Y. et al. Bioscience of Microbiota, Food and Health Vol. 40 (1), 1-11, 2021, hereby incorporated by reference in its entirety. In certain embodiments, the level of the at least one biomarker associated with aging-associated inflammation is reduced in the serum or select tissue of the human subject after administration of the pharmaceutical composition, medical food, or solid food stuff compared to a level and/or activity of the at least one biomarker associated with aging-associated inflammation prior to administration of the pharmaceutical composition, medical food, or solid food stuff. In certain embodiments, the methods described herein further comprise administering an effective amount of one or more additional agents known in the art for treating, preventing, reduction of the severity one or more symptoms of and/or enabling the dietary management of at least one symptom of aging-associated inflammation. In certain embodiments, the one or more additional compositions known in the art for treating, preventing, reduction of the severity and/or enabling the dietary management of at least one symptom of aging-associated inflammation is administered, before, simultaneously, or after the administration of the pharmaceutical composition, medical food, dietary supplement, or solid foodstuff described herein.

Combination Therapy

A composition can be administered alone or in combination with other treatments, either simultaneously or sequentially dependent upon the condition to be treated. In some embodiments, the compositions of the present disclosure can be used in combination with an agent known in the art for the treatment, prevention and/or reduction of the severity of one or more symptoms of an immune system disorder or a condition associated with inflammation. In certain embodiments, the compositions of the present disclosure are used in combination with one or more immunosuppressive agents known in the art. In certain embodiments, the compositions of the present disclosure are used in combination with an agent known in the art for reduction of an inflammatory cytokine. In certain embodiments, the compositions of the present disclosure are used in combination with for an agent known in the art for the treatment, prevention and/or reduction of the severity of one or more symptoms of rheumatoid arthritis. In certain embodiments, the compositions of the present disclosure are used in conjunction with methotrexate. In certain embodiments, the compositions of the present disclosure are used in combination with an agent known in the art for the treatment, prevention and/or reduction of the severity of one or more symptoms of periodontal disease. In certain embodiments, the composition of the present disclosure are used in combination with an agent known in the art for the treatment, prevention and/or reduction of the severity of one or more symptoms of gastritis. In certain embodiments, the compositions of the present disclosure are used in combination with an agent known in the art for the treatment, prevention and/or reduction of the severity of one or more symptoms of pathogen associated gastritis (e.g., *H. pylori*-induced gastritis). In certain embodiments, the compositions of the present disclosure are used in combination with an agent known in the art for the treatment, prevention and/or reduction of the severity of one or more symptoms of osteoarthritis. In certain embodiments, the compositions of the present disclosure are used in combination with an agent known in the art for the treatment, prevention and/or reduction of the severity of one or more symptoms of aging-associated inflammation. In certain embodiments, the compositions of the present disclosure are used in combination with an agent known in the art for the treatment, prevention and/or reduction of the severity of one or more symptoms of psoriasis. In certain embodiments, the compositions of the present disclosure are used in combination with an agent known in the art for the treatment, prevention and/or reduction of the severity of one or more symptoms of psoriatic arthritis.

Methods of Selecting Microbial Entities

In certain embodiments, described herein are methods for selecting a microbial entity for a pharmaceutical composition, medical food, dietary supplement or solid foodstuff for treating, preventing, reducing the severity of, at least one symptom of an immune system disorder comprising a viable microbial population, the method comprising: (i) providing a library of whole-genome or cDNA transcriptome sequences of microbial candidates of different species; and (ii) generating a gene-of-interest database for orthologous genes-of-interest from the different species, wherein the gene-of-interest is selected from genes involved in the metabolism or biogenesis of short chain fatty acid (propionate and butyrate), indole (indole-3-acetic acid and indole propionic acid), Gamma-aminobutyric acid (GABA), surfactants (surfactin, nisin, fengycin, and iturin), dopamine, secondary bile acids, exopolysaccharide proteins (EPS), omega 3 fatty acids, and combinations thereof.

In certain aspects, described herein are methods of selecting a microbial entity for a pharmaceutical composition, medical food, dietary supplement, or solid foodstuff comprising a viable microbial population for treating, preventing or reducing the severity of at least one symptom of aging-associated inflammation in a human subject, modulating the level and/or activity of an inflammatory cytokine related to human aging in a human subject, and/or reducing the level of at least one biomarker associated with aging-associated inflammation in a human subject, the method comprising:
  (i) providing a library of whole-genome or cDNA transcriptome sequences of microbial candidates of different species; and
  (ii) generating a gene-of-interest database for orthologous genes-of-interest from the different species, wherein the gene-of-interest is selected from genes involved in the metabolism or biogenesis of short chain fatty acid (propionate and butyrate), indole (indole-3-acetic acid and indole propionic acid), Gamma-aminobutyric acid (GABA), surfactants (surfactin, nisin, fengycin, and iturin), dopamine, secondary bile acids, exopolysaccharide proteins (EPS), omega 3 fatty acids, and combinations thereof.

Methods of Formulating Microbial Entities

In certain aspects, described herein are methods of formulating a composition (e.g., a pharmaceutical composition, medical food, dietary supplement or solid food stuff) comprising a viable microbial population for treating, preventing, reducing the severity, and/or enabling dietary management of at least one symptom of an immune system disorder, the method comprising: (i) identifying immunomodulatory functions of interest; and (ii) screening in silico for genes-of-interest to identify microbes with the capacity to produce identified functions of interest using libraries of whole-genome or cDNA transcriptome sequences of the microbial candidates of different species; and (iii) selecting at least two microbial entity candidates of different species with immunomodulatory function; and (iv) culturing the at least two microbial entities in vitro and detecting formation or activity of an anti-inflammatory product/function in each; and (v) culturing the at least two microbial entities in combination in vitro, collecting supernatants from the cultures, and treating activated immune cells in vitro with the supernatants and detecting reduction in inflammatory cytokine production.

In certain aspects, described herein are methods of formulating a composition (e.g., a pharmaceutical composition, medical food, dietary supplement or solid food stuff) comprising a viable microbial population for treating, preventing, reducing the severity of and/or enabling dietary management of at least one symptom of a rheumatic disease, the method comprising: (i) identifying immunomodulatory functions of interest; and (ii) screening in silico for genes-of-interest to identify microbes with the capacity to produce identified functions of interest using libraries of whole-genome or cDNA transcriptome sequences of the microbial candidates of different species; and (iii) selecting at least two microbial entity candidates of different species with immunomodulatory function; and (iv) culturing the at least two microbial entities in vitro and detecting formation or activity of an anti-inflammatory product/function in each; and (v) culturing the at least two microbial entities in combination in vitro, collecting supernatants from the cultures, and treating activated immune cells in vitro with the supernatants and detecting reduction in inflammatory cytokine production.

In certain aspects, described herein are methods of formulating a a composition (e.g., a pharmaceutical composition, dietary supplement or nutritional food stuff) comprising a viable microbial population for treating, preventing or reducing the severity, and/or enabling the dietary management of at least one symptom of an periodontal disease, the method comprising: (i) identifying immunomodulatory functions of interest; and (ii) screening in silico for genes-of-interest to identify microbes with the capacity to produce identified functions of interest using libraries of whole-genome or cDNA transcriptome sequences of the microbial candidates of different species; and (iii) selecting at least two microbial entity candidates of different species with immunomodulatory function; and (iv) culturing the at least two microbial entities in vitro and detecting formation or activity of an anti-inflammatory product/function in each; and (v) culturing the at least two microbial entities in combination in vitro, collecting supernatants from the cultures, and treating activated immune cells in vitro with the supernatants and detecting reduction in inflammatory cytokine production.

In certain aspects, described herein are methods of formulating a composition (e.g., a pharmaceutical composition, dietary supplement or nutritional food stuff) comprising a viable microbial population for treating, preventing or reducing the severity, and/or enabling the dietary management of at least one symptom of gastritis, the method comprising: (i) identifying immunomodulatory functions of interest; and (ii) screening in silico for genes-of-interest to identify microbes with the capacity to produce identified functions of interest using libraries of whole-genome or cDNA transcriptome sequences of the microbial candidates of different species; and (iii) selecting at least two microbial entity candidates of different species with immunomodulatory function; and (iv) culturing the at least two microbial entities in vitro and detecting formation or activity of an anti-inflammatory product/function in each; and (v) culturing the at least two microbial entities in combination in vitro, collecting supernatants from the cultures, and treating activated immune cells in vitro with the supernatants and detecting reduction in inflammatory cytokine production. In certain embodiments, the gastritis is *H. pylori*-associated gastritis.

In certain aspects, described herein are methods of formulating a pharmaceutical composition, medical food, dietary supplement, or solid food stuff comprising a viable microbial population for treating, preventing or reducing the severity of at least one symptom of aging-associated inflammation in human subject, modulating the level and/or activity of an inflammatory cytokine related to human aging in a human subject, and/or reducing the level of at least one biomarker associated with aging-associated inflammation in a human subject, the method comprising:
(i) selecting at least two microbial entity candidates of different species with immunomodulatory function; and
(ii) identifying genes-of-interest that indicate synergistic functions of the at least two microbial entities in silico using predictive modeling of libraries of whole-genome or cDNA transcriptome sequences of the microbial candidates of different species; and/or
(iii) culturing the at least two microbial entities in combination in vitro and detecting formation of an anti-inflammatory product.

EXAMPLES

Below are examples of specific embodiments for carrying out the present invention. The examples are offered for illustrative purposes only, and are not intended to limit the scope of the present invention in any way. Efforts have been made to ensure accuracy with respect to numbers used (e.g., amounts, temperatures, etc.), but some experimental error and deviation should, of course, be allowed for.

The practice of the present invention will employ, unless otherwise indicated, conventional methods of protein chemistry, biochemistry, recombinant DNA techniques and pharmacology, within the skill of the art. Such techniques are explained fully in the literature. See, e.g., T. E. Creighton, *Proteins: Structures and Molecular Properties* (W.H. Freeman and Company, 1993); A. L. Lehninger, *Biochemistry* (Worth Publishers, Inc., current addition); Sambrook, et al., *Molecular Cloning: A Laboratory Manual* (2nd Edition, 1989); *Methods In Enzymology* (S. Colowick and N. Kaplan eds., Academic Press, Inc.); *Remington's Pharmaceutical Sciences,* 18th Edition (Easton, Pennsylvania: Mack Publishing Company, 1990); Carey and Sundberg *Advanced Organic Chemistry* $3^{rd}$ *Ed.* (Plenum Press) Vols A and B (1992).

Example 1: Microbe Isolation, Bacteria and Fungi

Plant-based and fermented foods are rich sources of diverse microbes. A microbial library was developed that contains microbes from these sources as they represent an untapped potential source of novel beneficial microbes. Vegetables typically eaten raw and fermented foods were selected for isolation of microbes of interest. The materials were sourced at the point of distribution in supermarkets selling both conventional and organic farmed vegetables, either washed and ready to eat or without washing. The samples were divided into 50 g portions, thoroughly rinsed with tap water and blended for 30 seconds on use of a coarse and then a fine sieve followed by filtration through a 40 µm sieve. The sieved samples from each food source were stored with a cryoprotectant, for example 10% DMSO, as Solarea Bio plants (SBPs).

For DNA extraction, the cell suspension containing the plant microbiota, chloroplasts and plant cell debris was centrifuged at slow speed for removing plant material and the resulting supernatant was centrifuged at high speed to pellet microbial cells. The pellet resuspended in a buffer containing a proprietary plant cell lysis buffer consisting of chelating agents such as EDTA or Versetene EDTA-based chelating agents to remove divalent ions and a suitable non-ionic detergent such as Tween-20, Tween 80, Triton X, and washed then with PBS. DNA was extracted using the MagaZorb DNA extraction kit (Promega). DNA quality and concentration were measured using Nanodrop and Picogreen fluorescent quantification. DNA libraries were built using the Nextera XT library preparation kit (Illumina) and DNA sequencing was performed using an Illumina HiSeqX instrument using a 2×150 bp flow cell. Raw paired-end reads were processed for quality control with Solexa QA 56 for trimming and removing of Illumina adaptors using a Phred score>20 and minimum fragment length of 50 bp. Taxonomic annotation at the species level of the microbial community for each sample was metagenome using k-mer analysis with kraken2 (Table 3). SBPs were sampled and inoculated into media that would facilitate the growth of certain types of organisms to generate Solarea Bio enrichments (SBEs). As examples, cultivation with plant filtrates or acetate enriched broth can enrich for microbes capable of growth on plant substrates or low pH-tolerant microbes.

The sieved samples were also diluted and plated onto media that is non-selective, such as tryptic soy agar, or plated on media that is selective for a given microbial type. For example, fungi can be isolated from a sample by plating on a medium such as potato dextrose agar with added chlorotetracycline to prevent bacterial growth. Likewise, bacteria can be isolated away from yeast by added selective agents such as cycloheximide to the medium.

Single colonies were then selected and purified by sequential streak isolations or single cell sorting by FACS to generate Solarea Bio isolates (SBIs). These isolates were then assigned a preliminary identification by 16S rDNA or ITS sequencing (Table 4) for bacteria or fungi respectively, before in depth sequencing analysis.

Example 2: Sequencing: Genomic, RNA, Protein

The highest throughput method of determining microbial therapeutic potential begins with bioinformatic analyses. Through sequencing of isolated microbial candidates, it is possible to identify microbes with potentially beneficial phenotypes.

Whole-genome sequencing: whole-genome sequencing was performed using the Oxford Nanopore and Illumina systems. Microbes grown in pure culture were centrifuged at 4000×rpm for 10 min to remove supernatant. Genomic DNA was isolated from microbial pellets via column-based commercial genomic isolation kits, such as the Zymo Quick-DNA miniprep plus kit. DNA quality and concentration were measured using Nanodrop and Picogreen fluorescent quantification. DNA libraries were built using the Nextera Flex library preparation kit (Illumina) and the Nanopore Genomic DNA by Ligation kit (SQK-LSK110). DNA sequencing was performed using an Illumina MiSeq instrument using a 2×250 bp flow cell and the MinION Oxford Nanopore device. Illumina raw paired-end reads were processed for quality control with Solexa QA (Cox et al. 2010) for trimming and removing of Illumina adaptors using a Phred score>20 and minimum fragment length of 50 bp. Quality-filtered reads were de novo assembled using IDBA-UD (Peng et al. 2012) with pre-corrections and the percent of contamination and genome completeness were assessed based on recovery of lineage-specific marker genes using CheckM (Parks et al. 2015). Nanopore raw sequencing data was converted into a nucleic acid sequence through the "guppy_basecaller" command line software. Library barcodes were removed, and individual reads were separated by source through the "porechop" demultiplexing tool (https://github.com/rrwick/Porechop). Following demultiplexing, assembly of contigs was preformed through the "flye" assembly tool v1.8 (Kolmogorov et al. 2019) and assembly polish using Medaka v0.12.1 (https://github.com/nanoporetech/medaka). Error correction of the assembled contigs was performed using the Illumina sequencing reads with Pilon v1.23 (https://github.com/broadinstitute/pilon).

RNA sequencing: RNA transcripts from microbial candidates described above may also be sequenced. Microbes grown in pure culture are pelleted as above and the resulting pellet undergoes RNA extraction to isolate the total cellular RNA. RNA isolation is performed using a column-based commercial RNA isolation kit, such as the Zymo Research Quick RNA Microprep kit. Isolated RNA is then treated with DNAse to remove potential contaminating genomic DNA. Following DNAse inactivation at 65° C., the isolated RNA undergoes reverse transcriptase reactions, utilizing universal random primers to produce cDNA of specific products. These cDNA products are sequenced through Nanopore or Illumina based sequencing, as above.

Example 3: Annotation of Genomes

Once a microbial genome has been sequenced it is possible to determine its capacity to produce potentially therapeutic metabolites and compounds. Genome annotation was performed to determine the microbe's taxonomy and gene content. To determine the genes, present within each individual genome, the command line software tool, prokka, was used. The assembled contig information derived from genomic sequencing is input into prokka, which initially identifies the locations of all protein coding sequences, after which coding sequences are annotated as specific genes based on a database of all non-fragment Uniprot entries that have transcript evidence (Apeweiler et al., 2004). identified. To identify specific genes-of-interest that may not be annotated due to low homology, the BLAST+ command line application was used. A genes-of-interest database was constructed, which contains orthologous genes-of-interest from different species. A non-comprehensive list of genes within this database is included in Table 5. Genes-of-interest have included the gene pathways involved in short chain fatty acid (propionate and butyrate) biogenesis, indole (indole-3-acetic acid and indole propionic acid), Gamma-aminobutyric acid (GABA), surfactants (surfactin, nisin, fengycin, and iturin), dopamine, secondary bile acids, exopolysaccharide proteins (EPS), and omega 3 fatty acids biosynthesis.

Example 4: Identification of Enzymes Involved in Production of Immunomodulatory Compounds Microbes including bacteria and fungi are known to produce compounds with immunomodulatory and anti-inflammatory properties including but not limited to short chain fatty acids (SCFA), indoles and indole derivatives, anti-microbial compounds, neurotransmitters such as GABA, serotonin, and dopamine, extracellular polymeric substances (EPS), biosurfactants, secondary bile acids, and polyunsaturated fatty acids. To screen for these compounds in silico, enzyme commission (EC) numbers and amino acid reference sequences were identified for each potential biosynthetic pathway for the production of compounds of interest (Table 5). The genes-of-interest database was blasted against the amino acid sequences from the genomes with a 60% identity and 60% query aligned region threshold to identify potential homologs (Table 6).

Example 5: Expression Levels

The presence of genes associated with a beneficial metabolite offer significant predictive power for identifying potentially therapeutic microbes. However, it is important to determine the expression levels of these genes to confirm that the beneficial metabolite will actually be produced. Gene expression levels will be determined by quantitative reverse transcriptase polymerase chain reaction (qRT-PCR).

qRT-PCR is a standard laboratory technique wherein gene expression is quantified by direct measurement of RNA levels. Microbes grown in pure culture under a variety of conditions and media types. These pure cultures are pelleted by centrifugation at 4000×rpm for 10 min and the resulting pellet undergoes RNA extraction to isolate the total cellular RNA as described in Example 2. Additionally, RNA is DNAse treated as in Example 2. The isolated RNA undergoes reverse transcriptase reactions, utilizing universal random primers, to produce complementary DNA (cDNA) of the entire transcriptome. cDNA is then amplified through qPCR using primers specific to the gene-of-interest from Table 5 qPCR directly quantifies the amount of cDNA and thereby the starting quantity of the RNA transcript-of-interest, determining its expression levels.

Example 6: Measurement of Microbially Produced Compounds

The levels of microbially produced metabolites was examined in vitro. Individual microbes are grown in pure culture, after which the microbially conditioned supernatant were examined for different metabolites including short chain fatty acids, indole derivatives, antimicrobial compounds, and neurotransmitters. Additionally, the ability of microbes to produce extracellular polymeric substances was examined.

Short chain fatty acid quantification: Short chain fatty acids (SCFA) including acetate, propionate, and butyrate, are produced as a result of anaerobic bacterial fermentation of dietary fibers within the intestine and especially within the colon (Macfarlane et al., 2003). SCFAs have different modes of action on both local and systemic regulation of the immune system. SCFAs regulate and improve the intestinal barrier function by upregulation of the expression of tight junctions (Caffaratti et al., 2021). SCFAs also play an important role in T-cell functioning via regulation of G-protein-coupled receptors (GPCRs) and inhibition of histone deacetylase (HDAC) (Caffaratti et al., 2021). One of the most well described and potent anti-inflammatory properties of SCFAs is their capacity to promote regulatory T cells (Tregs) which suppress the activity of effector T cells (Postler et al., 2017). SCFA also inhibit the production of proinflammatory cytokines including TNF-α, IL-6, and IL-1β from intestinal macrophages to reduce local and systemic inflammation (Caffaratti et al., 2021). To measure short chain fatty acid production microbes were grown in pure culture under anaerobic conditions. The microbially conditioned supernatant was then examined by gas chromatography (GC) for the presence of acetate, butyrate, and propionate as previously described (Scortichini et al., 2020). Results for short chain fatty acid production from a selection of examined organisms can be found in Table 7.

Indole derivatives: In the intestine, tryptophan (Trp) can be metabolized into indole derivatives by the intestinal microbiota that can act as ligands for the aryl hydrocarbon receptor (AhR) in host cells to impact the immune response (Caffaratti et al., 2021, Postler et al., 2017). Indole derivatives including but not limited to indole, indole acetic acid (IAA), and indole propionic acid (IPA) can modulate the production of IL-22, an important mediator of intestinal homeostasis, as well as suppress the activation of NF-κB and proinflammatory cytokine production while simultaneously increase the production of or anti-inflammatory cytokines to reduce inflammation in the host (Gao et al., 2018). For example, in vitro studies have demonstrated the ability of indole to reduce TNF-α mediated activation of NF-κB, expression of the proinflammatory cytokine IL-8, and induce the production of the anti-inflammatory cytokine IL-10 in HCT-8 cells (Bansal et al., 2010). Thus, screeinging for microbes that produce indole metabolites will lead to the discovery of microbes with probiotic potential. To detect the presence of indole derivatives from microbes, conditioned supernatant was examined by both Kovacs and Salkowski tests, two standard biochemical tests that are commonly used to identify the presence of indole-containing compounds (Sethi et al., 2021). Results for indole derivative production from a selection of examined organisms can be found in Table 7.

Antimicrobial compounds: Antimicrobial compounds such as bacteriocins and antibacterial peptides serve multiple purposes including reducing pathogenic microbes associated with disease pathology and reducing the inflammatory response (Jenab et al., 2020). Bacteriocins such as microcin have been shown to increase the production of anti-inflammatory cytokines in intestinal cell lines co-treated with pathogenic *E. coli* and downregulating TNF through NF-κB inhibition (Yu et al., 2018). Further, bacteriocins produced by *Lactobacillus rhamnosus* with antibacterial effect showed significant inhibitory effects on *S. aureus* biofilm formation and decreased the level of the proinflammatory mediators, C Reactive Protein (CRP) and IL-6, in the serum following surgery (Zhou et al., 2017). The ability of potentially therapeutic microbes to produce of antimicrobial compounds, such as bacteriocins, will be determined in screening assays. Briefly, supernatant, conditioned by potentially therapeutic microbes, was incubated with potentially pathogenic microbes, for example: *Klebsiella pneumoniae* and *Porphyromonas gingivalis*. The growth of the potential pathogens was overtime through measurement of optical density. Through this system the production of antimicrobial compound by individual microbes was determined as previously described (Vijayakumar et al., 2015). Results for antimicrobial compound production from a selection of examined organisms can be found in Table 7.

Neurotransmitters: Microbially produced neurotransmitters including serotonin, gamma-aminobutyric acid (GABA), and dopamine affect host physiology and immunity through various mechanisms. Serotonin is synthesized from tryptophan (Trp) through a two-stage enzymatic reaction involving Trp hydroxylase and aromatic amino acid decarboxylase. In humans, approximately 90% of serotonin is located in the enterochromaffin cells of the GI tract where it promotes intestinal peristalsis (Gao et al., 2018). In an anti-inflammatory role, serotonin has been shown to induce T-cell differentiation into Tregs as well as promoting inflammatory Th17 cells to differentiate into Tregs. Th17 cells are an inflammatory T-cell that secrete IL-17 and have been implicated in autoinflammatory diseases including but not limited rheumatoid arthritis (Further, serotonin has been shown to reduce the production of IL-17 from Th17 cells and increase the production of IL-10 from Tregs, promoting an anti-inflammatory environment (Wan et al., 2020). GABA is an inhibitory neurotransmitter in the central nervous system, but also exerts important functions in the immune system. GABA has been shown to macrophage mediated inflammation, and induce the production of Tregs. GABA has also been shown to decrease IL-1β mediated inflammation and increase production of tight junctions in epithelial cells, improving intestinal barrier function (Caffaratti et al., 2021, Jin et al., 2011). Dopamine, a catecholamine, is abundantly present within the human intestinal tract in part due to microbial production (Sandrini et al., 2015). The bacterium *Enterococci faecalis* has been shown to produce the neurotransmitter dopamine from the metabolite, L-3,4 dihydroxyphenylalanine (L-dopa) (Villageliú et al., 2018). Furthermore, dopamine is recognized as a potent immunomodulatory compound (Pinoli et al., 2017; Jenab et al., 2020). Dopamine reduces systemic inflammation through inhibition of the NLRP3 inflammasome, a proinflammatory signaling cascade, associated with robust secretion of proinflammatory mediators (Yan et al., 2015). Dopamine was found to reduce neutrophil mediated reactive oxygen species production, and even inhibit neutrophil activation by the highly potent activator N-formyl-methionyl-leucyl-phenylalanine (Yamazaki et al., 1989). Additionally, treatment with dopamine receptor agonists has been shown to reduce the levels of the pro-inflammatory cytokines IL-6 and IL-8 in serum (Alduri et al., 2010). To screen for microbes that produce these neurotransmitters, microbially conditioned supernatant is quantified via ELISA, as previously described (An et al, 2020). Alternatively, high performance liquid chromatography (HPLC) can be used to quantify neurotransmitter production by potentially therapeutic microbes as has been described previously (Reinhoud et al., 2013).

Extracellular polymeric substances: Extracellular polymeric substances (EPS) are a diverse group of polymers composed mainly of polysaccharides, proteins, and DNA, that have been shown to have potent immunomodulatory effects (Costa et al., 2018, Jin et al., 2019). EPS producing strains have a variety of or health benefits for their hosts including anti-inflammatory, antioxidant, antitumor, and stress-tolerant effects (Jin et al., 2019). EPS from *Bacillus subtilis* has been shown to induce an anti-inflammatory M2 macrophage response to prevent T-cell mediated diseases (Paynich et al., 2017). EPS from *Bifidobacterium longum* decreases IFNγ, IL-12, TNF-α, IL-17, and IL-6 production and protects against the T-cell transfer model of colitis (Hsieh et al., 2020). EPS from *Faecalibacterium prausnitzii* decreases IFNγ and IL-12 while increasing IL-10 secretion through TLR-2 to attenuate the DSS model of colitis (Hsieh et al., 2020). These are just a few examples of the anti-inflammatory capabilities of microbially produced EPS. To screen for microbially produced EPS, microbes were grown on media containing the carbohydrate indicating dyes congo red or aniline blue. The presence of colorimetric changes within the microbial colony and the surrounding media indicates the presence of extracellular polymeric substances as demonstrated previously (Ruhmann et al., 2015). Results for EPS production from a selection of examined organisms can be found in Table 7.

Biosurfactants: Biosurfactants are a class of amphipathic molecule produced by microbes. In nature these substances improve nutrient solubility, which improves nutrient acquisition and absorption. In addition to their benefit to microbes biosurfactants have several features that make them potentially desirable compounds for probiotics (Jenab et al., 2020). Biosurfactants have been shown to have anti-inflammatory properties. The biosurfactant produced by *Bacillus licheniformis* VS16 has been shown to reduce the expression of pro-inflammatory cytokines, such as TNF-α and IL-1β, while also increasing the expression of the anti-inflammatory cytokines IL-10 and TGF-β (Giri et al., 2017). Additionally, surfactin, a biosurfactant produced by *Bacillus subtilis* has been shown to reduce the expression of the pro-inflammatory mediators IL-1β, iNOS, and TNF-α in LPS stimulated macrophages (Zhang et al., 2015).

Biosurfactant production by microbes are determined through two methods: blood agar lysis and lipid droplet spreading assays (Morikawa et al., 2000; Mulligan et al., 1984). Pure microbial cultures are grown on sheep blood agar. Agar will be checked daily for signs of hemolysis. Hemolysis indicates the potential presence of a biosurfactant (Mulligan et al., 1984). A lipid droplet spreading assay is utilized to confirm biosurfactant production by that microbe. A hemolysin positive microbial strain is grown in pure liquid culture. 10 μL of microbe-conditioned supernatant is applied to 40 mL of water overlain with a 10 μL layer of mineral oil. The presence of biosurfactants within the supernatant results in a zone of clearance around the applied supernatant. The diameter of clearance produced by this technique linearly correlates to the quantity of biosurfactant within the supernatant (Morikawa et al., 2000).

Secondary bile acids: Bile acids are sterol compounds produced by the human body to assist in the solubilization of lipids and other hydrophobic nutrients within the gastrointestinal tract. Select microbes have been shown to metabolize the human produced primary bile acids, cholic and chenodeoxycholic acid, into secondary bile acids, including but not limited to lithocholic and deoxycholic acid (Heinken et al., 2019). Secondary bile acids have been shown to have anti-inflammatory properties (Fiorucci et al., 2018). Anti-inflammatory properties/effects in a human subject include, but are not limited to reduction in symptoms of acute inflammation such as fever, fatigue, headaches, etc. and symptoms of chronic inflammation, such as, but not limited to, gastrointestinal complications (e.g., diarrhea or constipation), weight gain, weight loss, fatigue, persistent infection, cancer and/or stroke. Secondary bile acids are known to signal through both the FXR and TGR5 receptors. These receptors result in powerful immunoregulatory responses. FXR knockout mice have been shown to have increased expression of pro-inflammatory cytokines: IL-1β, IL-2, IL-6, TNF-a, and IFNγ (Fiorucci et al., 2018; Vavassori et al., 2009). Additionally, TGR5 agonism has been shown to reduce proinflammatory cytokine expression by IFNγ stimulated macrophages (Yoneno et al., 2013). Furthermore, it has been shown that FXR signaling reduces synthesis of the pro-inflammatory mediator prostaglandin E2, while bile acid signaling through TGR5 reduces activation of the NLRP3 inflammasome, a signaling cascade that would otherwise result in further inflammatory signals.

To determine and quantify microbial production of secondary bile acids signaling pathway induction and liquid chromatography-linked mass spectrometry (LC-MS) is utilized. Pure microbial culture is grown in liquid media in the presence of primary bile acids. Microbially-conditioned supernatants are then filtered to remove organisms. FXR- and TGR5-expressing epithelial cells are then incubated with supernatants. To determine FXR/TGR5 activation, and thus the presence of secondary bile acids, qRT-PCR, as previously described. Using primers specific to FXR/TGR5-controlled genes, such as the intestinal bile acid binding protein (IBABP) gene for FXR and caudal-type homeobox 2 (CDX2) for TGR5, the downstream signaling events and thus presence of secondary bile acids is determined (Wang et al., 2008; Ni et al., 2020). To differentiate and quantify secondary bile acids LC-MS is used. Microbes are grown in the presence of bile acids. The resulting supernatant is harvested and filtered. Supernatants are analyzed by LC-MS to identify and quantify any secondary bile acids that are produced by the microbe of interest.

Omega fatty acids: Omega-3 and omega-6 fatty acids are unsaturated fatty acids and precursor molecules for the eicosanoid family of immunomodulatory lipid mediators (Gutierrez S, 2019). This family of immunological signaling molecules includes prostaglandins and leukotrienes. These compounds are found in several forms which can be pro-inflammatory or anti-inflammatory. Omega-3 fatty acids, including eicosapentaenoic acid (EPA) and Docosahexaenoic acid (DHA) selectively induce the production of anti-inflammatory prostaglandins, while actively inhibiting the synthesis of the pro-inflammatory mediators prostaglandin E2 and leukotriene B4 (Kang et al., 2008). Conversely, omega-6 fatty acids, such as arachidonic acid, selectively induce the production of these same pro-inflammatory mediators. As such, the ratio of omega-3 to omega-6 fatty acids can be diagnostic in determining a microbe's inflammatory profile, where microbes that produce more omega-3 and less omega-6 acids are more anti-inflammatory (Bagga et al., 2003).

To detect, differentiate, and quantify omega fatty acids GC-FID is used. Pure microbial culture is cultivated in liquid culture. Microbial supernatant is collected and filtered to remove microbes. This supernatant is then analyzed by GC, which has the capability to detect, differentiate, and quantify the omega-3 and omega-6 fatty acids within the sample.

Example 7: In Vitro Testing of Single Organisms for Functionality

Following the in silico identification of organisms with therapeutic potential, it is vital to experimentally confirm the desired phenotypes. To develop probiotics with novel therapeutic potential, individual microbes are grown in pure culture. After which, these individual organisms are screened for the appropriate phenotype utilizing several culture-based assays. Microbes are screened directly for their ability to adhere to both mucus and mammalian epithelial cells. Microbially conditioned supernatant is examined for the presence of immunomodulating compounds.

Mucoadherence: Microbial adherence to the gastrointestinal tract is an important mechanism through which commensal microbes improve gut health. As all mucosal surfaces are covered in a layer of mucus, microbial microbe adherence to the mucus, hereafter referred to as mucoadherence, is the first important step in this process. It has been shown that probiotic mucoadherence competitively inhibits pathogen access to binding sites on mucosal surfaces (Walsham et al., 2016). Additionally, mucoadherence is thought to increase retention of probiotic microbes, increasing their potential to benefit the host (Han et al., 2021). To quantify mucoadherence, microbes were labeled with a live cell-compatible fluorescent dye, for example Sybr green. These microbes were then incubated in mucin conjugated plates. Total microbial fluorescence was measured via spectroscopy. Unbound bacteria were washed away and the fluorescence due to bound bacteria will be measured and used to calculate the percentage of total microbes that are bound to the mucin.

Epithelial adherence: In addition to mucoadherence the ability of microbes to bind to gut-derived epithelial cells was examined. Like mucoadherence, microbial adherence to epithelial cells has been shown to competitively inhibit epithelial adherence by pathogens, such as *Staphylococcus aureus, Escherichia coli*, and *Enterococcus faecium* (Monteagudo-Mera et al., 2019; Walsham et al., 2016; Zhang et al., 2015). Additionally, the close interaction between pro-biotic microbes and epithelial cells can induce immunological changes in the epithelial cell (Monteagudo-Mera et al., 2019). For example, it has been shown that *Lactobacillus rhamnosus* binding to epithelial cells is required to reduce IL-8 mRNA levels in Caco-2 cells, indicating that adherence is required for immunological modulation (Lebeer et al., 2012).

Caco-2 cells are gut-derived epithelial cells that have been used to study epithelial adherence by probiotic microbes (Grootaert et al., 2011) To determine the ability of microbes to bind to mammalian epithelial cells, microbes were incubated with confluent monolayers Caco-2 epithelial cells. Unbound microbes were then washed off. The epithelial cells were lysed, via a detergent-based lysis buffer, leaving viable bacteria. The surviving microbes were then quantified by plating, resulting in colony forming units (CFUs) bound to the monolayer, which was compared to the number of CFUs incubated in each well to determine the binding efficiency.

Immunomodulatory compounds: As described in Example 4 microbes were examined for their ability to produce metabolites known to be anti-inflammatory in the host. Strains that were positive for the production of these compounds are prioritized for testing of their anti-inflammatory functionality. To empirically test the immunomodulatory capacity of these prioritized strains in vitro, mammalian immune cells are treated with microbially conditioned supernatant. Human U937 cells are myelocyte lineage cells which can be differentiated into macrophage-like cells with ionophores, such as phorbol 12-myristate 13-acetate (PMA). PMA differentiated U937 macrophages are incubated with microbially conditioned supernatant. The subsequent immune response is analyzed by enzyme-linked immunosorbent assay (ELISA) and/or qRT-PCR to quantify the specific cytokines including but not limited to TNF-$\alpha$, IL-1$\beta$, IL-2, IL-3, IL-4, IL-5, IL-6, IL-7, IL-8, IL-9, IL-10, IL-12, IL-13, IL-15, IL-17, IL-21, IL-22, IL-23, IL-27 IFN$\gamma$, G-CSF, GM-CSF, IP-10, KC, LIF, LIX, MCP-1 that are produced in response to the microbial supernatant. Through examination of the pro- and anti-inflammatory cytokines that are produced by these immune cells the effect of the microbes of interest on the immune system is discerned.

Specific immunomodulatory pathways are also examined. The aryl hydrocarbon receptor (AHR) is receptor found on epithelial cells of the gastrointestinal tract that is known to induce anti-inflammatory immune signaling in response to indole derivatives and other microbial metabolites (Postler et al., 2017). Utilizing an AHR reporter system activation of this signaling pathway is examined as previously described (Marinelli et al., 2018). Microbially conditioned supernatant is produced as described in Example 7. This supernatant is then incubated with HT29 human cells containing an AHR luciferase reporter system, wherein the luciferase gene is under the control of an AHR controlled promoter. Supernatant that stimulates AHR signaling induces expression of the luciferase reporter gene. Luciferase activity is measured spectroscopically to quantify AHR signaling induced by the supernatant.

Other immunomodulatory pathways that are examined are the Toll-Like Receptor (TLR) pathways. TLRs are immunological receptors that detect specific microbial molecular patterns. In response to stimulation by their ligands, these receptors can promote pro- and anti-inflammatory responses. Of specific interest are the TLR heterodimers TLR1/TLR2 and TLR2/TLR6 and the homodimers TLR4 and TLR5. It has been shown that the TLR2-based heterodimers can induce the production of the anti-inflammatory cytokine, IL-10, upon binding to microbial cell wall components (Cario E, 2004; Jang S, 2004; Saraiva M, 2010; Nguyen B, 2020). Additionally, while TLR4 and TLR5 are often thought of as pro-inflammatory receptors, studies have indicated that TLR4 activation can lead to secretion of IL-10 resulting in the maturation of regulatory T cells to control the inflammatory response (Higgins S, 2003. Furthermore, TLR5 signaling is critical for maintenance of the epithelial barrier within the gastrointestinal tract. TLR5 activation by commensal bacteria has been shown to inhibit general inflammation within the gut. The loss of TLR5 expression from intestinal epithelial cells has been shown to increase inflammation and epithelial permeability within the gastro-intestinal tract (Vijay-Kumar et al., 2007, Chassaing et al., 2015). Reporter cell lines, such as the HEK-Blue TLR5 reporter line (Invivogen, San Diego, Ca), are used to demonstrate TLR signaling in response to microbial ligands. Microbes are grown in pure culture. These microbes or microbially-conditioned supernatant are used to treat human cells that contain a reporter gene has been placed under the control of a TLR controlled reporter. When the TLR becomes activated by a microbe or secreted microbial compound, the reporter gene is expressed producing a measurable result.

Example 8: DMA Formulation and In Vitro Testing of DMA Functionality

Microbes in nature generally interact with multiple other groups and form consortia that work in synergy, exchanging metabolic products and substrates resulting in thermodynamically favorable reactions as compared to the individual metabolism. For example, in the human colon, the process for plant fiber depolymerization, digestion and fermentation into butyrate is achieved by multiple metabolic groups working in concert. This type of synergy is reproduced in the DMA concept where strains are selected to be combined based on their ability to synergize to produce anti-inflammatory compounds when exposed to substrates such as plant fibers, tryptophan, or sucrose.

To experimentally describe the process of DMA validation the following method is applied to find candidates applicable for specific products:

Define a suitable habitat where microbes are with desirable attributes are abundant based on ecological hypotheses. For example, fresh vegetables are known to have anti-inflammatory effects when consumed in a whole-food plant-based diet, and therefore, it is likely they harbor microbes that can colonize the human gut.

Apply a selection filter to isolate and characterize only those microbes capable of a relevant function. For example, EPS production, mucoadherence and pathogen killing. In addition, strains need to be compatible with target therapeutic drugs.

Selected strains are then cultivated in vitro and their genomes sequenced at 100× coverage to assemble, annotate and use in predictive genome-wide metabolic models.

Predict microbial functions in silico and validate experimentally using the phenotypic methods described in Example 4.

Microbes with complementary or predicted synergistic functions are then combined. Drawing from the example strains in tables 6 and Y, a DMA could be assembled from microbes with complementary functions such as *Paraclostridium benzoelyticum* that produces abundant SCFAs but does not produce any other anti-inflammatory targets and *Exiguobacterium* sp., which produces IAA, inhibits pathogens, and produces EPS. Alternatively, microbes such as *Brevibacterium* sp. and *Exiguobacterium* sp. produce anti-pathogenic elements that could synergize to enhance pathogen killing. These two organisms belong to distinct phyla (actinobacteria and firmicutes respectively), meaning they likely harbor different antimicrobial products which may act via different, complementary mechanisms.

Test predicted synergistic combinations in the laboratory for validation. Single strains are grown to produce a biomass and the spent growth media removed after reaching late log or stationary phase. The washed cells are then combined in Defined Microbial Assemblages with 2-10 different strains per DMA and incubated using a culture media with prebiotic substances and precursors including but not limited to tryptophan, mono or oligosaccharides, fruit or vegetable powders that promote anti-inflammatory product formation.

Analyze the DMAs for their anti-inflammatory efficacy in the range of assays described in Examples 6 and 7 for synergistic effects produced by the combined assemblage as compared to the individual contributors.

Example 9: Preclinical Validation of DMA Efficacy

Aged Mice (Inflammaging)

Our lead candidate DMAs are evaluated for their therapeutic efficacy in a mouse model of aging-associated inflammation. All mice are group housed with 5 mice per cage in individually ventilated cages (IVCs) specifically designed for germ free husbandry. After an acclimation period, baseline samples of feces and blood are collected, and baseline measures of body mass are recorded. After baseline measures are recorded, 18-month-old C57bl/6J male and female are randomly divided into groups and administered by bi-daily oral gavage of water (negative control), or one of five test DMAs for a period of 6-weeks. Bi-weekly fecal samples are collected to monitor the functional and taxonomic composition of the gut microbiome over time. 1-week prior to sacrifice, fasted animals receive an oral gavage of FITC-dextran, and a blood sample will be collected 4-hours later to measure gut permeability. After the 6-week administration period, tissues are collected from each mouse for downstream analysis as follows.

Metagenomic analysis of fecal pellets: DNA from the fecal pellets are extracted using the ZymoBIOMICS DNA isolation kit (Zymo Research, CA) and the concentration are estimated using the Qubit 2.0 dsDNA high sensitivity assay (Invitrogen, CA). DNA libraries are prepared using the Illumina Nextera Flex library kit and an equimolar volume of each library will be pooled and sequenced on an Illumina NovaSeq S1 instrument (NovaSeq Control Software v1.7.5) on a 2×150 bp paired end run. Raw sequencing reads are processed using Solexa QA v3.1.7.1 (Cox et al., 2010) for trimming and removing of adaptors using a Phred score>20 and a minimum fragment size of 50 bp. Mouse DNA removal from the metagenomes is performed by mapping reads to the mouse reference genome GRCm38p6 using Bowtie2 v 2.4.2, with default parameters (Langmead and Salzberg, 2012).

Taxonomic classification of the short-read metagenomes are based on marker genes identified using MetaPhlAn2 (Segata et al., 2012), and organism abundances are calculated at different classification levels (species, genus, family). Functional profiling of microbial community members is performed using HUMAnN2 (Franzosa et al., 2018) and reference pathways databases including UniRef90 and ChocoPhlAn. The abundance of metabolic pathways in the gut microbiome are estimated using the HUMAnN2 output.

Gut permeability analysis: Following FITC-dextran administration to fasted mice, blood will be retro-orbitally collected after 4 hours, and fluorescence intensity will be measured on fluorescence plates using an excitation wavelength of 493 nm and an emission wavelength of 518 nm as previously described (Thevaranjan et al., 2017).

Circulating pro- and anti-inflammatory cytokine analysis: Blood is collected from each mouse into EDTA treated tubes at the time of sacrifice, and plasma is separated from cells. Cells are saved for peripheral blood mononuclear cell (PBMC) analysis. Plasma samples are analyzed by ELISA or Multiplex assay for circulating inflammatory cytokine levels including but not limited to CRP, TNF-α, IL-1β, IL-2, IL-3, IL-4, IL-5, IL-6, IL-7, IL-8, IL-9, IL-10, IL-12, IL-13, IL-15, IL-17, IL-21, IL-22, TL-23, IL-27 IFNγ, G-CSF, GM-CSF, IP-10, KC, LIF, LIX, MCP-1, M-CSF, MIG, MTP-1α, MIP-1β, MIP-2, MIP-3, RANTES, RANKL and VEGF as previously described (Schott et al., 2018).

Peripheral blood mononuclear cell (PBMC) analysis: PBMC populations are analyzed by flow cytometry as previously described (Rao et al., 2012). Anticoagulant treated blood undergoes density gradient centrifugation in Ficol to isolate PBMC populations from granulocytes, erythrocytes, and platelets. After which, PBMCS are washed thoroughly and resuspended in FACS buffer. Following resuspension cells undergo Fc (Constant Fragment) blocking to obstruct antibody binding to cellular Fc receptors. Cell suspensions are then treated with unique fluorescent antibodies that are specific for immunophenotyping markers. For instance, CD3 antibodies and CD19 antibodies would be used to label T and B cells, respectively. Through this process T cells, T cell subsets, B cells, monocytes, dendritic cells, phagocyte subsets, natural killer cells and other cellular populations, as deemed relevant, are analyzed.

Bone marrow and splenic immune cell analysis: Bone marrow aspirates and spleens are collected for immune cell phenotyping by flow cytometry and RNAseq as previously described (Tyagi et al., 2018). Upon collection, samples are split in half and either flash frozen for RNA analysis or immediately processed for flow cytometry. Samples are processed for flow cytometry as described for PBMCs, with the addition that spleens are homogenized either mechanically or enzymatically prior to washing and resuspension in FACS buffer.

Colonic tissue isolation for RNA and protein analysis: Two cm sections of proximal colonic tissue and two cm sections of terminal ileum tissue are isolated, split in half, and flash frozen for RNA and protein evaluation of tight junctions and claudins, critical mediators of gut barrier integrity, as well as inflammatory cytokine levels including but not limited to TNF-α, IL-17, IFNγ and IL-1β. RNA is extracted and analyzed by qRT-PCR, and protein is extracted and evaluated by ELISA and/or western blot as previously described for the aforementioned proteins of interest (Li et al., 2016).

Rheumatoid Arthritis

Our lead candidate DMAs are evaluated for their therapeutic efficacy in a mouse model of rheumatoid arthritis (RA) called the collagen-induced arthritis model (CIA) as well as in a delayed type hypersensitivity model. For a prototypical CIA mouse model study, all mice are group housed with 3-5 mice per cage in individually ventilated cages (IVCs) specifically designed for germ free husbandry. Adult male and female DBA/1 mice are randomly allocated to experimental groups and allowed to acclimate for two weeks. After an acclimation period, baseline samples of feces and blood are collected, and baseline measures of body mass are recorded. On Day 0, animals are administered by subcutaneous injection with 100 microliters of an emulsion containing 100 micrograms of type II collagen (CII) in incomplete's Freund's adjuvant supplemented with 4 mg/mil *Mycobacterium tuberculosis* H37Ra. On Day 21, animals are administered by subcutaneous injection with a booster emulsion containing 100 μg of type II collagen in incomplete Freund's adjuvant. Beginning from day −14 and continuing through day−45 (end of experiment), mice are administered by bi-daily oral gavage of water (negative control) or one of five test DMAs. From Day −14 until the end of the experiment on Day 45, animals are weighed three times per week. From Day 21 until the end of the experiment, animals are scored three times per week for clinical signs of arthritis to include swelling of the hind- and front paws, radio-carpal (wrist) joints and tibio-tarsal (ankle) joints. At the end of the experiment on day 45, mice are euthanized, and tissues are collected from each mouse for downstream analysis as follows.

Circulating pro- and anti-inflammatory cytokine analysis: Blood is collected from each mouse into EDTA treated tubes at the time of sacrifice, and plasma is separated from cells. Cells are saved for peripheral blood mononuclear cell (PBMC) analysis. Plasma samples are analyzed by ELISA or Multiplex assay for circulating inflammatory cytokine levels including but not limited to CRP, TNF-α, IL-1β, IL-2, IL-3, IL-4, IL-5, IL-6, IL-7, IL-8, IL-9, IL-10, IL-12, IL-13, IL-15, IL-17, IL-21, IL-22, IL-23, IL-27 IFNγ, G-CSF, GM-CSF, IP-10, KC, LIF, LIX, MCP-1, M-CSF, MIG, MIP-1α, MIP-1β, MIP-2, MIP-3, RANTES, RANKL and VEGF, as previously described (Schott et al., 2018).

Peripheral blood mononuclear cell (PBMC) analysis: PBMC populations are analyzed by flow cytometry as previously described (Rao et al., 2012). Anticoagulant treated blood undergoes density gradient centrifugation in Ficol to isolate PBMC populations from granulocytes, erythrocytes, and platelets. After which, PBMCS are washed thoroughly and resuspended in FACS buffer. Following resuspension cells undergo Fc (Constant Fragment) blocking to obstruct antibody binding to cellular Fc receptors. Cell suspensions are then treated with unique fluorescent antibodies that are specific for immunophenotyping markers. For instance, CD3 antibodies and CD19 antibodies would be used to label T and B cells, respectively. Through this process T cells, T cell subsets, B cells, monocytes, dendritic cells, phagocyte subsets, natural killer cells and other cellular populations, as deemed relevant, are analyzed.

Bone marrow and splenic immune cell analysis: Bone marrow aspirates and spleens are collected for immune cell phenotyping by flow cytometry and RNAseq as previously described (Tyagi et al., 2018). Upon collection, samples are split in half and either flash frozen for RNA analysis or immediately processed for flow cytometry. Samples are processed for flow cytometry as described for PBMCs, with the addition that spleens are homogenized either mechanically or enzymatically prior to washing and resuspension in FACS buffer.

Colonic tissue isolation for RNA and protein analysis: Two cm sections of proximal colonic tissue and two cm sections of terminal ileum tissue are isolated, split in half, and flash frozen for RNA and protein evaluation of tight junctions and claudins, critical mediators of gut barrier integrity, as well as inflammatory cytokine levels including but not limited to TNF-α, IL-17, IFNγ and IL-1β. RNA is extracted and analyzed by qRT-PCR, and protein is extracted and evaluated by ELISA and/or western blot as previously described for the aforementioned proteins of interest (Li et al., 2016).

Metagenomic analysis of fecal pellets: DNA from the fecal pellets are extracted using the ZymoBIOMICS DNA isolation kit (Zymo Research, CA) and the concentration are estimated using the Qubit 2.0 dsDNA high sensitivity assay (Invitrogen, CA). DNA libraries are prepared using the Illumina Nextera Flex library kit and an equimolar volume of each library will be pooled and sequenced on an Illumina NovaSeq S1 instrument (NovaSeq Control Software v1.7.5) on a 2×150 bp paired end run. Raw sequencing reads are processed using Solexa QA v3.1.7.1 (Cox et al., 2010) for trimming and removing of adaptors using a Phred score>20 and a minimum fragment size of 50 bp. Mouse DNA removal from the metagenomes is performed by mapping reads to the mouse reference genome GRCm38p6 using Bowtie2 v 2.4.2, with default parameters (Langmead and Salzberg, 2012).

Taxonomic classification of the short-read metagenomes are based on marker genes identified using MetaPhlAn2 (Segata et al., 2012), and organism abundances are calculated at different classification levels (species, genus, family). Functional profiling of microbial community members is performed using HUMAnN2 (Franzosa et al., 2018) and reference pathways databases including UniRef90 and ChocoPhlAn. The abundance of metabolic pathways in the gut microbiome are estimated using the HUMAnN2 output.

Histopathology: At the end of the experiment, hind paws are stored in tissue fixative. Samples are transferred into decalcification solution, and tissue samples are processed, sectioned, and stained with Haematoxylin & Eosin. Sections are scored by a qualified histopathologist, blind to the experimental design, for signs of arthritis to include inflammation, articular cartilage damage and damage to the underlying metaphyseal bone. A detailed scoring system is used (see below). Data will be graphed (Mean±SEM). Raw and analysed data will be provided as well as representative pictures.

TABLE 9

Histopathology Scoring System

| Type | Grade | Description |
|---|---|---|
| Inflammation | 0 | Normal Joint |
| Inflammation | 1 | Mild synovial hyperplasia with inflammation dominated by neutrophils. Low numbers of neutrophils and macrophages in joint space |
| Inflammation | 2 | Synovial hyperplasia with moderate to marked inflammation involving both neutrophils and macrophages. Neutrophils and macrophages in joint space; may be some necrotic tissue debris |
| Inflammation | 3 | Synovial hyperplasia with marked inflammation involving both neutrophils and macrophages. Loss of synoviocyte lining Inflammation may extend from synovium to surrounding tissue including muscle. Numerous neutrophils and macrophages in joint space, together with significant necrotic tissue debris |
| Articular cartilage damage | 0 | Normal joint |
| Articular cartilage damage | 1 | Articular cartilage shows only mild degenerative change Early pannus formation may be present peripherally. |
| Articular cartilage damage | 2 | Articular cartilage shows moderate degenerative change and focal loss. Pannus formation is present focally |
| Articular cartilage damage | 3 | Significant disruption and loss of articular cartilage with extensive pannus formation |
| Damage to the underlying metaphyseal bone | 0 | Normal joint |
| Damage to the underlying metaphyseal bone | 1 | No change to underlying metaphyseal bone |
| Damage to the underlying metaphyseal bone | 2 | May be focal necrosis or fibrosis of metaphyseal bone. |
| Damage to the underlying metaphyseal bone | 3 | Disruption or collapse of metaphyseal bone. Extensive inflammation, necrosis or fibrosis extending to medullary space of the metaphysis |

Delayed Type Hypersensitivity Model of RA:

In addition to the collagen-induced arthritis mouse model of RA study described above, a delayed type hypersensitivity study for RA is conducted in mice, and is conducted as follows. The studies are conducted in a BSL-1, quarantined room. Mice are acclimated to the facility for 1 week followed by an additional 2 week acclimation with bedding mixing to normalize microbiomes across cages. Fecal microbiome samples are collected 1-2 days prior to mBSA treatment #1. At 8 weeks of age (day 0), animals receive an intra-plantar mBSA (methylated Bovine Serum Albumin) challenge or PBS/Complete fruend's adjuvent (Control) in the right hindpaw. At 8 weeks of age (day 0), immediately following mBSA, animals are treated with either DMAs (twice daily) or Dexamethasone (Dex) 5 mg/kg (once daily). Treatment with DMA or Dex is continued until day 8. Mice receiving DMAs are only gavaged in the morning on day 8. On day 8, mice receive an intra-plantar mBSA challenge or PBS/CFA (control) in the right hind paw after Dex or DMA treatment. Paw swelling is measured on day 9. At the end of the study, the following samples/tissues shown in Table 9.1 are collected and further characterized as described above.

TABLE 9.1

| Organ/material | Storage | Application |
|---|---|---|
| Blood | Plasma: −80° C. | Cytokine profiling |
| Fecal pellet | −80° C. | Shotgun metagenomics |
| Spleen | Half flash frozen, half splenocyte prep and cyropreserved | Immune cell profiling: Flow |
| mBSA injected paw | 10% formalin | Histopathology, Immunostaining |

DMAs are identified that reduce paw inflammation and reduce pro-inflammatory cytokine secretion/detection in blood and injected paw samples.

Periodontal Disease (Systemic Delivery)

Our lead candidate DMAs are evaluated for their therapeutic efficacy in a mouse model of periodontal disease. All mice are group housed with 5 mice per cage in individually ventilated cages (IVCs) specifically designed for germ free husbandry. After an acclimation period, mice are randomly divided into groups, baseline samples of feces, oral microbiome swab, and blood are collected, and baseline measures of body mass are recorded. On Day 0, periodontitis is induced in 12-month-old C57bl/6J male and female mice using the well described ligature induced periodontal disease model (Aghaloo et al., 2011). Briefly, a sterile wire ligature is placed around the crown of the right first maxillary molar to induce the disease process. Immediately following induction of periodontitis, mice begin bi-daily administration by oral gavage with water (negative control) or one of five test DMAs for a period of 8-weeks. Weekly fecal and oral microbiome samples are collected to monitor the functional and taxonomic composition of the gut and oral microbiome over time. After the 8-week administration period, tissues are collected from each mouse for downstream analysis as follows.

Metagenomic analysis of fecal pellets: DNA from the fecal pellets are extracted using the ZymoBIOMICS DNA isolation kit (Zymo Research, CA) and the concentration are estimated using the Qubit 2.0 dsDNA high sensitivity assay (Invitrogen, CA). DNA libraries are prepared using the Illumina Nextera Flex library kit and an equimolar volume of each library will be pooled and sequenced on an Illumina NovaSeq S1 instrument (NovaSeq Control Software v1.7.5) on a 2×150 bp paired end run. Raw sequencing reads are processed using Solexa QA v3.1.7.1 (Cox et al., 2010) for trimming and removing of adaptors using a Phred score>20 and a minimum fragment size of 50 bp. Mouse DNA removal from the metagenomes is performed by mapping reads to the mouse reference genome GRCm38p6 using Bowtie2 v 2.4.2, with default parameters (Langmead and Salzberg, 2012).

Taxonomic classification of the short-read metagenomes are based on marker genes identified using MetaPhlAn2 (Segata et al., 2012), and organism abundances are calculated at different classification levels (species, genus, family). Functional profiling of microbial community members is performed using HUMAnN2 (Franzosa et al., 2018) and reference pathways databases including UniRef90 and ChocoPhlAn. The abundance of metabolic pathways in the gut microbiome are estimated using the HUMAnN2 output.

Metagenomic analysis of oral microbiome samples: Bacterial DNA extraction is performed using commercially available DNA purification kit (Epicentre MasterPure™) according to manufacturer's guidelines and the DNA concentration will be estimated using the Qubit 2.0 dsDNA high sensitivity assay (Invitrogen, CA). DNA library preparation, sequencing, and analysis is carried out as described above.

Circulating pro- and anti-inflammatory cytokine analysis: Blood is collected from each mouse into EDTA treated tubes at the time of sacrifice, and plasma is separated from cells. Cells are saved for peripheral blood mononuclear cell (PBMC) analysis. Plasma samples are analyzed by ELISA or Multiplex assay for circulating inflammatory cytokine levels including but not limited to CRP, TNF-α, IL-1β, IL-2, IL-3, IL-4, IL-5, IL-6, IL-7, IL-8, IL-9, IL-10, IL-12, IL-13, IL-15, IL-17, IL-21, IL-22, IL-23, IL-27 IFNγ, G-CSF, GM-CSF, IP-10, KC, LIF, LIX, MCP-1, M-CSF, MIG, MIP-1α, MIP-1β, MIP-2, MIP-3, RANTES, RANKL and VEGF as previously described (Schott et al., 2018).

Peripheral blood mononuclear cell (PBMC) analysis: PBMC populations are analyzed by flow cytometry as previously described (Rao et al., 2012). Anticoagulant treated blood undergoes density gradient centrifugation in Ficol to isolate PBMC populations from granulocytes, erythrocytes, and platelets. After which, PBMCS are washed thoroughly and resuspended in FACS buffer. Following resuspension cells undergo Fc (Constant Fragment) blocking to obstruct antibody binding to cellular Fc receptors. Cell suspensions are then treated with unique fluorescent antibodies that are specific for immunophenotyping markers. For instance, CD3 antibodies and CD19 antibodies would be used to label T and B cells, respectively. Through this process T cells, T cell subsets, B cells, monocytes, dendritic cells, phagocyte subsets, natural killer cells and other cellular populations, as deemed relevant, are analyzed.

Bone marrow and splenic immune cell analysis: Bone marrow aspirates and spleens are collected for immune cell phenotyping by flow cytometry and RNAseq as previously described (Tyagi et al., 2018). Upon collection, samples are split in half and either flash frozen for RNA analysis or immediately processed for flow cytometry. Samples are processed for flow cytometry as described for PBMCs, with the addition that spleens are homogenized either mechanically or enzymatically prior to washing and resuspension in FACS buffer.

Colonic tissue isolation for RNA and protein analysis: Two cm sections of proximal colonic tissue and two cm sections of terminal ileum tissue are isolated, split in half, and flash frozen for RNA and protein evaluation of tight junctions and claudins, critical mediators of gut barrier integrity, as well as inflammatory cytokine levels including but not limited to TNF-α, IL-17, IFNγ and IL-1β. RNA is extracted and analyzed by qRT-PCR, and protein is extracted and evaluated by ELISA and/or western blot as previously described for the aforementioned proteins of interest (Li et al., 2016).

Micro-computed tomographic (μCT) scanning: To analyze amount of alveolar bone loss following ligature induced periodontal disease, jaw bones are imaged by μCT scanning at 16-μm resolution, and volumetric data are converted to DICOM format and imported Imaging software to generate 3D and multiplanar reconstructed images. To quantify the amount of bone loss induced by experimental periodontal disease, the imaged volume is oriented with the nasal cavity floor parallel to the horizontal plane and the midpalatal suture parallel to the midsagittal plane. Then the volume is angled such that the long axis of the distal root of the first molar and the mesial root of the second molar are vertical to the horizontal plane. Then the distance between the cementoenamel junction and the alveolar bone crest are measured at the center of D1 and M2. To quantitatively assess changes in the width of the buccal alveolar outline on axial slices, the imaged volume is oriented such that the floor of the nasal cavity is parallel to the horizontal plane and the midpalatal suture was parallel to the midsagittal plane. Then the shortest distance from the buccal surface of the root to the buccal outline of the alveolar ridge is measured for the mesial and distal roots of the first and second molars at the level of the hard palate.

Histopathology: Bones are decalcified in 14.5% EDTA (pH 7.2) for 4 weeks. Samples are then embedded in paraffin, and 5-μm-thick coronal sections at the interproximal area between the first and second maxillary molars are made. Thus each section includes a complete cross section through the entire maxilla, which allows a side-by-side comparison of the bone, teeth, and soft tissues from the ligature (right) and nonligature (left) sites. To quantify the area of osteonecrosis and periosteal thickness, hematoxylin, and eosin (H&E)-stained slides are digitally scanned using the Aperio XT automated slide scanner and the Aperio ImageScope Version 10 software (Aperio Technologies, Inc., Vista, CA, USA). Areas of osteonecrosis, defined as loss of more than five contiguous osteocytes with confluent areas of empty lacunae, are marked and the total area are calculated by the ImageScope software. The ruler tool in ImageScope is used to measure the greatest area of buccal periosteal thickness on both the ligature and nonligature sides. Numbers of empty and total osteocytic lacunae are counted manually on the digital whole-slide image over a 1-mm-long and 0.25-mm-wide area of bone (length and width measured with the ImageScope ruler tool) at the buccal alveolus adjacent to the D1 root.

Protein and cytokine analysis of periodontal tissue: Whole buccal and palatal tissues of maxillary molars are collected. RNA is extracted and analyzed by qRT-PCR as previously described (Glowackia et al., 2013), and protein is extracted and evaluated by ELISA and/or western blot as previously described for the cytokines and proteins of interest including but not limited to IL-10, TGF-$\beta$, TNF-$\alpha$, cytotoxic T lymphocyte antigen 4 (CTLA-4), and RANKL.

Periodontal Disease (Local Delivery)

Our lead candidate DMAs are evaluated for their therapeutic efficacy in a mouse model of periodontal disease. All mice are group housed with 5 mice per cage in individually ventilated cages (IVCs) specifically designed for germ free husbandry. After an acclimation period, mice are randomly divided into groups, baseline samples of feces, oral microbiome swab, and blood are collected, and baseline measures of body mass are recorded. On Day 0, periodontitis is induced in 12-month-old C57bl/6J male and female mice using the well described ligature induced periodontal disease model (Aghaloo et al., 2011). Briefly, a sterile wire ligature is placed around the crown of the right first maxillary molar to induce the disease process. Immediately following induction of periodontitis, mice begin bi-daily administration by brushing onto the oral site with water (negative control), or one of five test DMAs for a period of 8-weeks. Weekly fecal and oral microbiome samples are collected to monitor the functional and taxonomic composition of the gut and oral microbiome over time. After the 8-week administration period, tissues are collected from each mouse for downstream analysis as follows.

Metagenomic analysis of fecal pellets: DNA from the fecal pellets are extracted using the ZymoBIOMICS DNA isolation kit (Zymo Research, CA) and the concentration are estimated using the Qubit 2.0 dsDNA high sensitivity assay (Invitrogen, CA). DNA libraries are prepared using the Illumina Nextera Flex library kit and an equimolar volume of each library will be pooled and sequenced on an Illumina NovaSeq S1 instrument (NovaSeq Control Software v1.7.5) on a 2×150 bp paired end run. Raw sequencing reads are processed using Solexa QA v3.1.7.1 (Cox et al., 2010) for trimming and removing of adaptors using a Phred score>20 and a minimum fragment size of 50 bp. Mouse DNA removal from the metagenomes is performed by mapping reads to the mouse reference genome GRCm38p6 using Bowtie2 v 2.4.2, with default parameters (Langmead and Salzberg, 2012).

Taxonomic classification of the short-read metagenomes are based on marker genes identified using MetaPhlAn2 (Segata et al., 2012), and organism abundances are calculated at different classification levels (species, genus, family). Functional profiling of microbial community members is performed using HUMAnN2 (Franzosa et al., 2018) and reference pathways databases including UniRef90 and ChocoPhlAn. The abundance of metabolic pathways in the gut microbiome are estimated using the HUMAnN2 output.

Metagenomic analysis of oral microbiome samples: Bacterial DNA extraction is performed using commercially available DNA purification kit (Epicentre MasterPure™) according to manufacturer's guidelines and the DNA concentration will be estimated using the Qubit 2.0 dsDNA high sensitivity assay (Invitrogen, CA). DNA library preparation, sequencing, and analysis is carried out as described above.

Circulating pro- and anti-inflammatory cytokine analysis: Blood is collected from each mouse into EDTA treated tubes at the time of sacrifice, and plasma is separated from cells. Cells are saved for peripheral blood mononuclear cell (PBMC) analysis. Plasma samples are analyzed by ELISA or Multiplex assay for circulating inflammatory cytokine levels including but not limited to CRP, TNF-$\alpha$, IL-1$\beta$, IL-2, IL-3, IL-4, IL-5, IL-6, IL-7, IL-8, IL-9, IL-10, IL-12, IL-13, IL-15, IL-17, IL-21, IL-22, IL-23, IL-27 IFN$\gamma$, G-CSF, GM-CSF, IP-10, KC, LIF, LIX, MCP-1, M-CSF, MIG, MIP-1$\alpha$, MIP-1$\beta$, MIP-2, MIP-3, RANTES, RANKL and VEGF as previously described (Schott et al., 2018).

Peripheral blood mononuclear cell (PBMC) analysis: PBMC populations are analyzed by flow cytometry as previously described (Rao et al., 2012). Anticoagulant treated blood undergoes density gradient centrifugation in Ficol to isolate PBMC populations from granulocytes, erythrocytes, and platelets. After which, PBMCS are washed thoroughly and resuspended in FACS buffer. Following resuspension cells undergo Fc (Constant Fragment) blocking to obstruct antibody binding to cellular Fc receptors. Cell suspensions are then treated with unique fluorescent antibodies that are specific for immunophenotyping markers. For instance, CD3 antibodies and CD19 antibodies would be used to label T and B cells, respectively. Through this process T cells, T cell subsets, B cells, monocytes, dendritic cells, phagocyte subsets, natural killer cells and other cellular populations, as deemed relevant, are analyzed.

Bone marrow and splenic immune cell analysis: Bone marrow aspirates and spleens are collected for immune cell phenotyping by flow cytometry and RNAseq as previously described (Tyagi et al., 2018). Upon collection, samples are split in half and either flash frozen for RNA analysis or immediately processed for flow cytometry. Samples are processed for flow cytometry as described for PBMCs, with the addition that spleens are homogenized either mechanically or enzymatically prior to washing and resuspension in FACS buffer.

Colonic tissue isolation for RNA and protein analysis: Two cm sections of proximal colonic tissue and two cm sections of terminal ileum tissue are isolated, split in half, and flash frozen for RNA and protein evaluation of tight junctions and claudins, critical mediators of gut barrier integrity, as well as inflammatory cytokine levels including but not limited to TNF-$\alpha$, IL-17, IFN$\gamma$ and IL-1$\beta$. RNA is extracted and analyzed by qRT-PCR, and protein is extracted and evaluated by ELISA and/or western blot as previously described for the aforementioned proteins of interest (Li et al., 2016).

Micro-computed tomographic ($\mu$CT) scanning: To analyze amount of alveolar bone loss following ligature induced periodontal disease, jaw bones are imaged by $\mu$CT scanning at 16-$\mu$m resolution, and volumetric data are converted to DICOM format and imported Imaging software to generate 3D and multiplanar reconstructed images. To quantify the amount of bone loss induced by experimental periodontal disease, the imaged volume is oriented with the nasal cavity floor parallel to the horizontal plane and the midpalatal suture parallel to the midsagittal plane. Then the volume is angled such that the long axis of the distal root of the first molar and the mesial root of the second molar are vertical to the horizontal plane. Then the distance between the cementoenamel junction and the alveolar bone crest are measured at the center of D1 and M2. To quantitatively assess changes in the width of the buccal alveolar outline on axial slices, the imaged volume is oriented such that the floor of the nasal cavity is parallel to the horizontal plane and the midpalatal suture was parallel to the midsagittal plane. Then the shortest distance from the buccal surface of the root to the buccal outline of the alveolar ridge is measured for the mesial and distal roots of the first and second molars at the level of the hard palate.

Histopathology: Bones are decalcified in 14.5% EDTA (pH 7.2) for 4 weeks. Samples are then embedded in paraffin, and 5-µm-thick coronal sections at the interproximal area between the first and second maxillary molars are made. Thus each section includes a complete cross section through the entire maxilla, which allows a side-by-side comparison of the bone, teeth, and soft tissues from the ligature (right) and nonligature (left) sites. To quantify the area of osteonecrosis and periosteal thickness, hematoxylin, and eosin (H&E)-stained slides are digitally scanned using the Aperio XT automated slide scanner and the Aperio ImageScope Version 10 software (Aperio Technologies, Inc., Vista, CA, USA). Areas of osteonecrosis, defined as loss of more than five contiguous osteocytes with confluent areas of empty lacunae, are marked and the total area are calculated by the ImageScope software. The ruler tool in ImageScope is used to measure the greatest area of buccal periosteal thickness on both the ligature and nonligature sides. Numbers of empty and total osteocytic lacunae are counted manually on the digital whole-slide image over a 1-mm-long and 0.25-mm-wide area of bone (length and width measured with the ImageScope ruler tool) at the buccal alveolus adjacent to the D1 root.

Protein and cytokine analysis of periodontal tissue: Whole buccal and palatal tissues of maxillary molars are collected. RNA is extracted and analyzed by qRT-PCR as previously described (Glowackia et al., 2013), and protein is extracted and evaluated by ELISA and/or western blot as previously described for the cytokines and proteins of interest including but not limited to IL-10, TGF-β, TNF-α, cytotoxic T lymphocyte antigen 4 (CTLA-4), and RANKL.

*H. pylori*-Associated Gastritis

Our lead candidate DMAs are evaluated for their therapeutic efficacy in a mouse model of *Helicobacter pylori*-associated gastritis. All mice are group housed with 5 mice per cage in individually ventilated cages (IVCs) specifically designed for germ free husbandry. Adult male and female C57Bl/6J mice are randomly allocated to experimental groups and allowed to acclimate for two weeks. After an acclimation period, baseline samples of feces and blood are collected, and baseline measures of body mass are recorded. On Day 0, animals are infected three times over a 5-day period with a 0.1 ml volume containing $10^8$ *H. pylori* (Sydney strain, SS1) organisms. Two weeks following infection, mice are treated by bi-daily oral gavage of water (negative control), triple antibiotic therapy of omeprazole, metronidazole, and clarithromycin (positive control), or one of five test DMAs for a period of 2-weeks. Fecal samples are collected weekly for metagenomic analysis. All animals are sacrificed 36 hours after the cessation of treatment for assessment of bacterial colonization by rapid qPCR and histology.

Histology. One-half of each stomach is placed into 10% buffered formalin and processed in paraffin, and 4-um sections will be stained with a modified Steiner silver stain. Colonization is assessed on a five-point scale: 0, no bacteria; 1, less than ⅓ of crypts colonized with 1 to 10 bacteria; 2, ⅓ to ⅔ of crypts colonized with 10 to 20 bacteria; 3, ⅔ of the crypts colonized with >20 bacteria; and 4, all crypts colonized with >20 bacteria as previously described (Velduyzen van Zanten et al., 2003).

Confirmation of *H. pylori* eradication by quantitative PCR: A longitudinal strip of gastric tissue from the greater curvature is digested with proteinase K at 55° C. overnight, followed by DNA extraction. *H. pylori* colonization levels in gastric tissue is quantified by PCR with strain specific primers as previously described (Velduyzen van Zanten et al., 2003). Any sample detecting<10 copies of the *H. pylori* genome is considered negative for *H. pylori* colonization.

Inflammatory cytokine quantification by qRTPCR: A longitudinal strip of gastric tissue from the greater curvature is isolated, and RNA is extracted and analyzed by qRT-PCR as previously described (Velduyzen van Zanten et al., 2003) to quantify inflammatory cytokines in the stomach tissue including but not limited to TNF-α, IL-1β, and IFNγ.

Metagenomic analysis of fecal pellets: DNA from the fecal pellets are extracted using the ZymoBIOMICS DNA isolation kit (Zymo Research, CA) and the concentration are estimated using the Qubit 2.0 dsDNA high sensitivity assay (Invitrogen, CA). DNA libraries are prepared using the Illumina Nextera Flex library kit and an equimolar volume of each library will be pooled and sequenced on an Illumina NovaSeq S1 instrument (NovaSeq Control Software v1.7.5) on a 2×150 bp paired end run. Raw sequencing reads are processed using Solexa QA v3.1.7.1 (Cox et al., 2010) for trimming and removing of adaptors using a Phred score>20 and a minimum fragment size of 50 bp. Mouse DNA removal from the metagenomes is performed by mapping reads to the mouse reference genome GRCm38p6 using Bowtie2 v 2.4.2, with default parameters (Langmead and Salzberg, 2012).

Taxonomic classification of the short-read metagenomes are based on marker genes identified using MetaPhlAn2 (Segata et al., 2012), and organism abundances are calculated at different classification levels (species, genus, family). Functional profiling of microbial community members is performed using HUMAnN2 (Franzosa et al., 2018) and reference pathways databases including UniRef90 and ChocoPhlAn. The abundance of metabolic pathways in the gut microbiome are estimated using the HUMAnN2 output.

Example 10: DMAs Identified with Increased Short Chain Fatty Acids Production

Figure 17A:
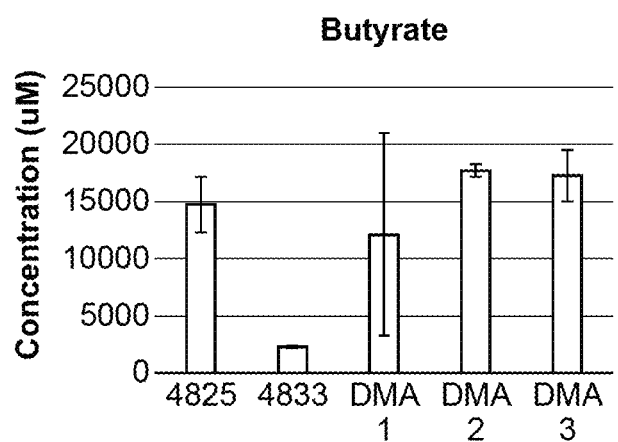
FIG. 17A is a graph depicting butyrate production of the indicated strains and DMAs.
Figure 17B:
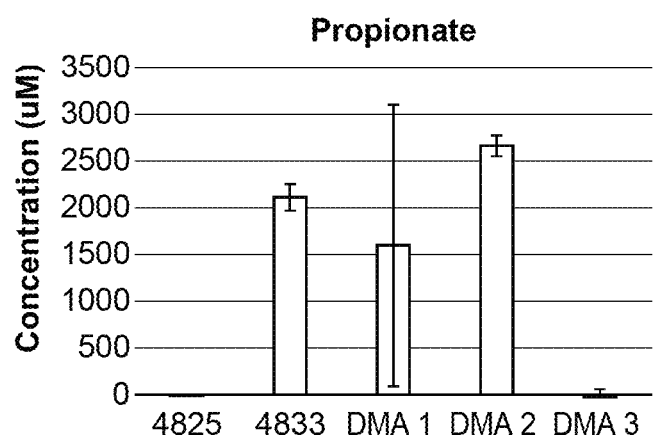
FIG. 17B is a graph depicting propionate production of the indicated strains and DMAs.

Individual strains and DMAs shown in Table 10 and Table 11 were screened for production of butyrate and propionate. For example, SBI4825 (*Clostridium* sp.) exhibited high levels of butyrate, and similar levels of butyrate were observed in DMAs 1, 2, and 3 (FIG. 17A). SBI4833 exhibited high levels of propionate (FIG. 17B). SBI4833 is present in DMAs 1 and 2, but not DMA 3. These results show that particular DMAs are capable of increased production of short chain fatty acids. SCFA data for all tested strains and DMAs are displayed in Table 7.

TABLE 10

Exemplary Strains in DMAs Selected for in vitro Characterization

| Isolate | Kingdom | Genus | Species |
|---|---|---|---|
| *SBS04254 | Bacteria | Lactobacillus | brevis |
| SBI00272 | Fungi | Hanseniaspora | occidentalis |
| *SBI04256 | Bacteria | Lactobacillus | casei |
| SBI4259 | Bacteria | Weisella | cibaria |
| SBS4263 | Fungi | Pichia | kudriavzevii |
| *SBS2335 | Bacteria | Pediococcus | pentosaceus |
| *SBI4877 | Bacteria | Bacillus | velezensis |
| SBI4833 | Bacteria | Clostridioides | mangenotii |
| SBI4825 | Bacteria | Clostridium | sp. |
| SBI00449 | Bacteria | Exiguobacterium | sp. |
| SBI00951 | Bacteria | Paenibacillus | polymyxa |
| SBI00303 | Fungi | Meyerozyma | caribbica |
| *SBI4915 | Bacteria | Lactobacillus | pentosus |
| SBI04884 | Bacteria | Enterococcus | gilvus |
| *SBI00540 | Fungi | Hanseniaspora | uvarum |
| *SBI04881 | Bacteria | Lactobacillus | buchneri |
| *SBI04916 | Bacteria | Lactococcus | lactis |
| SBI04913 | Bacteria | Lactobacillus | harbinensis |

*Indicates species with Qualified Presumption of Safety (QPS) Status

TABLE 11

Exemplary DMAs selected for in vitro characterization
Defined Microbial Assemblage

| | | DMA 1 | DMA 2 | DMA 3 | DMA 4 | DMA 5 | DMA 6 | DMA 7 | DMA 8 | DMA 9 | DMA 10 | DMA 11 | DMA 12 |
|---|---|---|---|---|---|---|---|---|---|---|---|---|---|
| Anaerobe | SBI4825 | x | x | x | | | | | | | | | |
| | SBI4833 | x | x | | | | | | | | | | |
| Lactic Acid Bacteria | SBI4259 | | x | x | | | | | | x | | x | |
| | *SBS04254 | | | x | | x | x | x | | x | | | x |
| | *SBI04881 | | | | x | x | | | x | | | | x |
| | *SBS2335 | | | | | x | | | | | x | | x |
| | *SBI04916 | | | | | | x | | | | | | x |
| | SBI04913 | | | | | | x | | | x | | | |
| | SBI04884 | | | | | | | | x | | | | |
| | *SBI04256 | | | | | | | | | | | x | |
| Bacteria (Other) | SBI00951 | | | | x | | | | | | | x | |
| | *SBI4877 | | | | | x | x | | | | | x | |
| | SBI00449 | | | | | | | | x | | | | |
| Fungi | SBI00303 | x | | x | | | | | x | x | | | |
| | SBS4263 | x | | | | | | | | | | | |
| | SBI00272 | | | | x | | | | | | | | |
| | *SBI00540 | | | | | | | | x | | x | | |

*Indicates species with Qualified Presumption of Safety (QPS) Status trols were added at 10% to U937 cultures and co-incubated for 24 hours to induce cytokine production. U937 culture supernatants were removed and analyzed for lysis (Cytotox 96, Promega) and IL-10 and TNFα release by ELISA (PromoCell) per the manufacturers' protocols. Results as shown in Table 7 were compared to media and agonist (LPS) controls.

To examine the effect of whole microbes on cytokine production of macrophages, microbes were inoculated onto macrophage-like cells at an 1:1 bacterial:macrophage ratio and co-incubated for 8 hrs at 37° C. 5% $CO_2$. Supernatants from the cocultures were removed and analyzed for lysis (Cytotox 96, Promega) and IL-10, IL-6, IL-1b and TNFα release by ELISA (Thermo Fisher) per the manufacturers' protocols. Results as shown in Table 7 were compared to media and agonist (LPS) controls. Microbial titers were measured at the beginning and end of the experiment by dilution plating.

Figure 18:
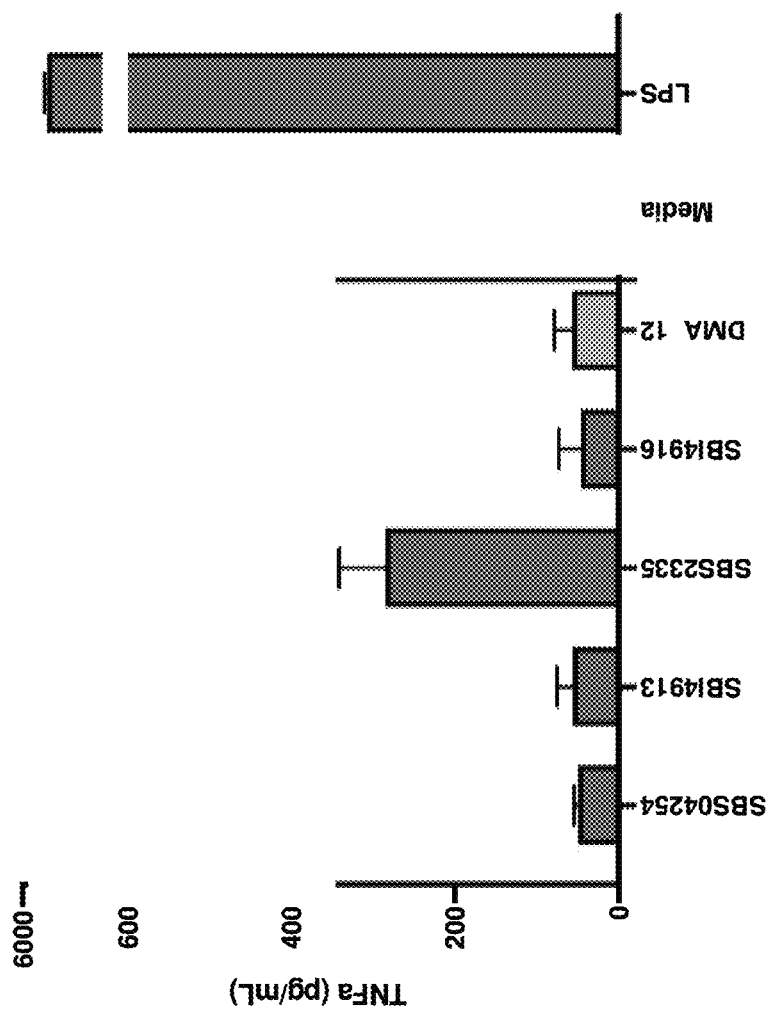
FIG. 18 is a graph depicting TNFα secretion of co-cultures of the indicated strains and DMAs with macrophage-like cells.

As shown in FIG. 18, for Tumor Necrosis Factor Alpha (TNFα), a proinflammatory cytokine associated with rheumatoid arthritis, unlike most DMAs, whole microbes of DMA12 stimulated less TNFα secretion than its constituent microbes when incubated with macrophages. These results show that particular DMAs can be effective to reduce proinflammatory cytokine secretion by macrophages.

Example 11: DMA 12 Exhibits Reduced TNFα Secretion

Individual strains and DMAs shown in Table 7 were screened for the ability to reduce secretion of cytokines when co-cultured with macrophages.

U937 monocyte cells were cultivated in suspension in RPMI medium containing 10% FBS, 1 mM Glutamine, 12.5 mM HEPES, 1× Anti-Anti (Gibco) at 37° C. 5% $CO_2$. Monocytes were differentiated into macrophage-like cells by the addition of 20 nM phorbol 12-myristate 13-acetate (PMA) for 72 hrs, at which the media was replaced with fresh medium without PMA, leaving adherent, differentiated macrophage-like cells. Experimentation proceeded 24 hrs after medium replacement.

To examine the effect of microbial supernatants on cytokine production of macrophages, bacteria and yeast were cultivated for 24-48 hours under nutrient, temperature, and oxygen conditions favorable for robust growth of each strain. Microbes were pelleted and culture supernatants were filter sterilized. Supernatants and cultivation medium con-

Example 12: Reductions in IL-8 in DMA 2 and DMA 6 vs. Constituent Microbes

Intestinal epithelial cells are the first cells to encounter microbes and contribute to the immune response. Epithelial cells can secrete Interleukin 8 (IL-8) and CXCL-1, two chemokines responsible for neutrophil recruitment to sites of inflammation. To investigate the ability of DMAs and strains to reduce the level of IL-8 in intestinal epithelial cells, DMAs shown in Table 7 were screened for stimulation of secretion of IL-8 and CXCL-1, when cultured with human colorectal adenocarcinoma epithelial cells (HT29 cells).

HT29 cells were cultivated in DMEM medium containing 10% 1 mM Glutamine, 1× Anti-Anti (Gibco) at 37° C. 5% $CO_2$. Microbes were inoculated onto epithelial cells at a 1:1 bacterial:macrophage ratio and co-incubated for 16 hrs at 37° C. 5% $CO_2$. Supernatants from the cocultures were removed and analyzed for lysis (Cytotox 96, Promega) and IL-8 and CXCL-1 release by ELISA (Thermo Fisher) per the manufacturers' protocols. Results were compared to media and agonist (LPS) controls. Microbial titers were measured at the beginning and end of the experiment by dilution plating.

Figure 19:
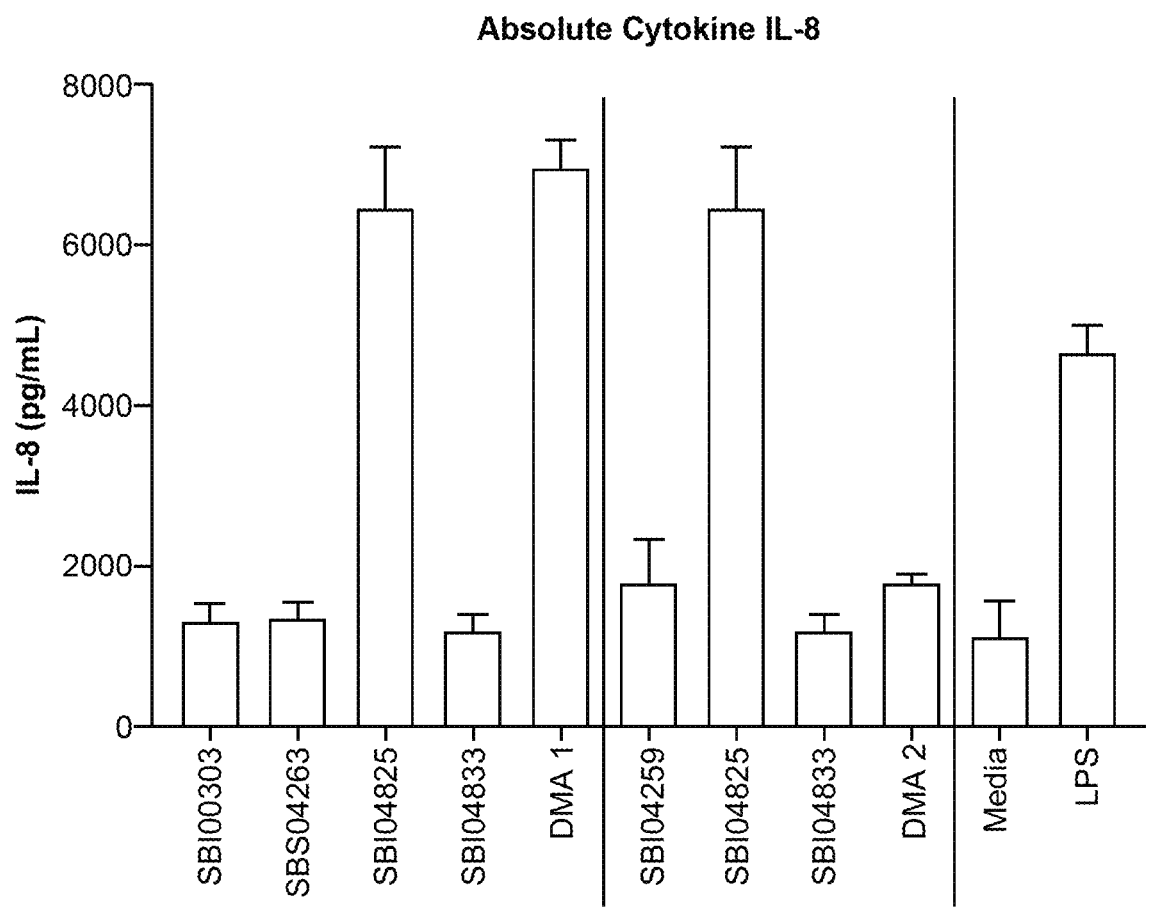
FIG. 19 is a graph depicting IL-8 secretion of co-cultures of the indicated strains and DMAs with intestinal epithelial cells.
Figure 20:
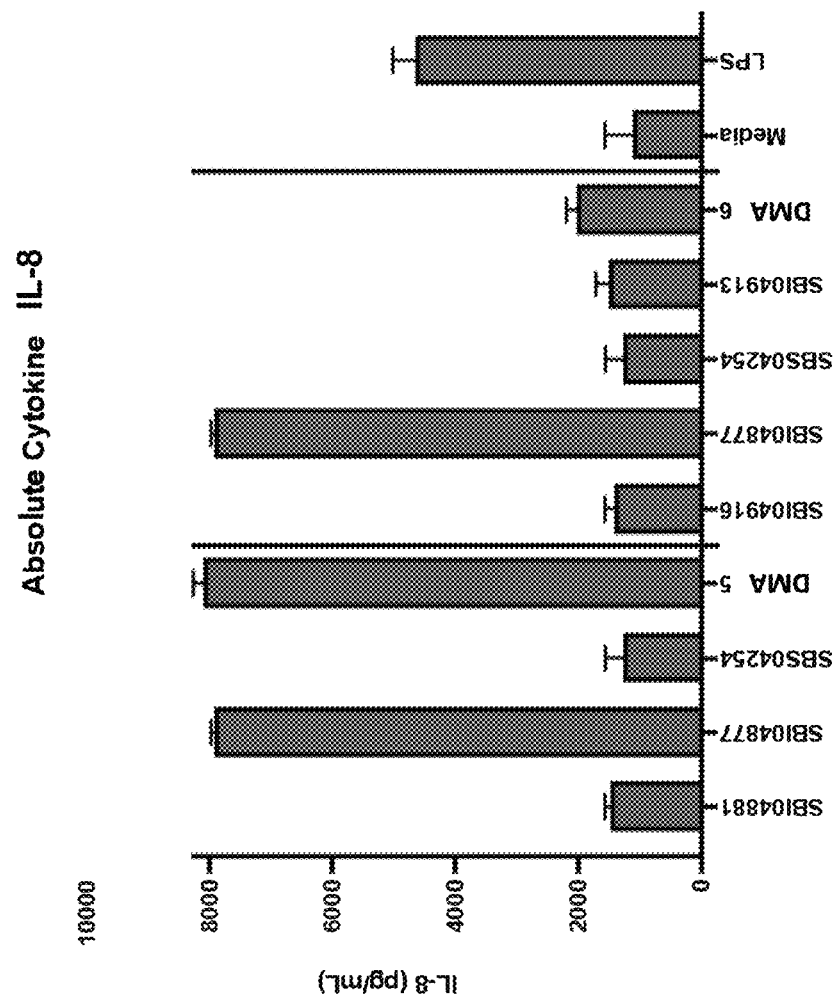
FIG. 20 is a graph depicting IL-8 secretion of co-cultures of the indicated strains and DMAs with intestinal epithelial cells.

The robust IL-8 response induced by SBI4825 was ameliorated in DMA 2 by other microbes present, but not in DMA1 (FIG. 19). The robust IL-8 response induced by SBI4877 was ameliorated in DMA 6 by other microbes present, but not in DMA5 (FIG. 20). These results show that particular DMAs can be effective to reduce proinflammatory cytokine secretion by intestinal epithelial cells.

Example 13: Synergy for GABA Production in DMA 5 and DMA 6

In addition to being beneficial for neurological, vascular, and musculoskeletal functioning, neurotransmitters can directly affect immune cells. DMAs shown in Table 7 were screened for secretion of GABA, a neurotransmitter derived from glutamate that has been shown to inhibit T cell responses and reduce proinflammatory cytokine secretion (FIG. 21).

To examine the ability of individual strains and DMAs to produce GABA, single microbial strains were grown for 24-48 hrs to achieve a high OD in brain heart infusion (BHI) or tryptic soy broth (TSB) for bacteria and potato dextrose broth (PDB) for yeast. Cultures were OD600 normalized to achieve a uniform density and inoculated (10% final volume) into TSB containing 0.1% added tryptophan and grown for 48 hrs. Culture supernatants were removed and analyzed by ELISA for GABA production (LS Bio) following the manufacturers' protocols.

Figure 21:
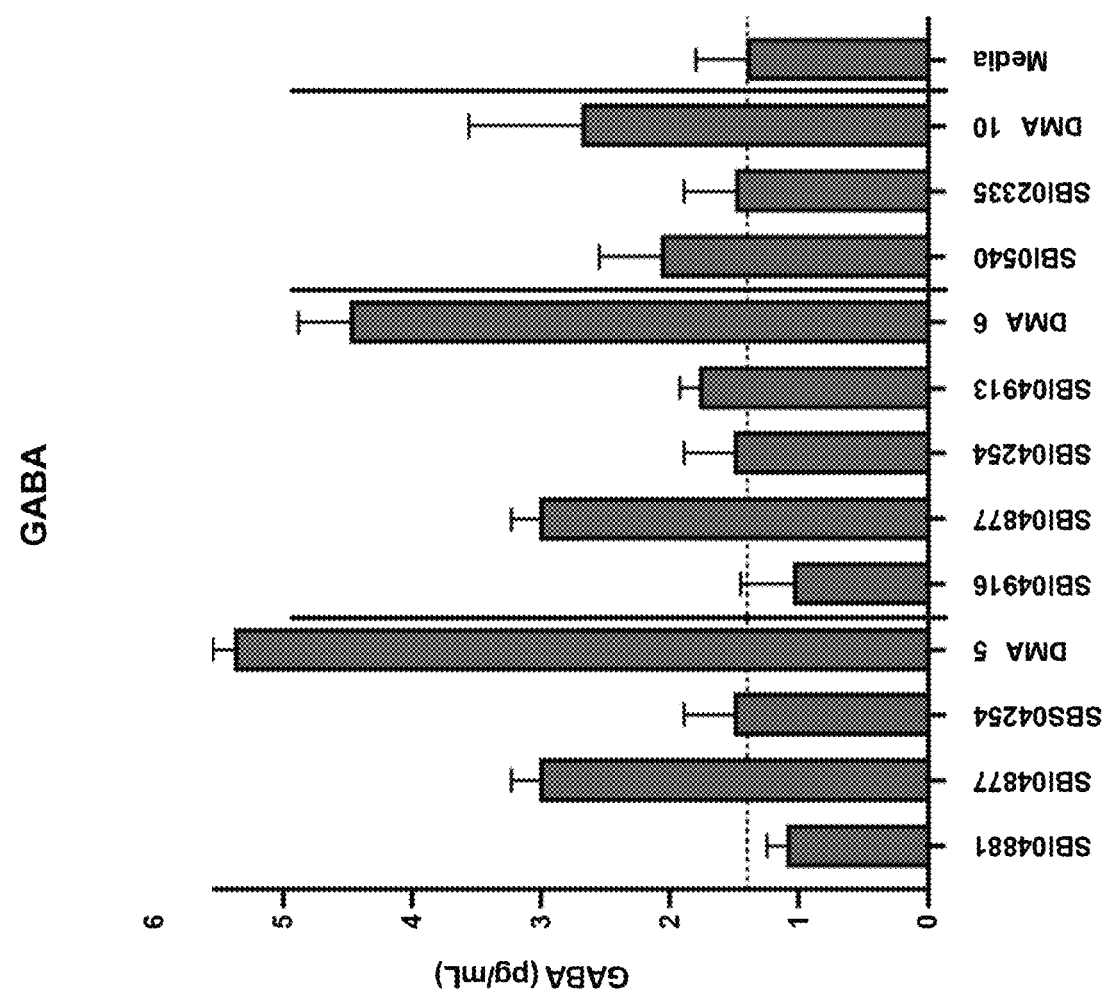
FIG. 21 is a graph depicting GABA production of the indicated strains and DMAs. Vertical lines separate each indicated DMA and strains that comprise each DMA are shown individually adjacent to the indicated DMA.

As shown in FIG. 21, increased levels of GABA were detected in DMA 5 and DMA 6. These results show that particular DMAs are capable of producing GABA neurotransmitter.

Example 14: Enhanced Serotonin Production in DMA3, DMA5, DMA6

DMAs shown in Table 7 were screened for secretion of serotonin, a neurotransmitter that reduces proinflammatory cytokine secretion by macrophages while modulating immune cell recruitment.

To examine the ability of individual strains and DMAs to produce serotonin, single microbial strains were grown for 24-48 hrs to achieve a high OD in brain heart infusion (BHI) or tryptic soy broth (TSB) for bacteria and potato dextrose broth (PDB) for yeast. Cultures were $OD_{600}$ normalized to achieve a uniform density and inoculated (10% final volume) into TSB containing 0.1% added tryptophan and grown for 48 hrs. Culture supernatants were removed and analyzed by ELISA for Serotonin (ENZO) following the manufacturers' protocols.

Figure 22:
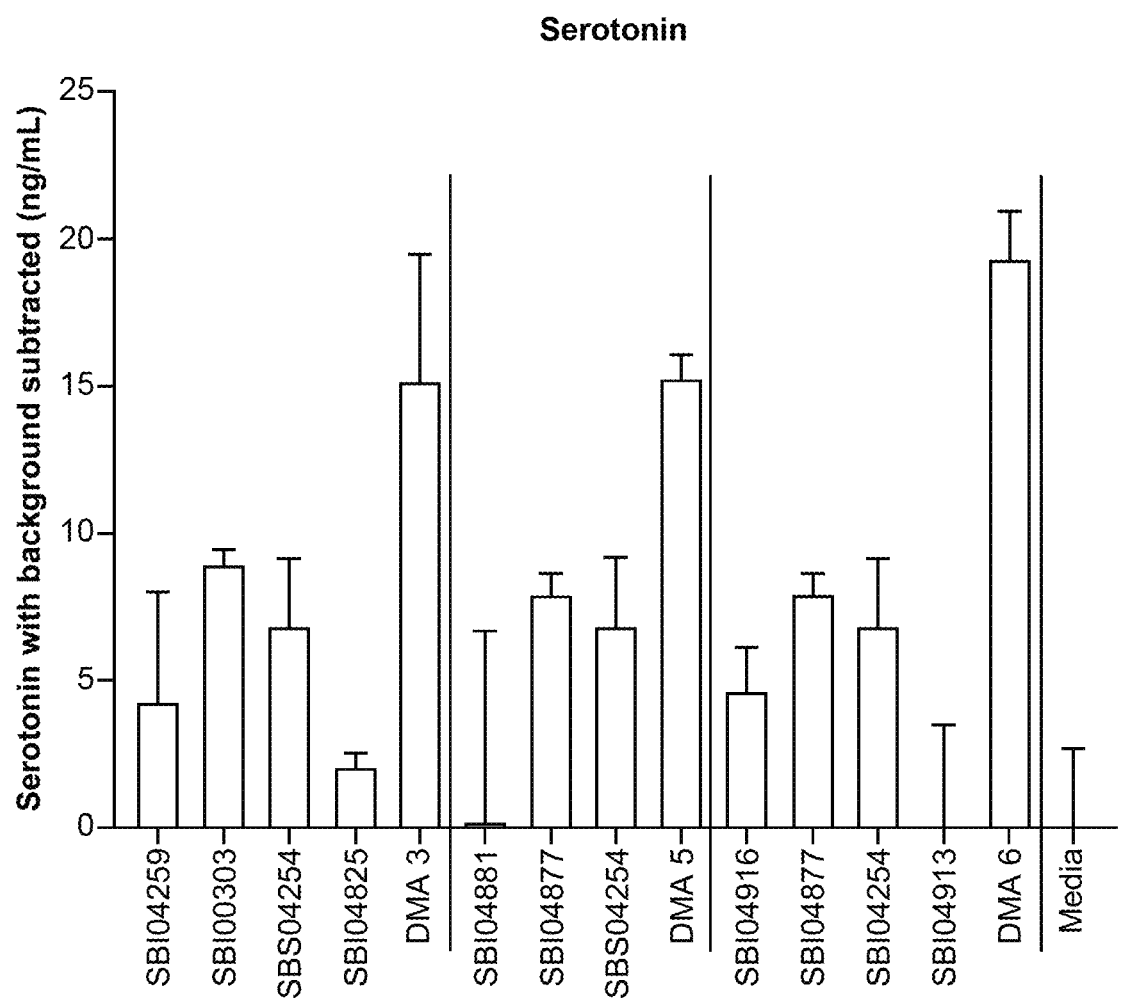
FIG. 22 is a graph depicting Serotonin production of the indicated strains and DMAs. Vertical lines separate each indicated DMA and strains that comprise each DMA are shown individually adjacent to the indicated DMA.

As shown in FIG. 22, increased levels of serotonin were detected in DMA 3, DMA 5, and DMA 6. These results show that particular DMAs are capable of producing serotonin neurotransmitter.

Example 15: Production of Serotonin by DMAs In Vitro

Figure 23:
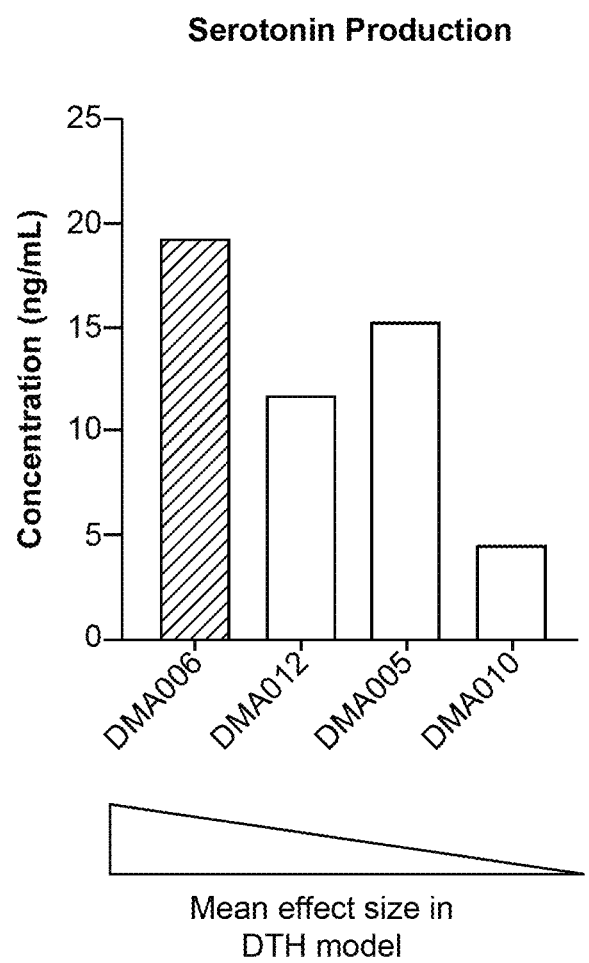
FIG. 23 is a graph depicting the concentration of serotonin produced in vitro by the indicated cultured DMAs.

To confirm the ability of DMAs to produce serotonin, DMAs were cultured in BHI medium and the amount of serotonin excreted in the culture medium was measured by ELISA. DMAs DMA005 (DMA 5), DMA006 (DMA 6), DMA010 (DMA 10), and DMA012 (DMA 12) were capable of producing serotonin. DMA006 (DMA 6) produced the largest amount of serotonin (FIG. 23). These results confirm that DMAs are capable of producing serotonin.

Figure 24:
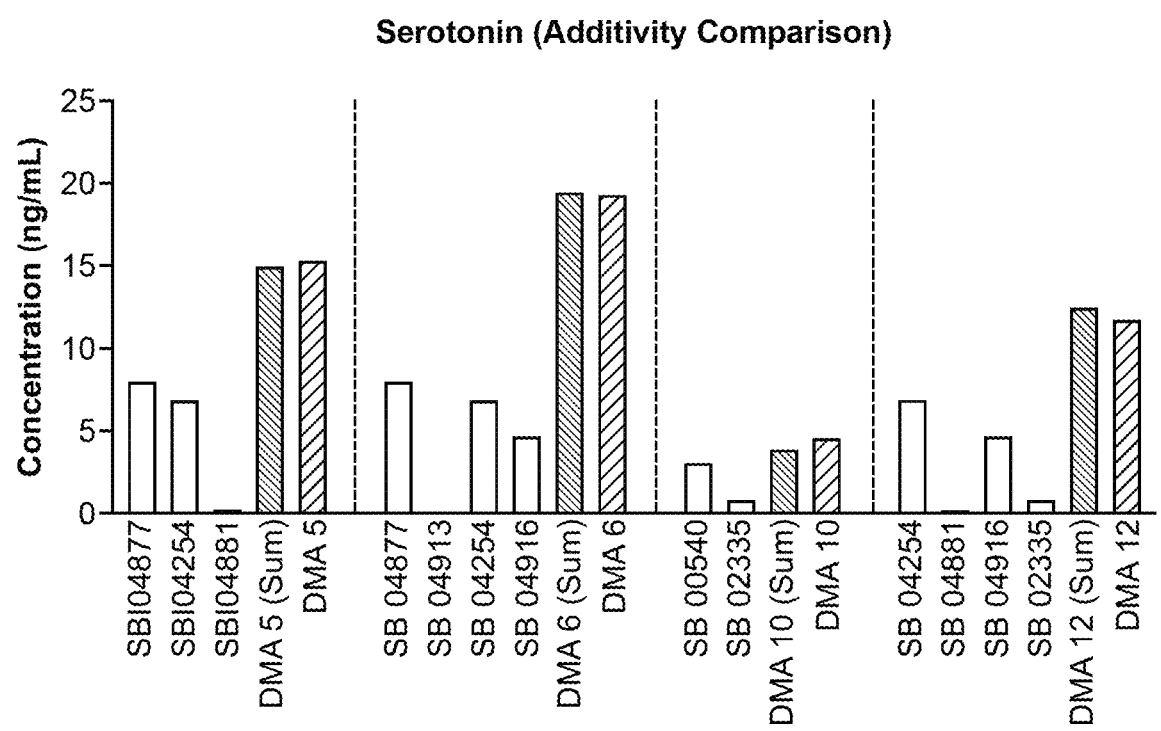
FIG. 24 is a graph depicting the concentration of serotonin produced in vitro by the indicated cultured individual strains of the DMAs, the sum of the serotonin produced of the individual stains ("sum") and the concentration of serotonin produced in vitro by the indicated cultured DMAs.

Individual strains of the DMAs were also cultured and the amount of serotonin was measured and compared to the serotonin of the strains cultured as the DMA (FIG. 24). The amount of serotonin produced by the individual strains comprising DMA005 (DMA 5), DMA006 (DMA 6), DMA010 (DMA 10) and DMA012 (DMA 12) was similar to the total sum of serotonin produced by the corresponding DMA. These results indicate that there is additivity of the serotonin produced by the individual strains when cultured as a DMA.

Figure 25:
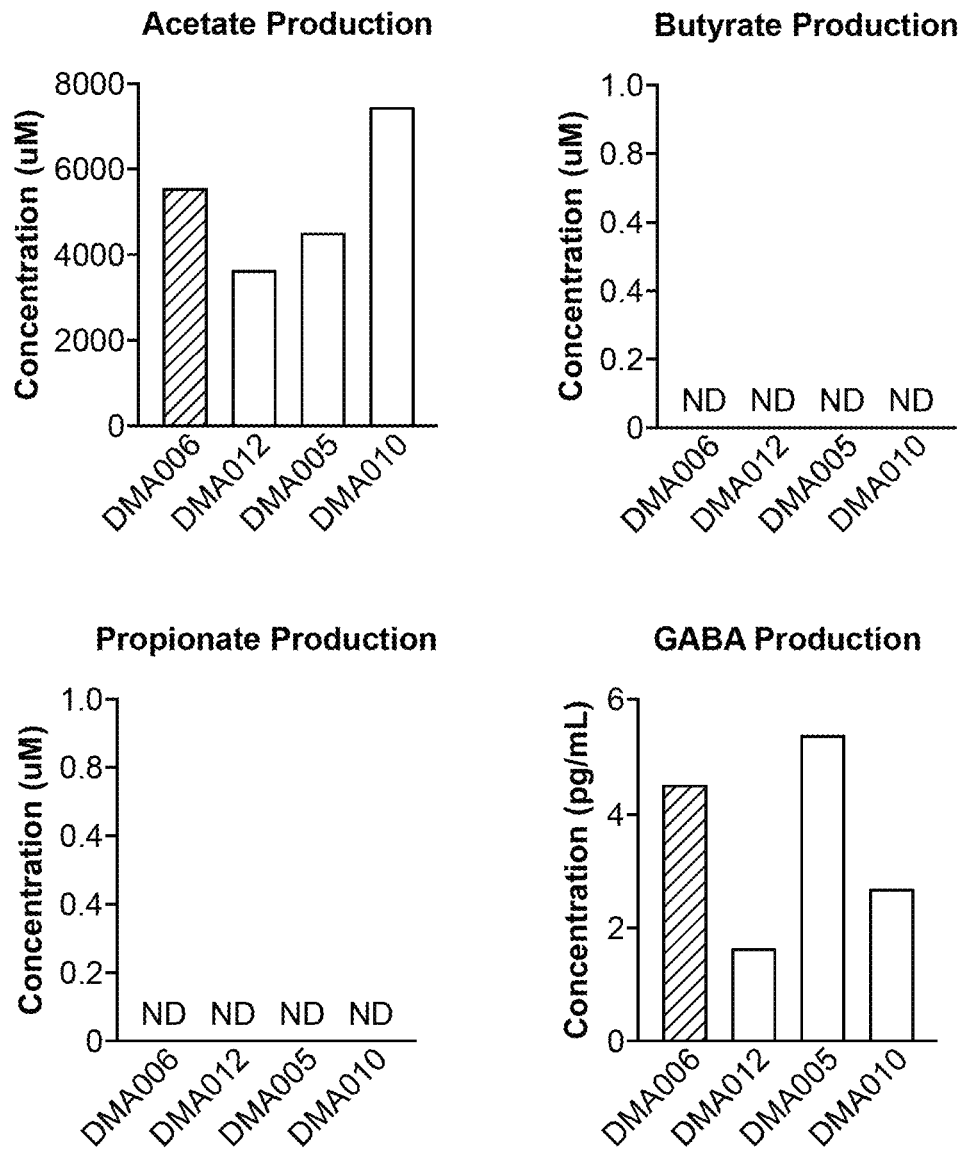
FIG. 25 are graphs depicting the concentration of metabolites: acetate (top left), butyrate (top right), propionate (bottom left) and GABA (bottom right), measured in the culture medium of the indicated DMAs cultured in vitro. "ND" indicates not detected.

Other metabolites were also measured for possible production by the DMAs in vitro, including acetate, butyrate, propionate, and GABA (FIG. 25).

Example 16: DMA Effects on Cytokine Production

Figure 26:
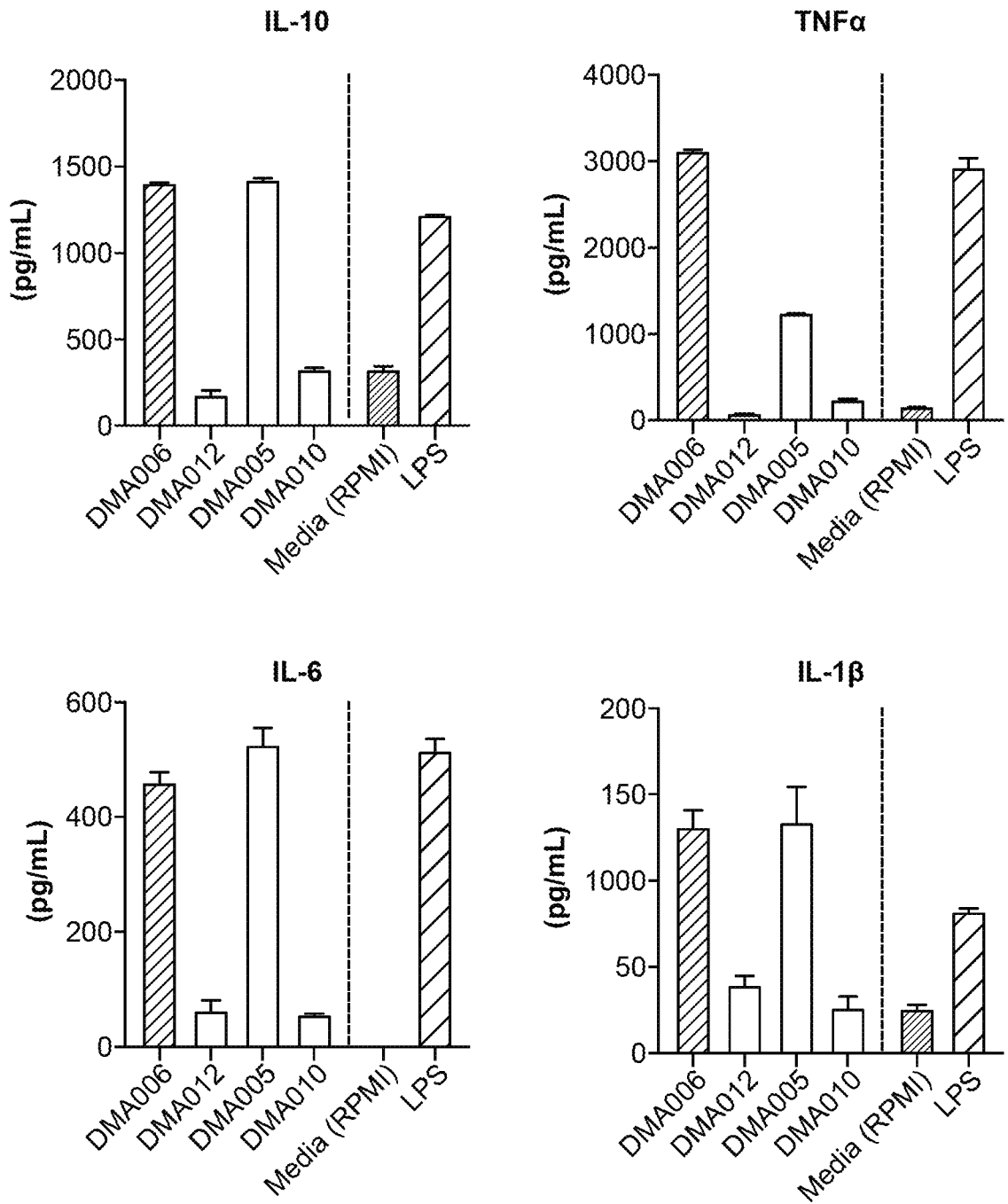
FIG. 26 are graphs depicting concentration of cytokines IL-1β, IL-6, IL-10 and TNFα in culture media of macrophages cultured in vitro with the indicated DMAs, medium alone (RPMI) or lipopolysacharride (LPS) positive control.

In order to confirm the ability of DMAs to modify cytokine production of immune cells, such as macrophages, DMAs were added to macrophages a a ratio of 4:1 (four microbes per one macrophage like cell and coincubated at 37° C., 5% $CO_2$ for eight hours, and cytokine production, such as interleukin (IL)-1β, IL-10, IL-6 and tumor necrosis factor alpha (TNFα) was measured by ELISA (FIG. 26). Macrophages cultured with DMA005 (DMA 5) or DMA006 (DMA 6) exhibited a robust production of IL-10, IL-6, and TNFα.

These results confirm that DMAs can modify cytokine production of immune cells, such as macrophages.

Figure 27:
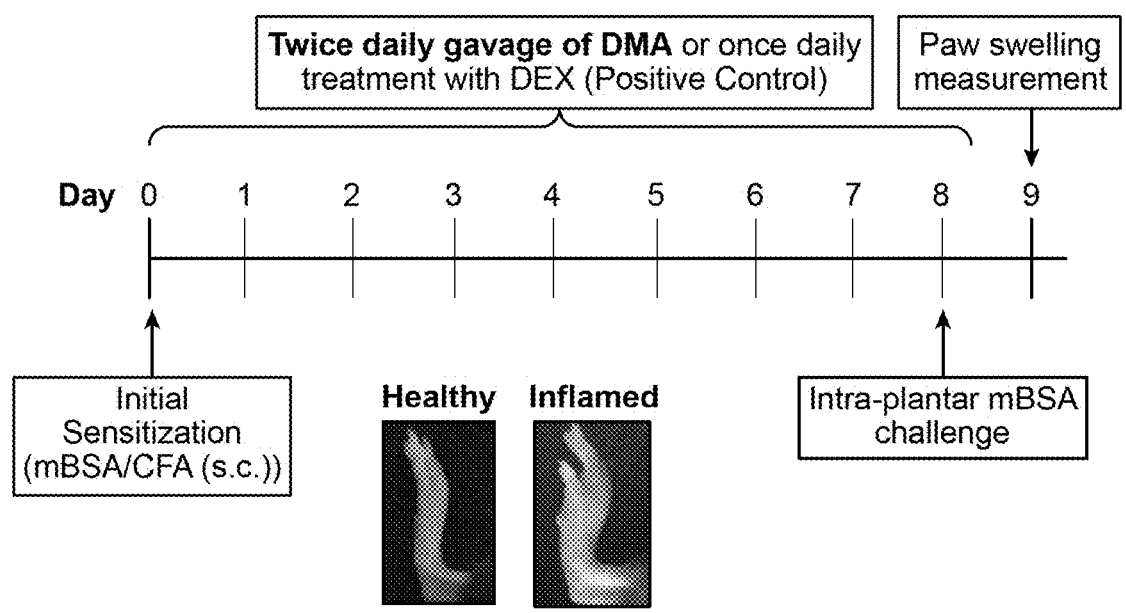
FIG. 27 is a diagram depicting the experimental design for a delayed type hypersensitivity (DTH) mouse model for testing DMAs in vivo. Images of exemplary healthy and unhealthy (inflamed) mouse paws are shown at bottom.

Example 17: Rapid Screening of DMAs in Delayed Type Hypersensitivity (DTH) Mouse Model of Inflammation For rapid screening of DMAs in animals for anti-inflammatory activity, a delayed type hypersensitivity (DTH) model of inflammation was employed. Briefly, 8-week old male mice were sensitized on Day-0 by subcutaneous injection of 1 mg/ml methylated bovine serum albumin (mBSA) and 1 mg/ml complete Freund's adjuvant (CFA). On Day-8, mice received a second challenge injection of 100 μg of BSA in 20 μL of PBS in the plantar surface of the left hind paw. The contra-lateral paw was injected with the same volume of saline alone. The relative swelling was calculated on Day-9 (FIG. 27). On days 0-8, DMAs were administered by oral gavage twice daily ($5 \times 10^9$ CFU per strain per administration) or a vehicle control. Dexamethasone was administered once daily as a positive control for reduction of paw swelling/inflammation. Paw swelling measurements were taken nine days after initial sensitization with mBSA/CFA.

Figure 28:
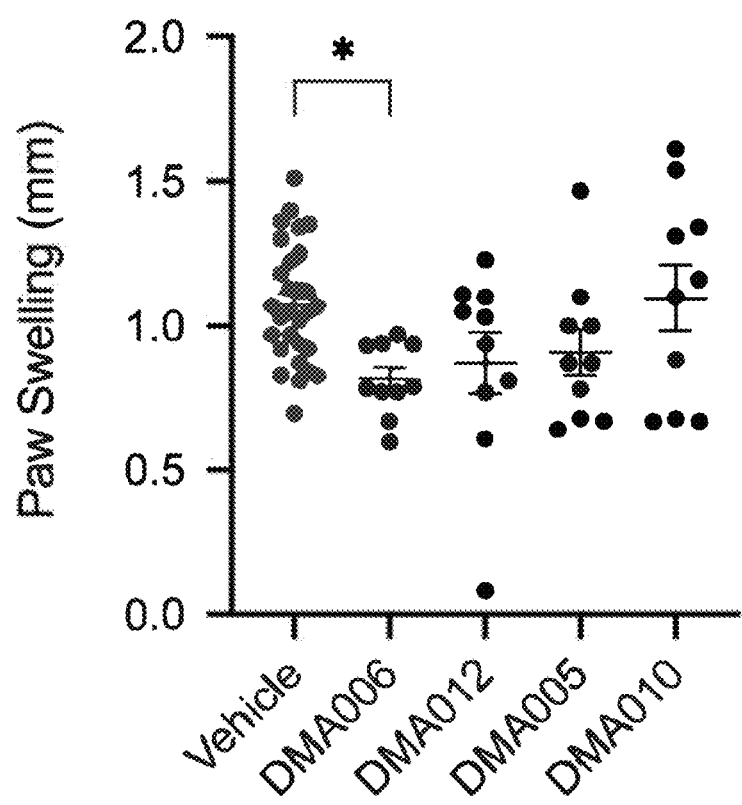
FIG. 28 is a graph depicting quantification of paw swelling in mice administered the indicated DMA compositions or vehicle control (water). Y-axis indicates paw swelling, measured by the difference between the injected (DTH) and uninjected (control) paw by calipers (mm)* p<0.05, One-way ANOVA with Dunnett's multiple comparisons test.

Exemplary DMAs listed in Table 12 were selected for screening of anti-inflammatory effects in the DTH model based on their ability to produce the immunomodulatory effectors serotonin, GABA, and acetate in vitro (FIG. 25 and FIG. 26), as well as their ability to modulate cytokine production by macrophages in vitro (production of IL-10, TNFα, IL-6, and/or IL-1β; Table 7). DMA006 (DMA 6) resulted in a significant reduction in paw swelling compared to vehicle control, ($p<0.05$, one-way ANOVA with Dunnett's multiple comparisons test), while DMA005 (DMA 5), DMA010 (DMA 10) and DMA012 (DMA 12) resulted in trends of reduced swelling (FIG. 28).

These results show that DMAs that produce the anti-inflammatory effector molecules serotonin, GABA, and acetate and that can modulate cytokine production by macrophages in vitro are able to ameliorate the inflammatory response in an animal model of delayed type hypersensitivity. These results also indicate that the effects on the inflammatory response are dependent on the composition of the DMAs and show that the DMA production of serotonin in vitro correlates with reduction of inflammation in vivo (FIG. 23).

TABLE 12

Exemplary DMAs tested in a delayed type hypersensitivity (DTH) mouse model of inflammation.

| Category | Strain | Genus | Species | DMA 5 | DMA 6 | DMA 10 | DMA 12 |
|---|---|---|---|---|---|---|---|
| Lactic Acid Bacteria | *SBS04254 | Lactobacillus | brevis | x | x |  | x |
|  | *SBI04881 | Lactobacillus | buchneri | x |  |  | x |
|  | *SBS2335 | Pediococcus | pentosaceus |  |  | x | x |
|  | *SBI04916 | Lactococcus | lactis |  | x |  | x |
|  | SBI04913 | Lactobacillus | harbinensis |  | x |  |  |
| Bacteria (Other) | *SBI4877 | Bacillus | velezensis | x | x |  |  |
| Fungi | SBI00303 | Meyerozyma | carribica |  |  |  |  |
|  | *SBI00540 | Hanseniaspora | uvarum |  |  | x |  |

*Indicates that the strain has Qualified Presumption of Safety (QPS) status.

Example 18: DMA Administration Delayed Onset of Arthritis in a Collagen-Induced Arthritis (CIA) Mouse Model In order to test and confirm DMAs effects for treatment of inflammation, a mouse model of collagen induced arthritis was used where collagen is administered to mice to induce arthritis. Exemplary defined microbial assemblages (DMAs) were examined for the ability to decrease paw swelling and clinical scores in the collagen induced arthritis mouse model. Mice were challenged with an initial collagen sensitization challenge on day 0 and a secondary challenge on day 21. Animals also received twice-daily gavage of exemplary DMAs (listed in Table 13, $2 \times 10^{10}$ CFU per strain per administration) or a vehicle control on days 14-42. An additional control group of animals received methotrexate injections three-times weekly on days 21-42 (positive control). Paw swelling was measured using calipers, and clinical scores were determined by observation of the animals. FIG. 29 displays the study design.

Figure 30A:
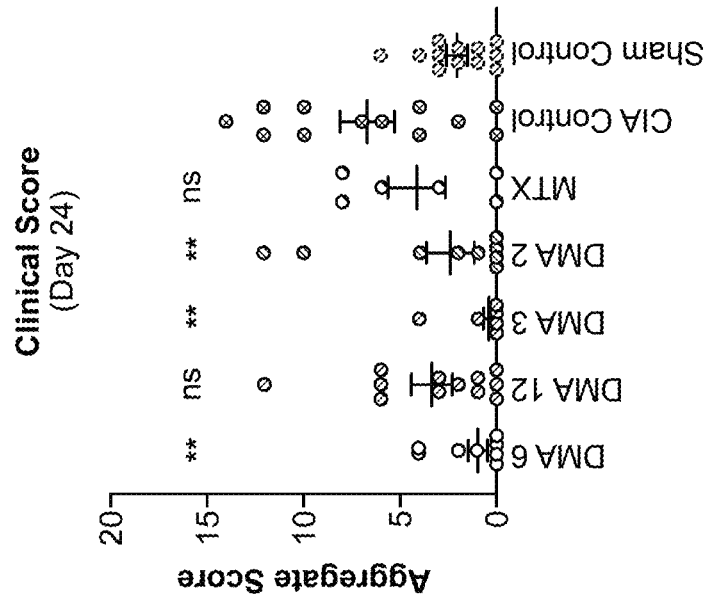
FIG. 30A is a graph depicting paw swelling in mice administered the indicated DMAs at Day 24 in a collagen-induced arthritis (CIA) model of rheumatoid arthritis, using the study design described in FIG. 29.
Figure 30B:
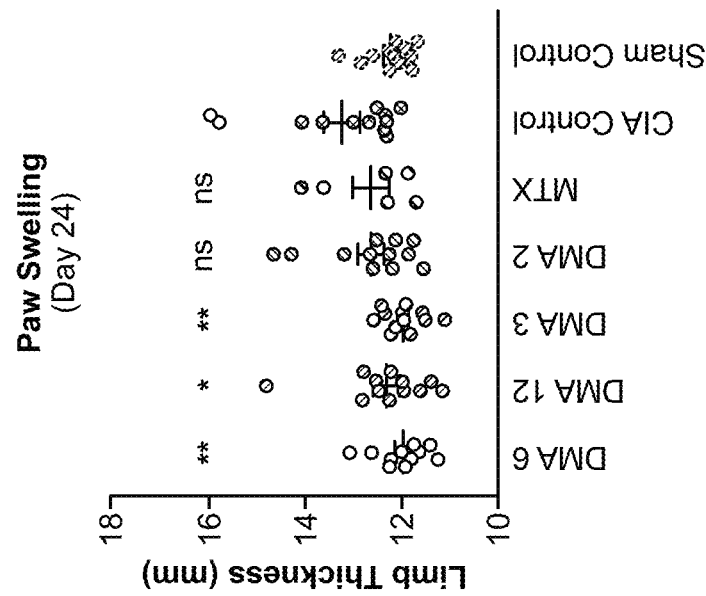
FIG. 30B is a graph depicting arthritis clinical scores in mice administered the indicated DMAs at Day 24 in a collagen-induced arthritis (CIA) model of rheumatoid arthritis, using the study design described in FIG. 29.

Twice daily administration of exemplary DMAs decreased paw swelling and clinical scores in mice on day 21 (3 days post disease onset), as compared to vehicle treated controls (FIGS. 30A and 30B). The effect on paw swelling was statistically significant for DMA 6, DMA 12, and DMA 3 ($p < 0.05$ compared to CIA Control. One-way ANOVA with multiple hypothesis testing correction). The effect on clinical score was statistically significant for DMA 6, DMA 2, and DMA 3 ($p < 0.05$ compared to CIA Control. One-way ANOVA with multiple hypothesis testing correction). These results confirm that the DMAs are effective for reducing inflammation in a mouse model of arthritis.

Figure 31:
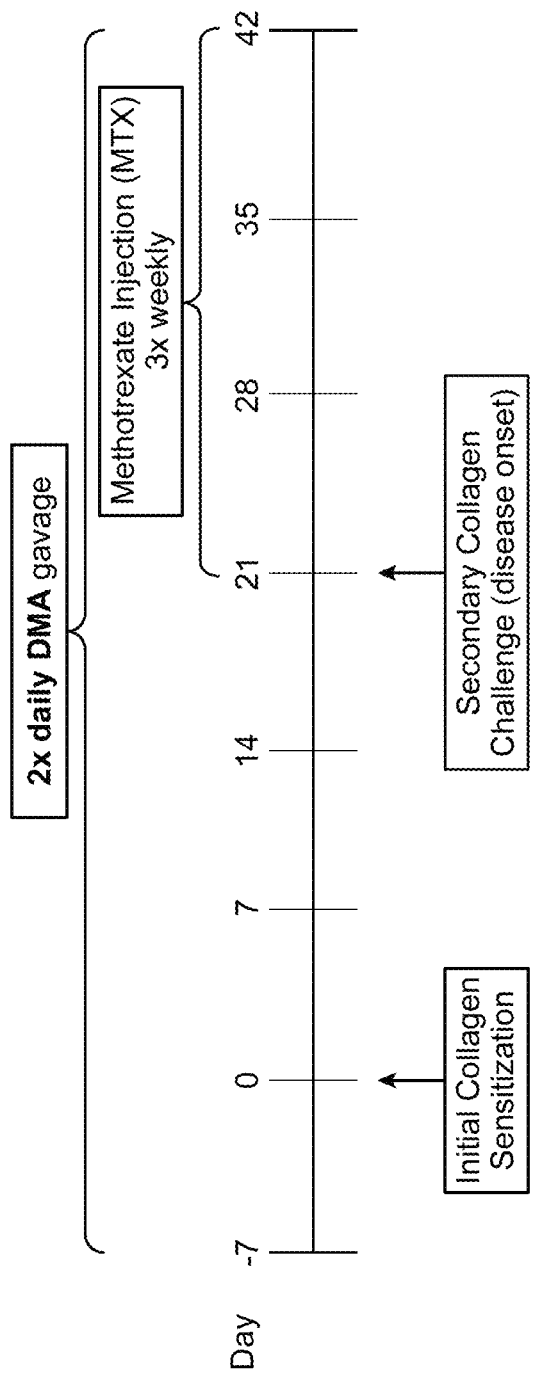
FIG. 31 is a diagram depicting the study design for examining the effects of DMAs administered 7 days prior to antigen challenge on disease progression in a collagen-induced arthritis (CIA) model in mice.

Example 19: DMA Administration Prior to Disease Induction Delayed Onset of Arthritis in a Collagen-Induced Arthritis (CIA) Mouse Model Exemplary defined microbial assemblages (DMAs) were examined for the ability to decrease paw swelling and clinical scores in a collagen induced arthritis mouse model by administering the DMAs prior to immunological challenge. Mice were challenged with an initial collagen sensitization challenge on day 0 and a secondary challenge on day 21. Animals received twice-daily gavage of exemplary DMAs (listed in Table 13, $4 \times 10^{10}$ CFU per strain per administration) or a vehicle control starting 7 days prior to initial sensitization challenge. A control group of animals received methotrexate injections three-times weekly on days 21-42 (positive control). Paw swelling was measured using calipers, and clinical scores were determined by observation of the animals. FIG. 31 displays the study design.

Twice daily administration of exemplary DMAs, DMA 3 and DMA 6, prior to disease induction reduced arthritis scores (FIGS. 32A and 32C) and paw swelling (FIGS. 32B and 32D) in combination with methotrexate administration compared to methotrexate administration alone. The effect on clinical scores was statistically significant on day 35 for MTX ($p = 0.03$), MTX+DMA 6 ($p < 0.0001$), and MTX+DMA 3 groups ($p = 0.0032$) compared to the untreated control (two-way repeated measures ANOVA with multiple hypothesis testing correction).

These results confirm that the DMAs are effective for the prevention of inflammation in a mouse model of arthritis.

TABLE 13

Exemplary DMAs tested in a collagen induced arthritis (CIA) mouse model.

| Category | Strain | Genus | Species | DMA 2 | DMA 3 | DMA 6 | DMA 12 |
|---|---|---|---|---|---|---|---|
| Anaerobe | SBI4825 | Clostridium | sp. | x | x |  |  |
|  | SBI4833 | Clostridioides | mangenotii | x |  |  |  |
| Lactic Acid Bacteria | SBI4259 | Weisella | cibaria | x | x |  |  |
|  | *SBS04254 | Lactobacillus | brevis |  | x | x | x |
|  | *SBI04881 | Lactobacillus | buchneri |  |  |  | x |
|  | *SBS2335 | Pediococcus | pentosaceus |  |  |  | x |
|  | *SBI04916 | Lactococcus | lactis |  |  | x | x |
|  | SBI04913 | Lactobacillus | harbinensis |  |  | x |  |
| Bacteria (Other) | *SBI4877 | Bacillus | velezensis |  |  | x |  |
| Fungi | SBI00303 | Meyerozyma | carribica |  |  | x |  |

*Indicates that the strain has Qualified Presumption of Safety (QPS) status.

Example 20. Key In Vitro Functionalities for the Anti-Inflammatory DMA, DMA 6, are Maintained when One or More Isolates are Replaced with New Isolates of the Same Species DMA 6 has demonstrated anti-inflammatory and pro-longevity effects in preclinical models. These effects are achieved through the combinatorial and synergistic effects of the beneficial functions of the microbes that comprise this DMA. These functionalities include the production of Extracellular polymeric substances (EPS), adherence to mucin, production of short chain fatty acids (SCFAs), and reduction in IL-8 secretion from intestinal epithelial cells in culture. To demonstrate that this is not unique to these isolates, we identified several additional distinct isolates (as determined by 16S rRNA sequence, Table 14) of the same species and examined these functions alone and in DMA swaps, where one to four strains in DMA 6 are replaced with another isolate.

In these experiments the constituents of the DMA, DMA6 (SBS4254, SBI4913, SBI4916 and SBI4877) and new replacement isolates (SBI4872, SBI4879, SBI5411, SBI4929, SBI5536, SBI2863 and SBI2328) from the library were tested for relevant phenotypes. Extracellular polymeric substance production (EPS) was determined using Congo Red and Aniline Blue dye-containing media. EPS production, indicated by color change, was assessed after plating and 48 hrs incubation at 30° C. Mucin attachment was determined by adherence to a porcine mucin (Sigma)-coated 96-well black plate. Each strain was fluorescently labeled with BacLight Green (Invitrogen) and incubated with the mucin plate for 30 min at room temperature. Fluorescence was measured before and after vigorous washing of the plate to remove any unattached bacteria. Data were expressed as percent fluorescence before and after washing. Short chain fatty acid production and epithelial cell stimulation was measured from each isolate alone, and as assembled DMAs. For DMA 6 and the swaps with new isolates, all strains were grown in TSB at 30° C. and each of the strains was normalized using OD600 prior to inoculation. For each substitution, one, two, three or four microbes from DMA 6 was replaced with a new isolate of the same species (See Table 14). To quantify acetate production, single strains and DMAs were inoculated into brain heart infusion (BHI) medium and incubated anaerobically for 48 hrs at 37° C. At 24 hrs cultures were pelleted by centrifugation at 5000×g for 10 min and supernatants were harvested. Final microbial titers were determined by dilution plating. Samples were acidified and a valeric acid internal control was added. Short chain fatty acids (SCFAs) quantified by gas chromatography (GC-2014, Shimadzu, Kyoto, Japan) relative to a free fatty acid control (Restek). To examine intestinal epithelial cell cytokine responses to the individual strains alone and as DMAs, HT-29 cells were seeded into 48-well plates at 100,000 cells per well and cultured for 10 days to ensure confluence. DMAs were added at a multiplicity of interaction (MOI) of 1 and co-incubated at 37° C., 5% CO2 for 24 hours, at which point supernatants were removed and IL-8 production was determined by ELISA (LS Bio).

Extracellular polymeric substances (EPS) produced by bacteria have been reported to have many anti-inflammatory properties (Reviewed in Oerlemans et al 2021). We compared the production of EPS of the isolates comprising DMA 6 with the new isolates (Table 15). All EPS phenotypes were consistent within a given species with the exception of SBI4879, which did produce EPS though it was not secreted into the media like the other L. brevis isolates.

Adherence to mucin is a characteristic examined for probiotic microbes (Ringot-Destrez et al 2018). Mucin attachment is believed to facilitate host-microbe interactions, slow intestinal transit, and exclude pathogens. Mucin adherence was consistent within each given species; with L. brevis exhibiting high mucoadherence, L. lactis demonstrating moderate adherence and L. harbinensis and B. velezensis with low adherence.

Figure 33A:
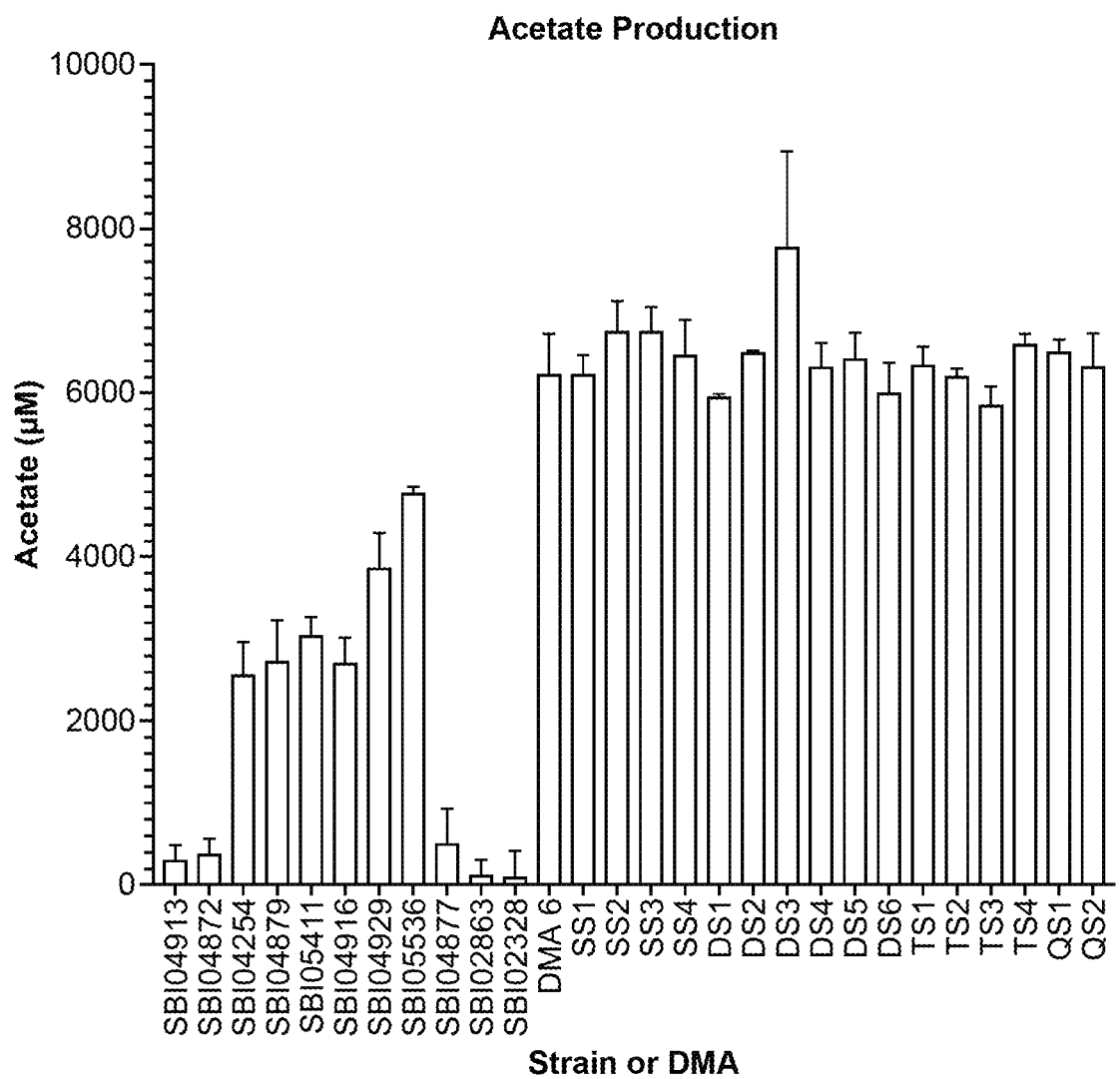
FIG. 33A-C are graphs depicting in vitro functionalities with DMAs with strains swapped as indicated. DMA labels correspond to compositions described in Table 12.

Acetate production from DMA 6, the DMA swaps, and individual strains was measured by gas chromatography (FIG. 33A). Acetate production was similarly low for the L. harbinensis and B. velezensis isolates, and higher in the L. brevis and L. lactis strains. DMA 6 produces more acetate than its individual isolates, demonstrating the additive effects of the combination. All of the DMA swaps produced acetate at levels similar to DMA 6.

Figure 33B:
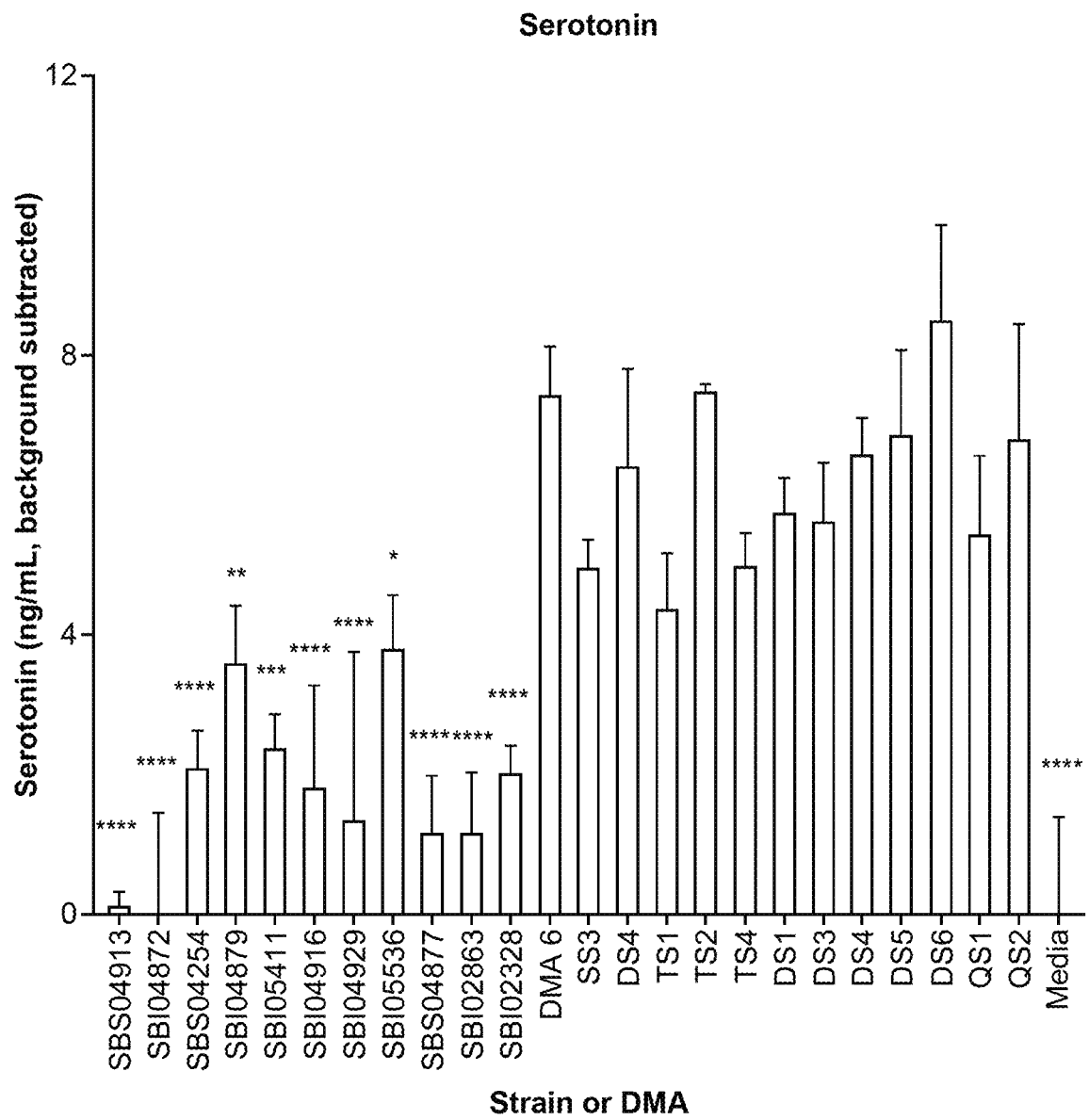

Serotonin is a neurotransmitter that has effects on mood, intestinal motility, and inflammation. The bulk of serotonin in the body is produced in the intestine both by enterocytes and by the microbes in the gut. DMA 6 microbes produce serotonin in liquid culture, and an additive effect of serotonin production is seen for DMA 6 compared to its individual components. Thus, serotonin production from DMA 6, the DMA swaps, and individual strains was measured by competitive ELISA (FIG. 33B). Both L. harbinensis isolates produced little to no serotonin, while the other individual isolates produced variable quantities, all significantly less than DMA 6. Eleven of the sixteen swaps tested produced serotonin at levels similar to DMA 6.

Figure 33C:
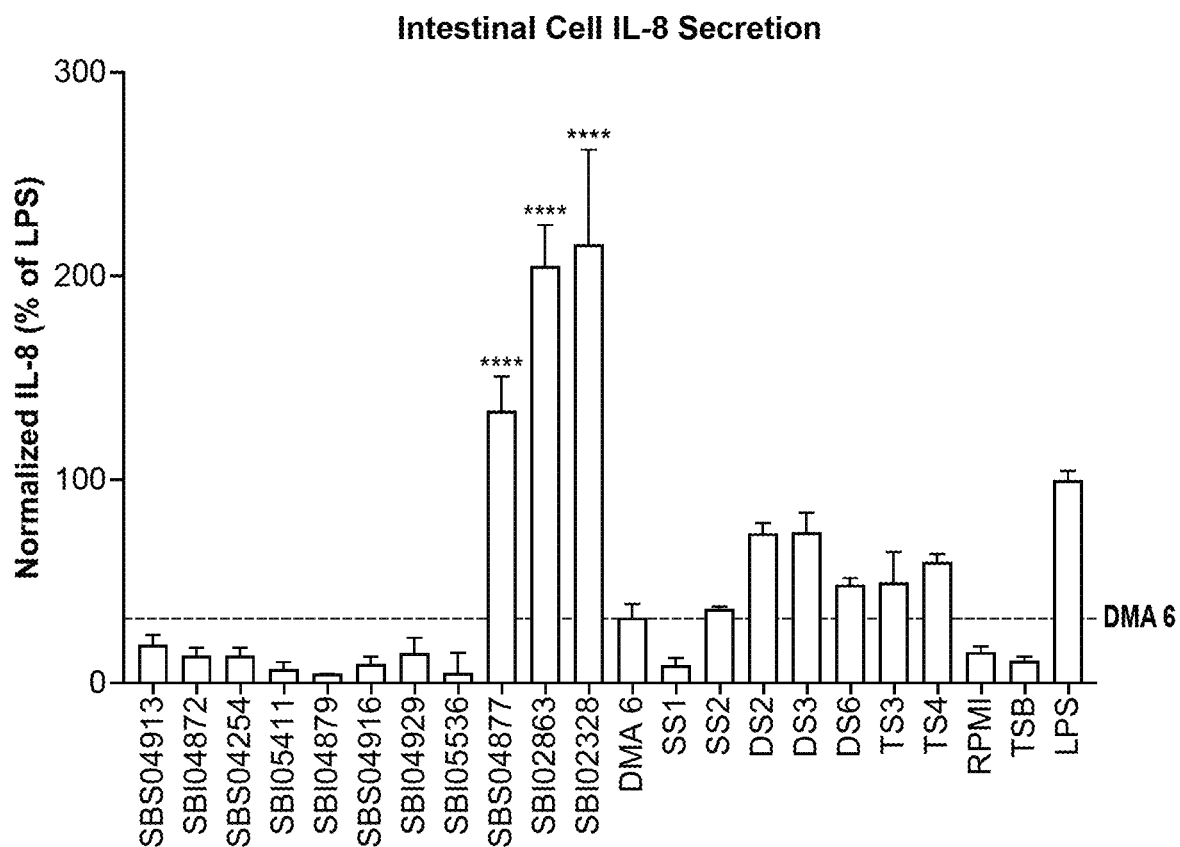

The intestine recruits immune cells to drive inflammatory and anti-inflammatory processes via secretion of various chemokines, including IL-8. The probiotic microbe, B. velezensis, a component of DMA 6, is an immunostimulatory microbe that elicits high IL-8 secretion from epithelial cells in vitro (FIG. 33C). The low levels of IL-8 induced by DMA 6 in was a key driver in the selection of this DMA for preclinical experimentation as it suggested that the other microbes present in the DMA had a profound capacity to modulate inflammation. We tested IL-8 secretion from the DMA swaps to determine whether the same synergy could be recapitulated. While not every one of the 16 DMA swaps tested exhibited reduced IL-8, seven compositions were comparable the phenotype elicited by DMA 6 (FIG. 33C).

These successful single, double, and triple isolate swaps included each of the new replacement isolates, which suggests that each strain is suitable to generate the desired phenotype, but there is some specificity in the combinations.

| Strain # | Genus | Species | % ID (16S) | DMA 6 | SS1 | SS2 | SS3 | SS4 | DS1 | DS2 | DS3 | DS4 |
|---|---|---|---|---|---|---|---|---|---|---|---|---|
| SBI04913 | Lactobacillus | harbinensis |  | x |  | x | x | x |  | x | x |  |
| SBI04872 | Lactobacillus | harbinensis | 99.89 |  | x |  |  |  | x |  |  | x |
| SBS04254 | Lactobacillus | brevis |  | x | x |  | x | x |  |  | x |  |
| SBI04879 | Lactobacillus | brevis | 99.89 |  |  |  |  |  | x |  |  |  |
| SBI05411 | Lactobacillus | brevis | 97.33 |  |  | x |  |  |  | x |  | x |
| SBI04916 | Lactococcus | lactis |  | x | x | x |  | x | x |  |  | x |

-continued

| Strain # | Genus | Species | % ID (16S) | | | | | | | |
|---|---|---|---|---|---|---|---|---|---|---|
| SBI04929 | Lactococcus | lactis | 99.24 | | | | | | x | |
| SBI05536 | Lactococcus | lactis | 98.81 | | | x | | | | x |
| SBI04877 | Bacillus | velezensis | | x | x | x | x | | x | | x |
| SBI02863 | Bacillus | velezensis | 99.56 | | | | | | x | |
| SBI02328 | Bacillus | velezensis | 99.71 | | | | x | | | x |

| Strain # | Genus | Species | % ID (16S) | DS5 | DS6 | TS1 | TS2 | TS3 | TS4 | QS1 | QS2 |
|---|---|---|---|---|---|---|---|---|---|---|---|
| SBI04913 | Lactobacillus | harbinensis | | x | | x | | | | | |
| SBI04872 | Lactobacillus | harbinensis | 99.89 | | x | | x | x | x | x | x |
| SBS04254 | Lactobacillus | brevis | | | x | | x | | | | |
| SBI04879 | Lactobacillus | brevis | 99.89 | x | | x | | | x | | x |
| SBI05411 | Lactobacillus | brevis | 97.33 | | | | | x | | x | |
| SBI04916 | Lactococcus | lactis | | x | | | | x | | | |
| SBI04929 | Lactococcus | lactis | 99.24 | | x | x | | | | | x |
| SBI05536 | Lactococcus | lactis | 98.81 | | | | x | | x | x | |
| SBI04877 | Bacillus | velezensis | | | x | | x | | x | | |
| SBI02863 | Bacillus | velezensis | 99.56 | x | | x | | | | x | |
| SBI02328 | Bacillus | velezensis | 99.71 | | | | | x | | | x |

Isolates used in the DMA 6 strain swap analysis. The strain identification number, genus, species, and 16S percent ID to the original isolate used in DMA 6 is listed to the left. The composition of DMA 6 and each swap is indicated with an "x" for each isolate present (SS = single swap, DS = double swap, TS = triple swap, QS = quadruple swap).

TABLE 15

| Strain # | Genus | Species | % ID (16S) | Congo Red | | Aniline Blue | Mucin % Attachment |
|---|---|---|---|---|---|---|---|
| | | | | Colony | Secretion | | |
| SBI04913 | Lactobacillus | harbinensis | | 2 | 0 | 2 | 2% |
| SBI04872 | Lactobacillus | harbinensis | 99.89 | 2 | 0 | 2 | 4% |
| SBS04254 | Lactobacillus | brevis | | 2 | 2 | 2 | 31% |
| SBI04879 | Lactobacillus | brevis | 99.89 | 2 | 0 | 1 | 26% |
| SBI05411 | Lactobacillus | brevis | 97.33 | 2 | 2 | 2 | 18% |
| SBI04916 | Lactococcus | lactis | | 2 | 2 | 2 | 13% |
| SBI04929 | Lactococcus | lactis | 99.24 | 2 | 2 | 2 | 7% |
| SBI05536 | Lactococcus | lactis | 98.81 | 2 | 2 | 2 | 14% |
| SBI04877 | Bacillus | velezensis | | 1 | 0 | 1 | 4% |
| SBI02863 | Bacillus | velezensis | 99.56 | 1 | 0 | 1 | 4% |
| SBI02328 | Bacillus | velezensis | 99.71 | 1 | 0 | 1 | 2% |

0 = No EPS roduction, 1 = Intermediate EPS production, 2 = EPS produced, ND = No growth on EPS indicating media Percent adherence to Mucin Extracellular polymeric substance (EPS) production and adherence to mucin are similar between isolates of the same species. The strain identification number, genus, species, and 16S percent ID to the original isolate used in DMA 6 is listed to the left. EPS production as determined by plating on Congo red medium, both capsular (colony) and secreted (secretion), and aniline blue medium is scored 0-2 as indicated. Adherence is determined by the percent of microbes remaining attached to mucin after 30 minutes incubation and vigorous washing.

Example 21: DMA Administration Increases Longevity in *C. Elegans*

Figure 34:
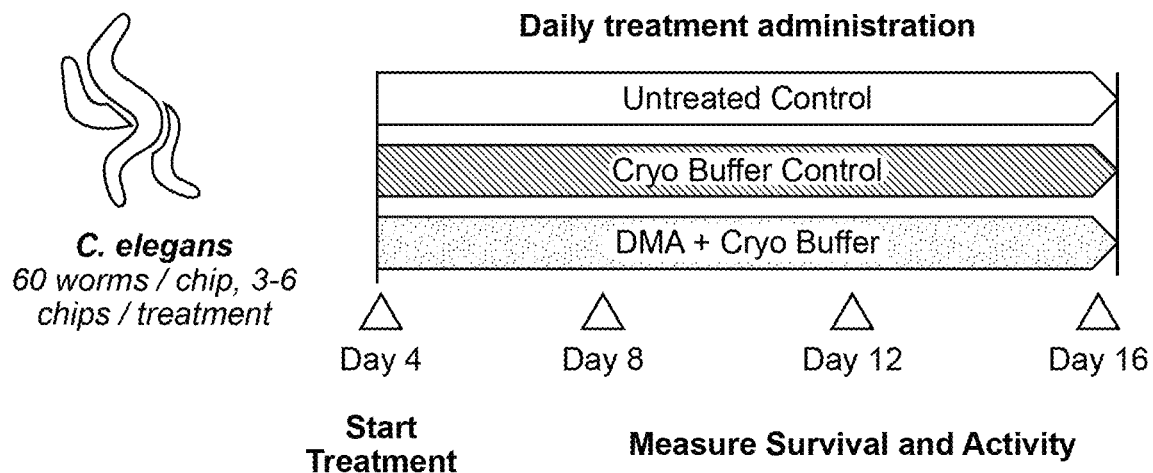
FIG. 34 is a diagram depicting the study design used to examine DMAs for the ability to improve longevity in *C. elegans* using micropillar-based microfluidic culture devices.

Exemplary defined microbial assemblages (DMAs) were examined for the ability to improve longevity in *C. elegans* using micropillar-based microfluidic culture devices (NemaLife chips) (Rahman, M., et al. Sci Rep 10, 16190 (2020). The impact of daily administration of each consortium on animal survival and activity levels was examined on days 4, 8, 12, and 16 of animal life (FIG. 34). These time points represent the first day of adulthood, early-, mid-, and late-life periods in the wild-type worm's lifespan.

Longevity studies were performed as follows. All procedures were performed at 20° C. *C. elegans* were raised on standard agar plates seeded with live *E. coli* OP50 from hatching until the L4 stage. At the L4 stage, the worms were loaded into NemaLife chips at a density of ~60 animals per chip (N=3-6 chips per experimental group). The worms were then switched to a diet of 25 mg/ml live OP50 resuspended in liquid nematode growth media (NGM). The animals in each chip were imaged to record the population size and baseline activity levels after 24 hrs. Chips were then washed with NGM buffer for 90 seconds to remove waste products and any progeny laid in the previous 24 hours. After washing the chips, the media was exchanged with media for the appropriate experimental condition. Experimental conditions included DMAs listed in Table 16 at a concentration of $5 \times 10^9$ CFU/mL, suspended in a cryo-buffer. A no-treatment negative control was performed using *E. coli* OP50 as the food source (25 mg/mL OP50). A vehicle control was also performed by administering cryo-buffer diluted with liquid NGM (1:10) to worms fed *E. coli* OP50 as the food source. The media on all chips were exchanged every 24 hours to remove waste and any progeny. On days 8, 12, and 16 of animal life, videos were recorded of the animals remaining on chip to quantify their survival rate and locomotor activity levels.

Briefly, behavioral videos of worms in microfluidic chips were processed using proprietary software developed by NemaLife Inc (www.nemalifeinc.com). The worms in each video were detected using a convolutional neural network that defines a bounding box enclosing each animal in three frames, each separated by a 30-second interval. If the detected worms in the video have a pixel displacement of more than 10 pixels during the 30 seconds, then the animal was scored as alive. After the software scoring, a manual data curation step is implemented that allows the correction of errors in scoring. Events such as matricide/unnatural death are censored during the human-in-the-loop data curation step.

Locomotory activity 'a' of the worms was determined by NemaLife's proprietary software. The software applies a bounding box to each detected animal, and the pixel intensity correlation is calculated between 30-second separated frames. If the normalized pixel intensity correlation between the two bounding boxes is unity, then a=0, indicating that the pixel intensities associated with the detected worm objects are fully correlated, and the animal is stationary in this time interval. Alternatively, if there is no correlation, then a=1, indicating that the animal has moved out of its bounding box. Using this approach, three activity scores were obtained per animal from a single video. These activity scores were then grouped by condition and replicate to visualize differences between experimental cohorts.

Figure 35A:
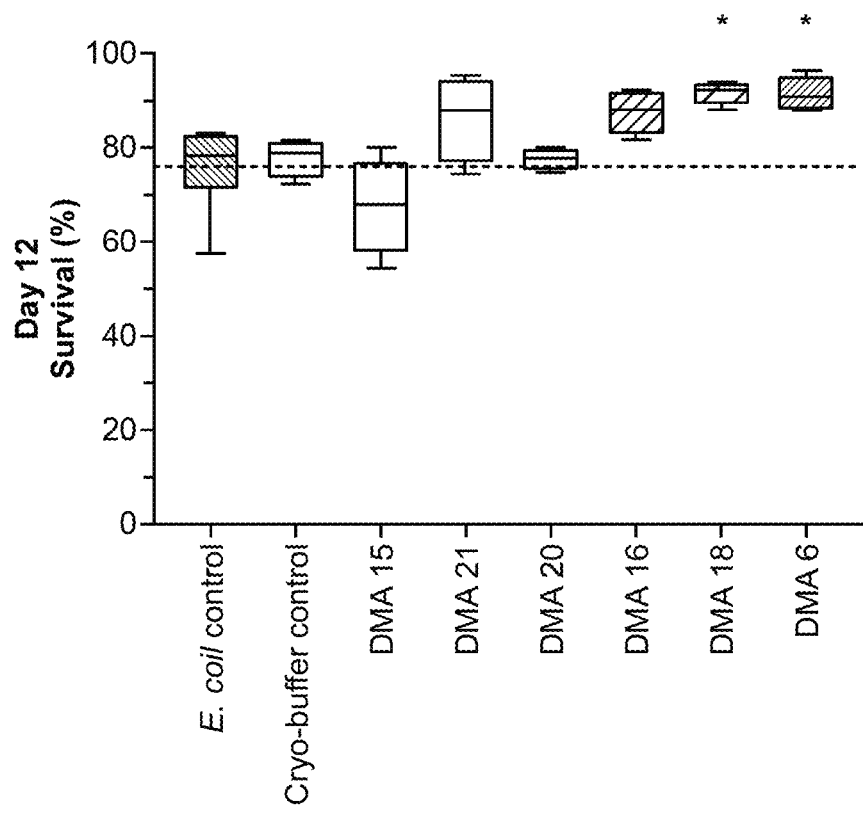
FIG. 35A is a graph depicting the percent survival at day 12 of *C. elegans* provided with growth medium supplemented with control *E. coli*, with the indicated DMAs, or with cryo-buffer alone. *p<0.05, one-way ANOVA with multiple hypothesis testing correction.
Figure 35B:
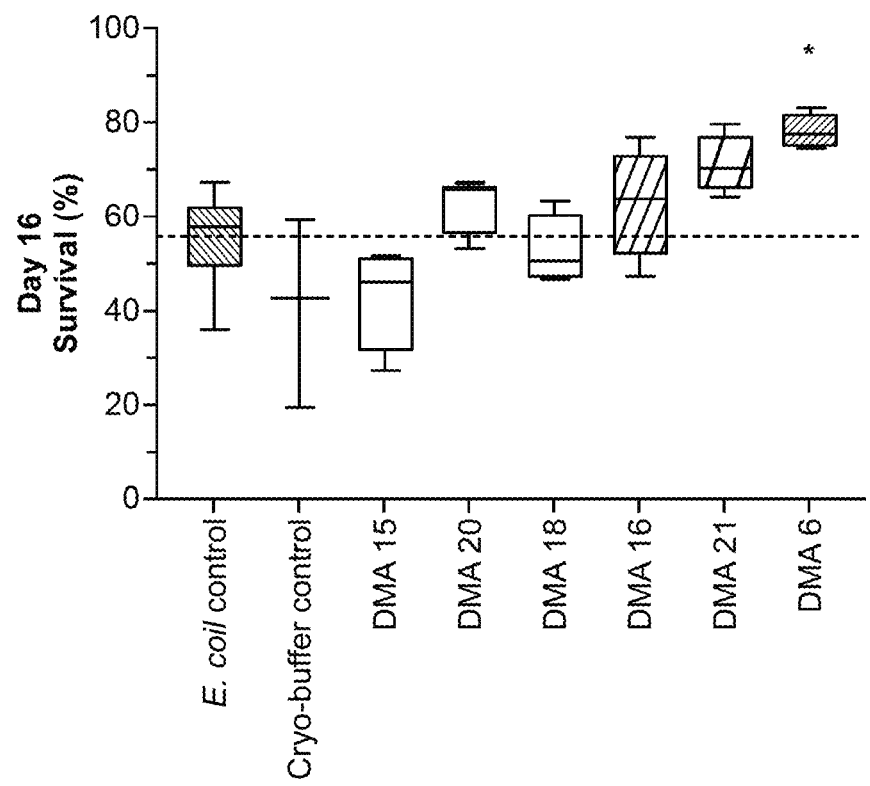
FIG. 35B is a graph depicting the percent survival at day 16 of *C. elegans* provided with growth medium supplemented with control *E. coli*, with the indicated DMAs, or with cryo-buffer alone. *p<0.05, one-way ANOVA with multiple hypothesis testing correction.
Figure 36:
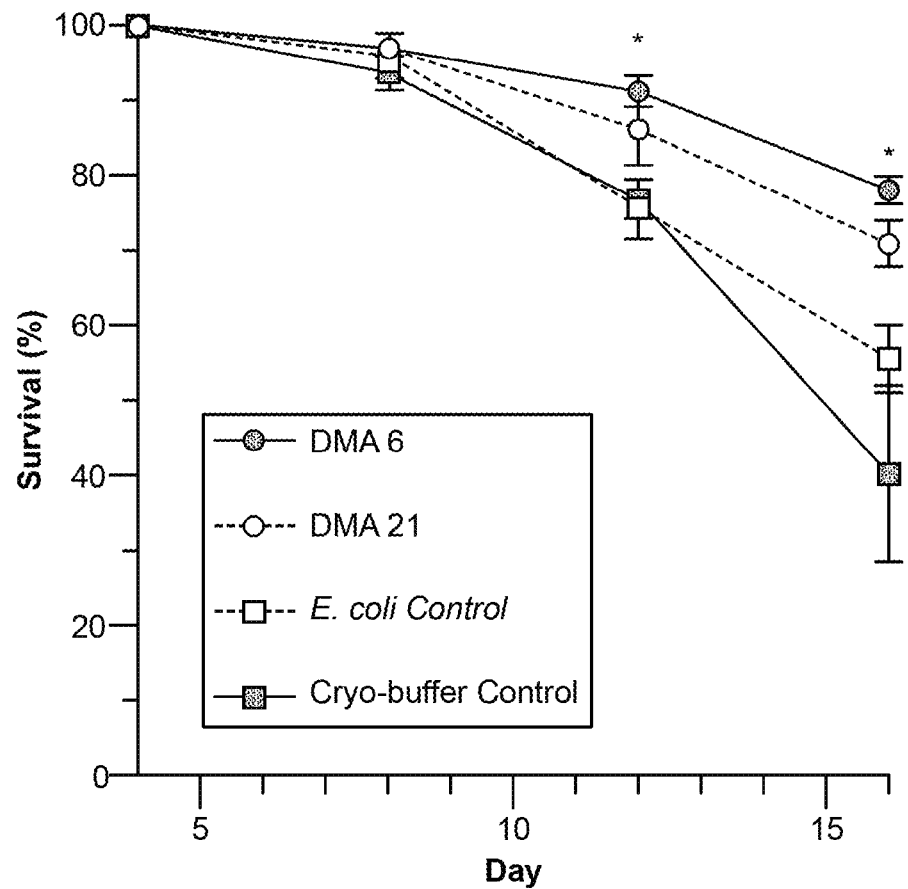
FIG. 36 is a graph depicting the percent survival of *C. elegans* at the indicated number of days provided with growth medium supplemented with control *E. coli*, with the indicated DMAs, or with cryo-buffer alone. *p<0.05, one-way ANOVA with multiple hypothesis testing correction.
Figure 37:
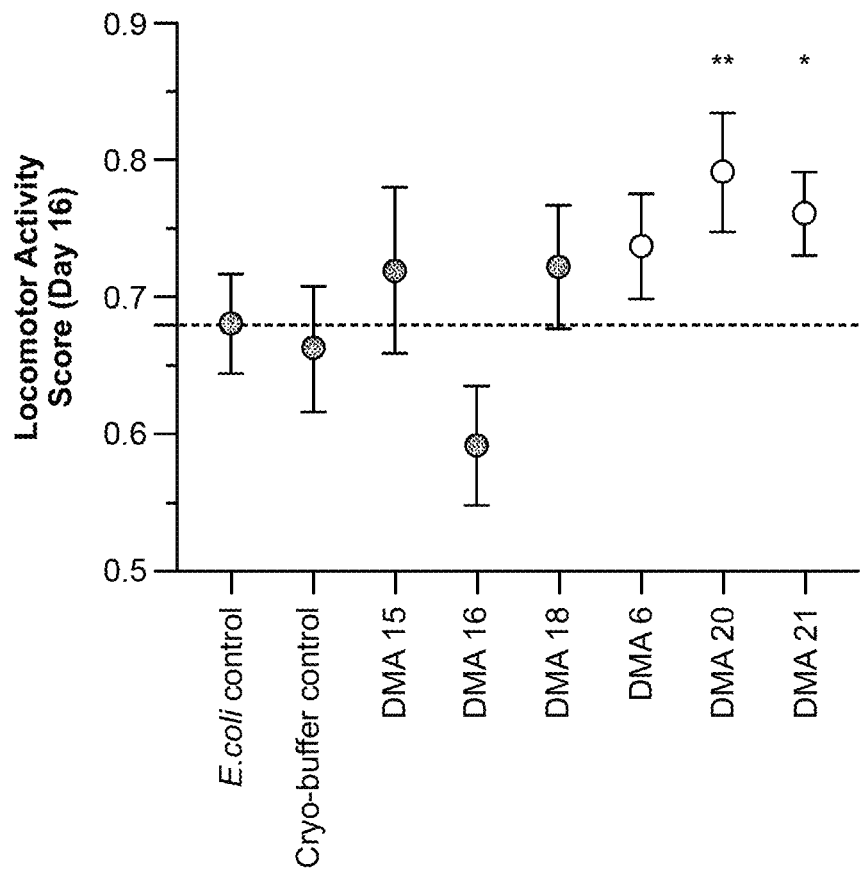
FIG. 37 is a graph depicting the locomotory activity scores at day 16 of *C. elegans* provided with growth medium supplemented with control *E. coli*, with the indicated DMAs, or with cryo-buffer alone. *p<0.05, **p<0.01 one-way ANOVA with multiple hypothesis testing correction.

Daily DMA administration increased survival for C. elegans at days 12 and 16 of life. This effect was statistically significant on day 12 for DMA 6 and DMA 18 (FIG. 35A) and on day 16 for DMA 6 (FIG. 35B; p<0.05, one-way ANOVA with multiple hypothesis testing correction). C. elegans survival from day 4 through day 16 are displayed for exemplary DMAs, DMA 6 and DMA 21 compared to control in FIG. 36. Locomotor activity was also increased on day 16 by daily DMA administration. This effect was statistically significant for DMA 20 and DMA 21 (FIG. 37; p<0.05, one-way ANOVA with multiple hypothesis testing correction).

These results confirm that the DMAs are capable of increasing survival and locomotor activity in C. elegans.

S. (2011). Periodontal disease and bisphosphonates induce osteonecrosis of the jaws in the rat. *Journal of bone and mineral research: the official journal of the American Society for Bone and Mineral Research*, 26(8), 1871-1882. https://doi.org/10.1002/jbmr.379

Agus, A., Planchais, J., & Sokol, H. (2018). Gut Microbiota Regulation of Tryptophan Metabolism in Health and Disease. *Cell host & microbe*, 23(6), 716-724. https://doi.org/10.1016/j.chom.2018.05.003

Adluri, R. K., Singh, A. V., Skoyles, J., Robins, A., Parton, J., Baker, M., & Mitchell, I. M. (2010). The effect of fenoldopam and dopexamine on cytokine and endotoxin release following on-pump coronary artery bypass grafting: a prospective randomized double-blind trial. *The heart surgery forum*, 13(6), E353-E361. https://doi.org/10.1532/HSF98.20101073

Altschul, S. F., Gish, W., Miller, W., Myers, E. W., & Lipman, D. J. (1990). Basic local alignment search tool. *Journal of molecular biology*, 215(3), 403-410. https://doi.org/10.1016/S0022-2836(05)80360-2

An, J., Seok, H., & Ha, E. M. (2021). GABA-producing Lactobacillus plantarum inhibits metastatic properties and induces apoptosis of 5-FU-resistant colorectal cancer cells via $GABA_B$ receptor signaling. *Journal of microbiology (Seoul, Korea)*, 59(2), 202-216. https://doi.org/10.1007/s12275-021-0562-5

Apweiler, R., Bairoch, A., Wu, C. H., Barker, W. C., Boeckmann, B., Ferro, S., Gasteiger, E., Huang, H., Lopez, R., Magrane, M., Martin, M. J., Natale, D. A., O'Donovan, C., Redaschi, N., & Yeh, L. S. (2004). UniProt: the Universal Protein knowledgebase. *Nucleic acids research*, 32 (Database issue), D115-D119. https://doi.org/10.1093/nar/gkh131

Bagga, D., Wang, L., Farias-Eisner, R., Glaspy, J. A., & Reddy, S. T. (2003). Differential effects of prostaglandin derived from omega-6 and omega-3 polyunsaturated fatty

TABLE 16

Exemplary DMAs tested in a C. elegans longevity model.

| Category | Strain | Genus | Species | DMA 6 | DMA 15 | DMA 16 | DMA 18 | DMA 20 | DMA 21 |
|---|---|---|---|---|---|---|---|---|---|
| Lactic Acid Bacteria | SBI04913 | *Lactobacillus* | *harbinensis* | x | | | | | |
| | *SBS04254 | *Lactobacillus* | *brevis* | x | x | x | x | x | x |
| | *SBI04916 | *Lactococcus* | *lactis* | x | x | x | x | x | x |
| Bacteria (Other) | *SBI4877 | *Bacillus* | *velezensis* | x | | | | | |
| Fungi | SBI00817 | *Pichia* | *membranifaciens* | | | x | | | |
| | *SBI00540 | *Hanseniaspora* | *uvarum* | | | | x | | |
| | SBI04927 | *Yarrowia* | *lipolytica* | | | | | | |
| | SBI00274 | *Leucosporidium* | *scottii* | | | | | x | |
| | SBI00272 | *Hanseniaspora* | *occidentalis* | | | | | | x |

*Indicates that the strain has Qualified Presumption of Safety (QPS) status.

While the invention has been particularly shown and described with reference to a preferred embodiment and various alternate embodiments, it will be understood by persons skilled in the relevant art that various changes in form and details can be made therein without departing from the spirit and scope of the invention.

All references, issued patents and patent applications cited within the body of the instant specification are hereby incorporated by reference in their entirety, for all purposes.

REFERENCES CITED

Aghaloo, T. L., Kang, B., Sung, E. C., Shoff, M., Ronconi, M., Gotcher, J. E., Bezouglaia, O., Dry, S. M., & Tetradis, acids on COX-2 expression and IL-6 secretion. *Proceedings of the National Academy of Sciences of the United States of America*, 100(4), 1751-1756. https://doi.org/10.1073/pnas.0334211100

Bansal, T., Alaniz, R. C., Wood, T. K., & Jayaraman, A. (2010). The bacterial signal indole increases epithelial-cell tight-junction resistance and attenuates indicators of inflammation. *Proceedings of the National Academy of Sciences of the United States of America*, 107(1), 228-233. https://doi.org/10.1073/pnas.0906112107

Caffaratti, C., Plazy, C., Mery, G., Tidjani, A. R., Fiorini, F., Thiroux, S., Toussaint, B., Hannani, D., & Le Gouellec, A. (2021). What We Know So Far about the Metabolite- Mediated Microbiota-Intestinal Immunity Dialogue and How to Hear the Sound of This Crosstalk. *Metabolites,* 11(6), 406. https://doi.org/10.3390/metabo11060406

Cario E. (2008). Barrier-protective function of intestinal epithelial Toll-like receptor 2. *Mucosal immunology,* 1 Suppl 1, S62-S66. https://doi.org/10.1038/mi.2008.47

Catrina, A. I., Deane, K. D., & Scher, J. U. (2016). Gene, environment, microbiome and mucosal immune tolerance in rheumatoid arthritis. *Rheumatology (Oxford, England),* 55(3), 391-402. https://doi.org/10.1093/rheumatology/keu469

Chassaing, B., Ley, R. E., & Gewirtz, A. T. (2014). Intestinal epithelial cell toll-like receptor 5 regulates the intestinal microbiota to prevent low-grade inflammation and metabolic syndrome in mice. *Gastroenterology,* 147(6), 1363-77.e17. https://doi.org/10.1053/j.gastro.2014.08.033

Costa, O. Y. A., Raaijmakers, J. M., & Kuramae, E. E. (2018). Microbial extracellular polymeric substances: Ecological function and impact on soil aggregation. *Frontiers in Microbiology,* 9. https://doi.org/10.3389/fmicb.2018.01636

Cox, M. P., Peterson, D. A. & Biggs, P. J. SolexaQA: At-a-glance quality assessment of Illumina second-generation sequencing data. *BMC Bioinformatics* 11, 485 (2010).

Feres, M., Teles, F., Teles, R., Figueiredo, L. C., & Faveri, M. (2016). The subgingival periodontal microbiota of the aging mouth. *Periodontology 2000,* 72(1), 30-53. https://doi.org/10.1111/prd.12136

Fiorucci, S., Biagioli, M., Zampella, A., & Distrutti, E. (2018). Bile Acids Activated Receptors Regulate Innate Immunity. *Frontiers in immunology,* 9, 1853. https://doi.org/10.3389/fimmu.2018.01853

Franzosa, E. A., McIver, L. J., Rahnavard, G., Thompson, L. R., Schirmer, M., Weingart, G., Lipson, K. S., Knight, R., Caporaso, J. G., Segata, N., & Huttenhower, C. (2018). Species-level functional profiling of metagenomes and metatranscriptomes. *Nature methods,* 15(11), 962-968. https://doi.org/10.1038/s41592-018-0176-y Gao, J., Xu, K., Liu, H., Liu, G., Bai, M., Peng, C., Li, T., & Yin, Y. (2018). Impact of the Gut Microbiota on Intestinal Immunity Mediated by Tryptophan Metabolism. *Frontiers in cellular and infection microbiology,* 8, 13. https://doi.org/10.3389/fcimb.2018.00013

Gatej, S. M., Marino, V., Bright, R., Fitzsimmons, T. R., Gully, N., Zilm, P., Gibson, R. J., Edwards, S., & Bartold, P. M. (2018). Probiotic *Lactobacillus rhamnosus* GG prevents alveolar bone loss in a mouse model of experimental periodontitis. *Journal of clinical periodontology,* 45(2), 204-212. https://doi.org/10.1111/jcpe.12838

Giri, S. S., Sen, S. S., Jun, J. W., Sukumaran, V., & Park, S. C. (2017). Role of *Bacillus licheniformis* VS16-Derived Biosurfactant in Mediating Immune Responses in Carp Rohu and its Application to the Food Industry. *Frontiers in microbiology,* 8, 514. https://doi.org/10.3389/fmicb.2017.00514

Glowacki, A. J., Yoshizawa, S., Jhunjhunwala, S., Vieira, A. E., Garlet, G. P., Sfeir, C., & Little, S. R. (2013). Prevention of inflammation-mediated bone loss in murine and canine periodontal disease via recruitment of regulatory lymphocytes. *Proceedings of the National Academy of Sciences of the United States of America,* 110(46), 18525-18530. https://doi.org/10.1073/pnas.1302829110

Grootaert, C., Boon, N., Zeka, F., Vanhoecke, B., Bracke, M., Verstraete, W., & Van de Wiele, T. (2011). Adherence and viability of intestinal bacteria to differentiated Caco-2 cells quantified by flow cytometry. *Journal of microbiological methods,* 86(1), 33-41. https://doi.org/10.1016/j.mimet.2011.03.011

Han, S., Lu, Y., Xie, J., Fei, Y., Zheng, G., Wang, Z., Liu, J., Lv, L., Ling, Z., Berglund, B., Yao, M., & Li, L. (2021). Probiotic Gastrointestinal Transit and Colonization After Oral Administration: A Long Journey. *Frontiers in cellular and infection microbiology,* 11, 609722. https://doi.org/10.3389/fcimb.2021.609722

Heinken, A., Ravcheev, D. A., Baldini, F., Heirendt, L., Fleming, R. M. T., & Thiele, I. (2019). Systematic assessment of secondary bile acid metabolism in gut microbes reveals distinct metabolic capabilities in inflammatory bowel disease. *Microbiome,* 7(1). https://doi.org/10.1186/s40168-019-0689-3

Higgins, S. C., Lavelle, E. C., McCann, C., Keogh, B., McNeela, E., Byrne, P., O'Gorman, B., Jarnicki, A., McGuirk, P., & Mills, K. H. (2003). Toll-like receptor 4-mediated innate IL-10 activates antigen-specific regulatory T cells and confers resistance to *Bordetella pertussis* by inhibiting inflammatory pathology. *Journal of immunology* (Baltimore, Md.: 1950), 171(6), 3119-3127. https://doi.org/10.4049/jimmunol.171.6.3119

Holers, V. M., Demoruelle, M. K., Kuhn, K. A., Buckner, J. H., Robinson, W. H., Okamoto, Y., Norris, J. M., & Deane, K. D. (2018). Rheumatoid arthritis and the mucosal origins hypothesis: protection turns to destruction. *Nature reviews. Rheumatology,* 14(9), 542-557. https://doi.org/10.1038/s41584-018-0070-0

Hsieh, S. A., & Allen, P. M. (2020). Immunomodulatory Roles of Polysaccharide Capsules in the Intestine. *Frontiers in immunology,* 11, 690. https://doi.org/10.3389/fimmu.2020.00690

Jang, S., Uematsu, S., Akira, S., & Salgame, P. (2004). IL-6 and IL-10 induction from dendritic cells in response to *Mycobacterium tuberculosis* is predominantly dependent on TLR2-mediated recognition. Journal of immunology (Baltimore, Md.: 1950), 173(5), 3392-3397. https://doi.org/10.4049/jimmunol.173.5.3392

Jenab, A., Roghanian, R., & Emtiazi, G. (2020). Bacterial Natural Compounds with Anti-Inflammatory and Immunomodulatory Properties (Mini Review). *Drug design, development and therapy,* 14, 3787-3801. https://doi.org/10.2147/DDDT.S261283

Jhun, J., Min, H. K., Ryu, J., Lee, S. Y., Ryu, J. G., Choi, J. W., Na, H. S., Lee, S. Y., Jung, Y., Park, S. J., Park, M. S., Kwon, B., Ji, G. E., Cho, M. L., & Park, S. H. (2020). *Lactobacillus sakei* suppresses collagen-induced arthritis and modulates the differentiation of T helper 17 cells and regulatory B cells. *Journal of translational medicine,* 18(1), 317. https://doi.org/10.1186/s12967-020-02477-8

Jin, H., Jeong, Y., Yoo, S H. et al. Isolation and characterization of high exopolysaccharide-producing *Weissella confusa* VP30 from young children's feces. Microb Cell Fact 18, 110 (2019). https://doi.org/10.1186/s12934-019-1158-1

Jin, X. T., Galvan, A., Wichmann, T., & Smith, Y. (2011). Localization and Function of GABA Transporters GAT-1 and GAT-3 in the Basal Ganglia. *Frontiers in systems neuroscience,* 5, 63. https://doi.org/10.3389/fnsys.2011.00063

Kang, J. X., & Weylandt, K. H. (2008). Modulation of inflammatory cytokines by omega-3 fatty acids. *Subcellular biochemistry,* 49, 133-143. https://doi.org/10.1007/978-1-4020-8831-5_5

Kinane, D. F., Stathopoulou, P. G., & Papapanou, P. N. (2017). Periodontal diseases. *Nature reviews. Disease primers,* 3, 17038. https://doi.org/10.1038/nrdp.2017.38

Kobayashi, R., Kobayashi, T., Sakai, F., Hosoya, T., Yamamoto, M., & Kurita-Ochiai, T. (2017). Oral administration of *Lactobacillus gasseri* SBT2055 is effective in preventing *Porphyromonas gingivalis*-accelerated periodontal disease. *Scientific reports,* 7(1), 545. https://doi.org/10.1038/s41598-017-00623-9

Kolmogorov Mikhail, Yuan Jeffrey, Lin Yu and Pevzner Pavel, Assembly of Long Error-Prone Reads Using Repeat Graphs. Nature Biotechnology, 2019

Langmead, B., & Salzberg, S. L. (2012). Fast gapped-read alignment with Bowtie 2. *Nature methods,* 9(4), 357-359. https://doi.org/10.1038/nmeth.1923

Lebeer S, Claes I, Tytgat H L, Verhoeven T L, Marien E, von Ossowski I, Reunanen J, Palva A, Vos W M, Keersmaecker S C, Vanderleyden J. Functional analysis of *Lactobacillus rhamnosus* GG pili in relation to adhesion and immunomodulatory interactions with intestinal epithelial cells. Appl Environ Microbiol. 2012 January; 78(1):185-93. doi: 10.1128/AEM.06192-11. Epub 2011 Oct. 21. PMID: 22020518; PMCID: PMC3255643.

Li, J. Y., Chassaing, B., Tyagi, A. M., Vaccaro, C., Luo, T., Adams, J., Darby, T. M., Weitzmann, M. N., Mulle, J. G., Gewirtz, A. T., Jones, R. M., & Pacifici, R. (2016). Sex steroid deficiency-associated bone loss is microbiota dependent and prevented by probiotics. *The Journal of clinical investigation,* 126(6), 2049-2063. https://doi.org/10.1172/JCI86062

Liu, B., Faller, L. L., Klitgord, N., Mazumdar, V., Ghodsi, M., Sommer, D. D., Gibbons, T. R., Treangen, T. J., Chang. Y. C., Li, S., Stine, O. C., Hasturk, H., Kasif, S., Segrè, D., Pop, M., & Amar, S. (2012). Deep sequencing of the oral microbiome reveals signatures of periodontal disease. *PloS one,* 7(6), e37919. https://doi.org/10.1371/journal.pone.0037919

Macfarlane, S., & Macfarlane, G. T. (2003). Regulation of short-chain fatty acid production. *The Proceedings of the Nutrition Society,* 62(1), 67-72. https://doi.org/10.1079/PNS2002207

Maeda, Y., Kurakawa, T., Umemoto, E., Motooka, D., Ito, Y., Gotoh, K., Hirota, K., Matsushita, M., Furuta, Y., Narazaki, M., Sakaguchi, N., Kayama, H., Nakamura, S., Iida, T., Saeki, Y., Kumanogoh, A., Sakaguchi, S., & Takeda, K. (2016). Dysbiosis Contributes to Arthritis Development via Activation of Autoreactive T Cells in the Intestine. *Arthritis & rheumatology* (Hoboken, N.J.), 68(11), 2646-2661. https://doi.org/10.1002/art.39783

Marietta, E. V., Murray, J. A., Luckey, D. H., Jeraldo, P. R., Lamba, A., Patel, R., Luthra, H. S., Mangalam, A., & Taneja, V. (2016). Suppression of Inflammatory Arthritis by Human Gut-Derived *Prevotella histicola* in Humanized Mice. *Arthritis & rheumatology* (Hoboken, N.J.), 68(12), 2878-2888. https://doi.org/10.1002/art.39785

Marinelli, L., Martin-Gallausiaux, C., Bourhis, J M. et al. Identification of the novel role of butyrate as AhR ligand in human intestinal epithelial cells. *Sci Rep* 9, 643 (2019). https://doi.org/10.1038/s41598-018-37019-2

Monteagudo-Mera A, Rastall R A, Gibson G R, Charalampopoulos D, Chatzifragkou A. Adhesion mechanisms mediated by probiotics and prebiotics and their potential impact on human health. Appl Microbiol Biotechnol. 2019 August; 103(16):6463-6472. doi: 10.1007/s00253-019-09978-7. Epub 2019 Jul. 2. PMID: 31267231; PMCID: PMC6667406.

Morikawa, M., Hirata, Y., & Imanaka, T. (2000). A study on the structure-function relationship of lipopeptide biosurfactants. *Biochimica et biophysica acta,* 1488(3), 211-218. https://doi.org/10.1016/s1388-1981(00)00124-4

Mulligan, C. (1984). The use of biological compounds to enhance the de-watering of peat. Department of Chemical Engineering. McGill University.

Nguyen, B. N., Chávez-Arroyo, A., Cheng, M. I., Krasilnikov, M., Louie, A., & Portnoy, D. A. (2020). TLR2 and endosomal TLR-mediated secretion of IL-10 and immune suppression in response to phagosome-confined *Listeria monocytogenes. PLoS pathogens,* 16(7), e1008622. https://doi.org/10.1371/journal.ppat.1008622

Ni, Z., Min, Y., Han, C. et al. TGR5-HNF4α axis contributes to bile acid-induced gastric intestinal metaplasia markers expression. *Cell Death Discov.* 6, 56 (2020). https://doi.org/10.1038/s41420-020-0290-3

Parks, D. H., Imelfort, M., Skennerton, C. T., Hugenholtz, P. & Tyson, G. W. CheckM: assessing the quality of microbial genomes recovered from isolates, single cells, and metagenomes. *Genome Res* 25, 1043-1055 (2015).

Paynich, M. L., Jones-Burrage, S. E., & Knight, K. L. (2017). Exopolysaccharide from *Bacillus subtilis* Induces Anti-Inflammatory M2 Macrophages That Prevent T Cell-Mediated Disease. *Journal of immunology* (Baltimore, Md.: 1950), 198(7), 2689-2698. https://doi.org/10.4049/jimmunol.1601641

Peng, Y., Leung, H. C. M., Yiu, S. M. & Chin, F. Y. L. IDBA-UD: a de novo assembler for single-cell and metagenomic sequencing data with highly uneven depth. *Bioinformatics* 28, 1420-1428 (2012).

Pérez-Chaparro, P. J., Gonçalves, C., Figueiredo, L. C., Faveri, M., Lobão, E., Tamashiro, N., Duarte, P., & Feres, M. (2014). Newly identified pathogens associated with periodontitis: a systematic review. *Journal of dental research,* 93(9), 846-858. https://doi.org/10.1177/0022034514542468

Pinoli, M., Marino, F., & Cosentino, M. (2017). Dopaminergic Regulation of Innate Immunity: a Review. *Journal of neuroimmune pharmacology: the official journal of the Society on Neuroimmune Pharmacology,* 12(4), 602-623. https://doi.org/10.1007/s11481-017-9749-2

Postler, T. S., & Ghosh, S. (2017). Understanding the Holobiont: How Microbial Metabolites Affect Human Health and Shape the Immune System. *Cell metabolism,* 26(1), 110-130. https://doi.org/10.1016/j.cmet.2017.05.008

Rao, S. P., Sancho, J., Campos-Rivera, J., Boutin, P. M., Severy, P. B., Weeden, T., Shankara, S., Roberts, B. L., & Kaplan, J. M. (2012). Human peripheral blood mononuclear cells exhibit heterogeneous CD52 expression levels and show differential sensitivity to alemtuzumab mediated cytolysis. *PloS one,* 7(6), e39416. https://doi.org/10.1371/journal.pone.0039416

Reinhoud, N. J., Brouwer, H. J., van Heerwaarden, L. M., & Korte-Bouws, G. A. (2013). Analysis of glutamate, GABA, noradrenaline, dopamine, serotonin, and metabolites using microbore UHPLC with electrochemical detection. *ACS chemical neuroscience,* 4(5), 888-894. https://doi.org/10.1021/cn400044s Ruhmann, B., Schmid, J., & Sieber, V. (2015). Methods to identify the unexplored diversity of microbial exopolysaccharides. *Frontiers in microbiology,* 6, 565. https://doi.org/10.3389/fmicb.2015.00565

Sandrini, S., Aldriwesh, M., Alruways, M., & Freestone, P. (2015). Microbial endocrinology: host-bacteria communication within the gut microbiome. *The Journal of endocrinology*, 225(2), R21-R34. https://doi.org/10.1530/JOE-14-0615

Saraiva, M., & O'Garra, A. (2010). The regulation of IL-10 production by immune cells. *Nature reviews. Immunology*, 10(3), 170-181. https://doi.org/10.1038/nri2711

Segata, N., Waldron, L., Ballarini, A., Narasimhan, V., Jousson, O., & Huttenhower, C. (2012). Metagenomic microbial community profiling using unique clade-specific marker genes. *Nature methods*, 9(8), 811-814. https://doi.org/10.1038/nmeth.2066

Sethi, S., & Samantaray, U. S. (2021). Isolation and biochemical characterization of indole-3-acetic acid (IAA) produced in *Pseudomonas* sp. isolated from rhizospheric soil. *International Journal for Research in Applied Sciences and Biotechnology*, 8(4). https://doi.org/10.31033/ijrasb.8.4.1

Scher, J. U., Sczesnak, A., Longman, R. S., Segata, N., Ubeda, C., Bielski, C., Rostron, T., Cerundolo, V., Pamer, E. G., Abramson, S. B., Huttenhower, C., & Littman, D. R. (2013). Expansion of intestinal *Prevotella copri* correlates with enhanced susceptibility to arthritis. *eLife*, 2, e01202. https://doi.org/10.7554/eLife.01202

Scortichini, S., Boarelli, M. C., Silvi, S., & Fiorini, D. (2020). Development and validation of a GC-FID method for the analysis of short chain fatty acids in rat and human faeces and in fermentation fluids. *Journal of chromatography. B, Analytical technologies in the biomedical and life sciences*, 1143, 121972. https://doi.org/10.1016/j.jchromb.2020.121972

Schott, E. M., Farnsworth, C. W., Grier, A., Lillis, J. A., Soniwala, S., Dadourian, G. H., Bell, R. D., Doolittle, M. L., Villani, D. A., Awad, H., Ketz, J. P., Kamal, F., Ackert-Bicknell, C., Ashton, J. M., Gill, S. R., Mooney, R. A., & Zuscik, M. J. (2018). Targeting the gut microbiome to treat the osteoarthritis of obesity. *JCI insight*, 3(8), e95997. https://doi.org/10.1172/jci.insight.95997

Skelly, A. N., Sato, Y., Kearney, S. et al. Mining the microbiota for microbial and metabolite-based immunotherapies. *Nat Rev Immunol* 19, 305-323 (2019). https://doi.org/10.1038/s41577-019-0144-5

Thevaranjan, N., Puchta, A., Schulz, C., Naidoo, A., Szamosi, J. C., Verschoor, C. P., Loukov, D., Schenck, L. P., Jury, J., Foley, K. P., Schertzer, J. D., Larché, M. J., Davidson, D. J., Verdú, E. F., Surette, M. G., & Bowdish, D. (2017). Age-Associated Microbial Dysbiosis Promotes Intestinal Permeability, Systemic Inflammation, and Macrophage Dysfunction. *Cell host & microbe*, 21(4), 455-466.e4. https://doi.org/10.1016/j.chom.2017.03.002

Tyagi, A. M., Yu, M., Darby, T. M., Vaccaro, C., Li, J. Y., Owens, J. A., Hsu, E., Adams, J., Weitzmann, M. N., Jones, R. M., & Pacifici, R. (2018). The Microbial Metabolite Butyrate Stimulates Bone Formation via T Regulatory Cell-Mediated Regulation of WNT10B Expression. *Immunity*, 49(6), 1116-1131.e7. https://doi.org/10.1016/j.immuni.2018.10.013

Vavassori, P., Mencarelli, A., Renga, B., Distrutti, E., & Fiorucci, S. (2009). The bile acid receptor FXR is a modulator of intestinal innate immunity. *Journal of immunology (Baltimore, Md.: 1950)*, 183(10), 6251-6261. https://doi.org/10.4049/jimmunol.0803978

Velduyzen van Zanten, S. J., Kolesnikow, T., Leung, V., O'Rourke, J. L., & Lee, A. (2003). Gastric transitional zones, areas where *Helicobacter* treatment fails: results of a treatment trial using the Sydney strain mouse model. *Antimicrobial agents and chemotherapy*, 47(7), 2249-2255. https://doi.org/10.1128/AAC.47.7.2249-2255.2003

Vijayakumar, P. P., & Muriana, P. M. (2015). A Microplate Growth Inhibition Assay for Screening Bacteriocins against *Listeria monocytogenes* to Differentiate Their Mode-of-Action. *Biomolecules*, 5(2), 1178-1194. https://doi.org/10.3390/biom5021178

Villageliú, D., & Lyte, M. (2018). Dopamine production in *Enterococcus faecium*: A microbial endocrinology-based mechanism for the selection of probiotics based on neurochemical-producing potential. *PloS one*, 13(11), e0207038. https://doi.org/10.1371/journal.pone.0207038

Walsham A D, MacKenzie D A, Cook V, Wemyss-Holden S, Hews C L, Juge N, Schüller S. *Lactobacillus reuteri* Inhibition of Enteropathogenic *Escherichia coli* Adherence to Human Intestinal Epithelium. Front Microbiol. 2016 Mar. 1; 7:244. doi: 10.3389/fmicb.2016.00244. PMID: 26973622; PMCID: PMC4771767.

Wan, M., Ding, L., Wang, D., Han, J., & Gao, P. (2020). Serotonin: A Potent Immune Cell Modulator in Autoimmune Diseases. *Frontiers in immunology*, 11, 186. https://doi.org/10.3389/fimmu.2020.00186

Wang, Y. D., Chen, W. D., Moore, D. D., & Huang, W. (2008). FXR: a metabolic regulator and cell protector. *Cell research*, 18(11), 1087-1095. https://doi.org/10.1038/cr.2008.289

Wells, P. M., Adebayo, A. S., Bowyer, R., Freidin, M. B., Finckh, A., Strowig, T., Lesker, T. R., Alpizar-Rodriguez, D., Gilbert, B., Kirkham, B., Cope, A. P., Steves, C. J., & Williams, F. (2020). Associations between gut microbiota and genetic risk for rheumatoid arthritis in the absence of disease: a cross-sectional study. *The Lancet. Rheumatology*, 2(7), e418-e427. https://doi.org/10.1016/S2665-9913(20)30064-3

Wilson, T. M., Trent, B., Kuhn, K. A., & Demoruelle, M. K. (2020). Microbial Influences of Mucosal Immunity in Rheumatoid Arthritis. *Current rheumatology reports*, 22(11), 83. https://doi.org/10.1007/s11926-020-00960-1

Yamashita, M., Matsumoto, K., Endo, T., Ukibe, K., Hosoya, T., Matsubara, Y., Nakagawa, H., Sakai, F., & Miyazaki, T. (2017). Preventive Effect of *Lactobacillus helveticus* SBT2171 on Collagen-Induced Arthritis in Mice. *Frontiers in microbiology*, 8, 1159. https://doi.org/10.3389/fmicb.2017.01159

Yamazaki, M., Matsuoka, T., Yasui, K., Komiyama, A., & Akabane, T. (1989). Dopamine inhibition of superoxide anion production by polymorphonuclear leukocytes. *The Journal of allergy and clinical immunology*, 83(5), 967-972. https://doi.org/10.1016/0091-6749(89)90113-9

Yan, Y., Jiang, W., Liu, L., Wang, X., Ding, C., Tian, Z., & Zhou, R. (2015). Dopamine controls systemic inflammation through inhibition of NLRP3 inflammasome. *Cell*, 160(1-2), 62-73. https://doi.org/10.1016/j.cell.2014.11.047

Yoneno, K., Hisamatsu, T., Shimamura, K., Kamada, N., Ichikawa, R., Kitazume, M. T., Mori, M., Uo, M., Namikawa, Y., Matsuoka, K., Sato, T., Koganei, K., Sugita, A., Kanai, T., & Hibi, T. (2013). TGR5 signalling inhibits the production of pro-inflammatory cytokines by in vitro differentiated inflammatory and intestinal macrophages in Crohn's disease. *Immunology*, 139(1), 19-29. https://doi.org/10.1111/imm.12045

Yu, H., Ding, X., Shang, L., Zeng, X., Liu, H., Li, N., Huang, S., Wang, Y., Wang, G., Cai, S., Chen, M., Levesque, C. L., Johnston, L. J., & Qiao, S. (2018). Protective Ability of Biogenic Antimicrobial Peptide Microcin J25 Against Enterotoxigenic *Escherichia coli*-Induced Intestinal Epithelial Dysfunction and Inflammatory Responses IPEC-J2

Cells. *Frontiers in cellular and infection microbiology,* 8, 242. https://doi.org/10.3389/fcimb.2018.00242

Zaiss, M. M., Joyce Wu, H. J., Mauro, D., Schett, G., & Ciccia, F. (2021). The gut-joint axis in rheumatoid arthritis. *Nature reviews. Rheumatology,* 17(4), 224-237. https://doi.org/10.1038/s41584-021-00585-3

Zhang B, Zuo F, Yu R, Zeng Z, Ma H, Chen S. Comparative genome-based identification of a cell wall-anchored protein from *Lactobacillus plantarum* increases adhesion of *Lactococcus lactis* to human epithelial cells. Sci Rep. 2015 Sep. 15; 5:14109. doi: 10.1038/srep14109. PMID: 26370773; PMCID: PMC4572922.

Zhang, X., Zhang, D., Jia, H., Feng, Q., Wang, D., Liang, D., Wu, X., Li, J., Tang, L., Li, Y., Lan, Z., Chen, B., Li, Y., Zhong, H., Xie, H., Jie, Z., Chen, W., Tang, S., Xu, X., Wang, X., . . . Wang, J. (2015). The oral and gut microbiomes are perturbed in rheumatoid arthritis and partly normalized after treatment. *Nature medicine,* 21(8), 895-905. https://doi.org/10.1038/nm.3914

Zhou, B., & Zhang, D. (2017). Antibacterial effects of bacteriocins isolated from *Lactobacillus rhamnosus* (ATCC 53103) in a rabbit model of knee implant infection. *Experimental and therapeutic medicine,* 15(3), 2985-2989. https://doi.org/10.3892/etm.2018.5790

Lengthy table referenced here

US12440523-20251014-T00001

Please refer to the end of the specification for access instructions.

Lengthy table referenced here

US12440523-20251014-T00002

Please refer to the end of the specification for access instructions.

Lengthy table referenced here

US12440523-20251014-T00003

Please refer to the end of the specification for access instructions.

Lengthy table referenced here

US12440523-20251014-T00004

Please refer to the end of the specification for access instructions.

Lengthy table referenced here

US12440523-20251014-T00005

Please refer to the end of the specification for access instructions.

Lengthy table referenced here

US12440523-20251014-T00006

Please refer to the end of the specification for access instructions.

LENGTHY TABLES

The patent contains a lengthy table section. A copy of the table is available in electronic form from the USPTO web site (https://seqdata.uspto.gov/?pageRequest=docDetail&DocID=US12440523B2). An electronic copy of the table will also be available from the USPTO upon request and payment of the fee set forth in 37 CFR 1.19(b)(3).

SEQUENCE LISTING

The patent contains a lengthy sequence listing. A copy of the sequence listing is available in electronic form from the USPTO web site (https://seqdata.uspto.gov/?pageRequest=docDetail&DocID=US12440523B2). An electronic copy of the sequence listing will also be available from the USPTO upon request and payment of the fee set forth in 37 CFR 1.19(b)(3).

The invention claimed is:

1. A pharmaceutical composition comprising
a) a combination of four heterologous microbes comprising:
*Lactobacillus harbinensis, Lactobacillus brevis, Lactococcus lactis,* and *Bacillus velezensis,* wherein the heterologous microbes are formulated as a synthetic microbial consortium comprising about $1.0 \times 10^8$ to about $1.0 \times 10^{12}$ CFU of each of the heterologous microbes, wherein at least one of the heterologous microbes comprises a 16S rRNA sequence having at least 97% identity to any one of SEQ ID NOs: 43, 198, 221, and 224, formulated in an amount effective to produce an anti-inflammatory effect in a human subject; and b) a pharmaceutically acceptable excipient.

2. The pharmaceutical composition of claim 1, wherein the at least one of the heterologous microbes comprises a 16S rRNA sequence having at least 98% identity to any one of SEQ ID NOs: 43, 198, 221, and 224.

3. The pharmaceutical composition of claim 1, further comprising a prebiotic selected from the group consisting of oligofructose, a dried fruit or vegetable powder, and combinations thereof.

4. The pharmaceutical composition of claim 1, further comprising one or more vitamins wherein the vitamins are selected from the group consisting of vitamins A, B6, B12, C, D, E, K1, K2, riboflavin, niacin, folic acid, pyridoxine, thiamine, pantothenic acid, biotin, and combinations thereof.

5. The pharmaceutical composition of claim 1, wherein producing an anti-inflammatory effect in a mammalian subject comprises reducing the level and/or activity of at least one inflammatory cytokine selected from Table 8 relative to a level and/or activity of the inflammatory cytokine in the serum of the subject; or a tissue of the subject, prior to administering the medical food to the subject.

6. The pharmaceutical composition of claim 1, wherein the anti-inflammatory effect in a mammalian subject is caused by the production of at least one anti-inflammatory metabolite selected from the group consisting of indole, indole acetic acid (IAA), indole propionic acid (IPA), bacteriocins, antibacterial peptides, serotonin, gamma-aminobutyric acid (GABA), dopamine, melatonin, secondary bile acids, and combinations thereof.

7. The pharmaceutical composition of claim 1, wherein administering an effective amount of the pharmaceutical composition to a human subject enables the treatment or management of at least one symptom in the subject of a rheumatic disease selected from rheumatoid arthritis, spondyloarthritis, and psoriasis.

8. The pharmaceutical composition of claim 7, wherein the treatment or management of at least one symptom in the subject of a rheumatic disease comprises at least 20%, at least 50%, or at least 70% improvement in the American College of Rheumatology composite score.

9. The pharmaceutical composition of claim 7, wherein the treatment or management of at least one symptom in the subject of a rheumatic disease comprises reduced joint swelling, joint tenderness, or subject's assessment of pain.

10. The pharmaceutical composition of claim 7, wherein the treatment or management of at least one symptom in the subject of a rheumatic disease comprises reducing the frequency and severity of gastrointestinal symptoms selected from gas, abdominal pain, or bloating.

11. The pharmaceutical composition of claim 7, further comprising one or more additional agents for the treatment or management of one or more symptoms of rheumatic disease.

12. The pharmaceutical composition of claim 11, wherein the one or more additional agents comprises methotrexate.

13. The pharmaceutical composition of claim 1, wherein each of the four heterologous microbes comprises a 16S rRNA sequence having at least 97% identity to any one of SEQ ID NOs: 43, 198, 221, and 224.

14. The pharmaceutical composition of claim 2, wherein each of the four heterologous microbes comprises a 16S rRNA sequence having at least 98% identity to any one of SEQ ID NOs: 43, 198, 221, and 224.

15. The pharmaceutical composition of claim 1, wherein the at least one of the heterologous microbes comprises a 16S rRNA sequence having at least 99% identity to any one of SEQ ID NOs: 43, 198, 221, and 224.

16. The pharmaceutical composition of claim 15, wherein each of the four heterologous microbes comprises a 16S rRNA sequence having at least 99% identity to any one of SEQ ID NOs: 43, 198, 221, and 224.

17. The pharmaceutical composition of claim 1, wherein the at least one of the heterologous microbes comprises a 16S rRNA sequence having 100% identity to any one of SEQ ID NOs: 43, 198, 221, and 224.

18. The pharmaceutical composition of claim 17, wherein each of the four heterologous microbes comprises a 16S rRNA sequence having 100% identity to any one of SEQ ID NOs: 43, 198, 221, and 224.

* * * * *